US012586054B2

(12) United States Patent
Van Os et al.

(10) Patent No.: US 12,586,054 B2
(45) Date of Patent: Mar. 24, 2026

(54) USER INTERFACE FOR PAYMENTS

(71) Applicant: Apple Inc., Cupertino, CA (US)

(72) Inventors: Marcel Van Os, San Francisco, CA (US); Christopher D. Adams, San Jose, CA (US); George R. Dicker, Sunnyvale, CA (US); Jack I-Chieh Fu, Los Gatos, CA (US); Petr Kostka, Prague (CZ); Daniel Kurtz, Sunnyvale, CA (US); Brittany D. Paine, Alpharetta, GA (US); Balaji A. Sarpeshkar, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1080 days.

(21) Appl. No.: 17/222,141

(22) Filed: Apr. 5, 2021

(65) Prior Publication Data

US 2021/0224785 A1     Jul. 22, 2021

Related U.S. Application Data

(63) Continuation of application No. 14/869,831, filed on Sep. 29, 2015, now abandoned.

(Continued)

(51) Int. Cl.
   *G06Q 20/32*        (2012.01)
   *G06Q 20/24*        (2012.01)
   (Continued)

(52) U.S. Cl.
   CPC ......... *G06Q 20/3278* (2013.01); *G06Q 20/32* (2013.01); *G06Q 20/3224* (2013.01);
   (Continued)

(58) Field of Classification Search
   CPC .............. G06Q 20/3278; G06Q 20/32; G06Q 20/3224; G06Q 20/3276; G06Q 20/3552;
   (Continued)

(56) References Cited

U.S. PATENT DOCUMENTS

| | | | |
|---|---|---|---|
| 4,803,487 A | 2/1989 | Willard et al. |
| 5,001,774 A | 3/1991 | Lee |

(Continued)

FOREIGN PATENT DOCUMENTS

| | | |
|---|---|---|
| AU | 2015100708 A4 | 7/2015 |
| AU | 2015100709 A4 | 7/2015 |

(Continued)

OTHER PUBLICATIONS

Communication for Board of Appeal received for European Patent Application No. 16703893.4, mailed on Mar. 9, 2023, 7 pages.

(Continued)

*Primary Examiner* — Slade E Smith

(74) *Attorney, Agent, or Firm* — YHE Law LLP

(57) ABSTRACT

The present disclosure generally relates selecting an appropriate communication radio mode based on criteria. In one example process, the device detects a fingerprint using the integrated biometric sensor and, in accordance with a determination that the fingerprint is consistent with an enrolled fingerprint and a determination that a set of one or more criteria is met, transitions to a second short-range communication radio mode different from a first short-range communication radio mode. In another example process, the device detects a fingerprint using the integrated biometric sensor and, in accordance with a determination that the fingerprint is consistent with the enrolled fingerprint and a determination that the set of one or more criteria is not met, the device is unlocked.

36 Claims, 62 Drawing Sheets

Related U.S. Application Data

(60) Provisional application No. 62/172,000, filed on Jun. 5, 2015, provisional application No. 62/110,566, filed on Feb. 1, 2015.

(51) Int. Cl.
| | |
|---|---|
| *G06Q 20/34* | (2012.01) |
| *G06Q 20/40* | (2012.01) |

(52) U.S. Cl.
CPC ..... *G06Q 20/3276* (2013.01); *G06Q 20/3552* (2013.01); *G06Q 20/40145* (2013.01); *G06Q 20/24* (2013.01)

(58) Field of Classification Search
CPC .. G06Q 20/40145; G06Q 20/24; G06Q 20/10; G06Q 20/322; G06Q 20/3223; G06Q 20/327; G06Q 20/401; G06Q 20/405; G06Q 30/0631; G06Q 20/36; G06Q 20/40; G06Q 20/102; G06Q 20/227; G06Q 20/3821; G06Q 20/4014; G06Q 20/204; G06Q 20/321; G06Q 20/3221; G06Q 20/326; G06Q 20/3267; G06Q 20/367; G06Q 20/386; G06Q 20/42; G06Q 20/425; G06Q 30/0261; G06Q 30/0641; G06Q 20/363; G06Q 30/0207; G06Q 30/0226; G06Q 30/0601; H04N 23/00; G06V 10/10; G06V 40/12; H04L 67/10; H04M 1/72403; H04M 1/72445; H04W 4/80
USPC .......................................................... 705/44
See application file for complete search history.

(56) References Cited

U.S. PATENT DOCUMENTS

| | | | |
|---|---|---|---|
| 5,237,159 | A | 8/1993 | Stephens et al. |
| 5,265,007 | A | 11/1993 | Barnhard, Jr. et al. |
| 5,404,295 | A | 4/1995 | Katz et al. |
| 5,418,951 | A | 5/1995 | Damashek |
| 5,444,823 | A | 8/1995 | Nguyen |
| 5,475,653 | A | 12/1995 | Yamada et al. |
| 5,484,988 | A | 1/1996 | Hills et al. |
| 5,495,604 | A | 2/1996 | Harding et al. |
| 5,691,524 | A | 11/1997 | Josephson |
| 5,717,868 | A | 2/1998 | James |
| 5,783,808 | A | 7/1998 | Josephson |
| 5,815,657 | A | 9/1998 | Williams et al. |
| 5,910,989 | A | 6/1999 | Naccache |
| 5,917,913 | A | 6/1999 | Wang |
| 5,960,411 | A | 9/1999 | Hartman et al. |
| 5,983,197 | A | 11/1999 | Enta |
| 6,016,484 | A | 1/2000 | Williams et al. |
| 6,164,528 | A | 12/2000 | Hills et al. |
| 6,189,785 | B1 | 2/2001 | Lowery |
| 6,193,152 | B1 | 2/2001 | Fernando et al. |
| 6,230,148 | B1 | 5/2001 | Pare, Jr. et al. |
| 6,260,027 | B1 | 7/2001 | Takahashi et al. |
| 6,282,656 | B1 | 8/2001 | Wang |
| 6,323,846 | B1 | 11/2001 | Westerman et al. |
| 6,328,207 | B1 | 12/2001 | Gregoire et al. |
| 6,398,646 | B1 | 6/2002 | Wei et al. |
| 6,408,087 | B1 | 6/2002 | Kramer |
| 6,570,557 | B1 | 5/2003 | Westerman et al. |
| 6,581,042 | B2 | 6/2003 | Pare, Jr. et al. |
| 6,590,303 | B1 | 7/2003 | Austin et al. |
| 6,644,546 | B2 | 11/2003 | George et al. |
| 6,661,438 | B1 | 12/2003 | Shiraishi et al. |
| 6,662,166 | B2 | 12/2003 | Pare, Jr. et al. |
| 6,677,932 | B1 | 1/2004 | Westerman |
| 6,809,724 | B1 | 10/2004 | Shiraishi et al. |
| 6,822,769 | B1 | 11/2004 | Drinkwater et al. |
| 6,889,138 | B1 | 5/2005 | Krull et al. |
| 6,950,810 | B2 | 9/2005 | Lapsley et al. |
| 6,970,855 | B2 | 11/2005 | Das et al. |
| 7,079,652 | B1 | 7/2006 | Harris |
| 7,081,905 | B1 | 7/2006 | Raghunath |
| 7,089,292 | B1 | 8/2006 | Roderick et al. |
| 7,099,845 | B2 | 8/2006 | Higgins et al. |
| 7,099,850 | B1 | 8/2006 | Mann, II et al. |
| 7,130,664 | B1 | 10/2006 | Williams |
| 7,155,411 | B1 | 12/2006 | Blinn et al. |
| 7,305,350 | B1 | 12/2007 | Bruecken |
| 7,347,361 | B2 | 3/2008 | Lovett |
| 7,356,516 | B2 | 4/2008 | Richey et al. |
| 7,359,880 | B2 | 4/2008 | Abel et al. |
| 7,370,244 | B2 | 5/2008 | Breitling et al. |
| 7,415,720 | B2 | 8/2008 | Jung |
| 7,430,537 | B2 | 9/2008 | Templeton et al. |
| 7,454,192 | B1 | 11/2008 | Zhu |
| 7,496,527 | B2 | 2/2009 | Silverstein et al. |
| 7,529,563 | B1 | 5/2009 | Pitroda |
| 7,535,344 | B2 | 5/2009 | Obradovich |
| 7,546,470 | B2 | 6/2009 | Schultz |
| 7,614,008 | B2 | 11/2009 | Ording |
| 7,633,076 | B2 | 12/2009 | Huppi et al. |
| 7,644,019 | B2 | 1/2010 | Woda et al. |
| 7,653,883 | B2 | 1/2010 | Hotelling et al. |
| 7,657,441 | B2 | 2/2010 | Richey et al. |
| 7,657,849 | B2 | 2/2010 | Chaudhri et al. |
| 7,663,607 | B2 | 2/2010 | Hotelling et al. |
| 7,689,508 | B2 | 3/2010 | Davis et al. |
| 7,810,720 | B2 | 10/2010 | Lovett |
| 7,818,399 | B1 | 10/2010 | Ross, Jr. et al. |
| 7,844,914 | B2 | 11/2010 | Andre et al. |
| 7,860,936 | B1 | 12/2010 | Newstadt et al. |
| 7,890,422 | B1 | 2/2011 | Hirka et al. |
| 7,953,393 | B2 | 5/2011 | Chin et al. |
| 7,957,762 | B2 | 6/2011 | Herz et al. |
| RE42,574 | E * | 7/2011 | Cockayne .............. G06Q 30/02 709/200 |
| 8,006,002 | B2 | 8/2011 | Kalayjian et al. |
| 8,042,157 | B2 | 10/2011 | Bennett et al. |
| 8,050,997 | B1 | 11/2011 | Nosek et al. |
| 8,060,571 | B2 | 11/2011 | Rao |
| 8,112,787 | B2 | 2/2012 | Buer |
| 8,121,945 | B2 | 2/2012 | Rackley, III et al. |
| 8,126,806 | B1 | 2/2012 | DiMartino et al. |
| 8,150,930 | B2 | 4/2012 | Satterfield et al. |
| 8,157,164 | B1 | 4/2012 | Billman |
| 8,195,507 | B2 | 6/2012 | Postrel |
| 8,195,576 | B1 * | 6/2012 | Grigg ................. G06Q 20/3278 726/10 |
| 8,239,784 | B2 | 8/2012 | Hotelling et al. |
| 8,254,647 | B1 | 8/2012 | Nechyba et al. |
| 8,279,180 | B2 | 10/2012 | Hotelling et al. |
| 8,285,258 | B2 | 10/2012 | Schultz et al. |
| 8,381,135 | B2 | 2/2013 | Hotelling et al. |
| 8,392,259 | B2 | 3/2013 | Macgillivray et al. |
| 8,396,265 | B1 | 3/2013 | Ross et al. |
| 8,401,904 | B1 | 3/2013 | Simakov et al. |
| 8,452,654 | B1 | 5/2013 | Wooters et al. |
| 8,452,978 | B2 | 5/2013 | Alward et al. |
| 8,453,940 | B2 | 6/2013 | Diamond |
| 8,459,545 | B1 * | 6/2013 | Hammer ............ G06Q 20/3276 705/16 |
| 8,467,766 | B2 | 6/2013 | Rackley, III et al. |
| 8,479,122 | B2 | 7/2013 | Hotelling et al. |
| 8,554,694 | B1 | 10/2013 | Ward et al. |
| 8,560,004 | B1 | 10/2013 | Tsvetkov et al. |
| 8,571,937 | B2 * | 10/2013 | Rose ................. G06Q 20/3278 705/16 |
| 8,583,549 | B1 | 11/2013 | Mohsenzadeh |
| 8,606,512 | B1 | 12/2013 | Bogovich et al. |
| 8,606,640 | B2 | 12/2013 | Brody et al. |
| 8,639,621 | B1 | 1/2014 | Kennedy et al. |
| 8,706,628 | B2 | 4/2014 | Phillips |
| 8,762,272 | B1 | 6/2014 | Cozens et al. |
| 8,763,896 | B2 | 7/2014 | Kushevsky et al. |
| 8,769,624 | B2 | 7/2014 | Cotterill |
| 8,774,868 | B2 | 7/2014 | Niu et al. |
| 8,827,153 | B1 | 9/2014 | Rhoades et al. |

(56) References Cited

U.S. PATENT DOCUMENTS

| | | |
|---|---|---|
| 8,831,677 B2 | 9/2014 | Villa-real |
| 8,862,252 B2 | 10/2014 | Rottler et al. |
| 8,880,055 B1 | 11/2014 | Clement et al. |
| 8,892,474 B1 | 11/2014 | Inskeep et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 8,949,902 B1 | 2/2015 | Fabian-Isaacs et al. |
| 8,963,806 B1 | 2/2015 | Starner et al. |
| 9,002,322 B2 | 4/2015 | Cotterill |
| 9,053,293 B2 | 6/2015 | Latzina |
| 9,075,612 B2 | 7/2015 | Yang et al. |
| 9,146,124 B2 | 9/2015 | Parada et al. |
| 9,177,130 B2 | 11/2015 | Nechyba et al. |
| 9,253,375 B2 | 2/2016 | Milanfar et al. |
| 9,268,387 B2 | 2/2016 | Yu |
| 9,269,083 B1 | 2/2016 | Jarajapu et al. |
| 9,294,476 B1 | 3/2016 | Lurey et al. |
| 9,305,310 B2 | 4/2016 | Radhakrishnan et al. |
| 9,324,067 B2 | 4/2016 | Van Os et al. |
| 9,349,035 B1 | 5/2016 | Gerber et al. |
| 9,355,393 B2 * | 5/2016 | Purves ................... G06Q 20/28 |
| 9,411,460 B2 | 8/2016 | Dumont et al. |
| 9,461,833 B1 | 10/2016 | Marra et al. |
| 9,477,872 B2 | 10/2016 | Sarve et al. |
| 9,483,763 B2 | 11/2016 | Van Os et al. |
| 9,519,901 B1 | 12/2016 | Dorogusker |
| 9,526,127 B1 | 12/2016 | Taubman et al. |
| 9,547,419 B2 | 1/2017 | Yang et al. |
| 9,558,636 B1 | 1/2017 | Burdick |
| 9,569,605 B1 | 2/2017 | Schneider et al. |
| 9,574,896 B2 | 2/2017 | Mcgavran et al. |
| 9,575,591 B2 | 2/2017 | Yang et al. |
| 9,584,463 B2 | 2/2017 | Ji et al. |
| 9,716,825 B1 | 7/2017 | Manzari et al. |
| 9,779,585 B2 | 10/2017 | Dupuis et al. |
| 9,817,549 B2 | 11/2017 | Chandrasekaran |
| 9,842,330 B1 | 12/2017 | Van Os et al. |
| 9,847,999 B2 | 12/2017 | Van Os et al. |
| 9,851,214 B1 | 12/2017 | Chintakindi |
| 9,881,198 B2 | 1/2018 | Lee et al. |
| 9,922,327 B2 | 3/2018 | Johnson et al. |
| 9,940,637 B2 | 4/2018 | Van Os et al. |
| 9,953,149 B2 | 4/2018 | Tussy |
| 9,954,991 B2 | 4/2018 | Wang et al. |
| 10,003,738 B2 | 6/2018 | Lautenbach et al. |
| 10,019,904 B1 | 7/2018 | Chan et al. |
| 10,032,100 B2 | 7/2018 | Mullen et al. |
| 10,073,541 B1 | 9/2018 | Baldwin |
| 10,079,815 B2 | 9/2018 | Berlin et al. |
| 10,089,607 B2 | 10/2018 | Ziat et al. |
| 10,182,048 B1 | 1/2019 | Sabanayagam |
| 10,223,631 B2 | 3/2019 | Mullen et al. |
| 10,248,779 B2 | 4/2019 | Song et al. |
| 10,255,545 B2 | 4/2019 | Mullen et al. |
| 10,319,203 B1 | 6/2019 | Testanero et al. |
| 10,334,054 B2 | 6/2019 | Van Os et al. |
| 10,482,461 B2 | 11/2019 | Van Os et al. |
| 10,749,967 B2 | 8/2020 | Van Os et al. |
| 10,783,576 B1 | 9/2020 | Van Os et al. |
| 2001/0027396 A1 | 10/2001 | Sato |
| 2001/0039497 A1 | 11/2001 | Hubbard |
| 2001/0049627 A1 | 12/2001 | Simpson |
| 2002/0004760 A1 | 1/2002 | Yoshida et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0037715 A1 | 3/2002 | Mauney et al. |
| 2002/0046064 A1 | 4/2002 | Maury et al. |
| 2002/0059295 A1 | 5/2002 | Ludtke et al. |
| 2002/0065774 A1 | 5/2002 | Young et al. |
| 2002/0087262 A1 | 7/2002 | Bullock et al. |
| 2002/0116276 A1 | 8/2002 | Ottley |
| 2003/0006280 A1 | 1/2003 | Seita et al. |
| 2003/0028639 A1 | 2/2003 | Yamamoto et al. |
| 2003/0061157 A1 | 3/2003 | Hirka et al. |
| 2003/0061172 A1 * | 3/2003 | Robinson ......... G06Q 20/40145 |
| | | 705/67 |
| 2003/0097413 A1 | 5/2003 | Vishik et al. |
| 2003/0142227 A1 | 7/2003 | Van Zee |
| 2003/0158737 A1 | 8/2003 | Csicsatka |
| 2003/0181201 A1 * | 9/2003 | Bomze ................... G06Q 30/02 |
| | | 455/414.3 |
| 2003/0188183 A1 | 10/2003 | Lee et al. |
| 2003/0200184 A1 | 10/2003 | Dominguez et al. |
| 2003/0236746 A1 | 12/2003 | Turner et al. |
| 2004/0041841 A1 | 3/2004 | Lemogne et al. |
| 2004/0070511 A1 | 4/2004 | Kim |
| 2004/0073432 A1 | 4/2004 | Stone |
| 2004/0113953 A1 | 6/2004 | Newman |
| 2004/0122685 A1 | 6/2004 | Bunce |
| 2004/0143553 A1 | 7/2004 | Torget et al. |
| 2004/0169722 A1 * | 9/2004 | Pena ..................... G06Q 40/02 |
| | | 348/14.08 |
| 2004/0181695 A1 | 9/2004 | Walker et al. |
| 2004/0215572 A1 | 10/2004 | Uehara et al. |
| 2004/0234117 A1 | 11/2004 | Tibor |
| 2004/0236975 A1 | 11/2004 | Gaskins et al. |
| 2004/0242200 A1 | 12/2004 | Maeoka et al. |
| 2004/0254891 A1 | 12/2004 | Blinn et al. |
| 2005/0015254 A1 | 1/2005 | Beaman |
| 2005/0045373 A1 | 3/2005 | Born |
| 2005/0066209 A1 | 3/2005 | Kee et al. |
| 2005/0071188 A1 | 3/2005 | Thuerk |
| 2005/0077349 A1 * | 4/2005 | Bonalle ................... G07C 9/28 |
| | | 235/380 |
| 2005/0093868 A1 | 5/2005 | Hinckley |
| 2005/0096009 A1 | 5/2005 | Ackley |
| 2005/0144452 A1 | 6/2005 | Lynch et al. |
| 2005/0187873 A1 | 8/2005 | Labrou et al. |
| 2005/0191159 A1 | 9/2005 | Benko |
| 2005/0219223 A1 | 10/2005 | Kotzin et al. |
| 2005/0250538 A1 | 11/2005 | Narasimhan et al. |
| 2005/0253814 A1 * | 11/2005 | Ghassabian ........... G06F 1/1641 |
| | | 345/168 |
| 2005/0268237 A1 | 12/2005 | Crane et al. |
| 2005/0278587 A1 | 12/2005 | Breitling et al. |
| 2005/0283729 A1 | 12/2005 | Morris et al. |
| 2006/0000900 A1 | 1/2006 | Fernandes et al. |
| 2006/0017692 A1 | 1/2006 | Wehrenberg et al. |
| 2006/0021003 A1 * | 1/2006 | Fisher ................. H04L 63/0861 |
| | | 726/1 |
| 2006/0025923 A1 | 2/2006 | Dotan et al. |
| 2006/0026245 A1 | 2/2006 | Cunningham et al. |
| 2006/0026536 A1 | 2/2006 | Hotelling et al. |
| 2006/0033724 A1 | 2/2006 | Chaudhri et al. |
| 2006/0036553 A1 | 2/2006 | Gupta et al. |
| 2006/0056664 A1 | 3/2006 | Iwasaki |
| 2006/0064313 A1 | 3/2006 | Steinbarth et al. |
| 2006/0064372 A1 | 3/2006 | Gupta |
| 2006/0092177 A1 | 5/2006 | Blasko et al. |
| 2006/0095848 A1 | 5/2006 | Naik |
| 2006/0120707 A1 | 6/2006 | Kusakari et al. |
| 2006/0165060 A1 * | 7/2006 | Dua ..................... G06Q 20/322 |
| | | 705/76 |
| 2006/0173749 A1 | 8/2006 | Ward et al. |
| 2006/0179404 A1 | 8/2006 | Yolleck et al. |
| 2006/0192868 A1 | 8/2006 | Wakamori |
| 2006/0197753 A1 | 9/2006 | Hotelling |
| 2006/0206709 A1 | 9/2006 | Labrou et al. |
| 2006/0208065 A1 | 9/2006 | Mendelovich et al. |
| 2006/0234764 A1 | 10/2006 | Gamo et al. |
| 2006/0288226 A1 | 12/2006 | Kowal |
| 2006/0291666 A1 | 12/2006 | Ball et al. |
| 2006/0293892 A1 * | 12/2006 | Pathuel ................... G06F 21/32 |
| | | 704/E17.003 |
| 2006/0294007 A1 | 12/2006 | Barthelemy |
| 2006/0294025 A1 | 12/2006 | Mengerink |
| 2007/0013662 A1 | 1/2007 | Fauth |
| 2007/0036300 A1 | 2/2007 | Brown et al. |
| 2007/0061786 A1 | 3/2007 | Zhou et al. |
| 2007/0073649 A1 | 3/2007 | Kikkoji et al. |

(56)                References Cited

U.S. PATENT DOCUMENTS

| 2007/0096765 A1 | 5/2007 | Kagan |
| 2007/0131759 A1 | 6/2007 | Cox et al. |
| 2007/0150842 A1 | 6/2007 | Chaudhri et al. |
| 2007/0156410 A1 | 7/2007 | Stohr et al. |
| 2007/0157089 A1 | 7/2007 | Van Os et al. |
| 2007/0180383 A1 | 8/2007 | Naik |
| 2007/0180492 A1 | 8/2007 | Hassan et al. |
| 2007/0186106 A1 | 8/2007 | Ting et al. |
| 2007/0188409 A1 | 8/2007 | Repetto et al. |
| 2007/0192168 A1 | 8/2007 | Van |
| 2007/0194110 A1 | 8/2007 | Esplin et al. |
| 2007/0194113 A1 | 8/2007 | Esplin et al. |
| 2007/0202925 A1 | 8/2007 | Beith |
| 2007/0219901 A1 | 9/2007 | Garbow et al. |
| 2007/0245148 A1 | 10/2007 | Buer |
| 2007/0254712 A1 | 11/2007 | Chitti |
| 2007/0255564 A1 | 11/2007 | Yee et al. |
| 2007/0260547 A1 | 11/2007 | Little |
| 2007/0260558 A1* | 11/2007 | Look ................ G06Q 20/3821 |
|  |  | 705/76 |
| 2007/0288932 A1 | 12/2007 | Horvitz et al. |
| 2007/0294182 A1 | 12/2007 | Hammad |
| 2008/0016443 A1 | 1/2008 | Hiroshima et al. |
| 2008/0040265 A1 | 2/2008 | Rackley, III et al. |
| 2008/0041936 A1 | 2/2008 | Vawter |
| 2008/0042866 A1 | 2/2008 | Morse et al. |
| 2008/0046820 A1 | 2/2008 | Lee et al. |
| 2008/0052181 A1 | 2/2008 | Devitt-Carolan et al. |
| 2008/0054081 A1 | 3/2008 | Mullen |
| 2008/0059351 A1 | 3/2008 | Richey et al. |
| 2008/0078831 A1 | 4/2008 | Johnson et al. |
| 2008/0079589 A1 | 4/2008 | Blackadar |
| 2008/0091166 A1 | 4/2008 | Fitzgerald et al. |
| 2008/0114678 A1 | 5/2008 | Bennett et al. |
| 2008/0114980 A1 | 5/2008 | Sridhar |
| 2008/0120029 A1 | 5/2008 | Zelek et al. |
| 2008/0120707 A1* | 5/2008 | Ramia ................ H04L 63/0861 |
|  |  | 726/5 |
| 2008/0208681 A1 | 8/2008 | Hammad et al. |
| 2008/0208762 A1 | 8/2008 | Arthur et al. |
| 2008/0221903 A1 | 9/2008 | Kanevsky et al. |
| 2008/0229409 A1 | 9/2008 | Miller et al. |
| 2008/0247519 A1 | 10/2008 | Abella et al. |
| 2008/0275779 A1 | 11/2008 | Lakshminarayanan |
| 2008/0319875 A1 | 12/2008 | Levchin et al. |
| 2008/0320391 A1 | 12/2008 | Lemay et al. |
| 2009/0030793 A1 | 1/2009 | Fordyce, III |
| 2009/0031375 A1 | 1/2009 | Sullivan et al. |
| 2009/0036165 A1 | 2/2009 | Brede |
| 2009/0037326 A1 | 2/2009 | Chitti et al. |
| 2009/0048959 A1 | 2/2009 | Omura et al. |
| 2009/0054044 A1 | 2/2009 | Ikemori et al. |
| 2009/0055494 A1 | 2/2009 | Fukumoto et al. |
| 2009/0057396 A1 | 3/2009 | Barbour et al. |
| 2009/0063851 A1 | 3/2009 | Nijdam |
| 2009/0066478 A1* | 3/2009 | Colella ................ G06Q 10/06 |
|  |  | 340/5.83 |
| 2009/0067689 A1 | 3/2009 | Porter et al. |
| 2009/0082043 A1 | 3/2009 | Lazaridis |
| 2009/0083850 A1 | 3/2009 | Fadell et al. |
| 2009/0094134 A1 | 4/2009 | Toomer et al. |
| 2009/0094681 A1 | 4/2009 | Sadler et al. |
| 2009/0098914 A1 | 4/2009 | Martin-cocher et al. |
| 2009/0119754 A1 | 5/2009 | Schubert |
| 2009/0122149 A1 | 5/2009 | Ishii |
| 2009/0124376 A1* | 5/2009 | Kelly ................ G07F 17/3206 |
|  |  | 463/29 |
| 2009/0132813 A1* | 5/2009 | Schibuk ............ G06Q 20/4014 |
|  |  | 726/9 |
| 2009/0135678 A1 | 5/2009 | Godat |
| 2009/0158390 A1 | 6/2009 | Guan |
| 2009/0159696 A1 | 6/2009 | Mullen |
| 2009/0160609 A1 | 6/2009 | Lin et al. |
| 2009/0165107 A1 | 6/2009 | Tojo et al. |
| 2009/0173784 A1 | 7/2009 | Yang et al. |
| 2009/0181726 A1 | 7/2009 | Vargas et al. |
| 2009/0182674 A1 | 7/2009 | Patel et al. |
| 2009/0187423 A1 | 7/2009 | Kim |
| 2009/0193514 A1 | 7/2009 | Adams et al. |
| 2009/0195469 A1 | 8/2009 | Lim et al. |
| 2009/0199130 A1 | 8/2009 | Tsern et al. |
| 2009/0199188 A1 | 8/2009 | Fujimaki |
| 2009/0210308 A1 | 8/2009 | Toomer et al. |
| 2009/0222842 A1 | 9/2009 | Narayanan et al. |
| 2009/0228938 A1 | 9/2009 | White et al. |
| 2009/0241169 A1 | 9/2009 | Dhand et al. |
| 2009/0249247 A1 | 10/2009 | Tseng et al. |
| 2009/0298444 A1 | 12/2009 | Shigeta |
| 2009/0307139 A1* | 12/2009 | Mardikar ............ H04L 63/0823 |
|  |  | 726/19 |
| 2009/0307511 A1 | 12/2009 | Fiennes et al. |
| 2010/0008535 A1 | 1/2010 | Abulafia et al. |
| 2010/0023449 A1 | 1/2010 | Skowronek et al. |
| 2010/0026453 A1 | 2/2010 | Yamamoto et al. |
| 2010/0027854 A1 | 2/2010 | Chatterjee et al. |
| 2010/0042517 A1 | 2/2010 | Paintin et al. |
| 2010/0042835 A1 | 2/2010 | Lee et al. |
| 2010/0058231 A1 | 3/2010 | Duarte et al. |
| 2010/0058333 A1 | 3/2010 | Peterson |
| 2010/0078471 A1 | 4/2010 | Lin et al. |
| 2010/0078472 A1 | 4/2010 | Lin et al. |
| 2010/0082445 A1 | 4/2010 | Hodge et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0088148 A1 | 4/2010 | Presswala et al. |
| 2010/0107229 A1 | 4/2010 | Najafi et al. |
| 2010/0114731 A1 | 5/2010 | Kingston et al. |
| 2010/0122327 A1 | 5/2010 | Linecker et al. |
| 2010/0125456 A1 | 5/2010 | Weng et al. |
| 2010/0131190 A1 | 5/2010 | Terauchi et al. |
| 2010/0131303 A1 | 5/2010 | Collopy et al. |
| 2010/0153265 A1 | 6/2010 | Hershfield et al. |
| 2010/0161434 A1 | 6/2010 | Herwig et al. |
| 2010/0162169 A1 | 6/2010 | Skarp |
| 2010/0164864 A1 | 7/2010 | Chou et al. |
| 2010/0174620 A1 | 7/2010 | Stringfellow et al. |
| 2010/0174644 A1 | 7/2010 | Rosano et al. |
| 2010/0185446 A1 | 7/2010 | Homma et al. |
| 2010/0191570 A1 | 7/2010 | Michaud et al. |
| 2010/0191818 A1 | 7/2010 | Satterfield et al. |
| 2010/0205091 A1 | 8/2010 | Graziano et al. |
| 2010/0216425 A1 | 8/2010 | Smith |
| 2010/0223145 A1 | 9/2010 | Dragt |
| 2010/0225607 A1 | 9/2010 | Kim |
| 2010/0243741 A1 | 9/2010 | Eng |
| 2010/0248823 A1 | 9/2010 | Smith |
| 2010/0250376 A1 | 9/2010 | Nandiraju |
| 2010/0251243 A1 | 9/2010 | Gill et al. |
| 2010/0262472 A1* | 10/2010 | Gautam ............ G06Q 30/0207 |
|  |  | 705/14.1 |
| 2010/0267362 A1 | 10/2010 | Smith et al. |
| 2010/0269156 A1 | 10/2010 | Hohlfeld et al. |
| 2010/0275259 A1 | 10/2010 | Adams et al. |
| 2010/0281409 A1 | 11/2010 | Rainisto et al. |
| 2010/0306107 A1 | 12/2010 | Nahari et al. |
| 2010/0311397 A1 | 12/2010 | Li |
| 2010/0317408 A1 | 12/2010 | Ferren et al. |
| 2010/0332518 A1 | 12/2010 | Song et al. |
| 2011/0035799 A1 | 2/2011 | Handler |
| 2011/0054268 A1 | 3/2011 | Fidacaro et al. |
| 2011/0055763 A1 | 3/2011 | Utsuki et al. |
| 2011/0059769 A1 | 3/2011 | Brunolli |
| 2011/0078025 A1 | 3/2011 | Shrivastav et al. |
| 2011/0096011 A1 | 4/2011 | Suzuki |
| 2011/0099079 A1 | 4/2011 | White et al. |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0145049 A1 | 6/2011 | Hertel et al. |
| 2011/0149874 A1 | 6/2011 | Reif |

(56)  References Cited

U.S. PATENT DOCUMENTS

| | | |
|---|---|---|
| 2011/0151418 A1 | 6/2011 | Delespaul et al. |
| 2011/0159959 A1 | 6/2011 | Mallinson et al. |
| 2011/0161116 A1 | 6/2011 | Peak et al. |
| 2011/0164269 A1 | 7/2011 | Kamishiro |
| 2011/0166992 A1 | 7/2011 | Dessert et al. |
| 2011/0167383 A1 | 7/2011 | Schuller et al. |
| 2011/0179271 A1* | 7/2011 | Orsini .................. H04L 9/3247 |
| | | 713/167 |
| 2011/0183650 A1 | 7/2011 | Mckee |
| 2011/0184820 A1 | 7/2011 | Mon et al. |
| 2011/0187497 A1 | 8/2011 | Chin |
| 2011/0199183 A1* | 8/2011 | Marsden ........... G07C 9/00563 |
| | | 340/5.52 |
| 2011/0201306 A1 | 8/2011 | Ali Al-Harbi |
| 2011/0202417 A1 | 8/2011 | Dewakar et al. |
| 2011/0214158 A1 | 9/2011 | Pasquero et al. |
| 2011/0218849 A1 | 9/2011 | Rutigliano et al. |
| 2011/0221568 A1* | 9/2011 | Giobbi .................... G16Z 99/00 |
| | | 340/5.82 |
| 2011/0225057 A1* | 9/2011 | Webb .................... G06Q 20/20 |
| | | 705/16 |
| 2011/0225547 A1 | 9/2011 | Fong et al. |
| 2011/0230769 A1 | 9/2011 | Yamazaki |
| 2011/0231914 A1 | 9/2011 | Hung |
| 2011/0239158 A1 | 9/2011 | Barraclough et al. |
| 2011/0244796 A1 | 10/2011 | Khan et al. |
| 2011/0251892 A1 | 10/2011 | Laracey |
| 2011/0254683 A1 | 10/2011 | Soldan et al. |
| 2011/0254684 A1 | 10/2011 | Antoci et al. |
| 2011/0265041 A1 | 10/2011 | Ganetakos et al. |
| 2011/0270757 A1 | 11/2011 | Hammad |
| 2011/0316769 A1 | 12/2011 | Boettcher et al. |
| 2012/0005476 A1 | 1/2012 | Wei et al. |
| 2012/0022872 A1 | 1/2012 | Gruber et al. |
| 2012/0023185 A1 | 1/2012 | Holden et al. |
| 2012/0024947 A1 | 2/2012 | Naelon et al. |
| 2012/0028609 A1* | 2/2012 | Hruska ................. H04W 12/02 |
| | | 455/411 |
| 2012/0036029 A1 | 2/2012 | Esplin et al. |
| 2012/0047380 A1 | 2/2012 | Nurmi |
| 2012/0052920 A1 | 3/2012 | Kobayashi et al. |
| 2012/0066731 A1 | 3/2012 | Vasquez et al. |
| 2012/0071149 A1 | 3/2012 | Bandyopadhyay et al. |
| 2012/0078751 A1 | 3/2012 | Macphail et al. |
| 2012/0084210 A1 | 4/2012 | Farahmand |
| 2012/0089300 A1 | 4/2012 | Wolterman et al. |
| 2012/0089507 A1 | 4/2012 | Zhang et al. |
| 2012/0095853 A1 | 4/2012 | Von et al. |
| 2012/0101881 A1 | 4/2012 | Taylor et al. |
| 2012/0101887 A1 | 4/2012 | Harvey et al. |
| 2012/0102437 A1 | 4/2012 | Worley et al. |
| 2012/0105358 A1 | 5/2012 | Momeyer et al. |
| 2012/0108215 A1 | 5/2012 | Kameli et al. |
| 2012/0109764 A1 | 5/2012 | Martin et al. |
| 2012/0116669 A1 | 5/2012 | Lee et al. |
| 2012/0117507 A1 | 5/2012 | Tseng et al. |
| 2012/0123806 A1 | 5/2012 | Schumann et al. |
| 2012/0123937 A1 | 5/2012 | Spodak et al. |
| 2012/0136780 A1 | 5/2012 | El-Awady et al. |
| 2012/0136781 A1 | 5/2012 | Fridman et al. |
| 2012/0150742 A1 | 6/2012 | Poon et al. |
| 2012/0150970 A1 | 6/2012 | Peterson et al. |
| 2012/0154303 A1 | 6/2012 | Lazaridis et al. |
| 2012/0158511 A1 | 6/2012 | Lucero et al. |
| 2012/0172088 A1 | 7/2012 | Kirch et al. |
| 2012/0185397 A1* | 7/2012 | Levovitz ............... G06Q 20/40 |
| | | 705/44 |
| 2012/0191603 A1 | 7/2012 | Nuzzi |
| 2012/0197740 A1 | 8/2012 | Grigg et al. |
| 2012/0197743 A1 | 8/2012 | Grigg et al. |
| 2012/0203605 A1 | 8/2012 | Morgan et al. |
| 2012/0209748 A1 | 8/2012 | Small |
| 2012/0215553 A1 | 8/2012 | Leston |
| 2012/0215647 A1 | 8/2012 | Powell et al. |
| 2012/0216127 A1 | 8/2012 | Meyr |
| 2012/0221464 A1 | 8/2012 | Pasquero et al. |
| 2012/0232968 A1 | 9/2012 | Calman et al. |
| 2012/0238363 A1 | 9/2012 | Watanabe et al. |
| 2012/0239949 A1 | 9/2012 | Kalyanasundaram et al. |
| 2012/0245985 A1 | 9/2012 | Cho et al. |
| 2012/0245986 A1 | 9/2012 | Regan et al. |
| 2012/0267432 A1 | 10/2012 | Kuttuva |
| 2012/0271712 A1 | 10/2012 | Katzin et al. |
| 2012/0272230 A1 | 10/2012 | Lee |
| 2012/0280917 A1 | 11/2012 | Toksvig et al. |
| 2012/0284185 A1 | 11/2012 | Mettler et al. |
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0303268 A1 | 11/2012 | Su et al. |
| 2012/0304084 A1 | 11/2012 | Kim et al. |
| 2012/0310760 A1 | 12/2012 | Phillips et al. |
| 2012/0316777 A1 | 12/2012 | Kitta et al. |
| 2012/0316933 A1 | 12/2012 | Pentland et al. |
| 2012/0317023 A1 | 12/2012 | Moon et al. |
| 2012/0322370 A1 | 12/2012 | Lee |
| 2012/0322371 A1 | 12/2012 | Lee |
| 2012/0330830 A1 | 12/2012 | Mason et al. |
| 2013/0002580 A1 | 1/2013 | Sudou |
| 2013/0006637 A1 | 1/2013 | Kanevsky et al. |
| 2013/0006746 A1 | 1/2013 | Moore et al. |
| 2013/0007665 A1 | 1/2013 | Chaudhri et al. |
| 2013/0013499 A1 | 1/2013 | Kalgi |
| 2013/0019204 A1 | 1/2013 | Kotler et al. |
| 2013/0024366 A1 | 1/2013 | Mukherjee et al. |
| 2013/0030934 A1 | 1/2013 | Bakshi et al. |
| 2013/0031217 A1 | 1/2013 | Rajapakse |
| 2013/0041654 A1 | 2/2013 | Walker et al. |
| 2013/0041824 A1 | 2/2013 | Gupta |
| 2013/0047034 A1 | 2/2013 | Salomon et al. |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0065566 A1 | 3/2013 | Gisby et al. |
| 2013/0073321 A1 | 3/2013 | Hofmann et al. |
| 2013/0074194 A1 | 3/2013 | White et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0091298 A1 | 4/2013 | Ozzie et al. |
| 2013/0103519 A1 | 4/2013 | Kountotsis et al. |
| 2013/0110719 A1 | 5/2013 | Carter et al. |
| 2013/0111579 A1 | 5/2013 | Newman et al. |
| 2013/0117022 A1 | 5/2013 | Chen et al. |
| 2013/0122866 A1 | 5/2013 | Huang |
| 2013/0124319 A1 | 5/2013 | Hodge et al. |
| 2013/0124423 A1 | 5/2013 | Fisher |
| 2013/0124855 A1 | 5/2013 | Varadarajan et al. |
| 2013/0130745 A1 | 5/2013 | Niu et al. |
| 2013/0144706 A1 | 6/2013 | Qawami et al. |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0159941 A1 | 6/2013 | Langlois et al. |
| 2013/0166325 A1 | 6/2013 | Ganapathy et al. |
| 2013/0166332 A1 | 6/2013 | Hammad |
| 2013/0166679 A1 | 6/2013 | Kuwahara et al. |
| 2013/0169219 A1 | 7/2013 | Gray |
| 2013/0179304 A1 | 7/2013 | Swist et al. |
| 2013/0185059 A1 | 7/2013 | Riccardi |
| 2013/0189953 A1* | 7/2013 | Mathews ............ G01S 5/02521 |
| | | 455/411 |
| 2013/0198112 A1 | 8/2013 | Bhat et al. |
| 2013/0200146 A1 | 8/2013 | Moghadam et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |

(56)                References Cited

U.S. PATENT DOCUMENTS

| | | |
|---|---|---|
| 2013/0222236 A1 | 8/2013 | Gärdenfors et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0232073 A1 | 9/2013 | Sheets et al. |
| 2013/0238455 A1 | 9/2013 | Laracey |
| 2013/0239202 A1 | 9/2013 | Adams et al. |
| 2013/0243264 A1 | 9/2013 | Aoki |
| 2013/0244633 A1 | 9/2013 | Jacobs et al. |
| 2013/0246202 A1 | 9/2013 | Tobin et al. |
| 2013/0254858 A1 | 9/2013 | Giardina et al. |
| 2013/0262857 A1 | 10/2013 | Neuman et al. |
| 2013/0272586 A1* | 10/2013 | Russo ................... G06V 40/12 |
| | | 382/124 |
| 2013/0275300 A1 | 10/2013 | Killian et al. |
| 2013/0282533 A1 | 10/2013 | Foran-Owens et al. |
| 2013/0282577 A1 | 10/2013 | Milne |
| 2013/0290187 A1 | 10/2013 | Itwaru |
| 2013/0297414 A1 | 11/2013 | Goldfarb et al. |
| 2013/0304514 A1 | 11/2013 | Hyde et al. |
| 2013/0304651 A1 | 11/2013 | Smith et al. |
| 2013/0307809 A1 | 11/2013 | Sudou |
| 2013/0317688 A1 | 11/2013 | Uratani et al. |
| 2013/0320080 A1 | 12/2013 | Olson et al. |
| 2013/0321314 A1 | 12/2013 | Oh et al. |
| 2013/0322634 A1 | 12/2013 | Bennett et al. |
| 2013/0322665 A1 | 12/2013 | Bennett et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0332826 A1 | 12/2013 | Karunamuni et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0339436 A1 | 12/2013 | Gray |
| 2013/0339772 A1 | 12/2013 | Yu |
| 2013/0345975 A1 | 12/2013 | Vulcano et al. |
| 2013/0346273 A1 | 12/2013 | Stockton et al. |
| 2013/0346302 A1 | 12/2013 | Purves et al. |
| 2013/0346882 A1 | 12/2013 | Shiplacoff et al. |
| 2013/0347018 A1 | 12/2013 | Limp et al. |
| 2014/0003677 A1 | 1/2014 | Han et al. |
| 2014/0006155 A1 | 1/2014 | Ramirez et al. |
| 2014/0006285 A1 | 1/2014 | Chi et al. |
| 2014/0019352 A1 | 1/2014 | Shrivastava |
| 2014/0025513 A1 | 1/2014 | Cooke et al. |
| 2014/0025520 A1* | 1/2014 | Mardikar ............. G06Q 20/204 |
| | | 705/44 |
| 2014/0036099 A1 | 2/2014 | Balassanian |
| 2014/0040120 A1 | 2/2014 | Cho et al. |
| 2014/0052553 A1 | 2/2014 | Uzo |
| 2014/0058805 A1 | 2/2014 | Paesler et al. |
| 2014/0058860 A1 | 2/2014 | Roh et al. |
| 2014/0058873 A1 | 2/2014 | Sorensen et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0061299 A1 | 3/2014 | Scipioni |
| 2014/0067654 A1 | 3/2014 | Hanson et al. |
| 2014/0068306 A1 | 3/2014 | Oh et al. |
| 2014/0068314 A1 | 3/2014 | Kim et al. |
| 2014/0068740 A1 | 3/2014 | Lecun et al. |
| 2014/0070957 A1 | 3/2014 | Longinotti-Buitoni et al. |
| 2014/0074407 A1 | 3/2014 | Hernandez-Silveira et al. |
| 2014/0074569 A1 | 3/2014 | Francis et al. |
| 2014/0074635 A1 | 3/2014 | Reese et al. |
| 2014/0074716 A1 | 3/2014 | Ni |
| 2014/0074717 A1 | 3/2014 | Evans et al. |
| 2014/0081793 A1* | 3/2014 | Hoffberg ............. G06Q 30/0207 |
| | | 705/26.3 |
| 2014/0081854 A1 | 3/2014 | Sanchez et al. |
| 2014/0089196 A1 | 3/2014 | Paya et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe et al. |
| 2014/0100952 A1 | 4/2014 | Bart et al. |
| 2014/0101056 A1 | 4/2014 | Wendling |
| 2014/0106677 A1 | 4/2014 | Altman |
| 2014/0108263 A1 | 4/2014 | Ortiz et al. |
| 2014/0109018 A1 | 4/2014 | Casey et al. |
| 2014/0114856 A1 | 4/2014 | Jung et al. |
| 2014/0118519 A1 | 5/2014 | Sahin |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0130035 A1 | 5/2014 | Desai et al. |
| 2014/0134947 A1 | 5/2014 | Stouder-Studenmund |
| 2014/0136633 A1 | 5/2014 | Murillo et al. |
| 2014/0138435 A1 | 5/2014 | Khalid |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0149198 A1 | 5/2014 | Kim et al. |
| 2014/0156531 A1 | 6/2014 | Poon et al. |
| 2014/0164082 A1 | 6/2014 | Sun et al. |
| 2014/0164241 A1 | 6/2014 | Neuwirth et al. |
| 2014/0167986 A1 | 6/2014 | Parada et al. |
| 2014/0172533 A1 | 6/2014 | Andrews et al. |
| 2014/0176426 A1 | 6/2014 | Morohoshi |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0189533 A1 | 7/2014 | Krack et al. |
| 2014/0189829 A1 | 7/2014 | Mclachlan et al. |
| 2014/0195815 A1 | 7/2014 | Taveau et al. |
| 2014/0197234 A1* | 7/2014 | Hammad ............. G06Q 20/326 |
| | | 235/379 |
| 2014/0199995 A1* | 7/2014 | Singh ................... H04W 88/02 |
| | | 455/552.1 |
| 2014/0207659 A1 | 7/2014 | Erez et al. |
| 2014/0207680 A1 | 7/2014 | Rephlo |
| 2014/0213295 A1 | 7/2014 | Conklin |
| 2014/0222664 A1 | 8/2014 | Milne |
| 2014/0229623 A1* | 8/2014 | Khasnabish ............. H04L 45/28 |
| | | 709/226 |
| 2014/0236840 A1 | 8/2014 | Islam |
| 2014/0239733 A1 | 8/2014 | Mach et al. |
| 2014/0240122 A1 | 8/2014 | Roberts et al. |
| 2014/0244365 A1 | 8/2014 | Price et al. |
| 2014/0244493 A1 | 8/2014 | Kenyon et al. |
| 2014/0244494 A1 | 8/2014 | Davis et al. |
| 2014/0244495 A1 | 8/2014 | Davis et al. |
| 2014/0244514 A1* | 8/2014 | Rodriguez ........... G06Q 20/227 |
| | | 348/150 |
| 2014/0246917 A1* | 9/2014 | Proud ................ A61B 5/14551 |
| | | 307/104 |
| 2014/0254355 A1* | 9/2014 | Soliman, Sr. ...... G06Q 30/0207 |
| | | 370/229 |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0279442 A1 | 9/2014 | Luoma et al. |
| 2014/0279474 A1 | 9/2014 | Evans et al. |
| 2014/0279497 A1 | 9/2014 | Qaim-Maqami et al. |
| 2014/0279556 A1 | 9/2014 | Priebatsch et al. |
| 2014/0279728 A1 | 9/2014 | Skole |
| 2014/0281561 A1 | 9/2014 | Etchegoyen et al. |
| 2014/0282987 A1 | 9/2014 | Narendra et al. |
| 2014/0292396 A1* | 10/2014 | Bruwer ................ H03K 17/962 |
| | | 327/517 |
| 2014/0293079 A1 | 10/2014 | Milanfar et al. |
| 2014/0297385 A1 | 10/2014 | Ryan |
| 2014/0298432 A1 | 10/2014 | Brown |
| 2014/0298478 A1 | 10/2014 | Kim et al. |
| 2014/0304416 A1* | 10/2014 | Khasnabish ........ H04L 41/0806 |
| | | 709/226 |
| 2014/0316984 A1* | 10/2014 | Schwartz ............. G06Q 20/322 |
| | | 705/44 |

(56)                References Cited

U.S. PATENT DOCUMENTS

| | | |
|---|---|---|
| 2014/0335906 A1* | 11/2014 | Kim .................... H04W 4/80 |
| | | 455/509 |
| 2014/0337207 A1 | 11/2014 | Ye et al. |
| 2014/0337634 A1 | 11/2014 | Johnson et al. |
| 2014/0337931 A1 | 11/2014 | Cotterill |
| 2014/0343843 A1 | 11/2014 | Yanku |
| 2014/0344082 A1 | 11/2014 | Soundararajan |
| 2014/0344896 A1 | 11/2014 | Pak et al. |
| 2014/0344904 A1 | 11/2014 | Venkataramani et al. |
| 2014/0359140 A1 | 12/2014 | Shankarraman |
| 2014/0365113 A1 | 12/2014 | Yue et al. |
| 2014/0372309 A1 | 12/2014 | Bullard et al. |
| 2014/0375835 A1 | 12/2014 | Bos |
| 2015/0002696 A1 | 1/2015 | He et al. |
| 2015/0004984 A1* | 1/2015 | Kim .................... H04W 4/70 |
| | | 455/440 |
| 2015/0006207 A1 | 1/2015 | Jarvis et al. |
| 2015/0006376 A1 | 1/2015 | Paulson et al. |
| 2015/0007049 A1 | 1/2015 | Langlois |
| 2015/0012417 A1 | 1/2015 | Joao et al. |
| 2015/0012425 A1 | 1/2015 | Mathew |
| 2015/0012435 A1 | 1/2015 | Wright et al. |
| 2015/0014141 A1 | 1/2015 | Myers et al. |
| 2015/0019418 A1 | 1/2015 | Hotard et al. |
| 2015/0019944 A1 | 1/2015 | Kalgi |
| 2015/0019963 A1 | 1/2015 | Park et al. |
| 2015/0028996 A1* | 1/2015 | Agrafioti ................ G06F 21/40 |
| | | 340/5.82 |
| 2015/0039494 A1 | 2/2015 | Sinton et al. |
| 2015/0043790 A1 | 2/2015 | Ono et al. |
| 2015/0044965 A1 | 2/2015 | Kurimoto et al. |
| 2015/0046336 A1 | 2/2015 | Cummins |
| 2015/0051846 A1 | 2/2015 | Masuya |
| 2015/0054764 A1 | 2/2015 | Kim et al. |
| 2015/0056957 A1 | 2/2015 | Mardikar et al. |
| 2015/0056986 A1* | 2/2015 | Kim .................... H04L 65/1073 |
| | | 455/432.1 |
| 2015/0058146 A1 | 2/2015 | Aissi et al. |
| 2015/0058191 A1 | 2/2015 | Khan et al. |
| 2015/0066758 A1 | 3/2015 | Denardis et al. |
| 2015/0067496 A1 | 3/2015 | Missig et al. |
| 2015/0067602 A1 | 3/2015 | Bernstein et al. |
| 2015/0074418 A1 | 3/2015 | Lee et al. |
| 2015/0074615 A1 | 3/2015 | Han et al. |
| 2015/0077362 A1* | 3/2015 | Seo .................... G06V 40/13 |
| | | 345/173 |
| 2015/0082446 A1 | 3/2015 | Flowers et al. |
| 2015/0089636 A1 | 3/2015 | Martynov et al. |
| 2015/0095174 A1 | 4/2015 | Dua |
| 2015/0095175 A1 | 4/2015 | Dua |
| 2015/0098309 A1 | 4/2015 | Adams et al. |
| 2015/0102992 A1 | 4/2015 | Klement et al. |
| 2015/0115028 A1 | 4/2015 | Montealegre |
| 2015/0117332 A1* | 4/2015 | Li .................... H04W 76/18 |
| | | 370/329 |
| 2015/0120545 A1 | 4/2015 | Fiore et al. |
| 2015/0121405 A1 | 4/2015 | Ates et al. |
| 2015/0124053 A1 | 5/2015 | Tamura et al. |
| 2015/0127539 A1 | 5/2015 | Ye et al. |
| 2015/0127550 A1 | 5/2015 | Khan |
| 2015/0135278 A1 | 5/2015 | Corda et al. |
| 2015/0135282 A1 | 5/2015 | Kong et al. |
| 2015/0149899 A1 | 5/2015 | Bernstein et al. |
| 2015/0154589 A1 | 6/2015 | Li |
| 2015/0154676 A1 | 6/2015 | Matousek et al. |
| 2015/0156307 A1 | 6/2015 | Kim et al. |
| 2015/0163617 A1* | 6/2015 | Hall .................... H04W 4/50 |
| | | 455/414.1 |
| 2015/0170146 A1 | 6/2015 | Ji et al. |
| 2015/0178878 A1 | 6/2015 | Huang |
| 2015/0181441 A1* | 6/2015 | Bindrim .................. H04L 67/10 |
| | | 370/328 |
| 2015/0185849 A1 | 7/2015 | Ramsay et al. |
| 2015/0186152 A1 | 7/2015 | Jothiswaran et al. |
| 2015/0186636 A1 | 7/2015 | Tharappel et al. |
| 2015/0186860 A1 | 7/2015 | Rangarajan |
| 2015/0186871 A1 | 7/2015 | Laracey |
| 2015/0186892 A1 | 7/2015 | Zhang et al. |
| 2015/0187019 A1 | 7/2015 | Fernandes et al. |
| 2015/0195133 A1 | 7/2015 | Sheets et al. |
| 2015/0206045 A1* | 7/2015 | Gazdzinski ........... H04L 63/102 |
| | | 235/492 |
| 2015/0208244 A1 | 7/2015 | Nakao |
| 2015/0213244 A1 | 7/2015 | Lymberopoulos et al. |
| 2015/0213452 A1 | 7/2015 | Wong |
| 2015/0213542 A1 | 7/2015 | Wallaja |
| 2015/0213560 A1 | 7/2015 | Aabye et al. |
| 2015/0215128 A1 | 7/2015 | Pal |
| 2015/0220774 A1 | 8/2015 | Ebersman et al. |
| 2015/0220924 A1 | 8/2015 | Bakker |
| 2015/0227922 A1 | 8/2015 | Filler |
| 2015/0227937 A1* | 8/2015 | Giles .................... G06Q 20/20 |
| | | 705/44 |
| 2015/0229750 A1 | 8/2015 | Zhou et al. |
| 2015/0230277 A1 | 8/2015 | Omeara et al. |
| 2015/0235018 A1 | 8/2015 | Gupta et al. |
| 2015/0235055 A1 | 8/2015 | An et al. |
| 2015/0242611 A1 | 8/2015 | Cotterill |
| 2015/0242837 A1 | 8/2015 | Yarbrough et al. |
| 2015/0248389 A1 | 9/2015 | Kahn et al. |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0278799 A1 | 10/2015 | Palanisamy |
| 2015/0286387 A1 | 10/2015 | Gu et al. |
| 2015/0286391 A1 | 10/2015 | Jacobs et al. |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0324113 A1 | 11/2015 | Kapp et al. |
| 2015/0324615 A1 | 11/2015 | Matsumoto et al. |
| 2015/0334567 A1 | 11/2015 | Chen et al. |
| 2015/0339652 A1 | 11/2015 | Park et al. |
| 2015/0346845 A1 | 12/2015 | Di Censo et al. |
| 2015/0347738 A1 | 12/2015 | Ulrich et al. |
| 2015/0348001 A1 | 12/2015 | Van Os et al. |
| 2015/0348002 A1 | 12/2015 | Van et al. |
| 2015/0348009 A1 | 12/2015 | Rosen et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0350200 A1* | 12/2015 | Li .................... H04W 12/068 |
| | | 726/8 |
| 2015/0363632 A1 | 12/2015 | Ahn et al. |
| 2015/0365400 A1 | 12/2015 | Cox |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0019536 A1 | 1/2016 | Ortiz et al. |
| 2016/0026779 A1 | 1/2016 | Grigg et al. |
| 2016/0029190 A1* | 1/2016 | Rattner .................. H04W 4/18 |
| | | 455/414.4 |
| 2016/0034887 A1 | 2/2016 | Lee |
| 2016/0041597 A1 | 2/2016 | Graham et al. |
| 2016/0047666 A1 | 2/2016 | Fuchs |
| 2016/0050199 A1 | 2/2016 | Ganesan |
| 2016/0061613 A1 | 3/2016 | Jung et al. |
| 2016/0061623 A1 | 3/2016 | Pahwa et al. |
| 2016/0062487 A1 | 3/2016 | Foss et al. |
| 2016/0062540 A1 | 3/2016 | Yang et al. |
| 2016/0062570 A1 | 3/2016 | Dascola et al. |
| 2016/0063235 A1 | 3/2016 | Tussy |
| 2016/0063298 A1 | 3/2016 | Tuneld et al. |
| 2016/0078281 A1 | 3/2016 | Gongaware et al. |
| 2016/0078434 A1 | 3/2016 | Huxham et al. |
| 2016/0086176 A1 | 3/2016 | Henrique et al. |
| 2016/0086188 A1* | 3/2016 | Candelore .......... G06Q 20/3255 |
| | | 705/44 |
| 2016/0087952 A1* | 3/2016 | Tartz .................... H04W 12/06 |
| | | 455/411 |

(56) References Cited

U.S. PATENT DOCUMENTS

| | | |
|---|---|---|
| 2016/0092665 A1 | 3/2016 | Cowan et al. |
| 2016/0092877 A1 | 3/2016 | Chew |
| 2016/0100156 A1 | 4/2016 | Zhou et al. |
| 2016/0104228 A1 | 4/2016 | Sundaresan |
| 2016/0117681 A1 | 4/2016 | Jiao et al. |
| 2016/0124592 A1 | 5/2016 | Kidron et al. |
| 2016/0125412 A1* | 5/2016 | Cannon .............. G06Q 20/4014 |
| | | 705/44 |
| 2016/0132864 A1 | 5/2016 | Shah et al. |
| 2016/0134488 A1 | 5/2016 | Straub et al. |
| 2016/0147987 A1 | 5/2016 | Jang et al. |
| 2016/0148384 A1 | 5/2016 | Bud et al. |
| 2016/0165205 A1 | 6/2016 | Liu et al. |
| 2016/0171192 A1 | 6/2016 | Holz et al. |
| 2016/0171482 A1 | 6/2016 | Muncey et al. |
| 2016/0180305 A1* | 6/2016 | Dresser .................. G06Q 20/32 |
| | | 705/40 |
| 2016/0188860 A1 | 6/2016 | Lee et al. |
| 2016/0191506 A1 | 6/2016 | Wang |
| 2016/0191522 A1* | 6/2016 | Liang ...................... H04L 67/10 |
| | | 713/168 |
| 2016/0203483 A1 | 7/2016 | Bridgewater et al. |
| 2016/0209906 A1 | 7/2016 | Chae et al. |
| 2016/0210623 A1 | 7/2016 | Voege |
| 2016/0217310 A1 | 7/2016 | Shah et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0232516 A1 | 8/2016 | Dayan et al. |
| 2016/0234023 A1 | 8/2016 | Mozer et al. |
| 2016/0238402 A1 | 8/2016 | Mcgavran et al. |
| 2016/0239701 A1 | 8/2016 | Lee et al. |
| 2016/0241543 A1 | 8/2016 | Jung et al. |
| 2016/0241555 A1 | 8/2016 | Vo et al. |
| 2016/0253665 A1 | 9/2016 | Van Os et al. |
| 2016/0261581 A1 | 9/2016 | Wang et al. |
| 2016/0267779 A1 | 9/2016 | Kuang |
| 2016/0270144 A1 | 9/2016 | Thanayankizil et al. |
| 2016/0275281 A1 | 9/2016 | Ranjit et al. |
| 2016/0277396 A1 | 9/2016 | Gardiner et al. |
| 2016/0292525 A1 | 10/2016 | Aoki |
| 2016/0294557 A1 | 10/2016 | Baldwin et al. |
| 2016/0299526 A1 | 10/2016 | Inagaki et al. |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0314451 A1 | 10/2016 | Martin |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0350522 A1 | 12/2016 | Chi et al. |
| 2016/0358133 A1 | 12/2016 | Van Os et al. |
| 2016/0358134 A1 | 12/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0378961 A1 | 12/2016 | Park |
| 2016/0378966 A1 | 12/2016 | Alten |
| 2017/0004507 A1 | 1/2017 | Henderson et al. |
| 2017/0017834 A1 | 1/2017 | Sabitov et al. |
| 2017/0017958 A1 | 1/2017 | Scott et al. |
| 2017/0032375 A1 | 2/2017 | Van Os et al. |
| 2017/0039567 A1 | 2/2017 | Stern et al. |
| 2017/0046508 A1 | 2/2017 | Shin et al. |
| 2017/0046704 A1 | 2/2017 | Büchner et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0083202 A1 | 3/2017 | Yang et al. |
| 2017/0093749 A1* | 3/2017 | Hoffmann ............... H04L 41/20 |
| 2017/0147186 A1 | 5/2017 | Velusamy et al. |
| 2017/0147197 A1 | 5/2017 | Yang et al. |
| 2017/0153795 A1 | 6/2017 | Yang et al. |
| 2017/0160098 A1 | 6/2017 | Mcgavran et al. |
| 2017/0161750 A1 | 6/2017 | Yao et al. |
| 2017/0169202 A1 | 6/2017 | Duggan et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0244703 A1 | 8/2017 | Lee et al. |
| 2017/0264608 A1 | 9/2017 | Moore et al. |
| 2017/0300897 A1 | 10/2017 | Ferenczi et al. |
| 2017/0329949 A1 | 11/2017 | Civelli |
| 2017/0337542 A1 | 11/2017 | Kim et al. |
| 2017/0339151 A1 | 11/2017 | Van Os et al. |
| 2017/0344251 A1 | 11/2017 | Hajimusa et al. |
| 2017/0357972 A1 | 12/2017 | Van Os et al. |
| 2017/0357973 A1 | 12/2017 | Van Os et al. |
| 2018/0004924 A1 | 1/2018 | Tieu |
| 2018/0021954 A1 | 1/2018 | Fischer et al. |
| 2018/0053157 A1 | 2/2018 | Roffey |
| 2018/0068313 A1 | 3/2018 | Van Os et al. |
| 2018/0082282 A1 | 3/2018 | Van Os et al. |
| 2018/0107372 A1 | 4/2018 | Van Damme et al. |
| 2018/0109629 A1 | 4/2018 | Van Os et al. |
| 2018/0114010 A1 | 4/2018 | Van Os et al. |
| 2018/0117944 A1 | 5/2018 | Lee |
| 2018/0131721 A1 | 5/2018 | Jones et al. |
| 2018/0150627 A1 | 5/2018 | Rodefer |
| 2018/0157395 A1 | 6/2018 | Mhun et al. |
| 2018/0158066 A1 | 6/2018 | Van Os et al. |
| 2018/0181185 A1 | 6/2018 | Graham et al. |
| 2018/0181737 A1 | 6/2018 | Tussy |
| 2018/0276673 A1 | 9/2018 | Van Os et al. |
| 2018/0300101 A1 | 10/2018 | Liu et al. |
| 2018/0302790 A1 | 10/2018 | Cotterill |
| 2018/0374096 A1 | 12/2018 | Demaret et al. |
| 2019/0050867 A1 | 2/2019 | Van Os et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0095883 A1 | 3/2019 | Robinson et al. |
| 2019/0124510 A1 | 4/2019 | Cotterill |
| 2019/0156607 A1 | 5/2019 | Tao et al. |
| 2019/0164134 A1 | 5/2019 | Morrow et al. |
| 2019/0228140 A1 | 7/2019 | Arroyo et al. |
| 2019/0286301 A1 | 9/2019 | Yang et al. |
| 2019/0289079 A1 | 9/2019 | Van Os et al. |
| 2019/0347391 A1 | 11/2019 | Kim et al. |
| 2019/0370448 A1 | 12/2019 | Devine et al. |
| 2019/0370583 A1 | 12/2019 | Van Os et al. |
| 2020/0042685 A1 | 2/2020 | Tussy et al. |
| 2020/0065470 A1 | 2/2020 | Van Os et al. |
| 2020/0065821 A1 | 2/2020 | Van Os et al. |
| 2020/0120503 A1 | 4/2020 | Cotterill |
| 2020/0184472 A1 | 6/2020 | Van Os et al. |
| 2020/0211047 A1 | 7/2020 | Van Os et al. |
| 2020/0302517 A1 | 9/2020 | Van Os et al. |
| 2020/0302519 A1 | 9/2020 | Van Os et al. |
| 2020/0311509 A1 | 10/2020 | Benkley et al. |
| 2020/0366742 A1 | 11/2020 | Van Os et al. |
| 2020/0371577 A1 | 11/2020 | Graham et al. |
| 2020/0372514 A1 | 11/2020 | Van Os et al. |
| 2021/0004897 A1 | 1/2021 | Van Os et al. |
| 2021/0042549 A1 | 2/2021 | Van Os et al. |
| 2021/0073823 A1 | 3/2021 | Van Os |
| 2021/0141437 A1 | 5/2021 | Graham et al. |
| 2021/0192475 A1 | 6/2021 | Van Os et al. |
| 2021/0192530 A1 | 6/2021 | Van Os et al. |
| 2021/0201288 A1 | 7/2021 | Van Os et al. |
| 2021/0272118 A1 | 9/2021 | Van Os et al. |
| 2021/0397681 A1 | 12/2021 | Boule et al. |
| 2022/0147135 A1 | 5/2022 | Graham et al. |
| 2022/0277063 A1 | 9/2022 | Arroyo et al. |

(56) References Cited

U.S. PATENT DOCUMENTS

| | | |
|---|---|---|
| 2022/0300108 A1 | 9/2022 | Yang et al. |
| 2023/0084751 A1 | 3/2023 | Mondello et al. |
| 2023/0259598 A1 | 8/2023 | Arroyo et al. |

FOREIGN PATENT DOCUMENTS

| AU | 2016100796 A4 | 6/2016 |
|---|---|---|
| AU | 2017100556 A4 | 6/2017 |
| AU | 2016102028 B4 | 7/2017 |
| AU | 2017101425 A4 | 11/2017 |
| CA | 2545339 A1 | 11/2007 |
| CN | 1452739 A | 10/2003 |
| CN | 1629776 A | 6/2005 |
| CN | 1741104 A | 3/2006 |
| CN | 1846221 A | 10/2006 |
| CN | 1852335 A | 10/2006 |
| CN | 1908981 A | 2/2007 |
| CN | 1950762 A | 4/2007 |
| CN | 101080737 A | 11/2007 |
| CN | 101171604 A | 4/2008 |
| CN | 101226616 A | 7/2008 |
| CN | 101268470 A | 9/2008 |
| CN | 101299694 A | 11/2008 |
| CN | 101329595 A | 12/2008 |
| CN | 101341718 A | 1/2009 |
| CN | 101341727 A | 1/2009 |
| CN | 101390371 A | 3/2009 |
| CN | 101454794 A | 6/2009 |
| CN | 101485128 A | 7/2009 |
| CN | 101535940 A | 9/2009 |
| CN | 101610155 A | 12/2009 |
| CN | 101656548 A | 2/2010 |
| CN | 101730907 A | 6/2010 |
| CN | 101796764 A | 8/2010 |
| CN | 101809581 A | 8/2010 |
| CN | 101877745 A | 11/2010 |
| CN | 101969511 A | 2/2011 |
| CN | 101981987 A | 2/2011 |
| CN | 102004908 A | 4/2011 |
| CN | 102065148 A | 5/2011 |
| CN | 102096546 A | 6/2011 |
| CN | 102111505 A | 6/2011 |
| CN | 102164213 A | 8/2011 |
| CN | 102202192 A | 9/2011 |
| CN | 102209321 A | 10/2011 |
| CN | 102244530 A | 11/2011 |
| CN | 102282578 A | 12/2011 |
| CN | 102349082 A | 2/2012 |
| CN | 102394838 A | 3/2012 |
| CN | 102396205 A | 3/2012 |
| CN | 102404458 A | 4/2012 |
| CN | 102663303 A | 9/2012 |
| CN | 102737312 A | 10/2012 |
| CN | 102737313 A | 10/2012 |
| CN | 102792325 A | 11/2012 |
| CN | 102982144 A | 3/2013 |
| CN | 103001856 A | 3/2013 |
| CN | 103067248 A | 4/2013 |
| CN | 103188280 A | 7/2013 |
| CN | 103199311 A | 7/2013 |
| CN | 103262108 A | 8/2013 |
| CN | 103299328 A | 9/2013 |
| CN | 103327159 A | 9/2013 |
| CN | 103413218 A | 11/2013 |
| CN | 103425119 A | 12/2013 |
| CN | 103443813 A | 12/2013 |
| CN | 103455913 A | 12/2013 |
| CN | 103489095 A | 1/2014 |
| CN | 103500079 A | 1/2014 |
| CN | 103577982 A | 2/2014 |
| CN | 103581413 A | 2/2014 |
| CN | 103582873 A | 2/2014 |
| CN | 103677520 A | 3/2014 |
| CN | 103677559 A | 3/2014 |
| CN | 103701605 A | 4/2014 |
| CN | 103718202 A | 4/2014 |
| CN | 103761647 A | 4/2014 |
| CN | 103763327 A | 4/2014 |
| CN | 103765861 A | 4/2014 |
| CN | 203520050 U | 4/2014 |
| CN | 103778533 A | 5/2014 |
| CN | 103838992 A | 6/2014 |
| CN | 103843021 A | 6/2014 |
| CN | 103902010 A | 7/2014 |
| CN | 103944811 A | 7/2014 |
| CN | 103970208 A | 8/2014 |
| CN | 104024987 A | 9/2014 |
| CN | 104038256 A | 9/2014 |
| CN | 104077534 A | 10/2014 |
| CN | 104252675 A | 12/2014 |
| CN | 104361302 A | 2/2015 |
| CN | 104487927 A | 4/2015 |
| CN | 104508618 A | 4/2015 |
| CN | 104539924 A | 4/2015 |
| CN | 104813354 A | 7/2015 |
| CN | 104903835 A | 9/2015 |
| CN | 104956182 A | 9/2015 |
| CN | 105100123 A | 11/2015 |
| CN | 105190659 A | 12/2015 |
| CN | 105320864 A | 2/2016 |
| CN | 105389491 A | 3/2016 |
| CN | 105474224 A | 4/2016 |
| CN | 105531730 A | 4/2016 |
| CN | 105703909 A | 6/2016 |
| CN | 105787718 A | 7/2016 |
| CN | 105794244 A | 7/2016 |
| CN | 105827624 A | 8/2016 |
| CN | 105844462 A | 8/2016 |
| CN | 105844468 A | 8/2016 |
| CN | 105868613 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106487754 A | 3/2017 |
| CN | 106503514 A | 3/2017 |
| CN | 106778222 A | 5/2017 |
| CN | 106961415 A | 7/2017 |
| CN | 109769397 A | 5/2019 |
| EP | 0836074 A2 | 4/1998 |
| EP | 1435620 A1 | 7/2004 |
| EP | 1589734 A2 | 10/2005 |
| EP | 1614992 A1 | 1/2006 |
| EP | 1226699 B1 | 6/2006 |
| EP | 1950678 A1 | 7/2008 |
| EP | 2020648 A2 | 2/2009 |
| EP | 2051157 A1 | 4/2009 |
| EP | 2096413 A1 | 9/2009 |
| EP | 2309410 A1 | 4/2011 |
| EP | 2341315 A1 | 7/2011 |
| EP | 2466260 A1 | 6/2012 |
| EP | 2574026 A1 | 3/2013 |
| EP | 2610701 A1 | 7/2013 |
| EP | 2654275 A1 | 10/2013 |
| EP | 2672377 A2 | 12/2013 |
| EP | 2674889 A2 | 12/2013 |
| EP | 2701107 A1 | 2/2014 |
| EP | 2713298 A1 | 4/2014 |
| EP | 2725537 A1 | 4/2014 |
| EP | 2849042 A1 | 3/2015 |
| EP | 2993619 A1 | 3/2016 |
| EP | 3057024 A1 | 8/2016 |
| EP | 3076334 A1 | 10/2016 |
| EP | 3373122 A1 | 9/2018 |
| GB | 2466038 A | 6/2010 |
| GB | 2500321 A | 9/2013 |
| GB | 2528948 A | 2/2016 |
| JP | 06-284182 A | 10/1994 |
| JP | 11-45117 A | 2/1999 |
| JP | 11-139385 A | 2/1999 |

(56) References Cited

FOREIGN PATENT DOCUMENTS

| | | | |
|---|---|---|---|
| JP | 11-073530 | A | 3/1999 |
| JP | 11-183183 | A | 7/1999 |
| JP | 11-312029 | A | 11/1999 |
| JP | 2000-209660 | A | 7/2000 |
| JP | 2000-259477 | A | 9/2000 |
| JP | 2001-331758 | A | 11/2001 |
| JP | 2002-099854 | A | 4/2002 |
| JP | 2002-366485 | A | 12/2002 |
| JP | 2003-016398 | A | 1/2003 |
| JP | 2003-141541 | A | 5/2003 |
| JP | 2003-178244 | A | 6/2003 |
| JP | 2003-346059 | A | 12/2003 |
| JP | 2004-252736 | A | 9/2004 |
| JP | 2004-258738 | A | 9/2004 |
| JP | 2004-287592 | A | 10/2004 |
| JP | 2004-356816 | A | 12/2004 |
| JP | 2005-521961 | A | 7/2005 |
| JP | 2005-523505 | A | 8/2005 |
| JP | 2005-317049 | A | 11/2005 |
| JP | 2006-031182 | A | 2/2006 |
| JP | 2006-079427 | A | 3/2006 |
| JP | 2006-093912 | A | 4/2006 |
| JP | 2006-113637 | A | 4/2006 |
| JP | 2006-114018 | A | 4/2006 |
| JP | 2006-129429 | A | 5/2006 |
| JP | 2006-163960 | A | 6/2006 |
| JP | 2006-197071 | A | 7/2006 |
| JP | 2006-221468 | A | 8/2006 |
| JP | 2006-277670 | A | 10/2006 |
| JP | 2007-034637 | A | 2/2007 |
| JP | 2007-507011 | A | 3/2007 |
| JP | 2007-226794 | A | 9/2007 |
| JP | 2007-334637 | A | 12/2007 |
| JP | 2008-070926 | A | 3/2008 |
| JP | 2009-009434 | A | 1/2009 |
| JP | 2009-049878 | A | 3/2009 |
| JP | 2009-87156 | A | 4/2009 |
| JP | 2009-099076 | A | 5/2009 |
| JP | 2009-134521 | A | 6/2009 |
| JP | 2009-258991 | A | 11/2009 |
| JP | 2010-102718 | A | 5/2010 |
| JP | 2010-517390 | A | 5/2010 |
| JP | 2010-152506 | A | 7/2010 |
| JP | 2010-524051 | A | 7/2010 |
| JP | 2010-211577 | A | 9/2010 |
| JP | 2010-211579 | A | 9/2010 |
| JP | 2010-250386 | A | 11/2010 |
| JP | 2010-271779 | A | 12/2010 |
| JP | 2011-53849 | A | 3/2011 |
| JP | 2011-097287 | A | 5/2011 |
| JP | 2011-519439 | A | 7/2011 |
| JP | 2011-242924 | A | 12/2011 |
| JP | 2012-008985 | A | 1/2012 |
| JP | 2012-504273 | A | 2/2012 |
| JP | 2012-68494 | A | 4/2012 |
| JP | 2012-73724 | A | 4/2012 |
| JP | 2012-508930 | A | 4/2012 |
| JP | 2012-099025 | A | 5/2012 |
| JP | 2012-114676 | A | 6/2012 |
| JP | 2012-198369 | A | 10/2012 |
| JP | 2012-198625 | A | 10/2012 |
| JP | 2012-215981 | A | 11/2012 |
| JP | 2012-529699 | A | 11/2012 |
| JP | 2013-12802 | A | 1/2013 |
| JP | 2013-020496 | A | 1/2013 |
| JP | 2013-034322 | A | 2/2013 |
| JP | 2013-048389 | A | 3/2013 |
| JP | 2013-058828 | A | 3/2013 |
| JP | 2013-511900 | A | 4/2013 |
| JP | 2013-114317 | A | 6/2013 |
| JP | 2013-530445 | A | 7/2013 |
| JP | 52-67966 | B2 | 8/2013 |
| JP | 2013-149206 | A | 8/2013 |
| JP | 2013-533532 | A | 8/2013 |
| JP | 2013-534662 | A | 9/2013 |
| JP | 2013-218663 | A | 10/2013 |
| JP | 2013-222410 | A | 10/2013 |
| JP | 2014-041616 | A | 3/2014 |
| JP | 2014-44719 | A | 3/2014 |
| JP | 2014-044724 | A | 3/2014 |
| JP | 2014-057129 | A | 3/2014 |
| JP | 2014-075155 | A | 4/2014 |
| JP | 2014-102845 | A | 6/2014 |
| JP | 2014-519126 | A | 8/2014 |
| JP | 2014-191653 | A | 10/2014 |
| JP | 2014-528601 | A | 10/2014 |
| JP | 2015-014923 | A | 1/2015 |
| JP | 2015-506040 | A | 2/2015 |
| JP | 2015-075877 | A | 4/2015 |
| JP | 2015-187783 | A | 10/2015 |
| JP | 2016-053766 | A | 4/2016 |
| JP | 2016-071655 | A | 5/2016 |
| JP | 2016-521403 | A | 7/2016 |
| JP | 60-23162 | B2 | 11/2016 |
| JP | 2016-224960 | A | 12/2016 |
| JP | 2017-016170 | A | 1/2017 |
| JP | 2017-500656 | A | 1/2017 |
| JP | 2017-91129 | A | 5/2017 |
| JP | 2017-102952 | A | 6/2017 |
| JP | 2017-138846 | A | 8/2017 |
| KR | 10-0403196 | B1 | 10/2003 |
| KR | 10-2004-0049502 | A | 6/2004 |
| KR | 10-2004-0067514 | A | 7/2004 |
| KR | 10-2006-0098024 | A | 9/2006 |
| KR | 10-2007-0120125 | A | 12/2007 |
| KR | 10-0805341 | B1 | 2/2008 |
| KR | 10-2008-0064395 | A | 7/2008 |
| KR | 10-2009-0089472 | A | 8/2009 |
| KR | 10-2010-0045059 | A | 5/2010 |
| KR | 10-2011-0056561 | A | 5/2011 |
| KR | 10-2011-0067750 | A | 6/2011 |
| KR | 10-2011-0098435 | A | 9/2011 |
| KR | 10-2012-0013867 | A | 2/2012 |
| KR | 10-2012-0040693 | A | 4/2012 |
| KR | 10-2012-0052150 | A | 5/2012 |
| KR | 10-2012-0076675 | A | 7/2012 |
| KR | 10-2012-0087333 | A | 8/2012 |
| KR | 10-1184865 | B1 | 9/2012 |
| KR | 10-2013-0011423 | A | 1/2013 |
| KR | 10-2013-0027326 | A | 3/2013 |
| KR | 10-1253392 | B1 | 4/2013 |
| KR | 10-2013-0112339 | A | 10/2013 |
| KR | 10-2013-0116905 | A | 10/2013 |
| KR | 10-1330962 | B1 | 11/2013 |
| KR | 10-2013-0138659 | A | 12/2013 |
| KR | 10-1342208 | B1 | 12/2013 |
| KR | 10-2014-0001515 | A | 1/2014 |
| KR | 10-2014-0015171 | A | 2/2014 |
| KR | 10-2014-0018019 | A | 2/2014 |
| KR | 10-2014-0018044 | A | 2/2014 |
| KR | 10-2014-0026263 | A | 3/2014 |
| KR | 10-2014-0027029 | A | 3/2014 |
| KR | 10-2014-0055429 | A | 5/2014 |
| KR | 10-2014-0070877 | A | 6/2014 |
| KR | 10-2014-0096208 | A | 8/2014 |
| KR | 10-2014-0105309 | A | 9/2014 |
| KR | 10-2014-0121764 | A | 10/2014 |
| KR | 10-2014-0137400 | A | 12/2014 |
| KR | 10-2015-0013264 | A | 2/2015 |
| KR | 10-2016-0012636 | A | 2/2016 |
| KR | 10-2016-0026791 | A | 3/2016 |
| KR | 10-2016-0045633 | A | 4/2016 |
| KR | 10-2016-0048215 | A | 5/2016 |
| KR | 10-2016-0054573 | A | 5/2016 |
| KR | 10-2016-0099397 | A | 8/2016 |
| KR | 10-2016-0099432 | A | 8/2016 |
| KR | 10-2016-0105296 | A | 9/2016 |
| KR | 10-1820573 | B1 | 1/2018 |
| TW | 200532429 | A | 10/2005 |
| TW | 201214268 | A | 4/2012 |
| WO | 99/44114 | A1 | 9/1999 |
| WO | 01/30047 | A2 | 4/2001 |
| WO | 2001/057757 | A1 | 8/2001 |
| WO | 02/01864 | A1 | 1/2002 |

(56) References Cited

FOREIGN PATENT DOCUMENTS

| WO | 03/038698 A1 | 5/2003 |
|----|--------------|--------|
| WO | 2003/083793 A2 | 10/2003 |
| WO | 03/093765 A2 | 11/2003 |
| WO | 2007/000012 A1 | 1/2007 |
| WO | 2007/041834 A1 | 4/2007 |
| WO | 2007/073422 A1 | 6/2007 |
| WO | 2007/105937 A1 | 9/2007 |
| WO | 2007/116521 A1 | 10/2007 |
| WO | 2008/030776 A2 | 3/2008 |
| WO | 2008/147457 A1 | 12/2008 |
| WO | 2009/042392 A2 | 4/2009 |
| WO | 2010/039337 A2 | 4/2010 |
| WO | 2010/056484 A2 | 5/2010 |
| WO | 2010/077960 A2 | 7/2010 |
| WO | 2010/120972 A1 | 10/2010 |
| WO | 2010/128442 A2 | 11/2010 |
| WO | 2012/083113 A2 | 6/2012 |
| WO | 2012/128824 A1 | 9/2012 |
| WO | 2012/135796 A1 | 10/2012 |
| WO | 2012/170446 A2 | 12/2012 |
| WO | 2013/000150 A1 | 1/2013 |
| WO | 2013/003372 A1 | 1/2013 |
| WO | 2013/023224 A2 | 2/2013 |
| WO | 2013/066659 A1 | 5/2013 |
| WO | 2013/090624 A1 | 6/2013 |
| WO | 2013/093558 A1 | 6/2013 |
| WO | 2013/103912 A1 | 7/2013 |
| WO | 2013/126078 A1 | 8/2013 |
| WO | 2013/169842 A2 | 11/2013 |
| WO | 2013/169865 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/177500 A1 | 11/2013 |
| WO | 2013/177548 A1 | 11/2013 |
| WO | 2013/181102 A1 | 12/2013 |
| WO | 2014/033939 A1 | 3/2014 |
| WO | 2014/074407 A1 | 5/2014 |
| WO | 2014/081453 A1 | 5/2014 |
| WO | 2014/083001 A2 | 6/2014 |
| WO | 2014/129655 A1 | 8/2014 |
| WO | 2014/147297 A1 | 9/2014 |
| WO | 2014/171734 A2 | 10/2014 |
| WO | 2015/009581 A1 | 1/2015 |
| WO | 2015/009765 A1 | 1/2015 |
| WO | 2015/013522 A1 | 1/2015 |
| WO | 2015/030912 A1 | 3/2015 |
| WO | 2015/038684 A1 | 3/2015 |
| WO | 2015/051361 A1 | 4/2015 |
| WO | 2015/057320 A1 | 4/2015 |
| WO | 2015/062382 A1 | 5/2015 |
| WO | 2015/062410 A1 | 5/2015 |
| WO | 2015/065561 A1 | 5/2015 |
| WO | 2015/112868 A1 | 7/2015 |
| WO | 2015/120019 A1 | 8/2015 |
| WO | 2015/120358 A1 | 8/2015 |
| WO | 2015/187608 A1 | 12/2015 |
| WO | 2016/029853 A1 | 3/2016 |
| WO | 2016/036472 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/126775 A1 | 8/2016 |
| WO | 2016/129938 A1 | 8/2016 |
| WO | 2016/201037 A1 | 12/2016 |
| WO | 2017/030223 A1 | 2/2017 |
| WO | 2017/218094 A1 | 12/2017 |
| WO | 2018/226265 A1 | 12/2018 |

OTHER PUBLICATIONS

Non-Final Office Action received for U.S. Appl. No. 17/062,941, mailed on Mar. 30, 2023, 6 pages.

Notice of Allowance received for U.S. Appl. No. 17/193,991, mailed on Mar. 29, 2023, 9 pages.

Office Action received for Australian Patent Application No. 2022200900, mailed on Mar. 28, 2023, 3 pages.

Office Action received for Chinese Patent Application No. 201980009669.8, mailed on Mar. 1, 2023, 19 pages (11 pages of English Translation and 8 pages of Official Copy).

Jeffries Adrianne, "Apple Pay allows you to pay at the counter with your iPhone 6", The Verge, Available Online at: https://www.theverge.com/2014/9/9/6084211/apple-pay-iphone-6-nfc-mobile-payment, Sep. 9, 2014, 6 pages.

Reardon et al., "Apple takes NFC mainstream on iPhone 6; Apple Watch with Apple Pay", CNET, Available Online at: https://www.cnet.com/tech/mobile/apple-adds-nfc-to-iphone-6-with-apple-pay/, Sep. 9, 2014, 14 pages.

Ex Parte Quayle Action received for U.S. Appl. No. 14/869,831, mailed on May 28, 2021, 16 pages.

Non-Final Office Action received for U.S. Appl. No. 16/434,747, mailed on Jun. 10, 2021, 13 pages.

Notice of Allowance received for Chinese Patent Application No. 201910744886.3, mailed on Jun. 3, 2021, 2 pages (1 page of English Translation and 1 page of Official Copy).

Notice of Allowance received for U.S. Appl. No. 15/823,269, mailed on Jun. 3, 2021, 6 pages.

Notice of Allowance received for U.S. Appl. No. 16/670,949, mailed on May 27, 2021, 7 pages.

Office Action received for Australian Patent Application No. 2019271921, mailed on Jun. 3, 2021, 6 pages.

Office Action received for Japanese Patent Application No. 2020-159979, mailed on May 10, 2021, 9 pages (5 pages of English Translation and 4 pages of Official Copy).

Advisory Action received for U.S. Appl. No. 17/193,991, mailed on Jan. 31, 2023, 3 pages.

Advisory Action received for U.S. Appl. No. 17/835,334, mailed on Feb. 8, 2023, 3 pages.

Applicant-Initiated Interview Summary received for U.S. Appl. No. 17/835,334, mailed on Jan. 27, 2023, 4 pages.

Corrected Notice of Allowance received for U.S. Appl. No. 17/498,557, mailed on Feb. 15, 2023, 4 pages.

Office Action received for Chinese Patent Application No. 201810654707.2, mailed on Dec. 28, 2022, 13 pages (5 pages of English Translation and 8 pages of Official Copy).

Non-Final Office Action received for U.S. Appl. No. 16/789,132, mailed on Aug. 5, 2021, 25 pages.

Notice of Allowance received for U.S. Appl. No. 16/549,862, mailed on Aug. 13, 2021, 7 pages.

Notice of Allowance received for U.S. Appl. No. 16/987,003, mailed on Aug. 18, 2021, 9 pages.

Office Action received for European Patent Application No. 19716254.8, mailed on Aug. 9, 2021, 8 pages.

Office Action received for Korean Patent Application No. 10-2020-7022596, mailed on Jul. 28, 2021, 26 pages (13 pages of English Translation and 13 pages of Official Copy).

Office Action received for Chinese Patent Application No. 202211285112.7, mailed on May 18, 2023, 16 pages (6 pages of English Translation and 10 pages of Official Copy).

Corrected Notice of Allowance received for U.S. Appl. No. 17/498,557, mailed on Jan. 11, 2023, 2 pages.

Advisory Action received for U.S. Appl. No. 16/581,614, mailed on Nov. 4, 2021, 4 pages.

Brief Communication Regarding Oral Proceedings received for European Patent Application No. 17865509.8, mailed on Nov. 1, 2021, 2 pages.

Intention to Grant received for European Patent Application No. 18170262.2, mailed on Oct. 27, 2021, 8 pages.

Intention to Grant received for European Patent Application No. 18713408.5, mailed on Oct. 28, 2021, 10 pages.

Notice of Allowance received for Japanese Patent Application No. 2020-103213, mailed on Oct. 25, 2021, 4 pages (1 page of English Translation and 3 pages of Official Copy).

Office Action received for Chinese Patent Application No. 201810339290.0, mailed on Oct. 18, 2021, 20 pages (11 pages of English Translation and 9 pages of Official Copy).

(56)        References Cited

OTHER PUBLICATIONS

Office Action received for Indian Patent Application No. 201817036875, mailed on Oct. 29, 2021, 8 pages.

Result of Consultation received for European Patent Application No. 17865509.8, mailed on Nov. 2, 2021, 3 pages.

Pu Fang, "Research on Location-aware Service in Pervasive Computing", Issue No. 7, Information Technology Series, China Doctoral Dissertations, Jul. 15, 2008, 140 pages (Official Copy only) (See Communication under 37 CFR § 1.98(a) (3)).

Board Decision received for Chinese Patent Application No. 201580047640.0, mailed on Jun. 29, 2021, 2 pages (1 page of English Translation and 1 page of Official Copy).

Non-Final Office Action received for U.S. Appl. No. 16/814,226, mailed on Jul. 13, 2021, 17 pages.

Notice of Allowance received for Korean Patent Application No. 10-2020-7027862, mailed on Jun. 29, 2021, 5 pages (1 page of English Translation and 4 pages of Official Copy).

Office Action received for Australian Patent Application No. 2020273355, mailed on Jul. 6, 2021, 3 pages.

Office Action received for European Patent Application No. 21150992.2, mailed on Jul. 6, 2021, 6 pages.

Summons to Attend Oral Proceedings received for European Patent Application No. 17865509.8, mailed on Jul. 14, 2021, 8 pages.

Board Decision received for Chinese Patent Application No. 201710094150.7, mailed on Dec. 22, 2021, 20 pages (1 page of English Translation and 19 pages of Official Copy).

Notice of Allowance received for Chinese Patent Application No. 201710094150.7, mailed on Feb. 23, 2022, 4 pages (1 page of English Translation and 3 pages of Official Copy).

Office Action received for Chinese Patent Application No. 201980009669.8, mailed on Dec. 3, 2021, 26 pages (12 pages of English Translation and 14 pages of Official Copy).

Office Action received for Indian Patent Application No. 202118018461, mailed on Feb. 23, 2022, 6 pages.

Das et al., "A Security Framework for Mobile-to-Mobile Payment Network", International Conference on Personal Wireless Communications., Jan. 25, 2005, pp. 420-423.

Office Action received for Chinese Patent Application No. 201810654707.2, mailed on Jun. 22, 2022, 14 pages (4 pages of English Translation and 10 pages of Official Copy).

Notice of Allowance received for U.S. Appl. No. 16/434,747, mailed on Apr. 28, 2022, 8 pages.

Office Action received for Chinese Patent Application No. 201810654707.2 mailed on Apr. 2, 2022, 16 pages (6 pages of English Translation and 10 pages of Official Copy).

Office Action received for Korean Patent Application No. 10-2022-0010942, mailed on Apr. 27, 2022, 5 pages (2 pages of English Translation and 3 pages of Official Copy).

Board Decision received for Chinese Patent Application No. 201510284715.9, mailed on Jul. 21, 2022, 22 pages (2 pages of English Translation and 20 pages of Official Copy).

Notice of Allowance received for Korean Patent Application No. 10-2022-0010942, mailed on Aug. 10, 2022, 6 pages (2 pages of English Translation and 4 pages of Official Copy).

Notice of Hearing received for Indian Patent Application No. 201617039493, mailed on Aug. 10, 2022, 3 pages.

Final Office Action received for U.S. Appl. No. 17/193,991, mailed on Dec. 22, 2022, 6 pages.

Final Office Action received for U.S. Appl. No. 17/835,334, mailed on Dec. 22, 2022, 11 pages.

"13 questions and answers about using Apple Pay online", Online available at: http://www.it528.com/apple/1356.html, Feb. 18, 2016, 5 pages (Official Copy Only). {See Communication under Rule 37 CFR § 1.98(a) (3)}.

Brief Communication Regarding Oral Proceedings received for European Patent Application No. 18170262.2, mailed on Oct. 4, 2021, 2 pages.

Brief Communication Regarding Oral Proceedings received for European Patent Application No. 18713408.5, mailed on Sep. 28, 2021, 2 pages.

International Preliminary Report on Patentability received for PCT Patent Application No. PCT/US2020/020414, mailed on Oct. 7, 2021, 18 pages.

Notice of Allowance received for Chinese Patent Application No. 201580047640.0, mailed on Sep. 18, 2021, 2 pages (1 page of English Translation and 1 page of Official Copy).

Notice of Allowance received for U.S. Appl. No. 17/015,429, mailed on Oct. 8, 2021, 5 pages.

Office Action received for Chinese Patent Application No. 201711292804.3, mailed on Sep. 10, 2021, 19 pages (8 pages of English Translation and 11 pages of Official Copy).

Office Action received for Chinese Patent Application No. 201780033899.9, mailed on Sep. 3, 2021, 12 pages (6 pages of English Translation and 6 pages of Official Copy).

Office Action received for Chinese Patent Application No. 201911199010.1, mailed on Sep. 3, 2021, 12 pages (7 pages of English Translation and 5 pages of Official Copy).

Office Action received for European Patent Application No. 19160344.8, mailed on Oct. 7, 2021, 8 pages.

Office Action received for Korean Patent Application No. 10-2019-7006639, mailed on Sep. 16, 2021, 20 pages (10 pages of English Translation and 10 pages of Official Copy).

Summons to Attend Oral Proceedings received for European Patent Application No. 20180033.1, mailed on Oct. 4, 2021, 9 pages.

Applicant-Initiated Interview Summary received for U.S. Appl. No. 16/549,862, mailed on May 21, 2021, 2 pages.

Applicant-Initiated Interview Summary received for U.S. Appl. No. 16/581,614, mailed on May 18, 2021, 2 pages.

Office Action received for European Patent Application No. 19194828.0, mailed on May 10, 2021, 6 pages.

Applicant Initiated Interview Summary received for U.S. Appl. No. 17/157,391, mailed on Nov. 23, 2021, 2 pages.

Decision to Grant received for European Patent Application No. 18830326.7, mailed on Nov. 11, 2021, 3 pages.

Examiner-Initiated Interview Summary received for U.S. Appl. No. 16/814,226, mailed on Nov. 15, 2021, 2 pages.

Non-Final Office Action received for U.S. Appl. No. 16/125,267, mailed on Nov. 23, 2021, 21 pages.

Notice of allowance received for Japanese Patent Application No. 2020-159979, mailed on Nov. 8, 2021, 4 pages (1 page of English Translation and 3 pages of Official Copy).

Notice of Allowance received for Korean Patent Application No. 10-2021-0099243, mailed on Oct. 30, 2021, 4 pages (1 page of English Translation and 3 pages of Official Copy).

Notice of Allowance received for U.S. Appl. No. 17/015,429, mailed on Nov. 24, 2021, 2 pages.

Office Action received for Chinese Patent Application No. 201810338040.5, mailed on Oct. 25, 2021, 22 pages (13 pages of English Translation and 9 pages of Official Copy).

Office Action received for Indian Patent Application No. 201918003782, mailed on Nov. 18, 2021, 8 pages.

Office Action received for Indian Patent Application No. 202018014786, mailed on Nov. 9, 2021, 7 pages.

Applicant-Initiated Interview Summary received for U.S. Appl. No. 16/125,267, mailed on Jan. 25, 2022, 5 pages.

Corrected Notice of Allowance received for U.S. Appl. No. 16/814,226, mailed on Jan. 18, 2022, 21 pages.

Corrected Notice of Allowance received for U.S. Appl. No. 16/814,226, mailed on Jan. 27, 2022, 2 pages.

Notice of Acceptance received for Australian Patent Application No. 2020273355, mailed on Jan. 17, 2022, 3 pages.

Notice of Allowance received for Korean Patent Application No. 10-2021-7014009, mailed on Jan. 4, 2022, 4 pages (2 pages of English Translation and 2 pages of Official Copy).

Office Action received for Chinese Patent Application No. 201710094150.7, mailed on Jan. 10, 2022, 6 pages (3 pages of English Translation and 3 pages of Official Copy).

Office Action received for Chinese Patent Application No. 201810654707.2 mailed on Jan. 11, 2022, 11 pages (5 pages of English Translation and 6 pages of Official Copy).

Office Action received for Chinese Patent Application No. 201510284896.5, mailed on Mar. 14, 2022, 10 pages (5 pages of English Translation and 5 pages of Official Copy).

(56) References Cited

OTHER PUBLICATIONS

Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Applicant-Initiated Interview Summary received for U.S. Appl. No. 16/814,226, mailed on Aug. 30, 2021, 3 pages.
Corrected Notice of Allowance received for U.S. Appl. No. 16/987,003, mailed on Sep. 1, 2021, 3 pages.
Final Office Action received for U.S. Appl. No. 16/125,267, mailed on Aug. 26, 2021, 22 pages.
Final Office Action received for U.S. Appl. No. 16/581,614, mailed on Aug. 27, 2021, 18 pages.
Non-Final Office Action received for U.S. Appl. No. 17/157,391, mailed on Aug. 23, 2021, 12 pages.
Notice of Allowance received for Japanese Patent Application No. 2020-126751, mailed on Aug. 16, 2021, 4 pages (1 page of English Translation and 3 pages of Official Copy).
Notice of Allowance received for U.S. Appl. No. 16/369,355, mailed on Sep. 1, 2021, 10 pages.
Notice of Allowance received for U.S. Appl. No. 16/549,862, mailed on Aug. 26, 2021, 2 pages.
Office Action received for Australian Patent Application No. 2020289822, mailed on Aug. 24, 2021, 7 pages.
Office Action received for Chinese Patent Application No. 201580047640.0, mailed on Jul. 6, 2021, 10 pages (5 pages of English Translation and 5 pages of Official Copy).
Office Action received for Korean Patent Application No. 10-2020-7034180, mailed on Aug. 17, 2021, 15 pages (6 pages of English Translation and 9 pages of Official Copy).
Supplemental Notice of Allowance received for U.S. Appl. No. 14/869,831, mailed on Aug. 20, 2021, 2 pages.
Non-Final Office Action received for U.S. Appl. No. 17/193,991, mailed on Oct. 6, 2022, 7 pages.
Ppcharlier, "Feature for auto-concatenating fields (e.g., for OTP based logins)?", Available online at: https://1password.community/discussion/comment/379288/#Comment_379288, Jul. 2017, 5 pages.
Notice of Allowance received for Japanese Patent Application No. 2020-028315, mailed on May 27, 2022, 3 pages (1 page of English Translation and 2 pages of Official Copy).
Notice of Allowance received for Japanese Patent Application No. 2021-035572, mailed on Jun. 3, 2022, 4 pages (1 page of English Translation and 3 pages of Official Copy).
Office Action received for Japanese Patent Application No. 2021-037591, mailed on Jun. 6, 2022, 6 pages (3 pages of English Translation and 3 pages of Official Copy).
Non-Final Office Action received for U.S. Appl. No. 17/835,334, mailed on Sep. 22, 2022, 11 pages.
Summons to Attend Oral Proceedings received for European Patent Application No. 15727291.5, mailed on Sep. 12, 2022, 13 pages.
Summons to Attend Oral Proceedings received for European Patent Application No. 16201195.1, mailed on Sep. 12, 2022, 14 pages.
Office Action received for Japanese Patent Application No. 2020-028315, mailed on Feb. 7, 2022, 6 pages (3 pages of English Translation and 3 pages of Official Copy).
Advisory Action received for U.S. Appl. No. 14/503,296, mailed on Oct. 2, 2015, 3 pages.
Advisory Action received for U.S. Appl. No. 14/869,715, mailed on Feb. 8, 2017, 3 pages.
Advisory Action received for U.S. Appl. No. 14/869,715, mailed on May 18, 2017, 6 pages.
Advisory Action received for U.S. Appl. No. 14/869,877, mailed on Jan. 5, 2017, 3 pages.
Advisory Action received for U.S. Appl. No. 14/870,793, mailed on Apr. 13, 2017, 3 pages.
Advisory Action received for U.S. Appl. No. 15/137,944, mailed on May 11, 2017, 6 pages.
Applicant Initiated Interview Summary received for U.S. Appl. No. 15/351,230, mailed on Nov. 22, 2019, 5 pages.

Brief Communication Regarding Oral Proceedings received for European Patent Application No. 15727291.5, mailed on Jun. 9, 2020, 12 pages.
Brief Communication regarding Oral Proceedings received for European Patent Application No. 16201205.8, mailed on May 29, 2020, 29 pages.
Brief Communication Regarding Oral Proceedings received for European Patent Application No. 16804040.0, mailed on May 28, 2020, 15 pages.
Brief Communication regarding Oral Proceedings received for European Patent Application No. 19171661.2, mailed on May 28, 2020, 2 pages.
Brief Communication Regarding Oral Proceedings received for European Patent Application No. 19171661.2, mailed on Sep. 3, 2020, 2 pages.
Cazlar, "[iOS] MapsGPS (formerly PebbGPS) is now available—now with colour turn-by-turn directions!", Online Available at: <https://forums.pebble.com/t/ios-mapsgps-formerly-pebbgps-is-now-available-now-with-colour-turn-by-turn-directions/5584>, 2013, 31 pages.
Certificate of Examination received for Australian Patent Application No. 2017100760 mailed on Feb. 9, 2018, 2 pages.
Corrected Notice of Allowance received for U.S. Appl. No. 14/836,754, mailed on May 23, 2018, 2 pages.
Corrected Notice of Allowance received for U.S. Appl. No. 14/870,793, mailed on Feb. 25, 2021, 19 pages.
Corrected Notice of Allowance received for U.S. Appl. No. 14/870,793, mailed on Mar. 8, 2021, 19 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/294,439, mailed on Mar. 13, 2019, 4 pages.
Decision on Appeal received for Korean Patent Application No. 10-2016-0152210, mailed on Jun. 23, 2020, 20 pages.
Decision on Appeal received for Korean Patent Application No. 10-2018-7019643, mailed on Jun. 9, 2020, 27 pages.
Decision on Appeal received for U.S. Appl. No. 14/869,831, mailed on Nov. 2, 2020, 8 pages.
Decision on Appeal received for U.S. Appl. No. 14/869,877, mailed on Mar. 18, 2021, 12 pages.
Decision on Appeal received for U.S. Appl. No. 14/870,793, mailed on Nov. 3, 2020, 11 pages.
Decision on Request for Rehearing received for U.S. Appl. No. 14/869,831, mailed on Mar. 8, 2021, 9 pages.
Decision to Grant received for Danish Patent Application No. PA201570665, mailed on Apr. 26, 2017, 2 pages.
Decision to Grant received for Danish Patent Application No. PA201670042, mailed on Mar. 19, 2018, 2 pages.
Decision to Refuse Application received for the European Patent Application No. 16803996.4, mailed on Apr. 3, 2020, 25 pages.
Decision to Refuse received for European Patent Application No. 15727291.5, mailed on Jun. 30, 2020, 21 pages.
Decision to Refuse received for European Patent Application No. 15728352.4, mailed on May 28, 2020, 25 pages.
Decision to Refuse received for European Patent Application No. 16201195.1, mailed on Mar. 4, 2019, 23 pages.
Decision to Refuse received for European Patent Application No. 16201205.8, mailed on Jun. 30, 2020, 29 pages.
Decision to Refuse received for European Patent Application No. 16703893.4, mailed on Jul. 24, 2019, 22 pages.
Decision to Refuse received for European Patent Application No. 16804040.0, mailed on Nov. 4, 2020, 18 pages.
Decision to Refuse received for European Patent Application No. 18154163.2, mailed on May 17, 2019, 22 pages.
Decision to Refuse received for European Patent Application No. 19171661.2, mailed on Oct. 22, 2020, 7 pages.
Decision to Refuse received for the European Patent Application No. 16803996.4, mailed on Apr. 14, 2020, 28 pages.
Does Apple Pay change payment? Mac Fan, Japan, Mynavi Publishing Corporation, vol. 22, No. 11 common No. 381, Nov. 1, 2014, 11 pages.

(56) References Cited

OTHER PUBLICATIONS

Easyvideoguides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4LI, Dec. 2, 2012, 1 page.
European Search Report received for European Patent Application No. 19171661.2, mailed on Jul. 17, 2019, 6 pages.
European Search Report received for European Patent Application No. 20180033.1, mailed on Jul. 6, 2020, 4 pages.
Examiner's Answer to Appeal Brief received for U.S. Appl. No. 14/870,793, mailed on Apr. 16, 2018, 15 pages.
Examiner's Answer to Appeal Brief received for U.S. Appl. No. 14/869,831, mailed on Aug. 12, 2019, 16 pages.
Examiner's Answer to Appeal Brief received for U.S. Appl. No. 14/869,877, mailed on Jun. 26, 2020, 14 pages.
Extended European Search Report received for European Patent Application No. 16201159.7, mailed on Mar. 27, 2017, 12 pages.
Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 16803996.4, mailed on Feb. 7, 2018, 8 pages.
Extended European Search Report received for European Patent Application No. 16804040.0, mailed on Feb. 26, 2018, 9 pages.
Extended European Search Report received for European Patent Application No. 17810682.9, mailed on Mar. 26, 2019, 7 pages.
Extended European Search Report received for European Patent Application No. 18154163.2, mailed on Mar. 2, 2018, 4 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Apr. 24, 2019, 5 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/836,754, mailed on Jun. 14, 2017, 23 pages.
Final Office Action received for U.S. Appl. No. 14/869,715, mailed on Jun. 17, 2016, 35 pages.
Final Office Action received for U.S. Appl. No. 14/869,715, mailed on Mar. 7, 2017, 41 pages.
Final Office Action received for U.S. Appl. No. 14/869,715, mailed on Oct. 6, 2016, 37 pages.
Final Office Action received for U.S. Appl. No. 14/869,831, mailed on Aug. 2, 2016, 14 pages.
Final Office Action received for U.S. Appl. No. 14/869,831, mailed on Jul. 30, 2018, 31 pages.
Final Office Action received for U.S. Appl. No. 14/869,831, mailed on May 19, 2017, 20 pages.
Final Office Action received for U.S. Appl. No. 14/869,877, mailed on Apr. 26, 2018, 18 pages.
Final Office Action received for U.S. Appl. No. 14/869,877, mailed on Aug. 3, 2016, 13 pages.
Final Office Action received for U.S. Appl. No. 14/869,877, mailed on Jun. 11, 2019, 35 pages.
Final Office Action received for U.S. Appl. No. 14/870,726, mailed on Apr. 19, 2017, 17 pages.
Final Office Action received for U.S. Appl. No. 14/870,793, mailed on Jan. 19, 2017, 16 pages.
Final Office Action Received for U.S. Appl. No. 14/871,635, mailed on Jan. 18, 2018, 33 pages.
Final Office Action Received for U.S. Appl. No. 14/871,635, mailed on May 3, 2019, 32 pages.
Final Office Action Received for U.S. Appl. No. 14/871,654, mailed on Nov. 16, 2017, 32 pages.
Final Office Action received for U.S. Appl. No. 15/137,944, mailed on Feb. 27, 2017, 10 pages.
Final Office Action received for U.S. Appl. No. 15/351,230, mailed on Nov. 4, 2019, 6 pages.
Final Office Action received for U.S. Appl. No. 14/836,754, mailed on Mar. 22, 2016, 17 pages.
Final Office Action received for U.S. Appl. No. 14/836,754, mailed on Mar. 31, 2017, 24 pages.
Final Office Action received for U.S. Appl. No. 14/870,694, mailed on Apr. 7, 2017, 16 pages.
Giving Apple Pay a Try, the Consumer Credit Monthly, Kinzai Institute for Financial Affairs, Inc, vol. 33, No. 1, ISSN: 0288-8122, 2015, 7 pages.
Haris, "Google Maps Navigation on Android 2.0", Sizzled Core, Online available at: <http://www.sizzledcore.com/2009/10/29/google-maps-navigation-on-android-20/>, Oct. 29, 2009, 6 pages.
Intention to Grant received for Danish Patent Application No. PA201570665, mailed on Feb. 28, 2017, 2 pages.
Intention to Grant received for Danish patent Application No. PA201670042, mailed on Jan. 29, 2018, 2 pages.
International Preliminary Report on Patentability received for PCT Patent Application No. PCT/US2015/033326, mailed on Dec. 8, 2016, 11 pages.
International Preliminary Report on Patentability received for PCT Patent Application No. PCT/US2015/033380, mailed on Dec. 8, 2016, 10 pages.
International Preliminary Report on Patentability received for PCT Patent Application No. PCT/US2015/043487, mailed on Feb. 16, 2017, 13 pages.
International Preliminary Report on Patentability received for PCT Patent Application No. PCT/US2015/046892, mailed on Mar. 16, 2017, 14 pages.
International Preliminary Report on Patentability received for PCT Patent Application No. PCT/US2016/015316, mailed on Aug. 10, 2017, 10 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2016/033751, mailed on Dec. 14, 2017, 11 pages.
International Preliminary Report on Patentability received for PCT Patent Application No. PCT/US2016/034175, mailed on Dec. 14, 2017, 14 pages.
International Preliminary Report on Patentability received for PCT Patent Application No. PCT/US2017/031748, mailed on Dec. 20, 2018, 10 pages.
International Search Report and Written Opinion received for PCT Application No. PCT/US2015/033326, mailed on Aug. 10, 2015, 13 pages.
International Search Report and Written Opinion received for PCT Application No. PCT/US2015/046892, mailed on Jan. 27, 2016, 20 pages.
International Search Report and Written Opinion received for PCT Patent Application No. PCT/US2015/033380, mailed on Aug. 10, 2015, 13 pages.
International Search Report and Written Opinion received for PCT Patent Application No. PCT/US2015/043487, mailed on Jan. 29, 2016, 19 pages.
International Search Report and Written Opinion received for PCT Patent Application No. PCT/US2016/016621, mailed on May 9, 2016, 12 pages.
International Search Report and Written Opinion received for PCT Patent Application No. PCT/US2016/033751, mailed on Oct. 5, 2016, 14 pages.
International Search Report and Written Opinion received for PCT Patent Application No. PCT/US2016/034175, mailed on Oct. 7, 2016, 17 pages.
International Search Report and Written Opinion received for PCT Patent Application No. PCT/US2017/031748, mailed on Aug. 29, 2017, 14 pages.

(56) References Cited

OTHER PUBLICATIONS

International Search Report and Written Opinion received for PCT Patent Application No. PCT/US2016/015316, mailed on Mar. 8, 2016, 13 pages.
Invitation to Pay Additional Fee received for PCT Patent Application No. PCT/US2017/031748, mailed on Jun. 21, 2017, 2 pages.
Invitation to Pay Additional Fees and Partial Search Report received for PCT Patent Application No. PCT/US2015/043487, mailed on Nov. 9, 2015, 4 pages.
Invitation to Pay Additional Fees received for PCT Patent Application No. PCT/US2015/046892, mailed on Nov. 4, 2015, 5 pages.
Invitation to Pay Additional Fees received for PCT Patent Application No. PCT/US2016/033751, mailed on Jul. 22, 2016, 2 pages.
Invitation to Pay Additional Fees received for PCT Patent Application No. PCT/US2016/034175, mailed on Aug. 11, 2016, 3 pages.
IOS Security, White Paper, Available online at: <https://web.archive.org/web/20150526223200/http://www.apple.com/business/docs/iOS_Security_Guide.pdf>, Apr. 2015, 55 pages.
Kamijo Noboru, "Next Generation Mobile System—WatchPad1.5", Available at: <http://researcher.ibm.com/researcher/view_group_subpage.php?id=5617>, retrieved on Jul. 4, 2015, 2 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31(Official Copy only).
Mahindra Comviva, "The Evolution of Digital and Mobile Wallets", Online available at: https://www.paymentscardsandmobile.com/wp-content/uploads/2016/10/The-Evolution-of-Digital-and-Mobile-Wallets.pdf, Aug. 2016, 24 pages.
Microsoft, "Pair a Bluetooth device in Windows", Online available at: https://support.microsoft.com/en-us/windows/pair-a-bluetooth-device-in-windows-2be7b51f-6ae9-b757-a3b9-95ee40c3e242, 2021, 5 pages.
Minutes of Oral Proceeding received for European Patent Application No. 16703893.4, mailed on Jul. 22, 2019, 9 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201205.8, mailed on Jun. 29, 2020, 6 pages.
Minutes of the Oral Proceedings received for European Patent Application No. 16804040.0, mailed on Nov. 2, 2020, 6 pages.
Minutes of the Oral Proceedings received for European Patent Application No. 18154163.2, mailed on May 17, 2019, 7 pages.
Minutes of the Oral Proceedings received for European Patent Application No. 19171661.2, mailed on Oct. 15, 2020, 5 pages.
Naver Blog, "How to Use Smart Wallet and Registered Card", Online Available at: <http://feena74.blog.me/140185758401>, Mar. 29, 2013, 20 pages.
Non-Final Office Action received for U.S. Appl. No. 14/836,754, mailed on Nov. 17, 2015, 15 pages.
Non-Final Office Action received for U.S. Appl. No. 14/869,715, mailed on Jan. 29, 2016, 62 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 14/864,011, mailed on Jan. 21, 2016, 10 pages.
Non-Final Office Action received for U.S. Appl. No. 14/869,877, mailed on Jan. 29, 2016, 18 pages.
Non-Final Office Action received for U.S. Appl. No. 14/869,877, mailed on Jun. 16, 2017, 17 pages.
Non-Final Office Action received for U.S. Appl. No. 14/869,877, mailed on Oct. 5, 2018, 19 pages.
Non-Final Office Action received for U.S. Appl. No. 14/870,793, mailed on Apr. 19, 2016, 17 pages.

Non-Final Office Action received for U.S. Appl. No. 14/503,364, mailed on Feb. 3, 2016, 16 pages.
Non-Final Office Action received for U.S. Appl. No. 14/869,831, mailed on Jan. 29, 2016, 18 pages.
Non-Final Office Action received for U.S. Appl. No. 14/869,831, mailed on Nov. 22, 2017, 17 pages.
Non-Final Office Action received for U.S. Appl. No. 14/503,072, mailed on Jun. 17, 2016, 19 pages.
Non-Final Office Action received for U.S. Appl. No. 14/503,296, mailed on Aug. 28, 2017, 14 pages.
Non-Final Office Action received for U.S. Appl. No. 14/503,296, mailed on Oct. 5, 2016, 11 pages.
Non-Final Office Action received for U.S. Appl. No. 14/503,296, mailed on Sep. 18, 2018, 20 pages.
Non-Final Office Action received for U.S. Appl. No. 14/503,381, mailed on May 13, 2015, 13 pages.
Non-Final Office Action received for U.S. Appl. No. 14/836,754, mailed on Aug. 16, 2017, 25 pages.
Non-Final Office Action received for U.S. Appl. No. 14/836,754, mailed on Oct. 21, 2016, 18 pages.
Non-final Office Action received for U.S. Appl. No. 14/864,011, mailed on Jun. 10, 2016, 10 pages.
Non-Final Office Action received for U.S. Appl. No. 14/869,715, mailed on Oct. 11, 201, 37 pages.
Non-Final Office Action received for U.S. Appl. No. 14/870,726, mailed on Sep. 16, 2016, 12 pages.
Non-Final Office Action Received for U.S. Appl. No. 14/871,635, mailed on May 5, 2017, 23 pages.
Non-Final Office Action Received for U.S. Appl. No. 14/871,635, mailed on Nov. 16, 2018, 36 pages.
Non-Final Office Action Received for U.S. Appl. No. 14/871,654, mailed on May 4, 2017, 23 pages.
Non-Final Office Action received for U.S. Appl. No. 15/137,944, mailed on Jul. 27, 2017, 13 pages.
Non-Final Office Action received for U.S. Appl. No. 15/137,944, mailed on Oct. 18, 2016, 10 pages.
Non-Final Office Action received for U.S. Appl. No. 15/294,439, mailed on Jan. 26, 2018, 18 pages.
Non-Final Office Action received for U.S. Appl. No. 15/351,230, mailed on Apr. 18, 2019, 16 pages.
Non-Final Office Action received for U.S. Appl. No. 15/433,238, mailed on Nov. 3, 2017, 6 pages.
Non-Final Office Action received for U.S. Appl. No. 14/870,694, mailed on Sep. 23, 2016, 13 pages.
Notice of Acceptance received for Australian Patent Application No. 2018200628, mailed on Jun. 13, 2019, 3 pages.
Notice of Acceptance received for Australian Patent Application No. 2015266650, mailed on Jan. 18, 2018, 3 pages.
Notice of Acceptance received for Australian Patent Application No. 2015266693, mailed on Jan. 19, 2018, 3 pages.
Notice of Acceptance received for Australian Patent Application No. 2016211504, mailed on Oct. 17, 2017, 3 pages.
Notice of Acceptance received for Australian Patent Application No. 2016218318, mailed on Jul. 3, 2019, 3 pages.
Notice of Acceptance received for Australian Patent Application No. 2017201064, mailed on Feb. 20, 2018, 3 pages.
Notice of Acceptance received for Australian Patent Application No. 2018202559, mailed on Oct. 21, 2019, 3 pages.
Notice of Acceptance received for Australian Patent Application No. 2020200685, mailed on Oct. 29, 2020, 3 pages.
Notice of Allowance received for Chinese Patent Application No. 201520357381.9, mailed on Jul. 29, 2015, 4 pages.
Notice of Allowance received for Chinese Patent Application No. 201520358683.8, issued on Mar. 10, 2016, 5 pages.
Notice of Allowance received for Chinese Patent Application No. 201610069731.0, mailed on Sep. 6, 2019, 2 pages.
Notice of Allowance received for Chinese Patent Application No. 201610084974.1, mailed on Aug. 5, 2019, 2 pages.
Notice of Allowance received for Chinese Patent Application No. 201610371774.4, mailed on Jun. 4, 2020, 2 pages.
Notice of Allowance received for Chinese Patent Application No. 201610371856.9, mailed on May 11, 2020, 2 pages.

(56)     References Cited

OTHER PUBLICATIONS

Notice of Allowance received for Chinese Patent Application No. 201620480708.6, mailed on Apr. 20, 2017, 3 pages.
Notice of Allowance received for Chinese Patent Application No. 201620480846.4, mailed on Apr. 20, 2017, 3 pages.
Notice of Allowance received for Chinese Patent Application No. 201710093861.2, mailed on Sep. 24, 2019, 4 pages.
Notice of Allowance received for Chinese Patent Application No. 201910354714.5, mailed on Oct. 14, 2020, 2 pages.
Notice of Allowance received for Japanese Patent Application No. 2016-224506, mailed on Jan. 24, 2020, 4 pages.
Notice of Allowance received for Japanese Patent Application No. 2016-224507, mailed on Mar. 26, 2019, 3 pages.
Notice of Allowance received for Japanese Patent Application No. 2016-224508, mailed on Jun. 20, 2017, 3 pages.
Notice of Allowance received for Japanese Patent Application No. 2016-558332, mailed on Jan. 11, 2019, 4 pages.
Notice of Allowance received for Japanese Patent Application No. 2016-569665, mailed on Feb. 22, 2019, 4 pages.
Notice of Allowance received for Japanese Patent Application No. 2017-540616, mailed on Apr. 23, 2019, 4 pages.
Notice of Allowance received for Japanese Patent Application No. 2017-562050, mailed on Jun. 1, 2020, 4 pages.
Notice of Allowance received for Japanese Patent Application No. 2017-562330, mailed on Sep. 20, 2019, 4 pages.
Notice of Allowance received for Japanese Patent Application No. 2018-008937, mailed on Jul. 2, 2018, 4 pages.
Notice of Allowance received for Japanese Patent Application No. 2019-096220, mailed on Nov. 25, 2019, 4 pages.
Notice of Allowance received for Japanese Patent Application No. 2019-191137, mailed on Mar. 8, 2021, 4 pages.
Notice of Allowance received for Korean Patent Application No. 10-2017-0022365, mailed on Mar. 27, 2018, 4 pages.
Notice of Allowance received for Korean Patent Application No. 10-2017-0022546, mailed on Feb. 27, 2018, 4 pages.
Notice of Allowance received for Korean Patent Application No. 10-2017-0022582, mailed on Feb. 27, 2020, 5 pages.
Notice of Allowance received for Korean Patent Application No. 10-2017-7024513, mailed on Apr. 20, 2018, 5 pages.
Notice of Allowance received for Korean Patent Application No. 10-2017-7034677, mailed on May 27, 2019, 5 pages.
Notice of Allowance received for Korean Patent Application No. 10-2018-7001854, mailed on Aug. 21, 2018, 4 pages.
Notice of Allowance received for Korean Patent Application No. 10-2019-7025322, mailed on Nov. 20, 2019, 5 pages.
Notice of Allowance received for Korean Patent Application No. 10-2019-7038235, mailed on Feb. 9, 2021, 4 pages.
Notice of Allowance received for Korean Patent Application No. 10-2020-0048600, mailed on Apr. 30, 2020, 5 pages.
Notice of Allowance received for Korean Patent Application No. 10-2020-7004737, mailed on Mar. 31, 2020, 4 pages.
Notice of Allowance received for Taiwanese Patent Application No. 104107332, mailed on Jun. 21, 2019, 5 pages.
Notice of Allowance received for Taiwanese Patent Application No. 104117508, mailed on Sep. 18, 2019, 5 pages.
Notice of Allowance received for Taiwanese Patent Application No. 104128689, mailed on Aug. 28, 2018, 5 pages.
Notice of Allowance received for the U.S. Appl. No. 14/503,381, mailed on Dec. 16, 2015, 8 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,296, mailed on Aug. 28, 2019, 12 pages.
Notice of Allowance received for U.S. Appl. No. 14/503,364, mailed on Jun. 16, 2016, 11 pages.
Notice of Allowance received for U.S. Appl. No. 14/836,754, mailed on May 10, 2018, 27 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 14/869,715, mailed on Dec. 19, 2017, 32 pages.
Notice of Allowance received for U.S. Appl. No. 14/870,694, mailed on Dec. 11, 2018, 6 pages.
Notice of Allowance received for U.S. Appl. No. 14/870,694, mailed on Jul. 31, 2018, 7 pages.
Notice of Allowance received for U.S. Appl. No. 14/870,726, mailed on Sep. 11, 2018, 9 pages.
Notice of Allowance received for U.S. Appl. No. 14/870,793, mailed on Jan. 22, 2021, 24 pages.
Notice of Allowance received for U.S. Appl. No. 14/870,793, mailed on Mar. 31, 2021, 19 pages.
Notice of Allowance received for U.S. Appl. No. 14/871,635, mailed on Feb. 3, 2020, 3 pages.
Notice of Allowance received for U.S. Appl. No. 14/871,635, mailed on Jan. 15, 2020, 3 pages.
Notice of Allowance Received for U.S. Appl. No. 14/871,635, mailed on Nov. 14, 2019, 14 pages.
Notice of Allowance received for U.S. Appl. No. 14/871,654, mailed on May 22, 2018, 22 pages.
Notice of Allowance received for U.S. Appl. No. 15/137,944, mailed on Dec. 21, 2017, 8 pages.
Notice of Allowance received for U.S. Appl. No. 15/294,439, mailed on Jan. 8, 2019, 8 pages.
Notice of Allowance received for U.S. Appl. No. 15/294,439, mailed on Sep. 10, 2018, 9 pages.
Notice of Allowance received for U.S. Appl. No. 15/351,230, mailed on Dec. 11, 2019, 11 pages.
Notice of Allowance received for U.S. Appl. No. 15/433,238, mailed on May 17, 2018, 7 pages.
Npasqua, "Maps: ability to swipe step by step in turn-by-turn mode", 2012, Apple Support Communities, Available online at: https://discussions.apple.com/thread/4424256?start=O&tstart=0, Oct. 12, 2012, 4 pages.
Oates Nathan, "PebbGPS", Available online at:—https://pebble.devpost.com/submissions/21694-pebbgps, Mar. 16, 2014, 2 pages.
Office Action received for Australian Patent Application No. 2017100558, mailed on Feb. 27, 2018, 3 pages.
Office Action received for European Patent Application No. 15728352.4, mailed on Jan. 25, 2018, 10 pages.
Office Action received for Japanese Patent Application No. 2016-224507, mailed on Dec. 1, 2017, 14 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Office Action received for Australian Patent Application No. 2015266650, mailed on Apr. 10, 2017, 4 pages.
Office Action received for Australian Patent Application No. 2015266693, mailed on Apr. 10, 2017, 4 pages.
Office Action received for Australian Patent Application No. 2016100090, issued on Apr. 13, 2016, 7 pages.
Office Action received for Australian Patent Application No. 2016100090, issued on Oct. 7, 2016, 3 pages.
Office Action received for Australian Patent Application No. 2016100155, mailed on May 4, 2016, 7 pages.
Office Action received for Australian Patent Application No. 2016100367, issued on May 25, 2016, 3 pages.
Office Action received for Australian Patent Application No. 2016100367, mailed on Oct. 26, 2016, 3 pages.
Office Action received for Australian Patent Application No. 2016100383, issued on Jun. 9, 2016, 2 pages.
Office Action received for Australian Patent Application No. 2016100383, issued on Nov. 11, 2016, 3 pages.

(56) References Cited

OTHER PUBLICATIONS

Office Action received for Australian Patent Application No. 2016100795, mailed on Aug. 12, 2016, 6 pages.
Office Action received for Australian Patent Application No. 2016100795, mailed on Feb. 6, 2017, 3 pages.
Office Action received for Australian Patent Application No. 2016100796, issued on Aug. 26, 2016, 6 pages.
Office Action received for Australian Patent Application No. 2016100796, issued on Feb. 13, 2017, 4 pages.
Office Action received for Australian Patent Application No. 2016102031, mailed on Feb. 28, 2017, 4 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2016270323, mailed on May 29, 2019, 4 pages.
Office Action received for Australian Patent Application No. 2016270323, mailed on Nov. 26, 2018, 4 pages.
Office Action received for Australian Patent Application No. 2016270775, mailed on May 29, 2019, 3 pages.
Office Action received for Australian Patent Application No. 2016270775, mailed on Nov. 26, 2018, 5 pages.
Office Action received for Australian Patent Application No. 2016270775, mailed on Nov. 26, 2019, 3 pages.
Office Action received for Australian Patent Application No. 2017100070, mailed on Mar. 16, 2017, 6 pages.
Office Action received for Australian Patent Application No. 2017100231, mailed on Apr. 13, 2017, 3 pages.
Office Action received for Australian Patent Application No. 2017100328, mailed on May 16, 2017, 3 pages.
Office Action received for Australian Patent Application No. 2017100328, mailed on Oct. 16, 2017, 6 pages.
Office Action received for Australian Patent Application No. 2017100558, mailed on Sep. 1, 2017, 5 pages.
Office Action received for Australian Patent Application No. 2017100760, mailed on Aug. 10, 2017, 4 pages.
Office Action received for Australian Patent Application No. 2017100760, mailed on Jan. 30, 2018, 3 pages.
Office Action received for Australian Patent Application No. 2017101375, mailed on Dec. 1, 2017, 3 pages.
Office Action received for Australian Patent Application No. 2017101375, mailed on Feb. 19, 2018, 4 pages.
Office Action received for Australian Patent Application No. 2017201064, mailed on Mar. 9, 2017, 2 pages.
Office Action received for Australian Patent Application No. 2017201068, mailed on Jan. 17, 2018, 5 pages.
Office Action received for Australian Patent Application No. 2017201068, mailed on Mar. 10, 2017, 2 pages.
Office Action received for Australian Patent Application No. 2018200485, mailed on Feb. 20, 2019, 6 pages.
Office Action received for Australian Patent Application No. 2018200485, mailed on Mar. 15, 2018, 3 pages.
Office Action received for Australian Patent Application No. 2018200485, mailed on Mar. 15, 2019, 4 pages.
Office Action received for Australian Patent Application No. 2018200628, mailed on Jan. 24, 2019, 3 pages.
Office Action received for Australian Patent Application No. 2018202559, mailed on Apr. 8, 2019, 4 pages.
Office Action Received for Australian Patent Application No. 2018202559, mailed on Jan. 16, 2019, 6 pages.
Office Action received for Australian Patent Application No. 2018202559, mailed on Jul. 19, 2019, 5 pages.
Office Action received for Australian Patent Application No. 2019271921, mailed on Oct. 6, 2020, 5 pages.
Office Action received for Australian Patent Application No. 2019271927, mailed on Feb. 10, 2021, 5 pages.
Office Action received for Australian Patent Application No. 2020200685, mailed on Apr. 20, 2020, 3 pages.
Office Action received for Australian Patent Application No. 2020200685, mailed on Aug. 12, 2020, 3 pages.
Office Action received for Australian Patent Application No. 2020200685, mailed on Feb. 10, 2020, 4 pages.
Office Action received for Chinese Patent Application No. 201510284715.9, mailed on Apr. 14, 2020, 19 pages.
Office Action received for Chinese Patent Application No. 201510284715.9, mailed on Dec. 18, 2019, 24 pages.
Office Action received for Chinese Patent Application No. 201510284715.9, mailed on Dec. 21, 2018, 22 pages.
Office Action received for Chinese Patent Application No. 201510284715.9, mailed on Jun. 19, 2019, 26 pages.
Office Action received for Chinese Patent Application No. 201510284896.5, mailed on Jun. 28, 2018, 15 pages.
Office Action received for Chinese Patent Application No. 201510284896.5, mailed on Mar. 6, 2019, 13 pages.
Office Action received for Chinese Patent Application No. 201510284896.5, mailed on Sep. 3, 2019, 9 pages.
Office Action received for Chinese Patent Application No. 201520358683.8, mailed on Sep. 2, 2015, Sep. 2, 2015, 4 pages.
Office Action received for Chinese Patent Application No. 201580047640.0, mailed on Aug. 5, 2019, 18 pages.
Office Action received for Chinese Patent Application No. 201580047640.0, mailed on Oct. 16, 2020, 20 pages.
Office Action received for Chinese Patent Application No. 201610069731.0, mailed on Mar. 5, 2019, 10 pages.
Office Action received for Chinese Patent Application No. 201610084974.1, mailed on Dec. 5, 2018, 6 pages.
Office Action received for Chinese Patent Application No. 201610084974.1, mailed on May 3, 2018, 12 pages.
Office Action received for Chinese Patent Application No. 201610371774.4, mailed on Dec. 2, 2019, 6 pages.
Office Action received for Chinese Patent Application No. 201610371774.4, mailed on Dec. 19, 2018, 13 pages.
Office Action received for Chinese Patent Application No. 201610371774.4, mailed on Jul. 8, 2019, 6 pages.
Office Action received for Chinese Patent Application No. 201610371856.9, mailed on Dec. 18, 2019, 6 pages.
Office Action received for Chinese Patent Application No. 201610371856.9, mailed on Dec. 19, 2018, 12 pages.
Office Action received for Chinese Patent Application No. 201610371856.9, mailed on Jul. 10, 2019, 6 pages.
Office Action received for Chinese Patent Application No. 201620101636.X, mailed on May 25, 2016, 3 pages.
Office Action received for Chinese Patent Application No. 201620101636.X, mailed on Oct. 13, 2016, 3 pages.
Office Action received for Chinese Patent Application No. 201620119869.2, mailed on Jun. 3, 2016, 2 pages.
Office Action received for Chinese Patent Application No. 201620119869.2, mailed on Nov. 22, 2016, 2 pages.
Office Action received for Chinese Patent Application No. 201620480708.6, mailed on Jan. 9, 2017, 3 pages.
Office Action received for Chinese Patent Application No. 201620480708.6, mailed on Sep. 14, 2016, 3 pages.
Office Action received for Chinese Patent Application No. 201620480846.4, mailed on Jan. 9, 2017, 3 pages.
Office Action received for Chinese Patent Application No. 201620480846.4, mailed on Sep. 14, 2016, 3 pages.
Office Action received for Chinese Patent Application No. 201620509362.8, mailed on Feb. 10, 2017, 2 pages.
Office Action received for Chinese Patent Application No. 201620509362.8, mailed on Oct. 21, 2016, 3 pages.
Office Action received for Chinese Patent Application No. 201620509515.9, mailed on Nov. 9, 2016, 2 pages.
Office Action received for Chinese Patent Application No. 201710093861.2, mailed on Mar. 5, 2019, 6 pages.
Office Action received for Chinese Patent Application No. 201710093861.2, mailed on Sep. 14, 2018, 15 pages.
Office Action received for Chinese Patent Application No. 201710094150.7, mailed on Dec. 19, 2018, 12 pages.
Office Action received for Chinese Patent Application No. 201710094150.7, mailed on Jul. 31, 2019, 6 pages.

(56)     References Cited

OTHER PUBLICATIONS

Office Action received for Chinese Patent Application No. 201810094316.X, mailed on Apr. 28, 2019, 9 pages.
Office Action received for Chinese Patent Application No. 201810094316.X, mailed on Aug. 5, 2019, 9 pages.
Office Action received for Chinese Patent Application No. 201810094316.X, mailed on Oct. 29, 2018, 12 pages.
Office Action received for Chinese Patent Application No. 201811330077.X, mailed on May 18, 2020, 9 pages.
Office Action received for Chinese Patent Application No. 201811330077.X, mailed on Nov. 13, 2019, 14 pages.
Office Action received for Chinese Patent Application No. 201811330077.X, mailed on Nov. 26, 2020, 8 pages.
Office Action received for Chinese Patent Application No. 201910354714.5, mailed on Feb. 3, 2020, 12 pages.
Office Action received for Chinese Patent Application No. 201910990432.4, mailed on Dec. 28, 2020, 6 pages.
Office Action received for Chinese Patent Application No. 201910990432.4, mailed on May 18, 2020, 15 pages.
Office Action Received for Danish Patent Application No. PA 201670709, mailed on Jul. 21, 2017, 4 pages.
Office Action Received for Danish Patent Application No. PA 201670709, mailed on Nov. 30, 2016, 10 pages.
Office Action received for Danish Patent Application No. PA201570665, mailed on Mar. 31, 2016, 9 pages.
Office Action received for Danish Patent Application No. PA201570665, mailed on Sep. 5, 2016, 3 pages.
Office Action received for Danish Patent Application No. PA201670042, mailed on Feb. 15, 2017, 3 pages.
Office Action received for Danish Patent Application No. PA201670042, mailed on Jun. 23, 2016, 5 pages.
Office Action received for Danish Patent Application No. PA201670042, mailed on Mar. 31, 2016, 10 pages.
Office Action received for Danish Patent Application No. PA201670042, mailed on Sep. 25, 2017, 2 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201670362, mailed on Jan. 29, 2018, 3 pages.
Office Action received for Danish Patent Application No. PA201670362, mailed on Jun. 1, 2017, 6 pages.
Office Action received for Danish Patent Application No. PA201670362, mailed on Nov. 21, 2016, 11 pages.
Office Action received for Danish Patent Application No. PA201670363, mailed on Feb. 12, 2018, 2 pages.
Office Action received for Danish Patent Application No. PA201670363, mailed on Jun. 1, 2017, 5 pages.
Office Action received for Danish Patent Application No. PA201670363, mailed on Nov. 4, 2016, 11 pages.
Office Action received for Danish Patent Application No. PA201670710, mailed on Dec. 8, 2016, 10 pages.
Office Action received for Danish Patent Application No. PA201670710, mailed on Sep. 25, 2017, 6 pages.
Office Action received for Danish Patent Application No. PA201670749, mailed on Jan. 30, 2017, 11 pages.
Office Action received for Danish Patent Application No. PA201670749, mailed on Oct. 3, 2017, 3 pages.
Office Action received for Danish Patent Application No. PA201670751, mailed on Jan. 13, 2017, 9 pages.
Office Action received for Danish Patent Application No. PA201670751, mailed on Nov. 13, 2017, 2 pages.
Office Action received for Danish Patent Application No. PA201770089, mailed on Apr. 25, 2017, 10 pages.
Office Action received for Danish Patent Application No. PA201770292, mailed on Apr. 24, 2018, 3 pages.

Office Action received for Danish Patent Application No. PA201770292, mailed on Jun. 6, 2017, 7 pages.
Office Action received for Danish Patent Application No. PA201770292, mailed on Nov. 9, 2018, 3 pages.
Office Action received for Danish Patent Application No. PA201770292, mailed on Sep. 6, 2017, 4 pages.
Office Action received for European Patent Application No. 15727291.5, mailed on Jan. 15, 2018, 8 pages.
Office Action received for European Patent Application No. 16201159.7, mailed on Jun. 12, 2019, 10 pages.
Office Action Received for European Patent Application No. 16201195.1, mailed on Feb. 14, 2018, 12 pages.
Office Action received for European Patent Application No. 16201205.8, mailed on Feb. 16, 2018, 12 pages.
Office Action received for European Patent Application No. 16703893.4, mailed on Sep. 17, 2018, 7 pages.
Office Action received for European Patent Application No. 16708003.5, mailed on Feb. 22, 2021, 10 pages.
Office Action received for European Patent Application No. 16803996.4, mailed on Nov. 29, 2018, 12 pages.
Office Action received for European Patent Application No. 16804040.0, mailed on May 13, 2019, 12 pages.
Office Action received for European Patent Application No. 17810682.9, mailed on Mar. 26, 2021, 8 pages.
Office Action received for European Patent Application No. 18154163.2, mailed on Apr. 11, 2018, 6 pages.
Office Action received for European Patent Application No. 19171661.2, mailed on Aug. 7, 2019, 7 pages.
Office Action received for European Patent Application No. 20180033.1, mailed on Jul. 17, 2020, 7 pages.
Office Action received for German Patent Application No. 202015004267.8, mailed on Nov. 4, 2015, 4 pages.
Office Action received for German Patent Application No. 212015000194.6, mailed on Mar. 16, 2017, 2 pages.
Office Action received for Indian Patent Application No. 201617039493, mailed on Oct. 21, 2019, 6 pages.
Office Action received for Japanese Patent Application No. 2016-224506, mailed on May 14, 2019, 22 pages.
Office Action received for Japanese Patent Application No. 2016-224507, mailed on Jun. 16, 2017, 16 pages.
Office Action received for Japanese Patent Application No. 2016-558332, mailed on Dec. 8, 2017, 12 pages.
Office Action received for Japanese Patent Application No. 2016-558332, mailed on Jul. 27, 2018, 9 pages.
Office Action received for Japanese Patent Application No. 2016-569665, mailed on Aug. 20, 2018, 9 pages.
Office Action received for Japanese Patent Application No. 2016-569665, mailed on Jan. 19, 2018, 10 pages.
Office Action received for Japanese Patent Application No. 2017-540616, mailed on Jan. 12, 2018, 24 pages.
Office Action received for Japanese Patent Application No. 2017-540616, mailed on Jul. 27, 2018, 20 pages.
Office Action received for Japanese Patent Application No. 2017-562050, mailed on Feb. 1, 2019, 15 pages.
Office Action received for Japanese Patent Application No. 2017-562050, mailed on Sep. 30, 2019, 5 pages.
Office Action received for Japanese Patent Application No. 2017-562330, mailed on Jan. 18, 2019, 11 pages.
Office Action received for Japanese Patent Application No. 2019-096220, mailed on Sep. 9, 2019, 8 pages.
Office Action received for Japanese Patent Application No. 2019-191137, mailed on Nov. 20, 2020, 9 pages.
Office Action received for Japanese Patent Application No. 2020-028315, mailed on Jul. 6, 2020, 18 pages.
Office Action received for Japanese Patent Application No. 2020-028315, mailed on Nov. 9, 2020, 11 pages.
Office Action received for Korean Patent Application No. 10-2016-0152210, mailed on Jan. 29, 2019, 7 pages.
Office Action received for Korean Patent Application No. 10-2016-0152210, mailed on May 14, 2018, 13 pages.
Office Action received for Korean Patent Application No. 10-2016-0152210, mailed on May 30, 2019, 8 pages.

(56)                    References Cited

OTHER PUBLICATIONS

Office Action received for Korean Patent Application No. 10-2017-0022365, mailed on Jun. 26, 2017, 10 pages.
Office Action received for Korean Patent Application No. 10-2017-0022546, mailed on Jun. 21, 2017, 12 pages.
Office Action received for Korean Patent Application No. 10-2017-0022582, mailed on Jul. 31, 2019, 5 pages.
Office Action received for Korean Patent Application No. 10-2017-0022582, mailed on Sep. 19, 2018, 6 pages.
Office Action received for Korean Patent Application No. 10-2017-7034558, mailed on Dec. 15, 2018, 15 pages.
Office Action received for Korean Patent Application No. 10-2017-7034558, mailed on Jun. 4, 2019, 7 pages.
Office Action received for Korean Patent Application No. 10-2017-7034558, mailed on Sep. 25, 2019, 9 pages.
Office Action received for Korean Patent Application No. 10-2017-7034677, mailed on Nov. 1, 2018, 5 pages.
Office Action received for Korean Patent Application No. 10-2018-7001854, mailed on Apr. 2, 2018, 13 pages.
Office Action received for Korean Patent Application No. 10-2018-7019643, mailed on Jan. 6, 2020, 7 pages.
Office Action received for Korean Patent Application No. 10-2018-7019643, mailed on Jul. 2, 2019, 12 pages.
Office Action received for Korean Patent Application No. 10-2019-7038235, mailed on Mar. 9, 2020, 15 pages.
Office Action received for Korean Patent Application No. 10-2020-0097418, mailed on Aug. 28, 2020, 6 pages.
Office Action received for Korean Patent Application No. 10-2020-7010007, mailed on Aug. 26, 2020, 12 pages.
Office Action received for Korean Patent Application No. 10-2020-7010007, mailed on Mar. 15, 2021, 7 pages.
Office Action received for Taiwanese Patent Application No. 104107332, mailed on Oct. 29, 2018, 12 pages.
Office Action received for Taiwanese Patent Application No. 104117508, issued on Jul. 14, 2017, 9 pages.
Office Action received for Taiwanese Patent Application No. 104117508, issued on Jul. 20, 2016, 19 pages.
Office Action received for Taiwanese Patent Application No. 104117508, issued on Mar. 20, 2017, 22 pages.
Office Action received for Taiwanese Patent Application No. 104117508, mailed on Jan. 25, 2019, 24 pages.
Office Action received for Taiwanese Patent Application No. 104117508, mailed on May 22, 2019, 7 pages.
Office Action received for Taiwanese Patent Application No. 104128689, issued on Aug. 21, 2017, 8 pages.
Office Action received for Taiwanese Patent Application No. 104128689, mailed on Nov. 14, 2016, 12 pages.
Pre-Brief Appeal Conference decision received for U.S. Appl. No. 14/869,831, mailed on Jan. 18, 2019, 3 pages.
Preliminary Opinion before oral proceedings received for European Patent Application No. 18154163.2, mailed on Apr. 16, 2019, 12 pages.
Real Solution of two-step-authentication Password Management for Authentication Enhancement, Fukuda Takao, Nikkei PC, JPN, Nikkei Business Publications, Inc, No. 694, Mar. 24, 2014, 11 pages.
Record of Oral Hearing received for U.S. Appl. No. 14/869,831, mailed on Oct. 6, 2020, 12 pages.
Record of Oral Hearing received for U.S. Appl. No. 14/869,877, mailed on Apr. 1, 2021, 10 pages.
Record of Oral Hearing received for U.S. Appl. No. 14/870,793, mailed on Nov. 3, 2020, 24 pages.
Result of Consultation received for European Patent Application No. 16703893.4, mailed on Jun. 7, 2019, 3 pages.
Result of Consultation received for European Patent Application No. 16803996.4, mailed on Feb. 17, 2020, 14 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.

Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 16703893.4, mailed on Mar. 26, 2019, 14 pages.
Summons to Attend Oral Proceedings received for European Patent Application No. 16803996.4, mailed on Oct. 2, 2019, 16 pages.
Summons to Attend Oral Proceedings received for European Patent Application No. 16804040.0, mailed on Jan. 24, 2020, 11 pages.
Summons to Attend Oral Proceedings received for European Patent Application No. 18154163.2, mailed on Nov. 29, 2018, 9 pages.
Summons to Attend Oral Proceedings received for European Patent Application No. 19171661.2, mailed on Apr. 16, 2020, 12 pages.
Summons to Attend Oral Proceedings received for European Patent Application No. 19171661.2, mailed on Jun. 2, 2020, 13 pages.
Supplemental Notice of Allowance received for U.S. Appl. No. 14/870,694, mailed on Jan. 17, 2019, 3 pages.
Supplemental Notice of Allowance received for U.S. Appl. No. 14/870,726, mailed on Mar. 6, 2019, 6 pages.
Supplemental Notice of Allowance received for U.S. Appl. No. 15/433,238, mailed on Jun. 20, 2018, 2 pages.
The Gadget Pill, "Sygic for Android Navigation with HUD", Available online at:—https://www.youtube.com/watch?v=fGqrycRevGU, Mar. 23, 2014, 1 page.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Notice of Allowance received for Japanese Patent Application No. 2021-037591, mailed on Nov. 18, 2022, 4 pages (1 page of English Translation and 3 pages of Official Copy).
Notice of Allowance received for U.S. Appl. No. 17/498,557, mailed on Dec. 2, 2022, 9 pages.
Office Action received for Australian Patent Application No. 2022200900, mailed on Nov. 30, 2022, 6 pages.
Board Opinion received for Chinese Patent Application No. 201510284715.9, mailed on Jun. 6, 2022, 14 pages (3 pages of English Translation and 11 pages of Official Copy).
Extended European Search Report received for European Patent Application No. 22158560.7, mailed on Jun. 10, 2022, 12 pages.
Notice of Allowance received for Chinese Patent Application No. 201510284896.5, mailed on Jun. 6, 2022, 2 pages (1 page of English Translation and 1 page of Official Copy).
Non-Final Office Action received for U.S. Appl. No. 17/583,657, mailed on Sep. 13, 2022, 13 pages.
Office Action received for Chinese Patent Application No. 201980009669.8, mailed on Aug. 3, 2022, 19 pages (12 pages of English Translation and 7 pages of Official Copy).
Intention to Grant received for European Patent Application No. 19716254.8, mailed on May 16, 2023, 9 pages.
Office Action received for European Patent Application No. 21150992.2, mailed on May 4, 2023, 12 pages.
Applicant-Initiated Interview Summary received for U.S. Appl. No. 16/369,355, mailed on Jul. 28, 2021, 2 pages.
Notice of Allowance received for Korean Patent Application No. 10-2021-7020549, mailed on Jul. 13, 2021, 3 pages (1 page of English Translation and 2 pages of Official Copy).
Office Action received for European Patent Application No. 20186286.9, mailed on Jul. 29, 2021, 8 pages.
Office Action received for Korean Patent Application No. 10-2021-7014009, mailed on Jul. 22, 2021, 12 pages (6 pages of English Translation and 6 pages of Official Copy).
Office Action received for Indian Patent Application No. 202018044420, mailed on Jan. 31, 2022, 6 pages.

(56) References Cited

OTHER PUBLICATIONS

Advisory Action received for U.S. Appl. No. 15/274,910, mailed on Aug. 12, 2019, 3 pages.
"Samsung User Manual", SM-R380_UM_EU_Eng_D13_140411. pdf, Apr. 2014, 78 Pages.
"Use NFC with Screen off or in Lock Screen on Galaxy Nexus", Available online at: https://www.xda-developers.com/use-nfc-with-screen-off-or-in-lock-screen-on-galaxy-nexus/, Jun. 14, 2012, 4 pages.
Adrianisen, "Samsung Galaxy S8 Face Recognition—Register Your Face Review!", Retrieved from: < https://www.youtube.com/watch?v=04KVPaCJq94>, Apr. 27, 2017, 1 page.
Advisory Action received for U.S. Appl. No. 16/164,561, mailed on Nov. 14, 2019, 2 pages.
Advisory Action received for U.S. Appl. No. 16/581,614, mailed on Sep. 11, 2020, 8 pages.
Advisory Action received for U.S. Appl. No. 15/250,152, mailed on Mar. 25, 2019, 5 pages.
Airize, "Notification & Control Center Problem Issue Solution", Available online at:—"https://www.youtube.com/watch?v=K0zCueYlaTA", Dec. 6, 2013, 1 page.
Applicant Initiated Interview Summary received for U.S. Appl. No. 15/433,320, mailed on Feb. 11, 2020, 5 pages.
Applicant Initiated Interview Summary received for U.S. Appl. No. 15/823,269, mailed on Sep. 17, 2020, 3 pages.
Applicant Initiated Interview Summary received for U.S. Appl. No. 15/902,401, mailed on Oct. 28, 2019, 4 pages.
Applicant Initiated Interview Summary received for U.S. Appl. No. 16/147,023, mailed on Oct. 29, 2019, 3 pages.
Applicant Initiated Interview Summary received for U.S. Appl. No. 16/581,614, mailed on Apr. 30, 2020, 4 pages.
Applicant Initiated Interview Summary received for U.S. Appl. No. 16/581,614, mailed on Aug. 26, 2020, 3 pages.
Applicant-Initiated Interview Summary received for U.S. Appl. No. 15/274,910, mailed on Jul. 9, 2020, 3 pages.
Applicant-Initiated Interview Summary received for U.S. Appl. No. 15/433,320, mailed on Nov. 25, 2020, 4 pages.
Applicant-Initiated Interview Summary received for U.S. Appl. No. 16/125,267, mailed on Feb. 8, 2021, 3 pages.
Applicant-Initiated Interview Summary received for U.S. Appl. No. 16/125,267, mailed on Sep. 14, 2020, 5 pages.
Applicant-Initiated Interview Summary received for U.S. Appl. No. 16/581,569, mailed on May 1, 2020, 3 pages.
Applicant-Initiated Interview Summary received for U.S. Appl. No. 16/667,271, mailed on Apr. 8, 2020, 3 pages.
Applicant-Initiated Interview Summary received for U.S. Appl. No. 16/670,949, mailed on Apr. 6, 2021, 2 pages.
Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Basu Saikat, "MS Outlook Tip: How to Automatically Organize Incoming Emails", Available online at: <http://www.makeuseof.com/tag/ms-outlook-productivity-tip-how-to-move-emails-to-individual-folders-automatically/>, Sep. 27, 2009, pp. 1-6.
Certificate of Examination received for Australian Patent Application No. 2017100553, mailed on Jan. 17, 2018, 2 pages.
Certificate of Examination received for Australian Patent Application No. 2017101425, mailed on Jan. 17, 2018, 2 pages.
Certificate of Examination received for Australian Patent Application No. 2018101014, mailed on Mar. 20, 2019, 2 pages.
Corrected Notice of Allowance received for U.S. Appl. No. 15/269,801, mailed on Oct. 3, 2017, 4 pages.
Corrected Notice of Allowance received for U.S. Appl. No. 15/845,794, mailed on Feb. 25, 2019, 2 pages.
Corrected Notice of Allowance received for U.S. Appl. No. 15/866,341, mailed on Aug. 21, 2019, 3 pages.
Corrected Notice of Allowance received for U.S. Appl. No. 15/866,341, mailed on Aug. 26, 2019, 3 pages.

Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.
Corrected Notice of Allowance received for U.S. Appl. No. 16/841,352, mailed on Dec. 2, 2020, 2 pages.
CV Meerkat, "Extracting Face Orientation in Real-time", Available online at: <https://www.youtube.com/watch?v=Ugwfnjx6UYw>, Jul. 22, 2016, 3 pages.
Decision to Grant received for Danish Patent Application No. PA201670628, mailed on Nov. 20, 2017, 2 pages.
Decision to Grant received for Danish Patent Application No. PA201770126, mailed on Mar. 27, 2018, 2 pages.
Decision to Grant received for Danish Patent Application No. PA201770715, mailed on Feb. 15, 2019, 2 pages.
Decision to Grant received for Danish Patent Application No. PA201770782, mailed on Oct. 25, 2019, 2 pages.
Decision to Grant received for Danish Patent Application No. PA201770804, mailed on Jun. 28, 2019, 2 pages.
Decision to Grant received for Danish Patent Application No. PA201870370, mailed on Mar. 29, 2019, 2 pages.
Decision to Grant received for Danish Patent Application No. PA201870371, mailed on Mar. 29, 2019, 2 pages.
Decision to Grant received for Danish Patent Application No. PA201870855, mailed on Oct. 20, 2020, 2 pages.
Decision to Grant received for Danish Patent Application No. PA201970127, mailed on Aug. 20, 2020, 2 pages.
Decision to Grant received for European Patent Application No. 12773460.6, mailed on Jun. 27, 2019, 2 pages.
Decision to Grant received for European Patent Application No. 15759981.2, mailed on Jan. 8, 2020, 2 pages.
Decision to Grant received for Japanese Patent Application No. 2017-075031, mailed on Jul. 1, 2019, 3 pages (1 page of English Translation and 2 pages of Official Copy).
Decision to Refuse received for European Patent Application No. 12770400.5, mailed on Nov. 8, 2018, 12 pages.
Drareni Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 17865509.8, mailed on Oct. 2, 2019, 5 pages.
European Search Report received for European Patent Application No. 21150414.7, mailed on Apr. 21, 2021, 4 pages.
Extended European Search Report for European Application No. 17813737.8, mailed on Nov. 22, 2019, 9 pages.
Extended European Search Report received for European Patent Application No. 17799904.2, mailed on Jul. 30, 2018, 7 pages.
Extended European Search Report received for European Patent Application No. 17835789.3, mailed on Jun. 23, 2020, 12 pages.
Extended European Search Report received for European Patent Application No. 18170262.2, mailed on Jul. 25, 2018, 8 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19160344.8, mailed on Jun. 14, 2019, 7 pages.
Extended European Search Report received for European Patent Application No. 19160348.9, mailed on Jul. 19, 2019, 6 pages.
Extended European Search Report received for European Patent Application No. 19186538.5, mailed on Oct. 9, 2019, 10 pages.
Extended European Search Report received for European Patent Application No. 19194828.0, mailed on Dec. 19, 2019, 7 pages.
Extended European Search Report received for European Patent Application No. 20186286.9, mailed on Nov. 2, 2020, 9 pages.
Extended European Search Report received for European Patent Application No. 20198076.0, mailed on Jan. 13, 2021, 8 pages.
Extended European Search Report Received for European patent Application No. 10151963.5 , mailed on Apr. 14, 2010, 7 Pages.
Final Office Action Received for U.S. Appl. No. 12/363,513, Mailed on Sep. 15, 2011, 25 Pages.
Final Office Action received for U.S. Appl. No. 13/248,882, mailed on Dec. 4, 2013, 22 pages.

(56)          References Cited

OTHER PUBLICATIONS

Final Office Action received for U.S. Appl. No. 14/285,378, mailed on Jul. 23, 2015, 19 pages.

Final Office Action received for U.S. Appl. No. 14/817,572, mailed on Mar. 23, 2017, 14 pages.

Final Office Action received for U.S. Appl. No. 14/838,235, mailed on Jun. 15, 2016, 18 pages.

Final Office Action received for U.S. Appl. No. 15/274,910, mailed on May 31, 2019, 31 pages.

Final Office Action received for U.S. Appl. No. 15/274,910, mailed on Oct. 16, 2020, 34 pages.

Final Office Action received for U.S. Appl. No. 15/433,320, mailed on Dec. 31, 2019, 30 pages.

Final Office Action received for U.S. Appl. No. 15/866,341, mailed on May 14, 2019, 10 pages.

Final Office Action received for U.S. Appl. No. 16/125,267, mailed on Dec. 10, 2020, 20 pages.

Final Office Action received for U.S. Appl. No. 16/147,023, mailed on Jul. 23, 2019, 18 pages.

Final Office Action received for U.S. Appl. No. 16/147,115, mailed on Jun. 19, 2019, 14 pages.

Final Office Action received for U.S. Appl. No. 16/164,561, mailed on Sep. 5, 2019, 12 pages.

Final Office Action received for U.S. Appl. No. 16/581,614, mailed on Jul. 10, 2020, 21 pages.

Final Office Action received for U.S. Appl. No. 15/250,152, mailed on Aug. 23, 2017, 24 pages.

Final Office Action received for U.S. Appl. No. 15/250,152, mailed on Nov. 16, 2018, 30 pages.

"How to Move Mail to Different Folders in Gmail", Available online at: <https://web.archive.org/web/20140731230338/http://www.wikihow.com/Move-Mail-to-Different-Folders-in-Gmail>, Jul. 31, 2014, pp. 1-4.

How to Smartphone, "Samsung Galaxy S7—screen rotation on / off", Available Online at <https://www.youtube.com/watch?v=np54sEEI11E >, see video from 1:10 to 1:30, Dec. 12, 2016, 3 pages.

Intention to Grant received for Danish Patent Application No. PA201570550, mailed on Dec. 22, 2016, 2 pages.

Intention to Grant received for Danish Patent Application No. PA201670628, mailed on Aug. 28, 2017, 2 pages.

Intention to Grant received for Danish Patent Application No. PA201770714, mailed on Feb. 15, 2019, 2 pages.

Intention to Grant received for Danish Patent Application No. PA201770714, mailed on Nov. 2, 2018, 2 pages.

Intention to Grant received for Danish Patent Application No. PA201770715, mailed on Nov. 13, 2018, 2 pages.

Intention to Grant received for Danish Patent Application No. PA201770782, mailed on Aug. 8, 2019, 2 pages.

Intention to Grant received for Danish Patent Application No. PA201770804, mailed on Apr. 10, 2019, 2 pages.

Intention to Grant received for Danish Patent Application No. PA201870370, mailed on Jan. 2, 2019, 2 pages.

Intention to Grant received for Danish Patent Application No. PA201870371, mailed on Jan. 2, 2019, 2 pages.

Intention to Grant received for Danish Patent Application No. PA201870855, mailed on Jul. 13, 2020, 2 pages.

Intention to Grant received for Danish Patent Application No. PA201970127, mailed on Apr. 21, 2020, 2 pages.

Intention to Grant received for Denmark Patent Application No. PA201770126, mailed on Jan. 19, 2018, 2 pages.

Intention to Grant received for European Patent Application No. 12773460.6, mailed on Feb. 4, 2019, 8 pages.

Intention to Grant received for European Patent Application No. 12773460.6, mailed on Jun. 17, 2019, 4 pages.

Intention to Grant received for European Patent Application No. 15759981.2, mailed on Aug. 12, 2019, 8 pages.

Intention to Grant received for European Patent Application No. 15759981.2, mailed on Mar. 21, 2019, 8 pages.

Intention to Grant received for European Patent Application No. 18170262.2, mailed on Jun. 30, 2020, 8 pages.

International Preliminary Report on Patentability Received for Application No. PCT/US2009/069052, Mailed on May 18, 2011, 17 pages.

International Preliminary Report on Patentability received for PCT Patent Application No. PCT/US2018/049289, mailed on Mar. 19, 2020, 9 pages.

International Preliminary Report on Patentability received for PCT Patent Application No. PCT/US2012/057319, mailed on Apr. 10, 2014, 6 pages.

International Preliminary Report on Patentability received for PCT Patent Application No. PCT/US2012/057656, mailed on Apr. 10, 2014, 6 pages.

International Preliminary Report on Patentability received for PCT Patent Application No. PCT/US2015/044083, mailed on Mar. 16, 2017, 24 pages.

International Preliminary Report on Patentability received for PCT Patent Application No. PCT/US2017/031086, mailed on Dec. 27, 2018, 12 pages.

International Preliminary Report on Patentability received for PCT Patent Application No. PCT/US2017/032240, mailed on Nov. 29, 2018, 29 pages.

International Preliminary Report on Patentability received for PCT Patent Application No. PCT/US2017/058368, mailed on Feb. 19, 2019, 5 pages.

International Preliminary Report on Patentability received for PCT Patent Application No. PCT/US2017/49500, mailed on Mar. 21, 2019, 14 pages.

International Preliminary Report on Patentability received for PCT Patent Application No. PCT/US2018/015603, mailed on Mar. 19, 2020, 8 pages.

International Preliminary Report on Patentability received for PCT Patent Application No. PCT/US2019/012571, mailed on Aug. 6, 2020, 10 pages.

International Preliminary Report on Patentability received for PCT Patent Application No. PCT/US2019/035092, mailed on Dec. 17, 2020, 10 pages.

International Search Report and Written Opinion Received for PCT Application No. PCT/US2009/069052, mailed on Mar. 3, 2010, 10 Pages.

International Search Report and Written Opinion received for PCT Patent Application No. PCT/US17/31086, mailed on Sep. 8, 2017, 15 pages.

International Search Report and Written Opinion received for PCT Patent Application No. PCT/US2012/057319, mailed on Feb. 25, 2013, 7 pages.

International Search Report and Written Opinion received for PCT Patent Application No. PCT/US2012/057656, mailed on Feb. 25, 2013, 7 pages.

International Search Report and Written Opinion received for PCT Patent Application No. PCT/US2015/044083, mailed on Feb. 4, 2016, 33 pages.

International Search Report and Written Opinion received for PCT Patent Application No. PCT/US2017/032240, mailed on Sep. 21, 2017, 33 pages.

International Search Report and Written Opinion received for PCT Patent Application No. PCT/US2017/058368, mailed on Feb. 23, 2018, 12 pages.

International Search Report and Written Opinion received for PCT Patent Application No. PCT/US2017/49500, mailed on Jan. 18, 2018, 18 pages.

International Search Report and Written Opinion received for PCT Patent Application No. PCT/US2018/015603, mailed on Jun. 22, 2018, 13 pages.

International Search Report and Written Opinion received for PCT Patent Application No. PCT/US2018/049289, mailed on Feb. 19, 2019, 12 pages.

International Search Report and Written Opinion received for PCT Patent Application No. PCT/US2019/012571, mailed on May 6, 2019, 15 pages.

(56)                References Cited

OTHER PUBLICATIONS

International Search Report and Written Opinion received for PCT Patent Application No. PCT/US2019/035092, mailed on Jan. 16, 2020, 16 pages.
International Search Report and Written Opinion received for PCT Patent Application No. PCT/US2020/020414, mailed on Jul. 27, 2020, 27 pages.
Invitation to Pay Additional Fee received for PCT Patent Application No. PCT/US17/31086, mailed on Jul. 14, 2017, 2 pages.
Invitation to Pay Additional Fee received for PCT Patent Application No. PCT/US17/32240, mailed on Jul. 12, 2017, 2 pages.
Invitation to Pay Additional Fee received for PCT Patent Application No. PCT/US2017/49500, mailed on Nov. 14, 2017, 3 pages.
Invitation to Pay Additional Fee received for PCT Patent Application No. PCT/US2019/035092, mailed on Nov. 20, 2019, 6 pages.
Invitation to Pay Additional Fee received for PCT Patent Application No. PCT/US2017/058368, mailed on Dec. 14, 2017, 2 pages.
Invitation to Pay Additional Fees received for PCT Patent Application No. PCT/US2015/044083, mailed on Nov. 4, 2015, 11 pages.
Invitation to Pay Additional Fees received for PCT Patent Application No. PCT/US2020/020414, mailed on Jun. 4, 2020, 24 pages.
Iosvlog Daily, "iOS 7 Notification Center Complete Walkthrough", Available online at: "https://www.youtube.com/watch?v=gATXt-o42LA", Jun. 10, 2013, 1 page.
Kane et al., "Slide Rule: Making Mobile Touch Screens Accessible to Blind People Using Multi-Touch Interaction Techniques", Assets, Oct. 15, 2008, pp. 73-80.
Komachi Aneem, "Time Attendance—Face Recognition—Biometrics", Available at <https://www.youtube.com/watch?v=ascITiiiSbc>, Feb. 9, 2010, 1 page.
Leonard Jonathano, "How to: dismiss banner notifications or toast notifications on ios7", Available online at: "https://www.youtube.com/watch?v=vSjHnBFIW_M", Dec. 17, 2013, 1 page.
Lewis Jeffery, "iOS Notification Banner Pull Down to Notification Center in iOS 7 Beta 5", Available online at:—"https://www.youtube.com/watch?v=nP0s6ETPxDg", Aug. 6, 2013, 1 page.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Minutes of the Oral Proceedings received for European Application No. 12770400.5, mailed on Nov. 6, 2018, 7 pages.
Nhdanh—Protocol Corp, "How to Enroll Face Enbioaccess T9 Nitgen Korea—Đăng Ký Khuôn Mặt Enbioaccess T9 Nitgen", Available online at: <https://www.youtube.com/watch?v=mFn03PD4NIE>, Mar. 30, 2017, 1 page.
Nomad Studio, "Hajimete-no-smartphone-no-komatta-wo-sakutto-kaiketsu (Easy solution to troubles at your first smartphone)", Kazukuni Saito of Shuwa System Co. Ltd. 1st Ed, Jul. 1, 2016, 20 pages (Official Copy only) (See Communication under 37 CFR § 1.98(a) (3)).
Non-Final Office Action received for U.S. Appl. No. 15/274,910, mailed on Oct. 18, 2018, 26 pages.
Non-Final Office Action received for U.S. Appl. No. 14/817,572, mailed on Sep. 12, 2016, 9 pages.
Non-Final Office Action received for U.S. Appl. No. 12/363,513, mailed on Mar. 23, 2011, 22 Pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/642,366, mailed on Aug. 24, 2015, 7 pages.
Non-Final Office Action received for U.S. Appl. No. 15/134,638, mailed on Sep. 20, 2016, 6 pages.

Non-Final Office Action received for U.S. Appl. No. 15/269,801, mailed on Dec. 30, 2016, 17 pages.
Non-Final Office Action received for U.S. Appl. No. 15/274,086, mailed on Jan. 11, 2017, 21 pages.
Non-Final Office Action received for U.S. Appl. No. 15/274,910, mailed on Apr. 6, 2020, 33 pages.
Non-Final Office Action received for U.S. Appl. No. 15/425,273, mailed on Oct. 3, 2018, 10 pages.
Non-Final Office Action received for U.S. Appl. No. 15/431,435, mailed on Jun. 8, 2017, 13 pages.
Non-Final Office Action received for U.S. Appl. No. 15/433,320, mailed on Jul. 31, 2020, 13 pages.
Non-Final Office Action received for U.S. Appl. No. 15/782,068, mailed on Jun. 3, 2019, 17 Pages.
Non-Final Office Action received for U.S. Appl. No. 15/823,269, mailed on Jun. 23, 2020, 14 pages.
Non-Final Office Action received for U.S. Appl. No. 15/845,794, mailed on Oct. 15, 2018, 8 pages.
Non-Final Office Action received for U.S. Appl. No. 15/866,341, mailed on Nov. 13, 2018, 11 pages.
Non-Final Office Action received for U.S. Appl. No. 15/894,221, mailed on Jul. 25, 2018, 21 pages.
Non-Final Office Action received for U.S. Appl. No. 15/902,401, mailed on Jul. 19, 2019, 11 pages.
Non-Final Office Action received for U.S. Appl. No. 15/903,456, mailed on Sep. 6, 2018, 20 pages.
Non-Final Office Action received for U.S. Appl. No. 15/992,722, mailed on Aug. 6, 2020, 7 pages.
Non-Final Office Action received for U.S. Appl. No. 16/125,267, mailed on Jul. 2, 2020, 20 pages.
Non-Final Office Action received for U.S. Appl. No. 16/125,267, mailed on Mar. 26, 2021, 20 pages.
Non-Final Office Action received for U.S. Appl. No. 16/147,023, mailed on Dec. 26, 2018, 17 pages.
Non-Final Office Action received for U.S. Appl. No. 16/147,115, mailed on Dec. 13, 2018, 12 pages.
Non-Final Office Action received for U.S. Appl. No. 16/164,561, mailed on Jan. 4, 2019, 14 pages.
Non-Final Office Action received for U.S. Appl. No. 16/241,199, mailed on Aug. 20, 2020, 11 pages.
Non-Final Office Action received for U.S. Appl. No. 16/369,355, mailed on Apr. 29, 2021, 16 pages.
Non-Final Office Action received for U.S. Appl. No. 16/434,865, mailed on Jan. 16, 2020, 9 pages.
Non-Final Office Action received for U.S. Appl. No. 16/542,084, mailed on Jan. 24, 2020, 21 pages.
Non-Final Office Action received for U.S. Appl. No. 16/549,862, mailed on Mar. 8, 2021, 23 pages.
Non-Final Office Action received for U.S. Appl. No. 16/581,569, mailed on Feb. 13, 2020, 32 pages.
Non-Final Office Action received for U.S. Appl. No. 16/581,614, mailed on Feb. 4, 2021, 18 pages.
Non-Final Office Action received for U.S. Appl. No. 16/581,614, mailed on Jan. 29, 2020, 13 pages.
Non-Final Office Action received for U.S. Appl. No. 16/667,271, mailed on Dec. 13, 2019, 8 pages.
Non-Final Office Action received for U.S. Appl. No. 16/670,949, mailed on Dec. 9, 2020, 11 pages.
Non-Final Office Action received for U.S. Appl. No. 16/987,003, mailed on May 10, 2021, 20 pages.
Non-Final Office Action received for U.S. Appl. No. 16/990,974, mailed on Oct. 15, 2020, 6 pages.
Non-Final Office Action received for U.S. Appl. No. 15/250,152, mailed on Apr. 6, 2018, 31 pages.
Non-Final Office Action received for U.S. Appl. No. 15/250,152, mailed on Mar. 2, 2017, 26 pages.
Non-Final Office Action received for U.S. Appl. No. 15/433,320, mailed on May 2, 2019, 27 pages.
Non-Final Office Action received for U.S. Appl. No. 15/945,610, mailed on Sep. 20, 2018, 9 pages.
Non-Final Office Action received for U.S. Appl. No. 14/838,235, mailed on Jan. 5, 2016, 3 pages.

(56)     References Cited

OTHER PUBLICATIONS

Notice of Acceptance received for Australian Patent Application No. 2017266867, mailed on Mar. 6, 2019, 3 pages.

Notice of Acceptance received for Australian Patent Application No. 2017284013, mailed on Aug. 26, 2020, 3 pages.

Notice of Acceptance received for Australian Patent Application No. 2017317605, mailed on Aug. 28, 2019, 3 Pages.

Notice of Acceptance received for Australian Patent Application No. 2018204430, mailed on Jun. 26, 2019, 3 pages.

Notice of Acceptance received for Australian Patent Application No. 2018279788, mailed on Nov. 6, 2019, 3 pages.

Notice of Acceptance received for Australian Patent Application No. 2018312629, mailed on Nov. 7, 2019, 4 pages.

Notice of Acceptance received for Australian Patent Application No. 2019200360, mailed on Mar. 15, 2019, 3 pages.

Notice of Acceptance received for Australian Patent Application No. 2019201101, mailed on May 6, 2019, 3 pages.

Notice of Acceptance received for Australian Patent Application No. 2019203473, mailed on Nov. 7, 2019, 3 pages.

Notice of Acceptance received for Australian Patent Application No. 2019246830, mailed on Oct. 24, 2019, 3 pages.

Notice of Acceptance received for Australian Patent Application No. 2019250143, mailed on Jan. 29, 2021, 3 pages.

Notice of Acceptance received for Australian Patent Application No. 2020200795, mailed on Feb. 28, 2020, 3 pages.

Notice of Acceptance received for Australian Patent Application No. 2020201306, mailed on Mar. 12, 2020, 3 pages.

Notice of Acceptance received for Australian Patent Application No. 2020239783, mailed on Mar. 2, 2021, 3 pages.

Notice of Acceptance received for Australian Patent Application No.2015312369, mailed on Mar. 21, 2018, 3 pages.

Notice of Allowance Received for U.S. Appl. No. 12/363,513, Mailed on Apr. 3, 2012, 10 Pages.

Notice of Allowance received for Chinese Patent Application No. 201280047459.6, mailed on Jan. 31, 2018, 2 pages (1 page of English Translation and 1 page of Official Copy).

Notice of Allowance received for Chinese Patent Application No. 201510549056.7, mailed on Jul. 2, 2019, 2 pages (1 page of English Translation and 1 page of Official Copy).

Notice of Allowance received for Chinese Patent Application No. 201520669842.6, mailed on May 18, 2016, 4 pages (2 pages of English Translation and 2 pages of Official copy).

Notice of Allowance received for Chinese Patent Application No. 201620830403.3, mailed on Sep. 8, 2017, 2 pages (1 page of English Translation and 1 page of Official Copy).

Notice of Allowance received for Chinese Patent Application No. 201780002398.4, mailed on Jun. 17, 2019, 2 pages (1 page of English Translation and 1 page of Official Copy).

Notice of Allowance received for Chinese Patent Application No. 201810338038.8, mailed on Jun. 30, 2020, 2 pages (1 page of English Translation and 1 page of Official Copy).

Notice of Allowance received for Chinese Patent Application No. 201811460172.1, mailed on Jan. 11, 2021, 2 pages (1 page of English Translation and 1 page of Official Copy).

Notice of Allowance received for Chinese Patent Application No. 201910498825.3, mailed on Mar. 8, 2021, 2 pages (1 page of English Translation and 1 page of Official Copy).

Notice of Allowance received for Danish Patent Application No. PA201570550, mailed on Mar. 20, 2017, 2 pages.

Notice of Allowance received for Japanese Patent Application No. 2017-510297, mailed on May 7, 2018, 4 pages (1 page of English Translation and 3 pages of Official copy).

Notice of Allowance received for Japanese Patent Application No. 2018-072632, mailed on Dec. 7, 2018, 4 pages (1 page of English Translation and 3 pages of Official Copy).

Notice of Allowance received for Japanese Patent Application No. 2018-158482, mailed on Sep. 7, 2020, 4 pages (1 page of English Translation and 3 pages of Official Copy).

Notice of Allowance received for Japanese Patent Application No. 2018-504997, mailed on Aug. 3, 2018, 4 pages (1 page of English Translation and 3 pages of Official copy).

Notice of Allowance received for Japanese Patent Application No. 2018-551159, mailed on Jun. 15, 2020, 4 pages (1 page of English Translation and 3 pages of Official Copy).

Notice of Allowance received for Japanese Patent Application No. 2018-560107, mailed on Dec. 6, 2019, 4 pages (1 page of English Translation and 3 pages of Official Copy).

Notice of Allowance received for Japanese Patent Application No. 2019-000698, mailed on Feb. 8, 2021, 4 pages (1 page of English Translation and 3 pages of Official Copy).

Notice of Allowance received for Japanese Patent Application No. 2019-053379, mailed on Nov. 16, 2020, 4 pages (1 page of English Translation and 3 pages of Official Copy).

Notice of Allowance received for Japanese Patent Application No. 2019-107235, mailed on May 15, 2020, 4 pages (1 page of English Translation and 3 pages of Official Copy).

Notice of Allowance received for Japanese Patent Application No. 2019-238894, mailed on Oct. 5, 2020, 4 pages (1 page of English Translation and 3 pages of Official Copy).

Notice of Allowance received for Japanese Patent Application No. 2019-510416, mailed on Oct. 12, 2020, 4 pages (1 page of English Translation and 3 pages of Official Copy).

Notice of Allowance received for Korean Patent Application No. 10-2016-7035555, mailed on Sep. 23, 2019, 3 pages (1 page of English Translation and 2 pages of Official Copy).

Notice of Allowance received for Korean Patent Application No. 10-2017-7005628, mailed on Jun. 18, 2018, 5 pages (2 page of English Translation and 3 pages of Official copy).

Notice of Allowance received for Korean Patent Application No. 10-2017-7012145, mailed on Oct. 30, 2019, 3 pages (1 page of English Translation and 2 pages of Official Copy).

Notice of Allowance Received for Korean Patent Application No. 10-2018-7027006, mailed on May 23, 2019, 4 pages (1 pages of English Translation and 3 pages of Official Copy).

Notice of Allowance received for Korean Patent Application No. 10-2018-7033301, mailed on Feb. 20, 2019, 5 pages (2 Pages of English Translation and 3 Pages of Official Copy).

Notice of Allowance received for Korean Patent Application No. 10-2019-7003374, mailed on Oct. 4, 2019, 9 pages (2 pages of English Translation and 7 pages of Official Copy).

Notice of Allowance received for Korean Patent Application No. 10-2019-7003836, mailed on Oct. 4, 2019, 4 pages (1 page of English Translation and 3 pages of Official Copy).

Notice of Allowance received for Korean Patent Application No. 10-2019-7004734, mailed on Oct. 24, 2019, 6 pages (2 pages of English Translation and 4 pages of Official Copy).

Notice of Allowance received for Korean Patent Application No. 10-2019-7005925, mailed on Jan. 21, 2020, 6 pages (2 pages of English Translation and 4 pages of Official Copy).

Notice of Allowance received for Korean Patent Application No. 10-2019-7014494, mailed on Mar. 19, 2020, 4 pages (1 page of English Translation and 3 pages of Official Copy).

Notice of Allowance received for Korean Patent Application No. 10-2019-7024901, mailed on May 12, 2020, 5 pages (2 pages of English Translation and 3 pages of Official Copy).

Notice of Allowance received for Korean Patent Application No. 10-2019-7038021, mailed on May 2, 2020, 5 pages (1 page of English Translation and 4 pages of Official Copy).

Notice of Allowance received for Korean Patent Application No. 10-2020-0097418, mailed on Apr. 27, 2021, 5 pages (2 pages of English Translation and 3 pages of Official Copy).

Notice of Allowance received for Korean Patent Application No. 10-2020-7002929, mailed on Nov. 26, 2020, 3 pages (1 page of English Translation and 2 pages of Official Copy).

Notice of Allowance received for Korean Patent Application No. 10-2020-7011172, mailed on Aug. 25, 2020, 7 pages (2 pages of English Translation and 5 pages of Official Copy).

Notice of Allowance received for Korean Patent Application No. 10-2020-7017803, mailed on Nov. 5, 2020, 6 pages (2 pages of English Translation and 4 pages of Official Copy).

(56)          References Cited

OTHER PUBLICATIONS

Notice of Allowance received for Korean Patent Application No. 10-2021-7005691, mailed on Mar. 29, 2021, 3 pages (1 page of English Translation and 2 pages of Official Copy).

Notice of Allowance received for Korean Patent Application No. 10-2014-7008348, mailed on Feb. 21, 2019, 5 pages (2 Pages of English Translation and 3 Pages of Official Copy).

Notice of Allowance received for Taiwanese Patent Application No. 104128704, mailed on Feb. 21, 2018, 5 pages (2 pages of English Translation and 3 pages of Official copy).

Notice of Allowance received for U.S. Appl. No. 12/363,513, mailed on Jul. 18, 2014, 7 Pages.

Notice of allowance received for U.S. Appl. No. 12/363,513, mailed on Jun. 26, 2012, 5 pages.

Notice of allowance received for U.S. Appl. No. 12/363,513, mailed on Oct. 11, 2012, 5 pages.

Notice of Allowance received for U.S. Appl. No. 13/248,872, mailed on Dec. 4, 2014, 7 pages.

Notice of Allowance received for U.S. Appl. No. 13/248,882, mailed on Mar. 13, 2014, 16 pages.

Notice of Allowance received for U.S. Appl. No. 14/285,378, mailed May 19, 2016, 10 pages.

Notice of Allowance received for U.S. Appl. No. 14/642,366, mailed on Jan. 14, 2016, 8 pages.

Notice of Allowance received for U.S. Appl. No. 14/817,572, mailed on Nov. 30, 2017, 26 pages.

Notice of Allowance received for U.S. Appl. No. 14/838,235, mailed on Dec. 29, 2016, 4 pages.

Notice of Allowance Received for U.S. Appl. No. 14/838,235, mailed on Oct. 4, 2016, 7 pages.

Notice of Allowance received for U.S. Appl. No. 15/134,638, mailed on Apr. 10, 2018, 7 pages.

Notice of Allowance received for U.S. Appl. No. 15/134,638, mailed on Jul. 27, 2018, 7 pages.

Notice of Allowance received for U.S. Appl. No. 15/250,152, mailed on May 1, 2019, 12 pages.

Notice of Allowance received for U.S. Appl. No. 15/269,801, mailed on May 3, 2017, 6 pages.

Notice of Allowance received for U.S. Appl. No. 15/269,801, mailed on Sep. 7, 2017, 5 pages.

Notice of Allowance received for U.S. Appl. No. 15/274,086, mailed on Jun. 7, 2017, 8 pages.

Notice of Allowance received for U.S. Appl. No. 15/274,086, mailed on Oct. 19, 2017, 9 pages.

Notice of Allowance received for U.S. Appl. No. 15/425,273, mailed on Mar. 7, 2019, 8 pages.

Notice of Allowance received for U.S. Appl. No. 15/431,435, mailed on Jan. 23, 2018, 8 pages.

Notice of Allowance received for U.S. Appl. No. 15/433,320, mailed on Apr. 1, 2021, 19 pages.

Notice of Allowance received for U.S. Appl. No. 15/782,068, mailed on Sep. 24, 2019, 7 pages.

Notice of Allowance received for U.S. Appl. No. 15/823,269, mailed on Dec. 10, 2020, 10 pages.

Notice of Allowance received for U.S. Appl. No. 15/823,269, mailed on Feb. 22, 2021, 7 pages.

Notice of Allowance received for U.S. Appl. No. 15/823,269, mailed on Mar. 10, 2021, 6 pages.

Notice of Allowance received for U.S. Appl. No. 15/823,269, mailed on Mar. 31, 2021, 9 pages.

Notice of Allowance received for U.S. Appl. No. 15/845,794, mailed on Feb. 14, 2019, 6 pages.

Notice of Allowance received for U.S. Appl. No. 15/866,341, mailed on Jul. 26, 2019, 8 pages.

Notice of Allowance received for U.S. Appl. No. 15/894,221, mailed on Apr. 11, 2019, 5 pages.

Notice of Allowance received for U.S. Appl. No. 15/894,221, mailed on Aug. 13, 2019, 2 pages.

Notice of Allowance received for U.S. Appl. No. 15/894,221, mailed on Feb. 1, 2019, 5 pages.

Notice of Allowance received for U.S. Appl. No. 15/894,221, mailed on Mar. 4, 2019, 2 pages.

Notice of Allowance received for U.S. Appl. No. 15/902,401, mailed on Dec. 4, 2019, 8 pages.

Notice of Allowance received for U.S. Appl. No. 15/903,456, mailed on May 1, 2019, 6 pages.

Notice of Allowance received for U.S. Appl. No. 15/945,610, mailed on May 20, 2019, 7 pages.

Notice of Allowance received for U.S. Appl. No. 15/992,722, mailed on Oct. 19, 2020, 5 pages.

Notice of Allowance received for U.S. Appl. No. 16/131,767, mailed on Sep. 6, 2019, 7 pages.

Notice of Allowance received for U.S. Appl. No. 16/147,023, mailed on Apr. 3, 2020, 2 pages.

Notice of Allowance received for U.S. Appl. No. 16/147,023, mailed on Aug. 13, 2020, 2 pages.

Notice of Allowance received for U.S. Appl. No. 16/147,023, mailed on Feb. 27, 2020, 2 pages.

Notice of Allowance received for U.S. Appl. No. 16/147,023, mailed on Jan. 31, 2020, 7 pages.

Notice of Allowance received for U.S. Appl. No. 16/147,023, mailed on Jul. 2, 2020, 2 pages.

Notice of Allowance received for U.S. Appl. No. 16/147,023, mailed on Jul. 21, 2020, 2 pages.

Notice of Allowance received for U.S. Appl. No. 16/147,023, mailed on Jun. 1, 2020, 2 pages.

Notice of Allowance received for U.S. Appl. No. 16/147,023, mailed on Jun. 18, 2020, 2 pages.

Notice of Allowance received for U.S. Appl. No. 16/147,023, mailed on Mar. 27, 2020, 2 pages.

Notice of Allowance received for U.S. Appl. No. 16/147,023, mailed on May 5, 2020, 2 pages.

Notice of Allowance received for U.S. Appl. No. 16/147,023, mailed on May 20, 2020, 7 pages.

Notice of Allowance received for U.S. Appl. No. 16/147,115, mailed on Oct. 30, 2019, 10 pages.

Notice of Allowance received for U.S. Appl. No. 16/164,561, mailed on Apr. 8, 2020, 5 pages.

Notice of Allowance received for U.S. Appl. No. 16/241,199, mailed on May 13, 2021, 9 pages.

Notice of Allowance received for U.S. Appl. No. 16/434,865, mailed on Apr. 7, 2020, 5 pages.

Notice of Allowance received for U.S. Appl. No. 16/542,084, mailed on May 20, 2020, 7 pages.

Notice of Allowance received for U.S. Appl. No. 16/581,569, mailed on May 27, 2020, 43 pages.

Notice of Allowance received for U.S. Appl. No. 16/667,271, mailed on May 12, 2020, 11 pages.

Notice of Allowance received for U.S. Appl. No. 16/841,352, mailed on Oct. 27, 2020, 13 pages.

Notice of Allowance received for U.S. Appl. No. 16/990,974, mailed on Apr. 28, 2021, 5 pages.

Notice of Allowance received for U.S. Appl. No. 16/990,974, mailed on Jan. 22, 2021, 7 pages.

Office Action received for Australian Patent Application No. 2015101188, issued on Apr. 14, 2016, 3 pages.

Office Action received for Australian Patent Application No. 2017100197, mailed on Apr. 28, 2017, 4 Pages.

Office Action received for Australian Patent Application No. 2017100198, mailed on Apr. 20, 2017, 4 pages.

Office Action received for Australian Patent Application No. 2017100553, mailed on Aug. 4, 2017, 5 pages.

Office Action received for Australian Patent Application No. 2017101563, mailed on Jan. 22, 2018, 2 pages.

Office Action received for Australian Patent Application No. 2017101563, mailed on Jun. 26, 2018, 3 pages.

Office Action received for Australian Patent Application No. 2017266867, mailed on Dec. 6, 2018, 3 pages.

Office Action received for Australian Patent Application No. 2017284013, mailed on Mar. 19, 2020, 3 pages.

Office Action received for Australian Patent Application No. 2017317605, mailed on Apr. 11, 2019, 4 pages.

(56) References Cited

OTHER PUBLICATIONS

Office Action received for Australian Patent Application No. 2017317605, mailed on Feb. 22, 2019, 4 pages.
Office Action received for Australian Patent Application No. 2017324176, mailed on Apr. 21, 2020, 3 pages.
Office Action received for Australian Patent Application No. 2017324176, mailed on Aug. 17, 2020, 5 pages.
Office Action received for Australian Patent Application No. 2017324176, mailed on Feb. 25, 2021, 6 pages.
Office Action received for Australian Patent Application No. 2017324176, mailed on Feb. 27, 2020, 3 pages.
Office Action received for Australian Patent Application No. 2017324176, mailed on Jan. 14, 2021, 6 pages.
Office Action received for Australian Patent Application No. 2018101014, mailed on Jan. 18, 2019, 5 pages.
Office Action received for Australian Patent Application No. 2018101014, mailed on Sep. 19, 2018, 4 pages.
Office Action received for Australian Patent Application No. 2018204430, mailed on Aug. 15, 2018, 5 pages.
Office Action received for Australian Patent Application No. 2018279788, mailed on Feb. 8, 2019, 4 pages.
Office Action received for Australian Patent Application No. 2018312629, mailed on Feb. 25, 2019, 4 pages.
Office Action received for Australian Patent Application No. 2019201101, mailed on Feb. 28, 2019, 3 pages.
Office Action received for Australian Patent Application No. 2019203473, mailed on Oct. 25, 2019, 2 pages.
Office Action received for Australian Patent Application No. 2019250143, mailed on Dec. 3, 2020, 5 pages.
Office Action received for Australian Patent Application No. 2019250143, mailed on Sep. 15, 2020, 5 pages.
Office Action received for Australian Patent Application No. 2020203899, mailed on May 5, 2021, 10 pages.
Office Action received for Australian Patent Application No. 2020239783, mailed on Oct. 13, 2020, 4 pages.
Office Action received for Australian Patent Application No. 2015312369, mailed on Mar. 29, 2017, 3 pages.
Office Action received for Chinese Patent Application No. 201510549056.7, mailed on Aug. 7, 2018, 7 pages (2 pages of English Translation and 5 pages of Official copy).
Office Action received for Chinese Patent Application No. 201510549056.7, mailed on Mar. 15, 2019, 7 pages (3 pages of English Translation and 4 pages of Official Copy).
Office Action received for Chinese Patent Application No. 2015105490567, mailed on Nov. 24, 2017, 15 pages (6 pages of English Translation and 9 pages of Official Copy).
Office Action received for Chinese Patent Application No. 201520669842.6, mailed on Dec. 4, 2015, 7 pages (4 pages of English Translation and 3 Pages of Official Copy).
Office Action received for Chinese Patent Application No. 201580047640.0, mailed on Mar. 3, 2021, 11 pages (3 pages of English Translation and 8 pages of Official copy).
Office Action Received for Chinese Patent Application No. 201620830403.3, mailed on Jun. 7, 2017, 2 pages (1 page of English Translation and 1 page of Official Copy).
Office Action Received for Chinese Patent Application No. 201620830403.3, mailed on Mar. 7, 2017, 3 pages (2 pages of English Translation and 1 page of Official Copy).
Office Action received for Chinese Patent Application No. 201711292804.3, mailed on Aug. 5, 2020, 26 pages (16 pages of English Translation and 10 pages of Official Copy).
Office Action received for Chinese Patent Application No. 201711292804.3, mailed on Feb. 23, 2021, 17 pages (8 pages of English Translation and 9 pages of Official Copy).
Office Action received for Chinese Patent Application No. 201780002398.4, mailed on Feb. 27, 2019, 6 pages (3 pages of English Translation and 3 pages of Official Copy).
Office Action received for Chinese Patent Application No. 201780002398.4, mailed on Sep. 12, 2018, 17 pages (5 pages of English Translation and 12 pages of Official Copy).

Office Action received for Chinese Patent Application No. 201780002648.4, mailed on Dec. 5, 2018, 13 pages (5 pages of English Translation and 8 pages of Official Copy).
Office Action received for Chinese Patent Application No. 201780002648.4, mailed on Jun. 12, 2019, 11 pages (5 pages of English Translation and 6 pages of Official Copy).
Office Action received for Chinese Patent Application No. 201780002648.4, mailed on Nov. 26, 2019, 10 pages (4 pages of English Translation and 6 pages of Official Copy).
Office Action received for Chinese Patent Application No. 201810338038.8, mailed on Jan. 21, 2020, 26 pages (13 pages of English Translation and 13 pages of Official Copy).
Office Action received for Chinese Patent Application No. 201810338038.8, mailed on May 14, 2019, 26 pages (13 pages of English Translation and 13 pages of Official Copy).
Office Action received for Chinese Patent Application No. 201810338826.7, mailed on Apr. 3, 2019, 21 pages (13 pages of English Translation and 8 pages of Official Copy).
Office Action received for Chinese Patent Application No. 201810338826.7, mailed on Jan. 16, 2020, 16 Pages (10 pages of English Translation and 6 pages of Official Copy).
Office Action received for Chinese Patent Application No. 201810338826.7, mailed on Oct. 21, 2019, 19 pages (12 pages of English Translation and 7 pages of Official Copy).
Office Action received for Chinese Patent Application No. 201810654707.2, mailed on Mar. 1, 2021, 23 pages (8 pages of English translation and 15 pages of official copy).
Office Action received for Chinese Patent Application No. 201811460172.1, mailed on Jan. 21, 2020, 17 pages (8 pages of English Translation and 9 pages of Official Copy).
Office Action received for Chinese Patent Application No. 201811460172.1, mailed on Oct. 14, 2020, 7 pages (4 pages of English Translation and 3 pages of Official Copy).
Office Action received for Chinese Patent Application No. 201910070375.8, mailed on Dec. 4, 2019, 23 pages (12 pages of English Translation and 11 pages of Official Copy).
Office Action received for Chinese Patent Application No. 201910070375.8, mailed on Sep. 3, 2020, 8 pages (4 pages of English Translation and 4 pages of Official Copy).
Office Action received for Chinese Patent Application No. 201910109868.8, mailed on Jun. 30, 2020, 15 pages (7 pages of English Translation and 8 pages of Official Copy).
Office Action received for Chinese Patent Application No. 201910109868.8, mailed on Mar. 16, 2020, 19 pages (10 pages of English Translation and 9 pages of Official Copy).
Office Action received for Chinese Patent Application No. 201910109868.8, mailed on Sep. 19, 2019, 23 pages (11 pages of English Translation and 12 pages of Official Copy).
Office Action received for Chinese Patent Application No. 201910246439.5, mailed on Apr. 23, 2020, 14 pages (7 pages of English Translation and 7 pages of Official Copy).
Office Action received for Chinese Patent Application No. 201910246439.5, mailed on Oct. 15, 2019, 17 pages (9 pages of English Translation and 8 pages of Official Copy).
Office Action received for Chinese Patent Application No. 201910246439.5, mailed on Sep. 2, 2020, 15 pages (8 pages of English Translation and 7 pages of Official Copy).
Office Action received for Chinese Patent Application No. 201910498825.3, mailed on May 21, 2020, 16 pages (9 pages of English Translation and 7 pages of Official Copy).
Office Action received for Chinese Patent Application No. 201910744886.3, mailed on Jan. 18, 2021, 7 pages (1 page of English Translation and 6 pages of Official Copy).
Office Action received for Chinese Patent Application No. 201911199010.1, mailed on Mar. 29, 2021, 14 pages (8 pages of English Translation and 6 pages of Official Copy).
Office Action received for Chinese Patent Application No. 201911199010.1, mailed on Nov. 4, 2020, 20 pages (10 pages of English Translation and 10 pages of Official Copy).
Office Action received for Danish Patent Application No. PA201570550, mailed on Dec. 7, 2015, 6 pages.
Office Action received for Danish Patent Application No. PA201570550, mailed on Jan. 19, 2016, 2 pages.

(56)        References Cited

OTHER PUBLICATIONS

Office Action received for Danish Patent Application No. PA201570550, mailed on Oct. 19, 2016, 3 pages.
Office Action Received for Danish Patent Application No. PA201670622, mailed on Aug. 17, 2018, 4 pages.
Office Action Received for Danish Patent Application No. PA201670622, mailed on May 30, 2017, 4 pages.
Office Action received for Danish Patent Application No. PA201670622, mailed on Nov. 1, 2017, 5 pages.
Office Action Received for Danish Patent Application No. PA201670622, mailed on Oct. 31, 2016, 11 pages.
Office Action received for Danish Patent Application No. PA201670628, mailed on Jun. 6, 2017, 3 pages.
Office Action received for Danish Patent Application No. PA201670628, mailed on Oct. 26, 2016, 7 pages.
Office Action received for Danish Patent Application No. PA201770125, mailed on Jan. 26, 2018, 5 pages.
Office Action received for Danish Patent Application No. PA201770125, mailed on Jul. 20, 2018, 2 pages.
Office Action received for Danish Patent Application No. PA201770126, mailed on Oct. 18, 2017, 3 pages.
Office Action received for Danish Patent Application No. PA201770712, mailed on Jul. 20, 2018, 4 pages.
Office Action received for Danish Patent Application No. PA201770712, mailed on Mar. 1, 2019, 3 pages.
Office Action received for Danish Patent Application No. PA201770713, mailed on Apr. 18, 2018, 4 pages.
Office Action received for Danish Patent Application No. PA201770713, mailed on Jun. 7, 2019, 4 pages.
Office Action received for Danish Patent Application No. PA201770713, mailed on Nov. 13, 2018, 3 pages.
Office Action received for Danish Patent Application No. PA201770714, mailed on Aug. 17, 2018, 6 pages.
Office Action received for Danish Patent Application No. PA201770714, mailed on Feb. 21, 2018, 3 pages.
Office Action received for Danish Patent Application No. PA201770714, mailed on Oct. 13, 2017, 9 pages.
Office Action received for Danish Patent Application No. PA201770715, mailed on Mar. 8, 2018, 4 pages.
Office Action received for Danish Patent Application No. PA201770715, mailed on Oct. 29, 2018, 4 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201770804, mailed on Feb. 1, 2018, 9 pages.
Office Action received for Danish Patent Application No. PA201770804, mailed on May 31, 2018, 6 pages.
Office Action received for Danish Patent Application No. PA201770804, mailed on Nov. 6, 2018, 4 pages.
Office Action received for Danish Patent Application No. PA201870370, mailed on Nov. 9, 2018, 4 pages.
Office Action received for Danish Patent Application No. PA201870371, mailed on Nov. 20, 2018, 3 pages.
Office Action received for Danish Patent Application No. PA201870855, mailed on May 14, 2020, 4 pages.
Office Action received for Danish Patent Application No. PA201870855, mailed on Nov. 7, 2019, 4 pages.
Office Action received for Danish Patent Application No. PA201970127, mailed on Dec. 20, 2019, 3 pages.
Office Action received for Danish Patent Application No. PA201970127, mailed on Feb. 24, 2020, 2 pages.
Office Action received for European Patent Application No. 101519635 mailed on May 15, 2015, 5 pages.
Office Action received for European Patent Application No. 127704005, mailed on Mar. 10, 2015, 5 pages.
Office Action received for European Patent Application No. 127734606, mailed on Feb. 19, 2018, 6 pages.

Office Action received for European Patent Application No. 157599812, mailed on Apr. 19, 2018, 6 pages.
Office Action received for European Patent Application No. 157599812, mailed on Aug. 6, 2018, 10 pages.
Office Action received for European Patent Application No. 157599812, mailed on May 16, 2018, 6 pages.
Office Action received for European Patent Application No. 177999042, mailed on Oct. 21, 2020, 6 pages.
Office Action received for European Patent Application No. 17813737. 8, mailed on Apr. 16, 2021, 7 pages.
Office Action received for European Patent Application No. 17835789. 3, mailed on Jan. 20, 2021, 14 pages.
Office Action received for European Patent Application No. 17865509. 8, mailed on Jul. 28, 2020, 8 pages.
Office Action received for European Patent Application No. 17865509. 8, mailed on Oct. 10, 2019, 6 pages.
Office Action received for European Patent Application No. 18170262. 2, mailed on Dec. 9, 2019, 3 pages.
Office Action received for European Patent Application No. 18170262. 2, mailed on May 16, 2019, 6 pages.
Office Action received for European Patent Application No. 18170262. 2, mailed on May 27, 2019, 6 pages.
Office Action received for European Patent Application No. 18208881. 5, mailed on Jun. 11, 2019, 5 pages.
Office Action received for European Patent Application No. 18208881. 5, mailed on May 7, 2021, 6 pages.
Office Action received for European Patent Application No. 18713408. 5, mailed on May 20, 2019, 5 pages.
Office Action received for European Patent Application No. 18713408. 5, mailed on May 26, 2020, 5 pages.
Office Action received for European Patent Application No. 18713408. 5, mailed on Nov. 4, 2020, 6 pages.
Office Action received for European Patent Application No. 18713408. 5, mailed on Nov. 20, 2019, 4 pages.
Office Action received for European Patent Application No. 18830326. 7, mailed on Apr. 30, 2020, 5 pages.
Office Action received for European Patent Application No. 18830326. 7, mailed on Aug. 13, 2020, 6 pages.
Office Action received for European Patent Application No. 18830326. 7, mailed on Aug. 27, 2019, 6 pages.
Office Action received for European Patent Application No. 18830326. 7, mailed on Nov. 22, 2019, 8 pages.
Office Action received for European Patent Application No. 18830326. 7, mailed on Sep. 16, 2019, 6 pages.
Office Action received for European Patent Application No. 19150528. 8, mailed on Jul. 1, 2020, 6 pages.
Office Action received for European Patent Application No. 19160344. 8, mailed on Mar. 26, 2021, 7 pages.
Office Action received for European Patent Application No. 19160348. 9, mailed on May 14, 2020, 4 pages.
Office Action received for European Patent Application No. 19160348. 9, mailed on Nov. 17, 2020, 6 pages.
Office Action received for European Patent Application No. 19186538. 5, mailed on Oct. 12, 2020, 7 pages.
Office Action received for European Patent Application No. 19194828. 0, mailed on Oct. 15, 2020, 7 pages.
Office Action received for European Patent Application No. 21150414. 7, mailed on May 3, 2021, 8 pages.
Office Action received for German Patent Application No. 202017005507.4, mailed on Feb. 5, 2018, 2 pages (1 page of English Translation and 1 page of Official Copy).
Office Action received for Japanese Patent Application No. 2017-075031, mailed on Jul. 30, 2018, 16 pages (8 pages of English Translation and 8 pages of Official Copy).
Office Action received for Japanese Patent Application No. 2017-510297, mailed on Dec. 4, 2017, 5 pages (2 page of English Translation and 3 pages of Official copy).
Office Action received for Japanese Patent Application No. 2017-510297, mailed on Jul. 10, 2017, 10 pages (5 pages of English Translation and 5 pages of Official Copy).
Office Action received for Japanese Patent Application No. 2018-072632, mailed on Jul. 9, 2018, 5 Pages (2 Pages of English Translation and 3 pages of Official Copy).

(56) References Cited

OTHER PUBLICATIONS

Office Action received for Japanese Patent Application No. 2018-158482, mailed on Jan. 10, 2020, 9 pages (5 pages of English Translation and 4 pages of Official Copy).

Office Action received for Japanese Patent Application No. 2018-551159, mailed on Jan. 27, 2020, 8 pages (4 pages of English Translation and 4 pages of Official Copy).

Office Action received for Japanese Patent Application No. 2018-551159, mailed on Sep. 30, 2019, 6 pages (3 pages of English Translation and 3 pages of Official Copy).

Office Action received for Japanese Patent Application No. 2018-560107, mailed on Jun. 14, 2019, 26 pages (13 pages of English Translation and 13 pages of Official Copy).

Office Action received for Japanese Patent Application No. 2019-000698, mailed on Mar. 9, 2020, 8 pages (4 pages of English Translation and 4 pages of Official Copy).

Office Action received for Japanese Patent Application No. 2019000698, mailed on Oct. 23, 2020, 4 pages (2 pages of English Translation and 2 pages of Official Copy).

Office Action received for Japanese Patent Application No. 2019-053379, mailed on May 29, 2020, 11 pages (6 pages of English Translation and 5 pages of Official Copy).

Office Action received for Japanese Patent Application No. 2019-053379, mailed on Oct. 18, 2019, 11 pages (6 pages of English Translation and 5 pages of Official Copy).

Office Action received for Japanese Patent Application No. 2019-107235, mailed on Oct. 18, 2019, 8 pages (4 pages of English Translation and 4 pages of Official Copy).

Office Action received for Japanese Patent Application No. 2019-238894, mailed on Mar. 6, 2020, 7 pages (3 pages of English Translation and 4 pages of Official Copy).

Office Action received for Japanese Patent Application No. 2019-510416, mailed on May 15, 2020, 4 pages (2 pages of English Translation and 2 pages of Official Copy).

Office Action received for Japanese Patent Application No. 2019-510416, mailed on Oct. 18, 2019, 4 pages (2 pages of English translation and 2 pages of Official copy).

Office Action received for Japanese Patent Application No. 2020-126751, mailed on Jan. 5, 2021, 8 pages (4 pages of English Translation and 4 pages of Official Copy).

Office Action received for Korean Patent Application No. 10-2014-7008348, mailed on Jan. 22, 2019, 16 pages (1 page of English Translation and 15 pages of Official Copy).

Office Action received for Korean Patent Application No. 10-2016-7035555, mailed on Dec. 26, 2017, 5 pages (2 pages of English Translation and 3 pages of Official Copy).

Office Action received for Korean Patent Application No. 10-2016-7035555, mailed on Jul. 18, 2019, 9 pages (4 pages of English Translation and 5 pages of Official Copy).

Office Action received for Korean Patent Application No. 10-2016-7035555, mailed on Sep. 18, 2018, 9 pages (4 pages of English Translation and 5 pages of Official Copy).

Office Action received for Korean Patent Application No. 10-2017-7005628, mailed on Jan. 30, 2018, 6 pages (2 pages of English translation and 4 pages of official copy).

Office Action received for Korean Patent Application No. 10-2017-7005628, mailed on May 10, 2017, 12 pages (5 pages of English Translation and 7 pages of Official Copy).

Office Action received for Korean Patent Application No. 10-2017-7012145, mailed on Jul. 18, 2019, 5 pages (2 Pages of English Translation and 3 Pages of Official Copy).

Office Action received for Korean Patent Application No. 10-2017-7012145, mailed on Sep. 13, 2018, 6 pages (3 pages of English Translation and 3 pages of Official Copy).

Office Action Received for Korean Patent Application No. 10-2018-7027006, mailed on Jan. 14, 2019, 6 pages (2 pages of English Translation and 4 pages of Official Copy).

Office Action received for Korean Patent Application No. 10-2018-7033301, mailed on Dec. 14, 2018, 6 pages (2 pages of English Translation and 4 pages of Official Copy).

Office Action received for Korean Patent Application No. 10-2019-7003374, mailed on Jun. 10, 2019, 7 pages (2 pages of English Translation and 5 pages of official copy).

Office Action received for Korean Patent Application No. 10-2019-7003836, mailed on Jun. 14, 2019, 7 pages (2 pages of English Translation and 5 pages of Official Copy).

Office Action received for Korean Patent Application No. 10-2019-7004734, mailed on Jul. 4, 2019, 7 pages (2 pages of English Translation and 5 pages of Official Copy).

Office Action received for Korean Patent Application No. 10-2019-7005925, mailed on Jul. 4, 2019, 24 pages (11 pages of English Translation and 13 pages of Official Copy).

Office Action received for Korean Patent Application No. 10-2019-7006639, mailed on Dec. 21, 2020, 20 pages (10 pages of English Translation and 10 pages of Official Copy).

Office Action received for Korean Patent Application No. 10-2019-7014494, mailed on Jun. 14, 2019, 11 pages (5 pages of English Translation and 6 pages of Official Copy).

Office Action received for Korean Patent Application No. 10-2019-7024901, mailed on Sep. 26, 2019, 6 pages (2 pages of English Translation and 4 pages of Official Copy).

Office Action received for Korean Patent Application No. 10-2020-7002929, mailed on Mar. 22, 2020, 5 pages (2 pages of English Translation and 3 pages of Official Copy).

Office Action received for Korean Patent Application No. 10-2020-7027862, mailed on Jan. 29, 2021, 8 pages (3 pages of English Translation and 5 pages of Official Copy).

Office Action received for Taiwanese Patent Application No. 104128704, mailed on Jul. 31, 2017, 7 pages (3 pages of English Translation and 4 pages of Official Copy).

Office Action received for Taiwanese Patent Application No. 104128704, mailed on Nov. 2, 2016, 12 pages (5 pages of English Translation and 7 pages of Official Copy).

Okazolab, "Kinect Based 3D Head Tracking in Behavioural Research", Available online at: <https://www.youtube.com/watch?v=nigRvT9beQw>, Aug. 8, 2012, 3 pages.

Onefacein, "[How It Works] Securing Your Smartphone with One Face in", Biometric Password Manager, Available at: <https://www.youtube.com/watch?v=h-JG5SPxBQ0>, Dec. 2, 2016, 1 page.

Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.

Patterson Ben, "iOS 7 tip: Alerts, banners, and badges—whats the difference?", Available online at:—"https://web.archive.org/web/20140128072440/http://heresthethingblog.com/2014/01/22/ios-7-tip-whats-difference-alert/", Jan. 22, 2014, 5 Pages.

Phonebuff, "How to Use Face Unlock on Android 4.0 ICS", Retrieved from: <https://www.youtube.com/watch?v=0ASf6jkpFKE>, Dec. 15, 2011, 1 page.

PSP Security LTD, "AccuFACE features", Available online at: <https://www.youtube.com/watch?v=p3jvGoEbioY>, Oct. 14, 2009, 1 page.

PSP Security LTD, "PSP Security—AccuFACE Step by Step Enrollment Process", Available online at: <https://www.youtube.com/watch?v=0IIF5OOdya0>, Oct. 14, 2009, 1 page.

Punchkick Interactive, "Punchkick hands-on review: Fitbit Surge", URL: https://www.youtube.com/watch?v=K2G7aebUYcA, Mar. 25, 2015, 3 pages.

Result of Consultation received for European Patent Application No. 18170262.2, mailed on Jan. 18, 2021, 3 pages.

Samsung, "Samsung Gear 2 User manual", Online Available: <https://data2.manualslib.com/pdf3/76/7550/754923-samsung/gear_2.pdf?7eb313a9f65b1566bcf9ff58661c6b3a&take=binary>, XP055464984, retrieved on Apr. 5, 2018, Apr. 9, 2014, pp. 1-97.

Schofield Tim, "Face Unlock Demonstration on the HTC EVO 4G LTE", Retrieved from: <https://www.youtube.com/watch?v=TNL9Or_9SWg>, May 31, 2012, 1 page.

Search Report and Opinion received for Danish Patent Application No. PA201770712, mailed on Oct. 25, 2017, 10 pages.

Search Report and Opinion received for Danish Patent Application No. PA201770713, mailed on Oct. 31, 2017, 9 pages.

(56)                References Cited

OTHER PUBLICATIONS

Search Report and Opinion received for Danish Patent Application No. PA201770715, issued on Nov. 9, 2017, 10 pages.
Search Report and Opinion received for Danish Patent Application No. PA201870370, mailed on Sep. 7, 2018, 11 pages.
Search Report and Opinion received for Danish Patent Application No. PA201870371, mailed on Sep. 14, 2018, 14 pages.
Search Report and Opinion received for Danish Patent Application No. PA201870855, mailed on Apr. 3, 2019, 12 pages.
Search Report and Opinion received for Danish Patent Application No. PA201970127, mailed on Oct. 4, 2019, 9 pages.
Search Report and Opinion received for Netherlands Patent Application No. 2015354, completed on Jun. 22, 2017, 24 pages (10 pages of English Translation and 14 pages of Official Copy).
Search Report and Opinion received for Netherlands Patent Application No. 2019878, mailed on Apr. 6, 2018, 24 pages (12 pages of English Translation and 12 pages of Official Copy).
Search Report received for Danish Patent Application No. PA201770125, mailed on May 5, 2017, 10 pages.
Search Report received for Danish Patent Application No. PA201770126, mailed on Apr. 26, 2017, 8 Pages.
Search Report received for Germany Patent Application No. 202017005507.4, mailed on Jan. 2, 2019, 6 pages (1 page of English Translation and 5 pages of Official Copy).
Sensory Trulysecure, "AppLock Face/Voice Recognition", Available at: <https://www.youtube.com/watch?v=odax5O51aT0>, May 27, 2015, 1 page.
Summons to Attend Oral proceedings received for European Patent Application No. 10151963.5, mailed on Dec. 18, 2015, 15 pages.
Summons to Attend Oral Proceedings received for European Patent Application No. 12770400.5, mailed on Mar. 19, 2018, 10 pages.
Summons to Attend Oral Proceedings received for European Patent Application No. 18170262.2, mailed on Dec. 15, 2020, 5 pages.
Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Supplemental Notice of Allowance received for U.S. Appl. No. 15/902,401, mailed on Feb. 3, 2020, 2 pages.
Supplemental Notice of Allowance received for U.S. Appl. No. 15/902,401, mailed on Feb. 13, 2020, 2 pages.
Teather et al., "Assessing the Effects of Orientation and Device on (Constrained) 3D Movement Techniques", IEEE Symposium on 3D User Interfaces. Reno, Nevada, USA, Mar. 8-9, 2008, 8 pages.
Thanakulmas Thanit, "MasterCard Identity Check Facial Recognition Biometrics", Available at: <https://www.youtube.com/watch?v=g4sMbrkt1gl>, Oct. 10, 2016, 1 page.
User Manual, Available online at: <http://www.manualslib.com/download/754923/Samsung-Gear-2.html>, 2014, pp. 1-97.
Wang Na, "Research of Face Detection System Based on Mobile Phone Platform", Video Engineering, vol. 36, No. 11, Nov. 2012, 5 pages (Official Copy Only) (See Communication under 37 CFR § 1.98(a) (3)).
Wikipedia, "QR code", Available online at: https://en.wikipedia.org/w/index.php?title=OR_code&oldid=452939488, Sep. 28, 2011, pp. 1-9.
Corrected Notice of Allowance received for U.S. Appl. No. 17/498,557, mailed on Mar. 15, 2023, 2 pages.
Extended European Search Report received for European Patent Application No. 22212086.7, mailed on Feb. 21, 2023, 10 pages.
Non-Final Office Action received for U.S. Appl. No. 17/835,334, mailed on Mar. 1, 2023, 11 pages.
Board Decision received for Chinese Patent Application No. 201510284896.5, mailed on Nov. 19, 2021, 14 pages (1 page of English Translation and 13 pages of Official Copy).
Board Decision received for Chinese Patent Application No. 201810094316.X, mailed on Dec. 3, 2021, 18 pages (1 page of English Translation and 17 pages of Official Copy).
Corrected Notice of Allowance received for U.S. Appl. No. 17/157,391, mailed on Dec. 30, 2021, 2 pages.

Decision to Refuse received for European Patent Application No. 17865509.8, mailed on Jan. 4, 2022, 13 pages.
Minutes of the Oral Proceedings received for European Patent Application No. 17865509.8, mailed on Jan. 4, 2022, 8 pages.
Non-Final Office Action received for U.S. Appl. No. 17/027,274, mailed on Jan. 4, 2022, 23 pages.
Notice of Acceptance received for Australian Patent Application No. 2020289822, mailed on Dec. 22, 2021, 3 pages.
Notice of Allowance received for U.S. Appl. No. 16/814,226, mailed on Dec. 30, 2021, 24 pages.
Office Action received for Australian Patent Application No. 2019271927, mailed on Dec. 17, 2021, 4 pages.
Office Action received for Indian Patent Application No. 201917024374, mailed on Dec. 30, 2021, 10 pages.
Office Action received for Korean Patent Application No. 10-2020-7034405, mailed on Dec. 4, 2021, 15 pages (7 pages of English Translation and 8 pages of Official Copy).
Summons to Attend Oral Proceedings received for European Patent Application No. 17813737.8, mailed on Jan. 4, 2022, 12 pages.
Applicant-Initiated Interview Summary received for U.S. Appl. No. 17/835,334, mailed on Oct. 31, 2022, 3 pages.
Notice of Allowance received for U.S. Appl. No. 17/583,657, mailed on Nov. 16, 2022, 8 pages.
Applicant-Initiated Interview Summary received for U.S. Appl. No. 16/434,747, mailed on Sep. 8, 2021, 4 pages.
Corrected Notice of Allowance received for U.S. Appl. No. 16/241,199, mailed on Sep. 13, 2021, 5 pages.
Corrected Notice of Allowance received for U.S. Appl. No. 16/670,949, mailed on Sep. 8, 2021, 2 pages.
Notice of Allowance received for U.S. Appl. No. 16/670,949, mailed on Sep. 14, 2021, 7 pages.
Result of Consultation received for European Patent Application No. 18713408.5, mailed on Aug. 30, 2021, 5 pages.
Applicant-Initiated Interview Summary received for U.S. Appl. No. 16/125,267, mailed on Jun. 25, 2021, 5 pages.
Brief Communication Regarding Oral Proceedings received for European Patent Application No. 16201159.7, mailed on Jun. 29, 2021, 13 pages.
Brief Communication Regarding Oral Proceedings received for European Patent Application No. 18830326.7, mailed on Jun. 30, 2021, 2 pages.
European Search Report received for European Patent Application No. 21150992.2, mailed on Jun. 23, 2021, 6 pages.
Non-Final Office Action received for U.S. Appl. No. 16/667,174, mailed on Jun. 24, 2021, 16 pages.
Notice of Allowance received for U.S. Appl. No. 14/869,831, mailed on Jul. 2, 2021, 9 pages.
Notice of Allowance received for U.S. Appl. No. 17/015,429, mailed on Jun. 17, 2021, 10 pages.
Office Action received for Australian Patent Application No. 2020204256, mailed on Jun. 21, 2021, 2 pages.
Office Action received for Chinese Patent Application No. 201780069966.2, mailed on Jun. 1, 2021, 23 pages (12 pages of English Translation and 11 pages of Official Copy).
Office Action received for Chinese Patent Application No. 201810338040.5, mailed on Jun. 3, 2021, 25 pages (15 pages of English Translation and 10 pages of Official Copy).
Office Action received for Chinese Patent Application No. 201810339290.0, mailed on Jun. 4, 2021, 20 pages (11 pages of English Translation and 9 pages of Official Copy).
Office Action received for Japanese Patent Application No. 2020-010992, mailed on May 24, 2021, 9 pages (4 pages of English Translation and 5 pages of Official Copy).
Office Action received for Korean Patent Application No. 10-2019-7006639, mailed on Jun. 15, 2021, 8 pages (4 pages of English Translation and 4 pages of Official Copy).
Office Action received for Korean Patent Application No. 10-2020-7010007, mailed on Jun. 21, 2021, 7 pages (3 pages of English Translation and 4 pages of Official Copy).
Result of Consultation received for European Patent Application No. 18830326.7, mailed on Jun. 21, 2021, 5 pages.

(56)        References Cited

OTHER PUBLICATIONS

International Search Report and Written Opinion received for PCT Patent Application No. PCT/US2022/030945, mailed on Nov. 28, 2022, 19 pages.

Invitation to Pay Additional Fees received for PCT Patent Application No. PCT/US2022/030945, mailed on Oct. 6, 2022, 9 pages.

Office Action received for Chinese Patent Application No. 201980009669.8, mailed on Nov. 22, 2022, 16 pages (10 pages of English Translation and 6 pages of Official Copy).

Notice of Allowance received for U.S. Appl. No. 17/062,941, mailed on Aug. 11, 2023, 11 pages.

Notice of Allowance received for U.S. Appl. No. 17/835,334, mailed on Aug. 16, 2023, 8 pages.

Office Action received for Chinese Patent Application No. 201810654707.2, mailed on Jul. 6, 2023, 10 pages (5 pages of English Translation and 5 pages of Official Copy).

Office Action received for Chinese Patent Application No. 202211283788.2, mailed on Jul. 7, 2023, 11 pages (8 pages of English Translation and 3 pages of Official Copy).

Applicant-Initiated Interview Summary received for U.S. Appl. No. 17/062,941, mailed on Apr. 19, 2023, 2 pages.

Board Decision received for Chinese Patent Application No. 201810654707.2, mailed on Apr. 13, 2023, 2 pages (1 page of English Translation and 1 page of Official Copy).

Office Action received for Chinese Patent Application No. 202211283788.2, mailed on Mar. 22, 2023, 15 pages (7 pages of English Translation and 8 pages of Official Copy).

International Search Report and Written Opinion received for PCT Patent Application No. PCT/US2021/037949, mailed on Nov. 12, 2021, 19 pages.

Invitation to Pay Additional Fees and Partial International Search Report received for PCT Patent Application No. PCT/US2021/037949, mailed on Sep. 22, 2021, 13 pages.

Invitation to Pay Search Fees received for European Patent Application No. 19731554.2, mailed on Dec. 16, 2021, 3 pages.

Non-Final Office Action received for U.S. Appl. No. 15/274,910, mailed on Dec. 24, 2021, 35 pages.

Notice of Allowance received for Korean Patent Application No. 10-2021-7030343, mailed on Dec. 9, 2021, 6 pages (2 pages of English Translation and 4 pages of Official Copy).

Notice of Allowance received for U.S. Appl. No. 17/015,429, mailed on Dec. 24, 2021, 2 pages.

Notice of Allowance received for U.S. Appl. No. 17/157,391, mailed on Dec. 17, 2021, 8 pages.

Office Action received for Australian Patent Application No. 2019281965, mailed on Nov. 30, 2021, 3 pages.

Office Action received for Australian Patent Application No. 2020203899, mailed on Nov. 26, 2021, 4 pages.

Office Action received for Australian Patent Application No. 2020273355, mailed on Nov. 23, 2021, 6 pages.

Office Action received for Indian Patent Application No. 202018041558, mailed on Dec. 3, 2021, 7 pages.

Summons to Attend Oral Proceedings received for European Patent Application No. 17799904.2, mailed on Dec. 20, 2021, 8 pages.

Applicant-Initiated Interview Summary received for U.S. Appl. No. 16/434,747, mailed on Mar. 18, 2022, 4 pages.

Decision to Grant received for European Patent Application No. 18170262.2, mailed on Mar. 11, 2022, 2 pages.

Notice of Allowance received for Korean Patent Application No. 10-2022-7004804, mailed on Mar. 8, 2022, 8 pages (2 pages of English Translation and 6 pages of Official Copy).

Yongxi et al., "Application of RFID Technology in Mobile Payment", China Academic Journal Electronic Publishing House, 1994-2022, Nov. 25, 2012, pp. 97-99 (Official Copy Only) (See Communication under 37 CFR § 1.98(a) (3)).

Applicant-Initiated Interview Summary received for U.S. Appl. No. 16/789,132, mailed on Nov. 29, 2021, 5 pages.

Corrected Notice of Allowance received for U.S. Appl. No. 16/549,862, mailed on Dec. 2, 2021, 2 pages.

Final Office Action received for U.S. Appl. No. 16/434,747, mailed on Nov. 26, 2021, 14 pages.

Notice of Allowance received for U.S. Appl. No. 17/015,429, mailed on Dec. 13, 2021, 2 pages.

Decision to Refuse received for European Patent Application No. 16201159.7, mailed on Sep. 27, 2021, 22 pages.

Intention to Grant received for European Patent Application No. 18830326.7, mailed on Sep. 15, 2021, 11 pages.

Minutes of the Oral Proceedings received for European Patent Application No. 16201159.7, mailed on Sep. 23, 2021, 6 pages.

Notice of Allowance received for U.S. Appl. No. 17/015,429, mailed on Sep. 22, 2021, 6 pages.

Office Action received for Australian Patent Application No. 2019271927, mailed on Sep. 8, 2021, 4 pages.

Office Action received for Chinese Patent Application No. 201780033622.6, mailed on Sep. 3, 2021, 11 pages (5 pages of English Translation and 6 pages of Official Copy).

Office Action received for European Patent Application No. 20198076.0, mailed on Sep. 22, 2021, 6 pages.

Notice of Allowance received for U.S. Appl. No. 17/193,991, mailed on Jul. 17, 2023, 10 pages.

Office Action received for Australian Patent Application No. 2022200900, mailed on Jul. 13, 2023, 3 pages.

Applicant-Initiated Interview Summary received for U.S. Appl. No. 16/125,267, mailed on Oct. 25, 2021, 4 pages.

Applicant-Initiated Interview Summary received for U.S. Appl. No. 16/667,174, mailed on Oct. 25, 2021, 2 pages.

Board Opinion received for Chinese Patent Application No. 201810094316.X, mailed on Sep. 30, 2021, 11 pages (3 pages of English Translation and 8 pages of Official Copy).

Final Office Action received for U.S. Appl. No. 16/814,226, mailed on Oct. 28, 2021, 19 pages.

Notice of Acceptance received for Australian Patent Application No. 2020204256, mailed on Oct. 9, 2021, 3 pages.

Notice of Allowance received for U.S. Appl. No. 16/549,862, mailed on Oct. 20, 2021, 7 pages.

Notice of Allowance received for U.S. Appl. No. 17/015,429, mailed on Oct. 22, 2021, 2 pages.

Office Action received for European Patent Application No. 19186538.5, mailed on Oct. 22, 2021, 7 pages.

Notice of Allowance received for Chinese Patent Application No. 202111432087.6, mailed on Feb. 9, 2024, 2 pages (1 page of English Translation and 1 page of Official Copy).

Office Action received for European Patent Application No. 22158560.7, mailed on Feb. 13, 2024, 10 pages.

Sony Ericsson Mobile Comm., "User guide SmartWatch MN2", Available online at: https://manualzz.com/doc/23127468/sony-smartwatch-mn2-user-guide, Dec. 2011, 19 pages.

Office Action received for Chinese Patent Application No. 202111432087.6, mailed on Oct. 12, 2023, 10 pages (4 pages of English Translation and 6 pages of Official Copy).

Decision to Grant received for European Patent Application No. 19716254.8, mailed on Oct. 6, 2023, 2 pages.

Office Action received for Chinese Patent Application No. 202111429825.1, mailed on Oct. 19, 2023, 11 pages (5 pages of English Translation and 6 pages of Official Copy).

International Preliminary Report on Patentability received for PCT Patent Application No. PCT/US2022/030945, mailed on Dec. 21, 2023, 11 pages.

Non-Final Office Action received for U.S. Appl. No. 18/137,985, mailed on Dec. 21, 2023, 8 pages.

Office Action received for Australian Patent Application No. 2023203469, mailed on Dec. 18, 2023, 4 pages.

Office Action received for Australian Patent Application No. 2022200900, mailed on Sep. 8, 2023, 4 pages.

Office Action received for Australian Patent Application No. 2023203469, mailed on Aug. 31, 2023, 5 pages.

Notice of Allowance received for Chinese Patent Application No. 201810654707.2, mailed on Sep. 24, 2023, 2 pages (1 page of English Translation and 1 page of Official Copy).

Office Action received for Japanese Patent Application No. 2022-100394, mailed on Sep. 29, 2023, 6 pages (3 pages of English Translation and 3 pages of Official Copy).

(56) References Cited

OTHER PUBLICATIONS

Office Action received for Korean Patent Application No. 10-2022-0150750, mailed on Sep. 20, 2023, 15 pages (7 pages of English Translation and 8 pages of Official Copy).

Extended European Search Report received for European Patent Application No. 23199594.5, mailed on Nov. 28, 2023, 11 pages.

FSS, "Mobile Banking", Available online at: https://mobile.fssnet. co.in/mpayweb/, Dec. 5, 2023, 2 pages.

Non-Final Office Action received for U.S. Appl. No. 17/062,941, mailed on Nov. 24, 2023, 8 pages.

Notice of Hearing received for Indian Patent Application No. 201617039493, mailed on Nov. 21, 2023, 3 pages.

Notice of Hearing received for Indian Patent Application No. 202018014786, mailed on Nov. 29, 2023, 3 pages.

Numnonda Thanachart, "Mobile payment", Software Park Thailand, Available online at: https://www.slideshare.net/softwarepark/mobile-payment, Nov. 23, 2010, 6 pages.

Office Action received for Australian Patent Application No. 2022200900, mailed on Nov. 30, 2023, 3 pages.

Office Action received for Chinese Patent Application No. 202111430197.9, mailed on Oct. 13, 2023, 20 pages (7 pages of English Translation and 13 pages of Official Copy).

Pouralinazar Behzad, "The System for Secure Mobile Payment Transactions", Available online at: https://www.diva-portal.org/smash/get/diva2:616934/FULLTEXT01.pdf, 2013, 78 pages.

Notice of Allowance received for Japanese Patent Application No. 2022-100394, mailed on Jan. 12, 2024, 4 pages (1 page of English Translation and 3 pages of Official Copy).

Notice of Allowance received for U.S. Appl. No. 17/835,334, mailed on Jan. 5, 2024, 8 pages.

Applicant-Initiated Interview Summary received for U.S. Appl. No. 17/062,941, mailed on Dec. 14, 2023, 2 pages.

Office Action received for Chinese Patent Application No. 202211283788.2, mailed on Nov. 1, 2023, 10 pages (5 pages of English Translation and 5 pages of Official Copy).

Office Action received for Chinese Patent Application No. 202211285112.7, mailed on Nov. 11, 2023, 6 pages (3 pages of English Translation and 3 pages of Official Copy).

Summons to Oral Proceedings received for European Patent Application No. 16703893.4, mailed on Mar. 14, 2024, 8 pages.

Office Action received for Chinese Patent Application No. 201911076555.3, mailed on Jan. 20, 2024, 24 pages (10 pages of English Translation and 14 pages of Official Copy).

* cited by examiner

Portable Multifunction Device 100

| 206 | 210 | 212 |

Speaker 111    Optical Sensor 164    Proximity Sensor 166

208

208

200

210 is SIM card slot
212 is headphone jack

202

Touch Screen 112

Contact Intensity Sensor(s) 165

Tactile Output Generator(s) 167

203

Microphone 113    Home 204    Accelerometer(s) 168

External Port 124

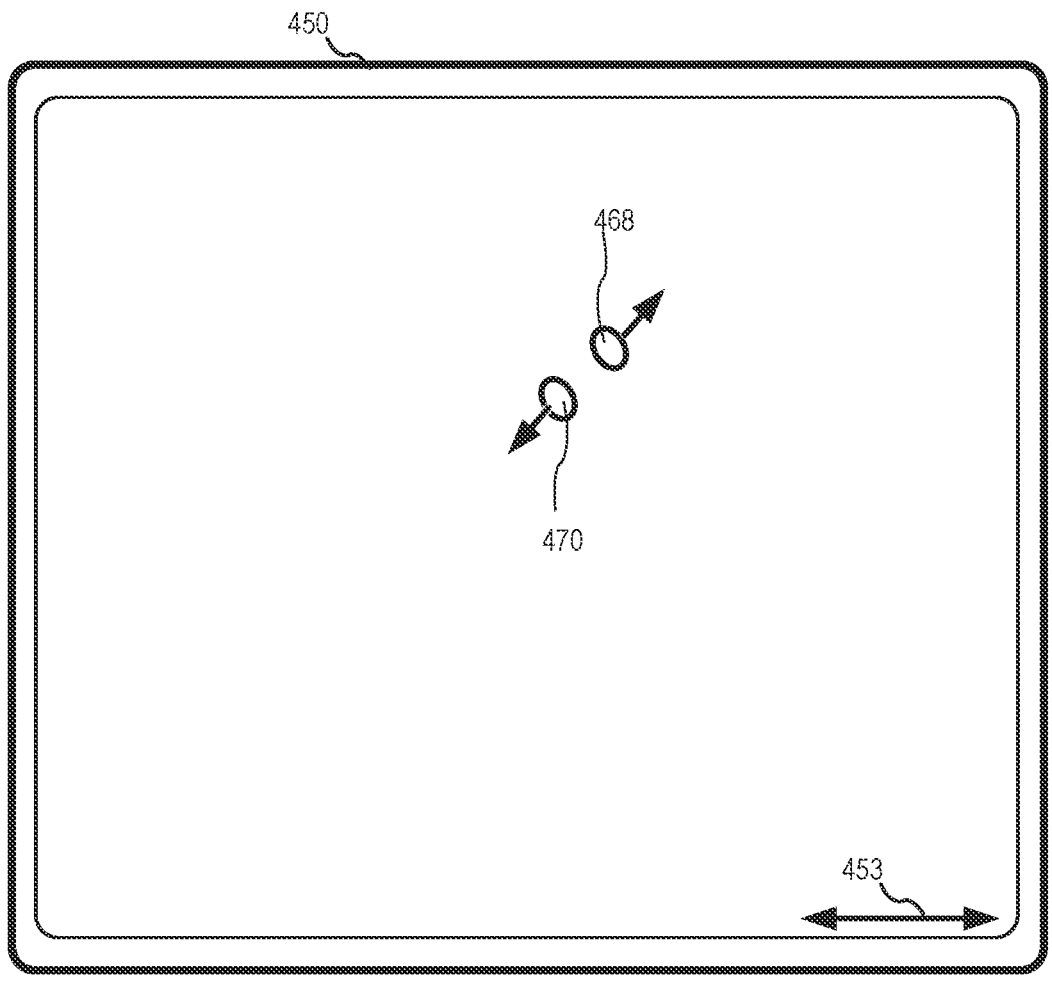
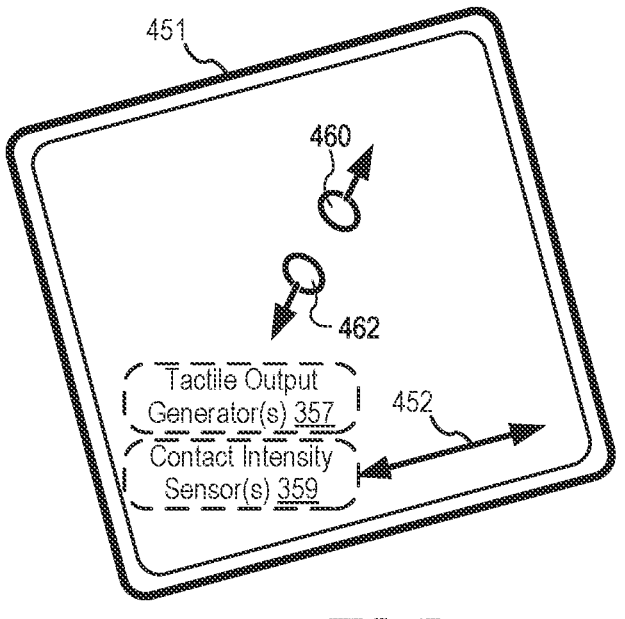
*FIG. 4B*

100

602

604

606

624

626

628

630

632
634
636
638

9:41 AM                    100%

Close            Cont            Edit

Item Added!                     Continue
                                Shopping!

Shirt
Navy Blue                       $85.00
Qty:1

Electronic Wallet               Cancel

Card: AA Bank                   624A    >
(...5432)

Shipping:John Appleseed         626A    >
10 Main ST
San Francisco, CA 94105

Method:two days delivery $5      628A    >
Arrives:March 5                 630A
Contact:johnappleseed@email.com         >

Price                           $111.00
Tax                             $10.00
Shipping                        $5.00
Pay Retail                      $126.00

650A
Pay with Touch ID

620

204

700

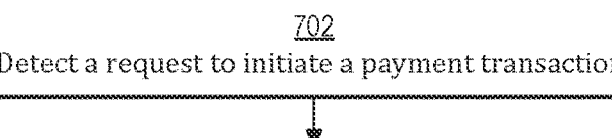

> 702
> Detect a request to initiate a payment transaction.

> 704
> In response to detecting the request to initiate the payment transaction, display a payment user interface.

> 706
> While displaying the payment user interface, receive first authorization data.

> 708
> After receiving the first authorization data, determine whether the first authorization data is valid.

> 710
> Receive second authorization data.

> 712
> After receiving the first authorization data and the second authorization data, transmit a transaction request that corresponds to the payment transaction to one or more remote servers.

> 714
> Receive a reply to the transaction request.

> 716
> In response to receiving the reply to the transaction request:
> in accordance with a determination that the transaction request was successful, dismiss the payment user interface; and in accordance with a determination that the transaction request failed, maintain display of the payment user interface and updating the payment user interface to display an indication of a reason for failure of the transaction request.

Figure 9:
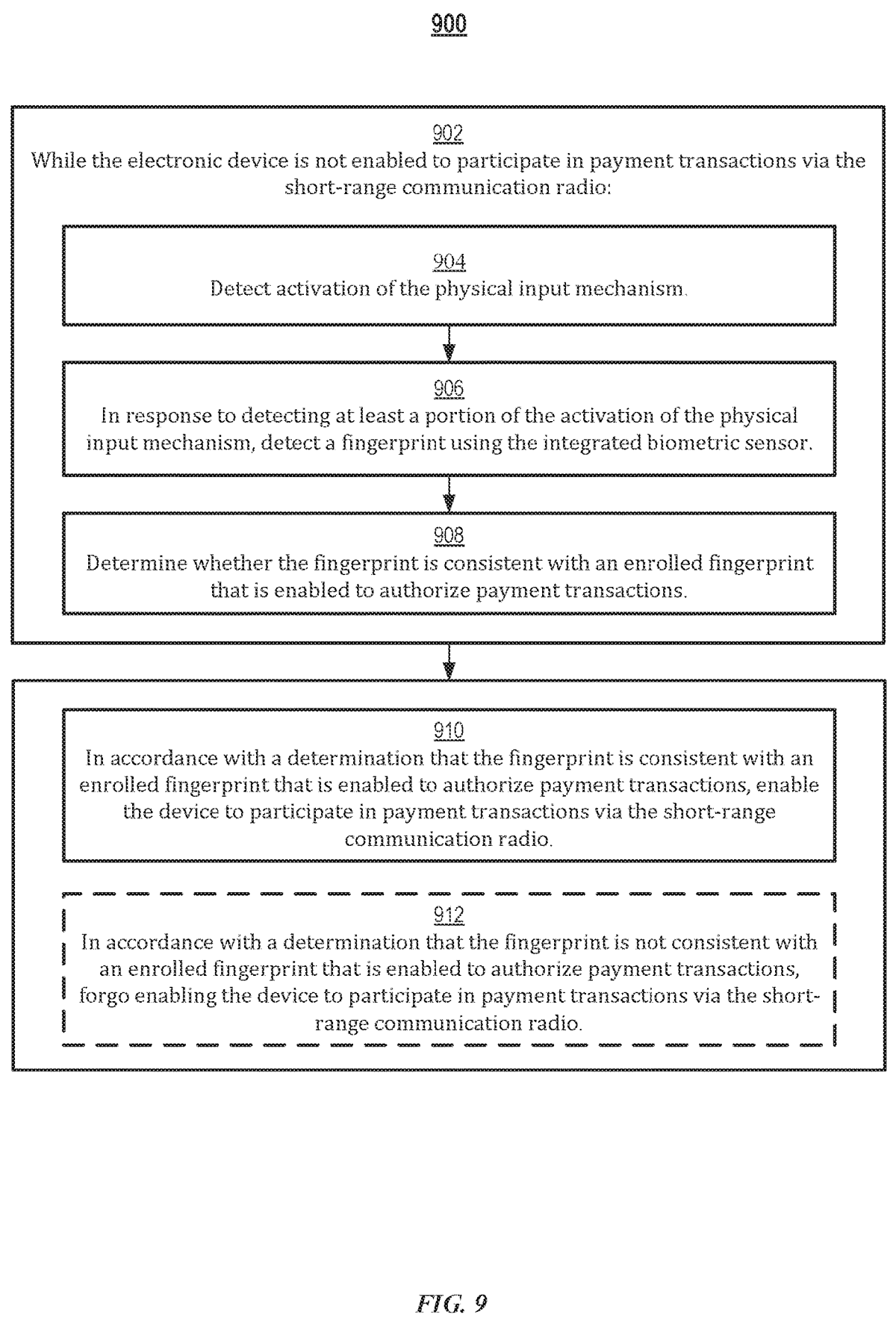

902
While the electronic device is not enabled to participate in payment transactions via the short-range communication radio:

904
Detect activation of the physical input mechanism.

906
In response to detecting at least a portion of the activation of the physical input mechanism, detect a fingerprint using the integrated biometric sensor.

908
Determine whether the fingerprint is consistent with an enrolled fingerprint that is enabled to authorize payment transactions.

910
In accordance with a determination that the fingerprint is consistent with an enrolled fingerprint that is enabled to authorize payment transactions, enable the device to participate in payment transactions via the short-range communication radio.

912
In accordance with a determination that the fingerprint is not consistent with an enrolled fingerprint that is enabled to authorize payment transactions, forgo enabling the device to participate in payment transactions via the short-range communication radio.

Credit Card

Credit and Debit Cards
Add Your Card information
to Electronic Wallet and Make
Purchases With Your Phone Add a Card

1016

Passes

Store Your
Boarding Passes, Movie Tickets,
Etc.

Scan Code

Done

9:41 AM     100%

Figure 11:
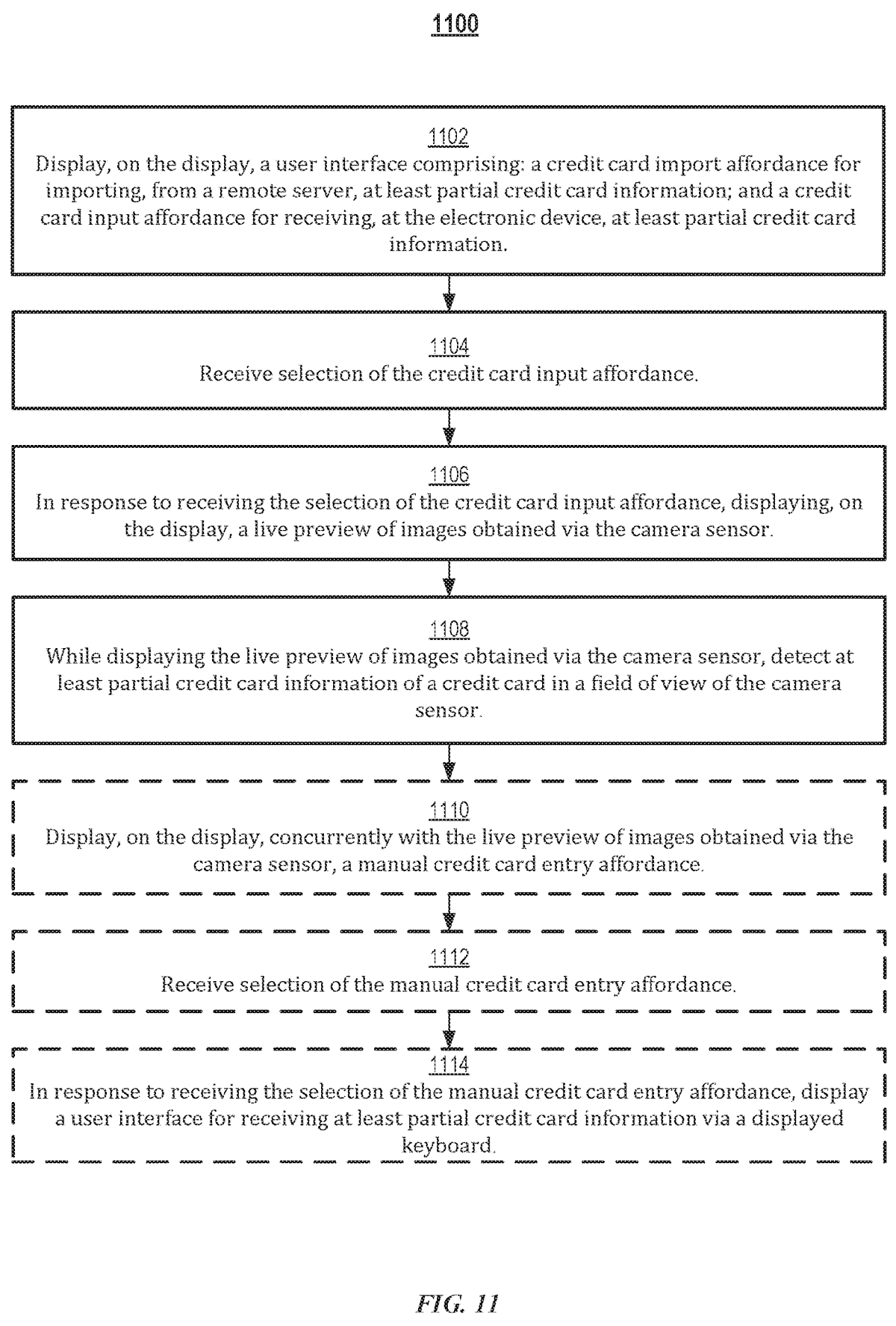

1100

1102
Display, on the display, a user interface comprising: a credit card import affordance for importing, from a remote server, at least partial credit card information; and a credit card input affordance for receiving, at the electronic device, at least partial credit card information.

1104
Receive selection of the credit card input affordance.

1106
In response to receiving the selection of the credit card input affordance, displaying, on the display, a live preview of images obtained via the camera sensor.

1108
While displaying the live preview of images obtained via the camera sensor, detect at least partial credit card information of a credit card in a field of view of the camera sensor.

1110
Display, on the display, concurrently with the live preview of images obtained via the camera sensor, a manual credit card entry affordance.

1112
Receive selection of the manual credit card entry affordance.

1114
In response to receiving the selection of the manual credit card entry affordance, display a user interface for receiving at least partial credit card information via a displayed keyboard.

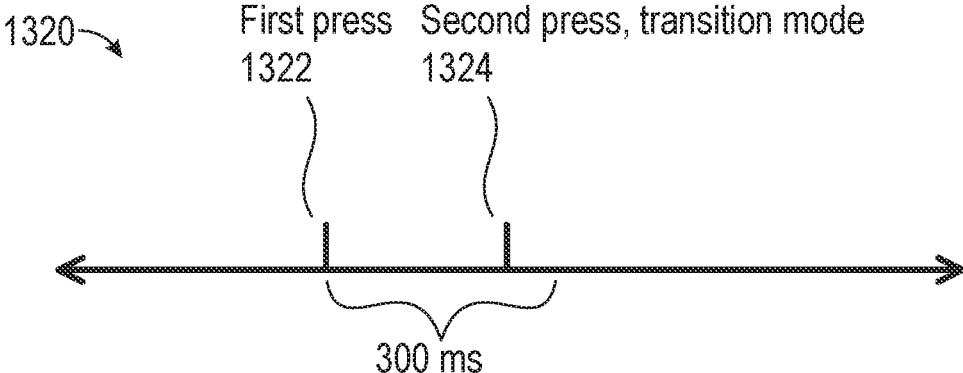
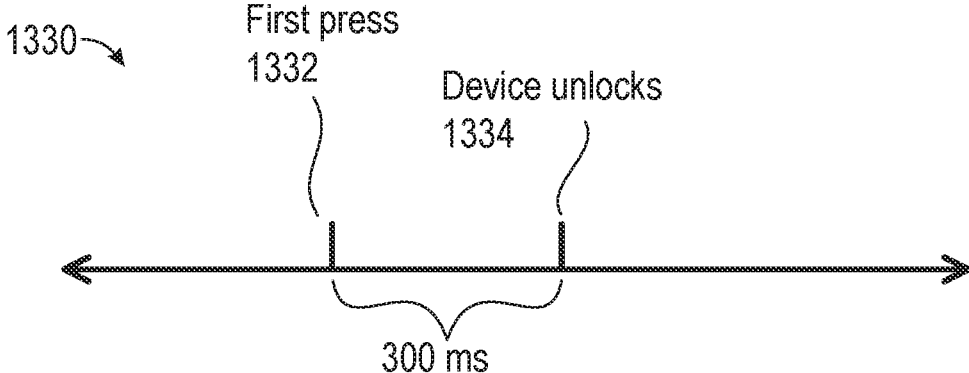
*FIG. 13E*

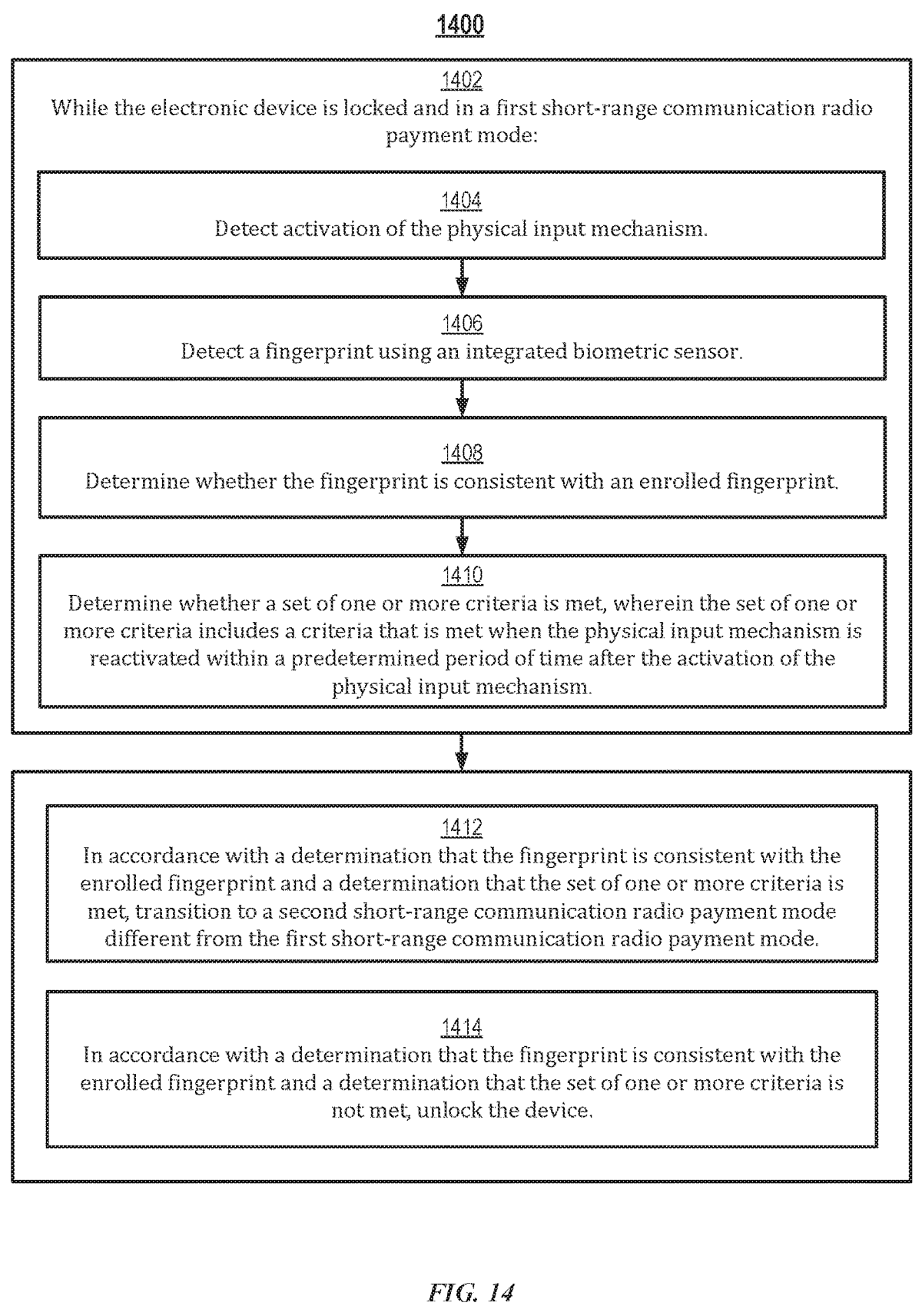

1400

1402
While the electronic device is locked and in a first short-range communication radio payment mode:

1404
Detect activation of the physical input mechanism.

1406
Detect a fingerprint using an integrated biometric sensor.

1408
Determine whether the fingerprint is consistent with an enrolled fingerprint.

1410
Determine whether a set of one or more criteria is met, wherein the set of one or more criteria includes a criteria that is met when the physical input mechanism is reactivated within a predetermined period of time after the activation of the physical input mechanism.

1412
In accordance with a determination that the fingerprint is consistent with the enrolled fingerprint and a determination that the set of one or more criteria is met, transition to a second short-range communication radio payment mode different from the first short-range communication radio payment mode.

1414
In accordance with a determination that the fingerprint is consistent with the enrolled fingerprint and a determination that the set of one or more criteria is not met, unlock the device.

FIG. 14

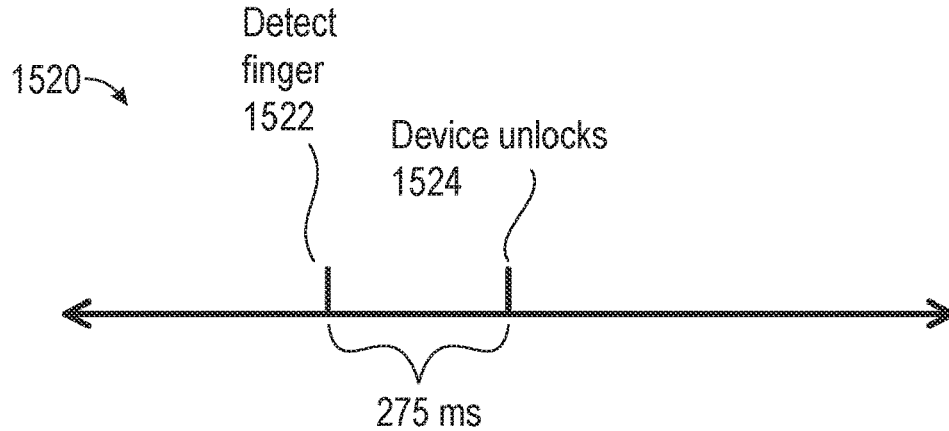
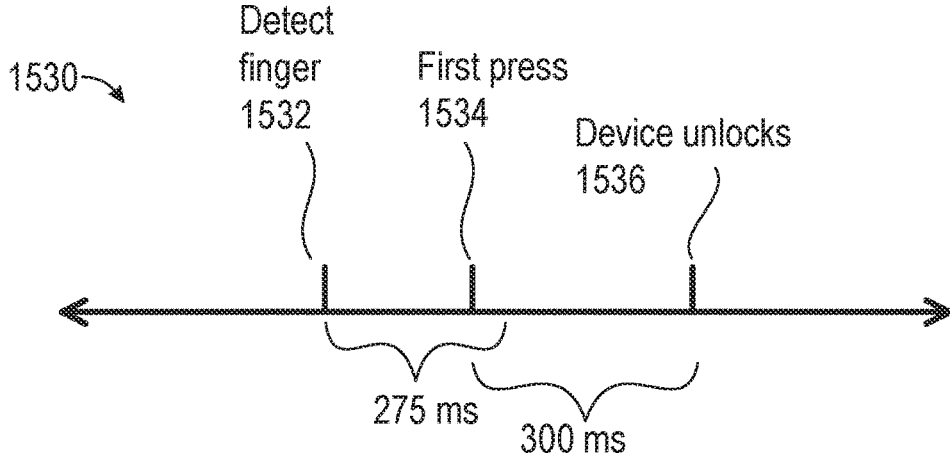
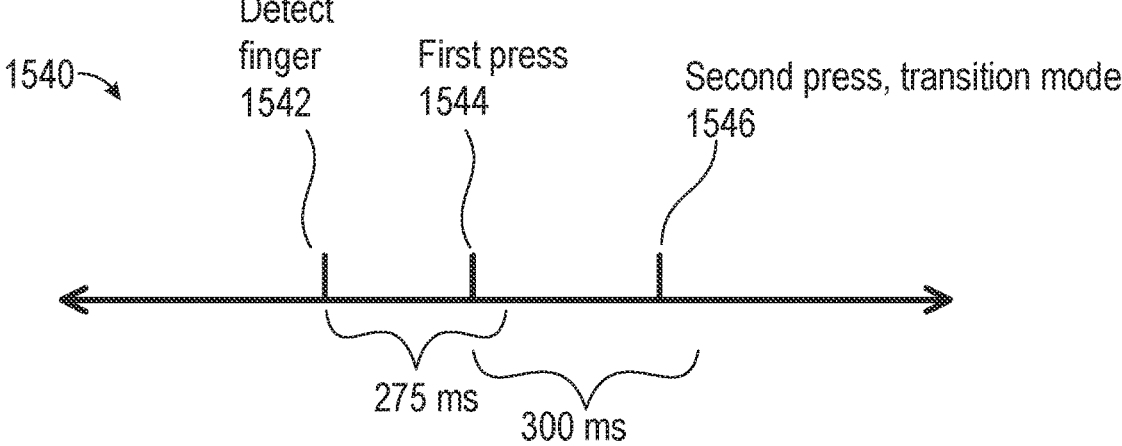
*FIG. 15E*

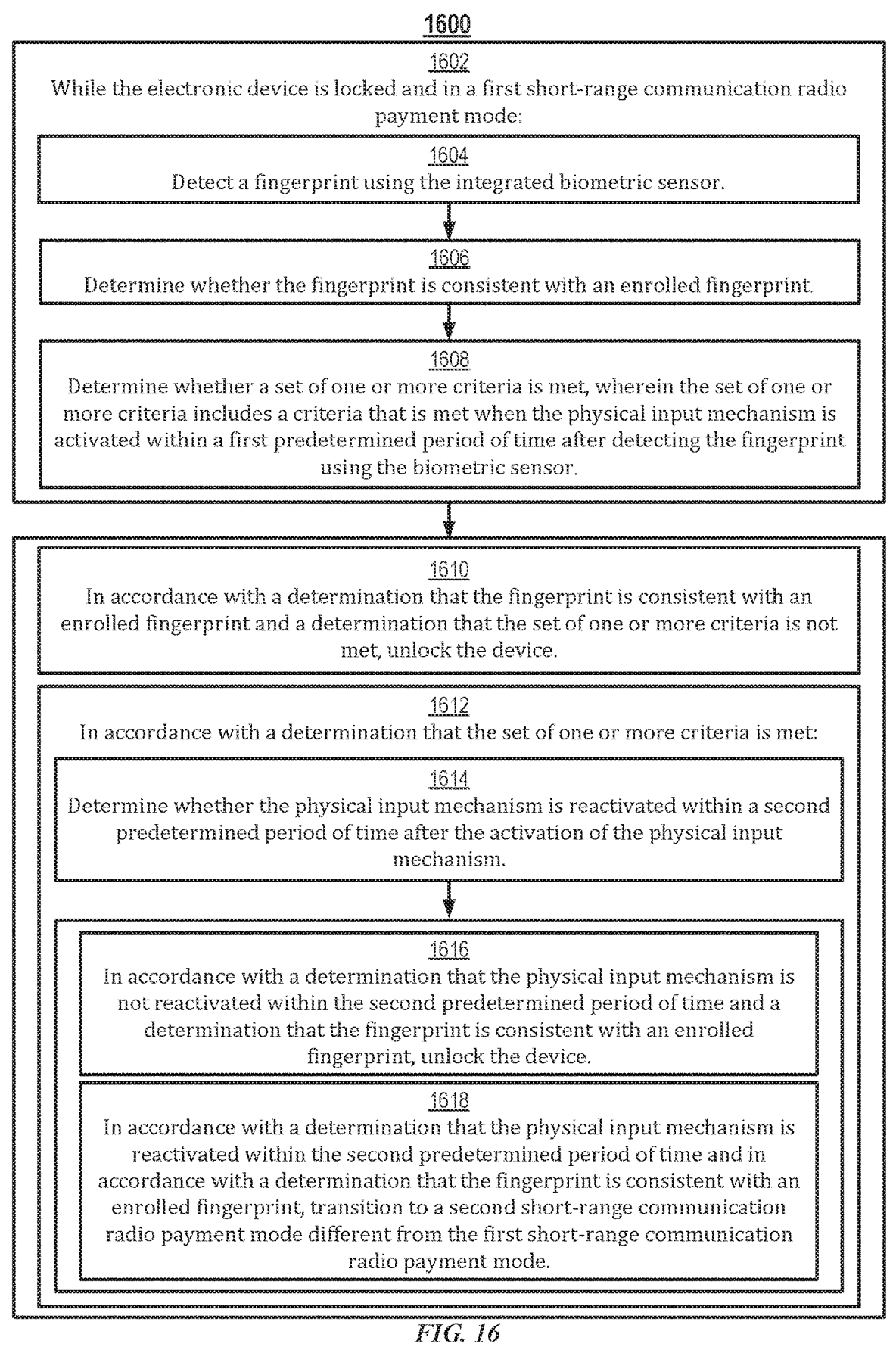

1600

1602
While the electronic device is locked and in a first short-range communication radio payment mode:

1604
Detect a fingerprint using the integrated biometric sensor.

1606
Determine whether the fingerprint is consistent with an enrolled fingerprint.

1608
Determine whether a set of one or more criteria is met, wherein the set of one or more criteria includes a criteria that is met when the physical input mechanism is activated within a first predetermined period of time after detecting the fingerprint using the biometric sensor.

1610
In accordance with a determination that the fingerprint is consistent with an enrolled fingerprint and a determination that the set of one or more criteria is not met, unlock the device.

1612
In accordance with a determination that the set of one or more criteria is met:

1614
Determine whether the physical input mechanism is reactivated within a second predetermined period of time after the activation of the physical input mechanism.

1616
In accordance with a determination that the physical input mechanism is not reactivated within the second predetermined period of time and a determination that the fingerprint is consistent with an enrolled fingerprint, unlock the device.

1618
In accordance with a determination that the physical input mechanism is reactivated within the second predetermined period of time and in accordance with a determination that the fingerprint is consistent with an enrolled fingerprint, transition to a second short-range communication radio payment mode different from the first short-range communication radio payment mode.

*FIG. 16*

USER INTERFACE FOR PAYMENTS

CROSS-REFERENCE TO RELATED APPLICATIONS

This application is a continuation of U.S. patent application Ser. No. 14/869,831, entitled "USER INTERFACE FOR PAYMENTS", filed Sep. 29, 2015, which claims priority from U.S. Provisional Patent Application Ser. No. 62/110,566, entitled "USER INTERFACE FOR PAYMENTS", filed Feb. 1, 2015, and U.S. Provisional Patent Application Ser. No. 62/172,000, entitled "USER INTERFACE FOR PAYMENTS", filed Jun. 5, 2015, each of which is hereby incorporated by reference in its entirety for all purposes.

This application relates to the following applications: U.S. Patent Application Ser. No. 62/004,886, entitled "USER INTERFACE FOR PAYMENTS", filed May 29, 2014, (Reference No. P22848USP1); U.S. Patent Application Ser. No. 62/047,545, entitled "USER INTERFACE FOR PAYMENTS", filed Sep. 8, 2014, (Reference No. P22848USP2); U.S. Patent Application Ser. No. 62/127,790, entitled "USER INTERFACE FOR PAYMENTS", filed Mar. 3, 2015, (Reference No. P22848USP3); U.S. Patent Application Ser. No. 61/912,727, entitled "PROVISIONING AND AUTHENTICATING CREDENTIALS ON AN ELECTRONIC DEVICE", filed Dec. 6, 2013, (Reference No. P19543USP1); U.S. Patent Application Ser. No. 61/909,717, entitled "PROVISIONING OF CREDENTIALS ON AN ELECTRONIC DEVICE USING PASSWORDS COMMUNICATED OVER VERIFIED CHANNELS", filed Nov. 27, 2013, (Reference No. P19950USP1); U.S. Patent Application Ser. No. 62/004,182, entitled "ONLINE PAYMENTS USING A SECURE ELEMENT OF AN ELECTRONIC DEVICE", filed May 28, 2014, (Reference No. P20450USP4); U.S. Patent Application Ser. No. 61/920,029, entitled "DELETION OF CREDENTIALS FROM AN ELECTRONIC DEVICE", filed Dec. 23, 2013, (Reference No. P21084USP1); U.S. Patent Application Ser. No. 61/899, 737, entitled "USING BIOAUTHENTICATION IN NEAR-FIELD-COMMUNICATION TRANSACTIONS", filed Nov. 4, 2013, (Reference No. P21646USP1); U.S. Patent Application Ser. No. 61/905,035, entitled "GENERATING TRANSACTION IDENTIFIERS", filed Nov. 15, 2013, (Reference No. P21714USP1); U.S. Patent Application Ser. No. 61/905,042, entitled "ELECTRONIC RECEIPTS FOR NFC-BASED FINANCIAL TRANSACTIONS", filed Nov. 15, 2013, (Reference No. 21734USP1); U.S. Patent Application Serial Nos. 62/004,798, entitled "FINANCIAL-TRANSACTION NOTIFICATIONS", filed May 29, 2014, (Reference No. P23211USP1); U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS", filed May 29, 2014, (Reference No. P23215USP1); U.S. Patent Application Ser. No. 62/004,840, entitled "METHODS FOR OPERATING A PORTABLE ELECTRONIC DEVICE TO CONDUCT MOBILE PAYMENT TRANSACTIONS", filed May 29, 2014, (Reference No. P23223USP1); U.S. Patent Application Ser. No. 62/004,835, entitled "METHODS FOR USING A PRIMARY USER DEVICE TO PROVISION CREDENTIALS ONTO A SECONDARY USER DEVICE", filed May 29, 2014, (Reference No. P23224USP1); U.S. Patent Application Ser. No. 62/004, 832, entitled "METHODS FOR USING A RANDOM AUTHORIZATION NUMBER TO PROVIDE ENHANCED SECURITY FOR A SECURE ELEMENT", filed May 29, 2014, (Reference No. P23261USP1); U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014, (Reference No. P22931USP1); and U.S. Utility patent application Ser. No. 14/092,205, entitled "SECURE PROVISIONING OF CREDENTIALS ON AN ELECTRONIC DEVICE", filed Nov. 27, 2013, (Reference No. P19545US1); which are hereby incorporated by reference in their entirety.

FIELD

The present disclosure relates generally to user interfaces, and more specifically to techniques for conducting payment transactions and linking payment accounts to electronic devices.

BACKGROUND

The use of electronic devices for making payments at point-of-sale terminals and over the Internet has increased significantly in recent years. Exemplary point-of-sale terminals include Near Field Communication-enabled (NFC-enabled) terminals, Bluetooth-enabled terminals, and barcode scanner-enabled terminals. Electronic devices can be used in conjunction with these exemplary terminals to enable the user of the electronic device to make a payment for the purchase of, for example, goods or services. Similarly, electronic devices can be used in conjunction with Internet shopping carts to enable the user to make a payment by entering their credit card information.

BRIEF SUMMARY

Some techniques for conducting payment transactions and linking payment accounts for payment transactions using electronic devices, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, there is a need for electronic devices with faster, more efficient methods and interfaces for conducting payment transactions and linking payment accounts for payment transactions, while maintaining a high level of security. Such methods and interfaces optionally complement or replace other methods for conducting payment transactions and linking payment accounts for payment transactions. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at an electronic device. The method includes: detecting a request to initiate a payment transaction; in response to detecting the request to initiate the payment transaction, displaying a payment user interface; while displaying the payment user interface, receiving first authorization data; after receiving the first authorization data, determining whether the first authorization data is valid; receiving second authorization data; after receiving the first authorization data and the second authorization data, transmitting a transaction request that corresponds to the payment transaction to one or more remote servers; receiving a reply to the transaction request; and in response to receiving the reply to the transaction request: in accordance with a determination that the transaction request was successful, dismissing the payment user interface; and in accordance with a determination that the transaction request failed, maintaining display of the payment user interface and updating the payment user interface to display an indication of a reason for failure of the transaction request.

In accordance with some embodiments, a method is performed at an electronic device with a short-range communication radio and a physical input mechanism that includes an integrated biometric sensor. The method includes: while the electronic device is not enabled to participate in payment transactions via the short-range communication radio: detecting activation of the physical input mechanism; in response to detecting at least a portion of the activation of the physical input mechanism, detecting a fingerprint using the integrated biometric sensor; and determining whether the fingerprint is consistent with an enrolled fingerprint that is enabled to authorize payment transactions; and in accordance with a determination that the fingerprint is consistent with an enrolled fingerprint that is enabled to authorize payment transactions, enabling the device to participate in payment transactions via the short-range communication radio.

In accordance with some embodiments, a method is performed at an electronic device with a display and a camera sensor. The method includes: displaying, on the display, a user interface comprising: a credit card import affordance for importing, from a remote server, at least partial credit card information; and a credit card input affordance for receiving, at the electronic device, at least partial credit card information; receiving selection of the credit card input affordance; in response to receiving the selection of the credit card input affordance, displaying, on the display, a live preview of images obtained via the camera sensor; and while displaying the live preview of images obtained via the camera sensor, detecting at least partial credit card information of a credit card in a field of view of the camera sensor.

In accordance with some embodiments, a method is performed at an electronic device with a short-range communication radio and a physical input mechanism that includes an integrated biometric sensor. While the electronic device is locked and in a first short-range communication radio payment mode: detecting activation of the physical input mechanism; detecting a fingerprint using the integrated biometric sensor; determining whether the fingerprint is consistent with an enrolled fingerprint; and determining whether a set of one or more criteria is met, wherein the set of one or more criteria includes a criterion that is met when the physical input mechanism is reactivated within a predetermined period of time after the activation of the physical input mechanism; in accordance with a determination that the fingerprint is consistent with the enrolled fingerprint and a determination that the set of one or more criteria is met, transitioning to a second short-range communication radio payment mode different from the first short-range communication radio payment mode; and in accordance with a determination that the fingerprint is consistent with the enrolled fingerprint and a determination that the set of one or more criteria is not met, unlocking the device.

In accordance with some embodiments, a method is performed at an electronic device with a short-range communication radio and a physical input mechanism that includes an integrated biometric sensor. While the electronic device is locked and in a first short-range communication radio payment mode: detecting a fingerprint using the integrated biometric sensor; determining whether the fingerprint is consistent with an enrolled fingerprint; determining whether a set of one or more criteria is met, wherein the set of one or more criteria includes a criterion that is met when the physical input mechanism is activated within a first predetermined period of time after detecting the fingerprint using the biometric sensor; in accordance with a determination that the fingerprint is consistent with an enrolled fingerprint and a determination that the set of one or more criteria is not met, unlocking the device; and in accordance with a determination that the set of one or more criteria is met: determining whether the physical input mechanism is reactivated within a second predetermined period of time after the activation of the physical input mechanism; in accordance with a determination that the physical input mechanism is not reactivated within the second predetermined period of time and a determination that the fingerprint is consistent with an enrolled fingerprint, unlocking the device; and in accordance with a determination that the physical input mechanism is reactivated within the second predetermined period of time and in accordance with a determination that the fingerprint is consistent with an enrolled fingerprint, transitioning to a second short-range communication radio payment mode different from the first short-range communication radio payment mode.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for conducting payment transactions and linking payment accounts for payment transactions, thereby increasing the effectiveness, efficiency, and user satisfaction with such devices. Such methods and interfaces may complement or replace other methods for conducting payment transactions and linking payment accounts for payment transactions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for conducting a payment transaction in accordance with some embodiments.

FIG. 9 is a flow diagram illustrating a method for conducting a payment transaction using a short-range communication radio in accordance with some embodiments.

FIG. 11 is a flow diagram illustrating a method for linking a payment account to an electronic device in accordance with some embodiments.

FIGS. 13A-13E illustrate exemplary techniques and user interfaces for enabling an electronic device to participate in a payment transaction in accordance with some embodiments.

FIG. 14 is a flow diagram illustrating a method for enabling an electronic device to participate in a payment transaction in accordance with some embodiments.

FIGS. 15A-15E illustrate exemplary techniques and user interfaces for enabling an electronic device to participate in a payment transaction in accordance with some embodiments.

FIG. 16 is a flow diagram illustrating a method for enabling an electronic device to participate in a payment transaction in accordance with some embodiments.

DESCRIPTION OF EMBODIMENTS

Figure 1A:
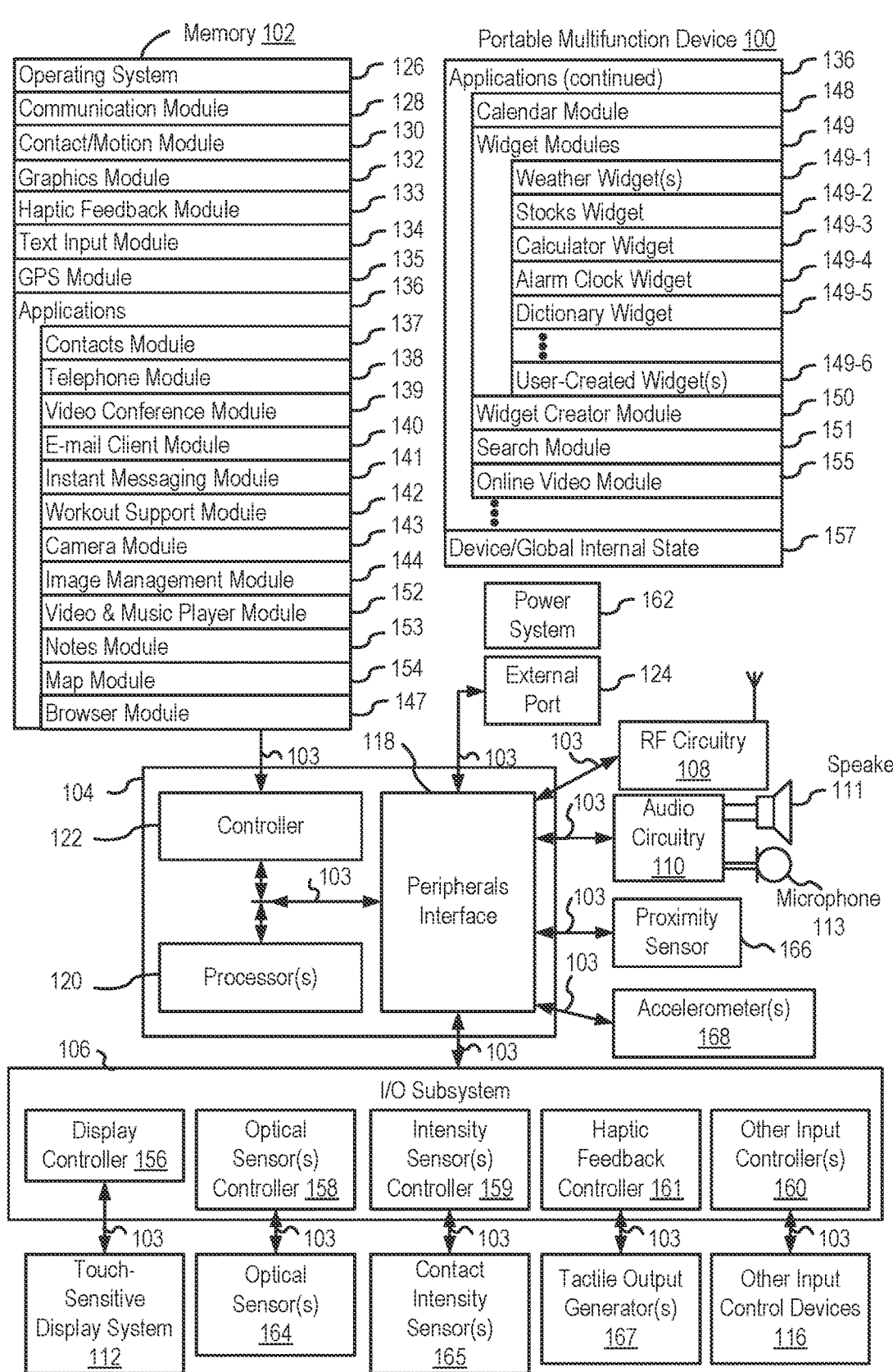
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Aspects of method 700 (FIGS. 6A-6O, FIG. 7), method 900 (FIGS. 8A-8K, FIG. 9), method 1100 (FIGS. 10A-10I, FIG. 11), method 1400 (FIGS. 13A-13E, FIG. 14), and method 1600 (FIGS. 15A-15E, FIG. 16) may be incorporated with one another. Additionally, aspects of U.S. Provisional Patent Application Ser. No. 62/004,886 (the "'886 Application"), entitled "USER INTERFACE FOR PAYMENTS", filed May 29, 2014, (Reference No. P22848USP1) and aspects of co-pending U.S. Provisional Patent Application Ser. No. 62/047,545 (the "'545 Application"), entitled "USER INTERFACE FOR PAYMENTS", filed Sep. 8, 2014, (Reference No. P22848USP2) may be incorporated with the techniques described below.

For example, aspects of method 600 (FIG. 6A-6C), method 800 (FIG. 8A-8B), method 1000 (FIG. 10A-10B), and method 1200 (FIG. 12A-12C) of the '886 Application may be incorporated with one another and may also be incorporated with aspects of method 600 (FIG. 6), method 800 (FIG. 8), method 1000 (FIG. 10), method 1200 (FIG. 12), and method 1400 (FIG. 14) of the '545 Application, and may also be incorporated with aspects of method 700 (FIG. 7), method 900 (FIG. 9), and method 1100 (FIG. 11). Thus, the techniques described with respect to each method of the '886 Application, the '545 Application, and the present application may be relevant to every other method of the '886 Application, the '545 Application, and the present application.

There is a need for electronic devices that provide efficient methods and interfaces for conducting payment transactions and linking payment accounts for payment transactions. Such techniques can reduce the cognitive burden on a user who access event notifications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for conducting payment transactions and linking payment accounts for payment transactions. FIGS. 6A-6O, 8A-8K, 10A-10I, 13A-13D, and 15A-15D illustrate exemplary techniques and user interfaces for conducting payment transactions and linking payment accounts. The user interfaces in the figures are also used to illustrate the processes described below, including the processes in FIGS. 7, 9, 11, 14, and 16.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

(Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.11 ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
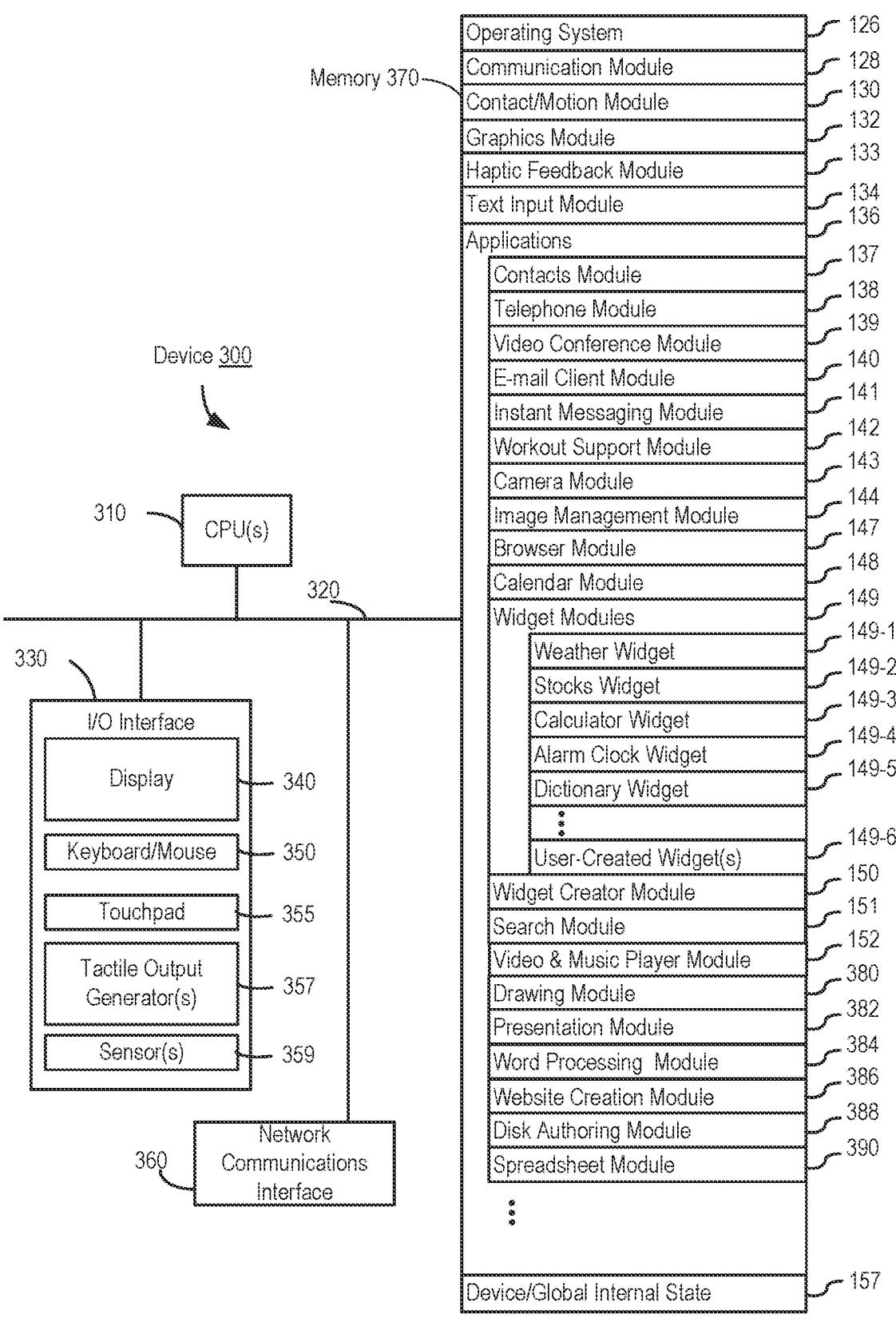
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conferencing module 139;
E-mail client module 140;
Instant messaging (IM) module 141;
Workout support module 142;
Camera module 143 for still and/or video images;
Image management module 144;

Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
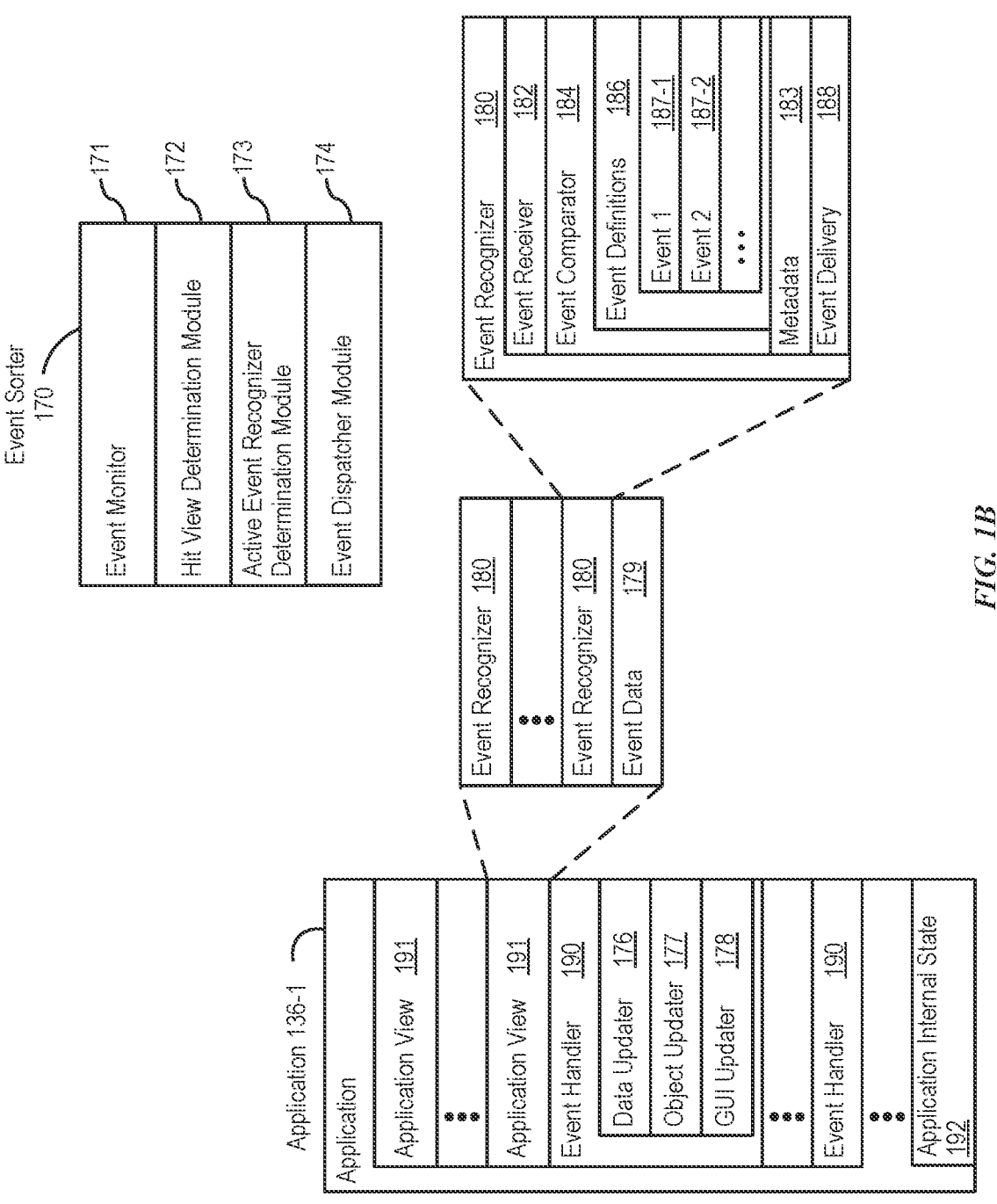
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
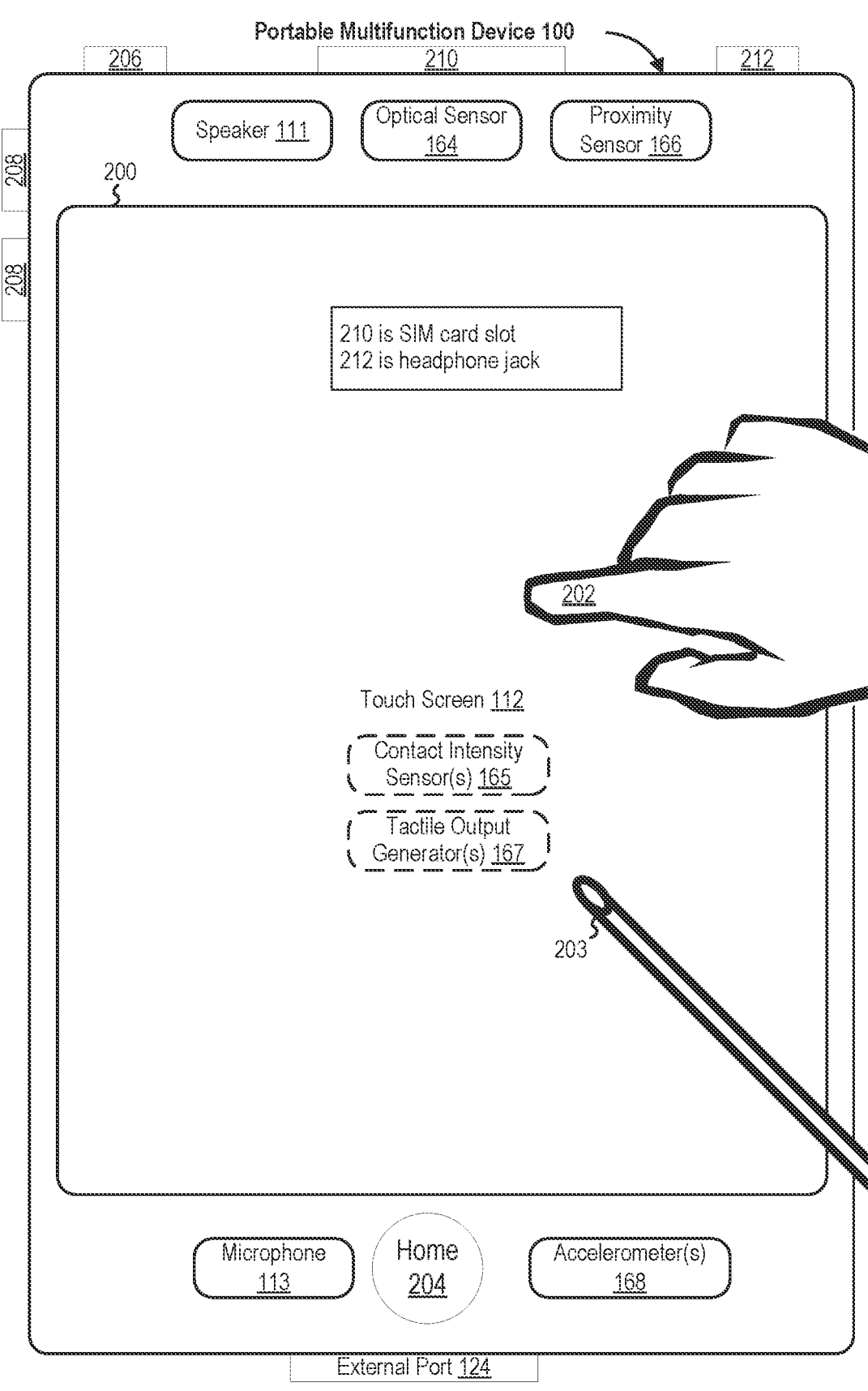
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
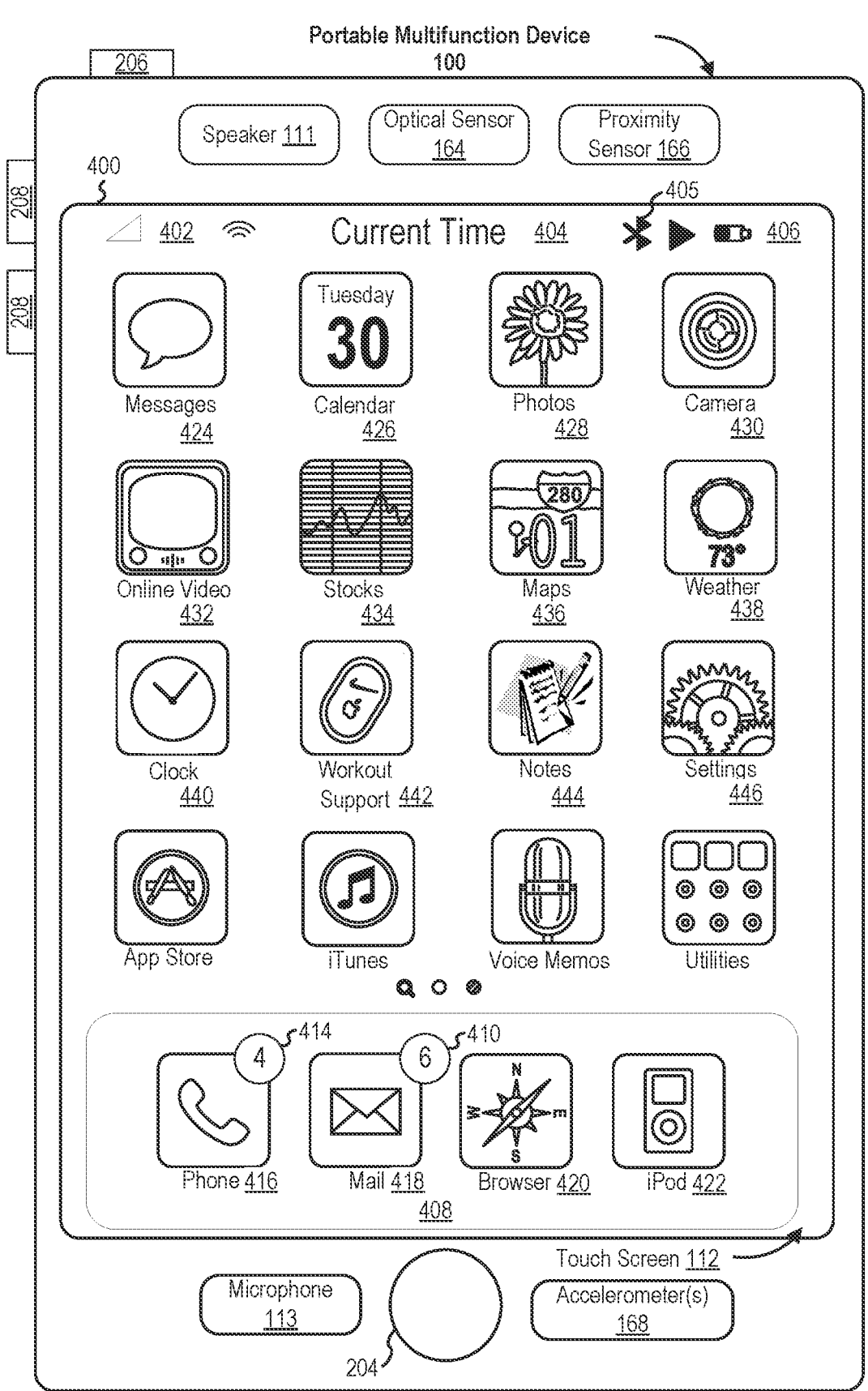
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112

(where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
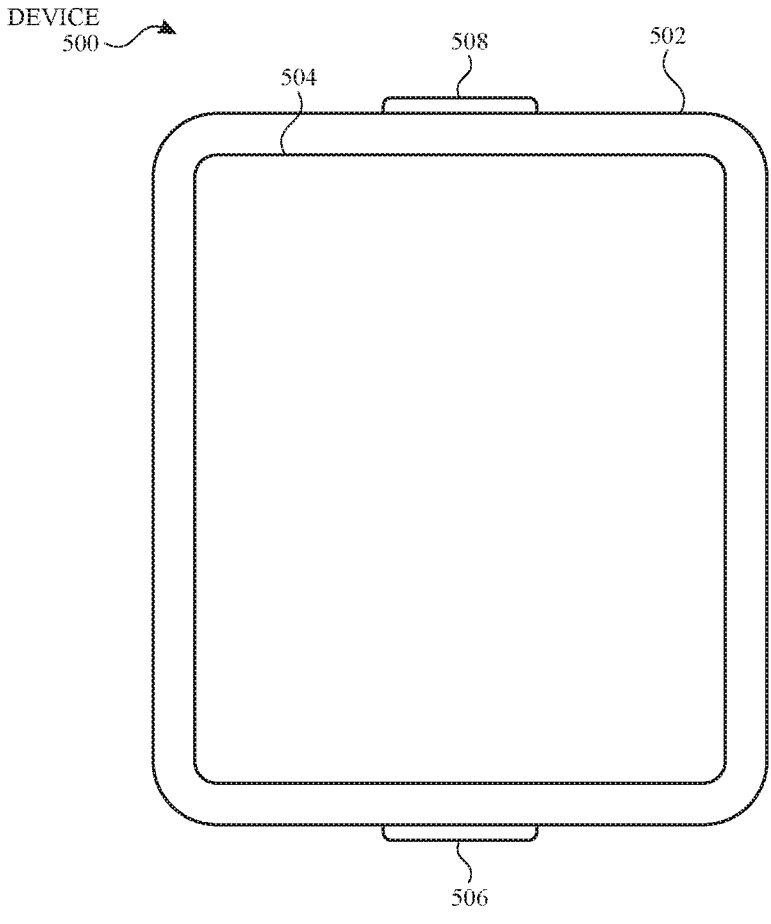
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
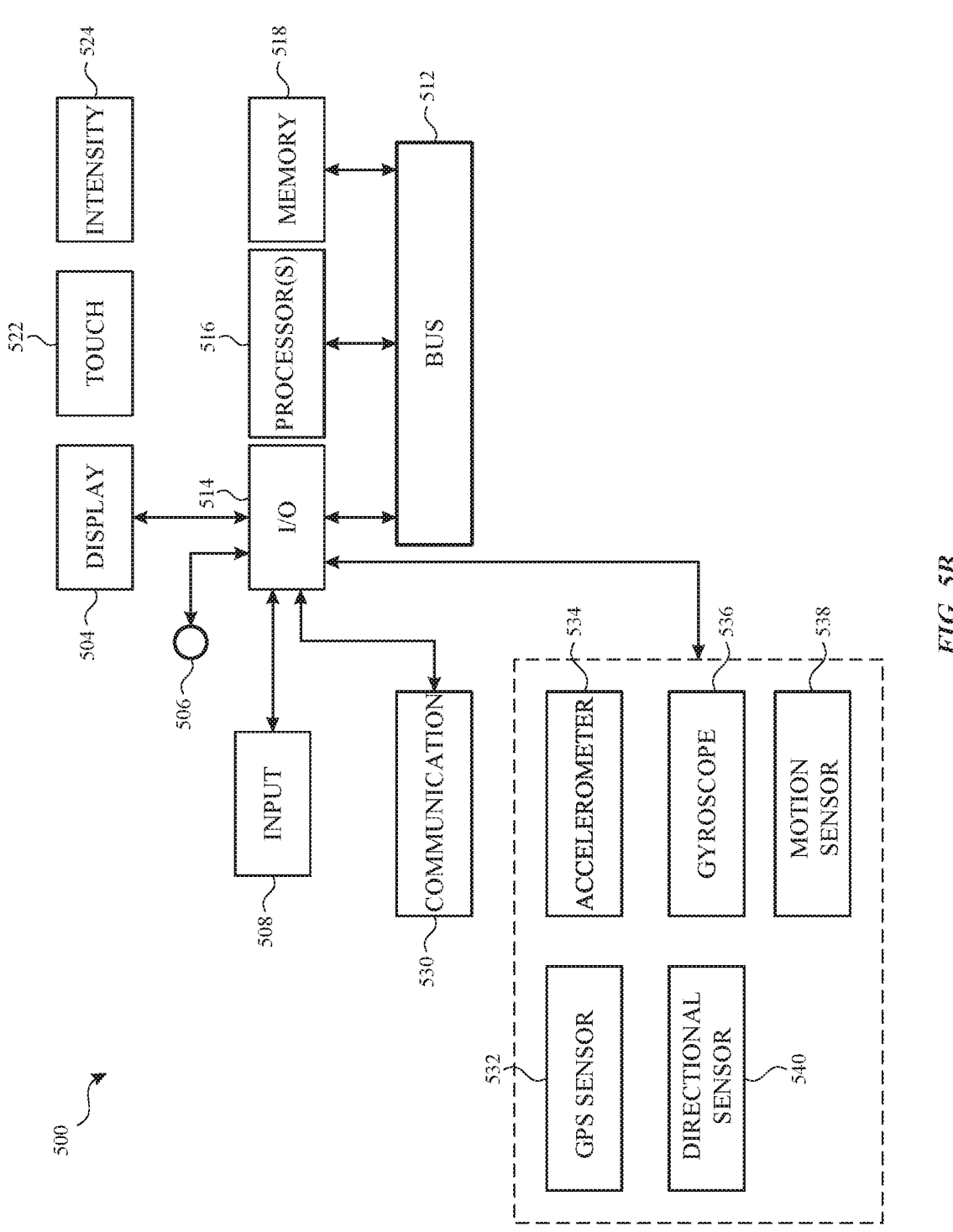
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 (FIG. 7), 900 (FIG. 9), 1100 (FIG. 11), 1400, (FIG. 14), and 1600 (FIG. 16). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
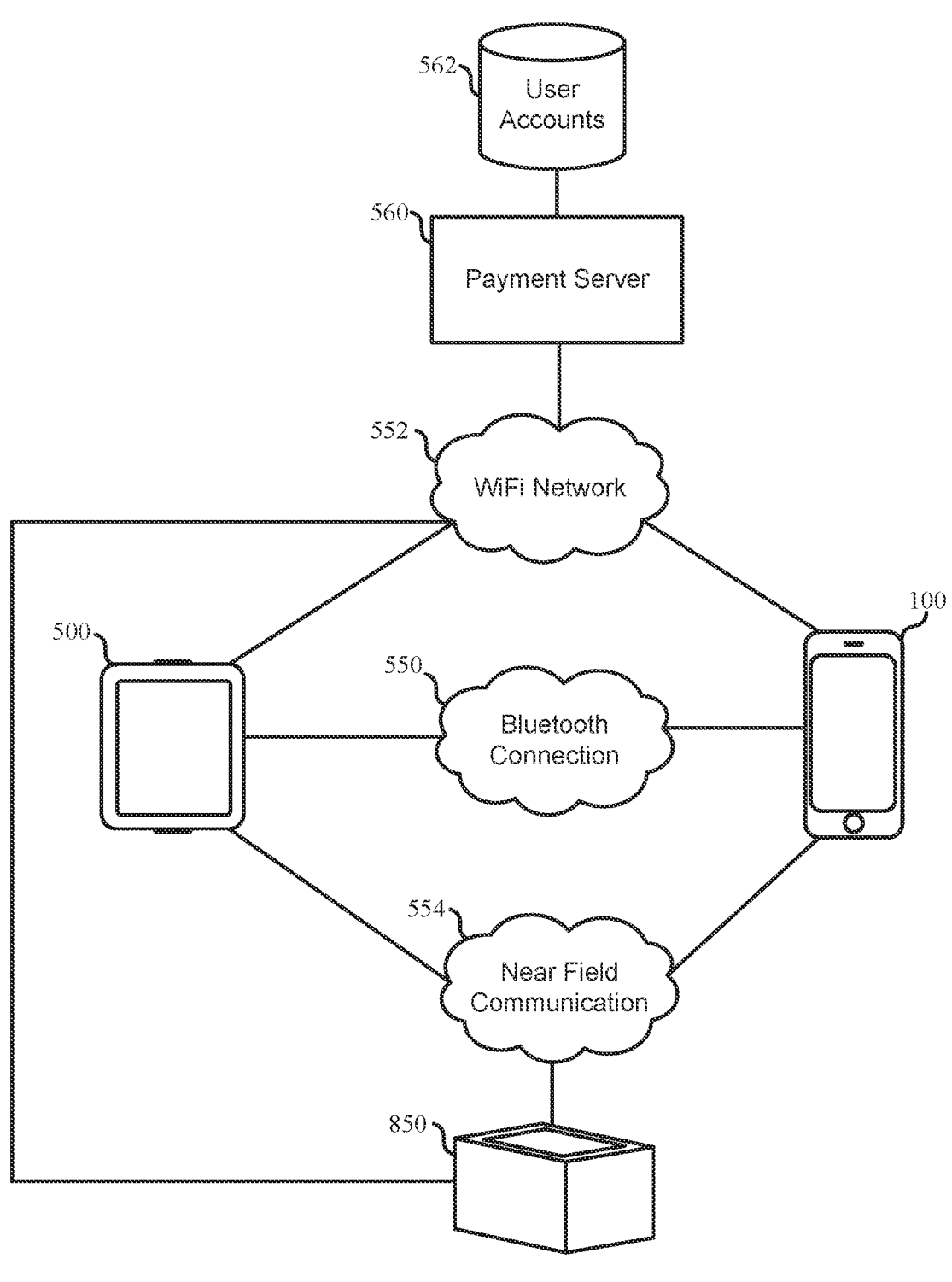
FIG. 5C illustrates exemplary devices connected via one or more communication channels to complete a payment transaction in accordance with some embodiments.

FIG. 5C illustrates exemplary devices connected via one or more communication channels to complete a payment transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each over any of a variety of networks. For example, the devices communicate using a Bluetooth connection 550 (e.g., which includes a traditional Bluetooth connection or a Bluetooth Low Energy connection) or using a WiFi network 552. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 850, which is optionally NFC-enabled. The communication optionally occurs using a variety of communication channels and/or technologies. In one examples, electronic device (e.g., 100, 300, 500) communicates with payment terminal 850 using an NFC channel 554. In some examples, payment terminal 850 communicates with an electronic device (e.g., 100, 300, 500) using a peer-to-peer NFC mode. Electronic device (e.g., 100, 300, 500) is optionally configured transmit a signal to payment terminal 850 that includes payment information for a payment account (e.g., a default account or an account selected for the particular transaction).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 850) is established within a defined time period from detection of the input, the secure element releases payment information to be transmitted to the other device (e.g., payment terminal 850). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 850 optionally uses the payment information to generate a signal to transmit to a payment server 560 to determine whether the payment is authorized. Payment server 560 optionally includes any device or system configured to receive payment information associated with a payment account and to determine whether a proposed purchase is authorized. In some examples, payment server 560 includes a server of an issuing bank. Payment terminal 850 communicates with payment server 560 directly or indirectly via one or more other devices or systems (e.g., a server of an acquiring bank and/or a server of a card network).

Payment server 560 optionally uses at least some of the payment information to identify a user account from among a database of user accounts (e.g., 562). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 560) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 560 responds to POS payment terminal 850 with an indication as to whether a proposed purchase is authorized or denied. In some examples, POS payment terminal 850 transmits a signal to the electronic device (e.g., 100, 300, 500) to identify the result. For example, POS payment terminal 850 sends a receipt to the electronic device (e.g., 100, 300, 500) when a purchase is authorized (e.g., via a transaction-coordination server that manages a transaction app on the user device). In some instances, POS payment terminal 850 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 850. For example, upon detecting that a mechanical input has been received, a secure element in the electronic device (e.g., 100, 300, 500) releases payment information to allow an application on the electronic device to access the information (e.g., and to transmit the information to a server associated with the application).

Figure 6A:
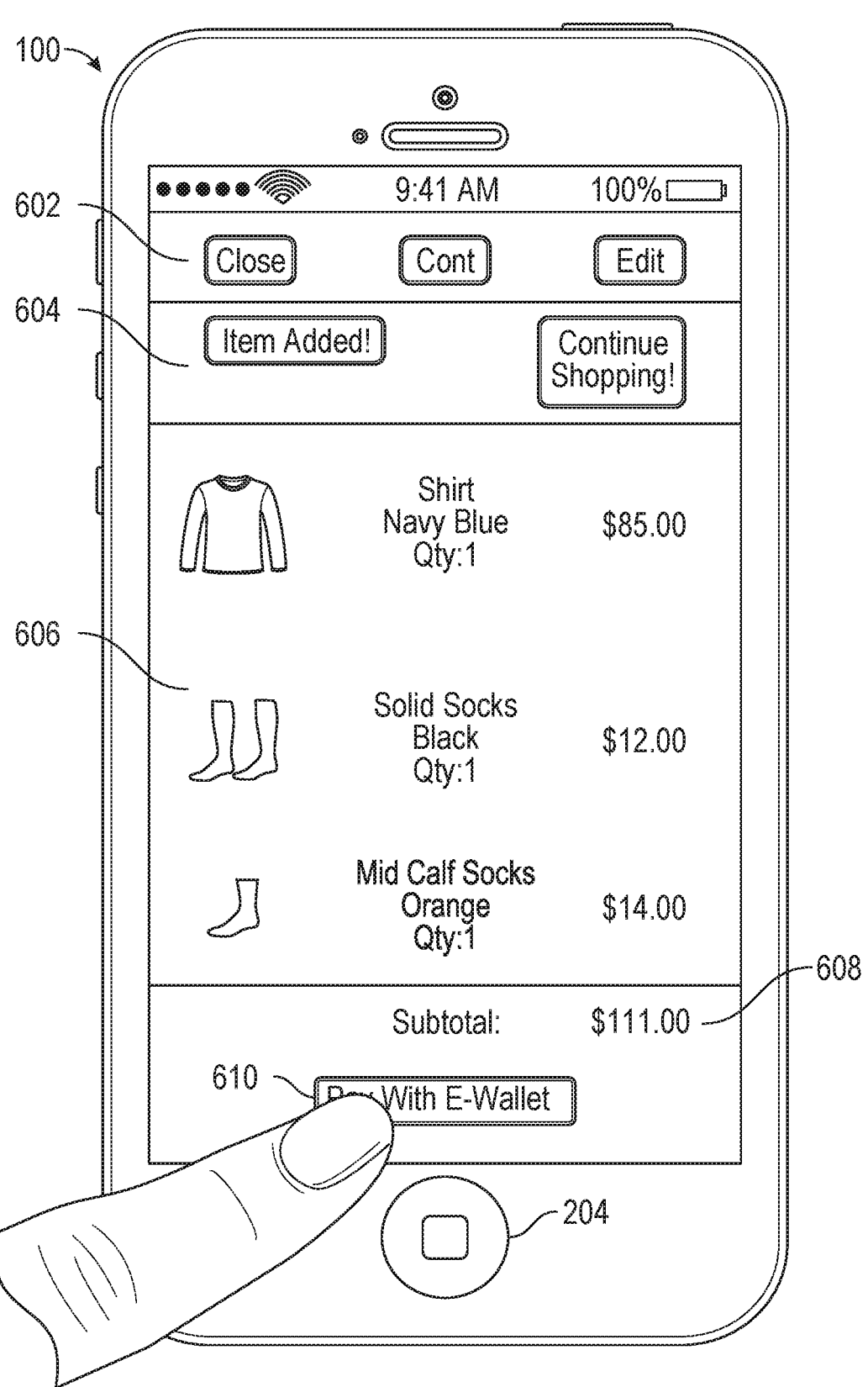
FIGS. 6A-6O illustrate exemplary user interfaces for conducting a payment transaction in accordance with some embodiments.

FIGS. 6A-60 illustrate exemplary user interfaces for conducting a payment transaction in accordance with some embodiments. The user interfaces in these figures are used to illustrate the processes described below, including the process in FIG. 7.

The payment technique allows a user to both authorize with the electronic device (e.g., using a fingerprint or a device passcode) and to authorize with a remote server (such as a bank). The two authorizations each require their own authorization data, which are provided by the user. This payment technique is more secure and convenient than other payment techniques.

FIG. 6A illustrates an exemplary user interface for conducting a payment transaction in accordance with some embodiments. At FIG. 6A, an electronic device 100 displays a user interface for a first application 602 (e.g., a third-party merchant application or a web browser-accessed website). The user interface for the first application 602 includes a payment affordance 610 (e.g., a submit button to buy contents of a shopping cart) associated with a payment transaction (e.g., a purchase to be made). For example, the payment affordance 610 may be a submit button to initiate the purchase of the contents of an electronic shopping cart 604. In the illustrated example of FIG. 6A, the electronic shopping cart 604 includes multiple clothing items 606.

The electronic device detects a request to initiate a payment transaction (e.g., detecting selection of payment affordance 610 associated with the payment transaction; a user taps the payment affordance 610). In response to detecting the request to initiate the payment transaction, the device displays a payment user interface 620, as illustrated in FIG. 6B.

In some embodiments, the payment user interface is of a second application. For example, the second application may be part of the operating system of the electronic device, and the second application has access to an electronic wallet of the device. In some embodiments, the second application is a first-party application provided by a provider of the operating system of the electronic device, and the second application has access to an electronic wallet of the device.

Figure 6B:
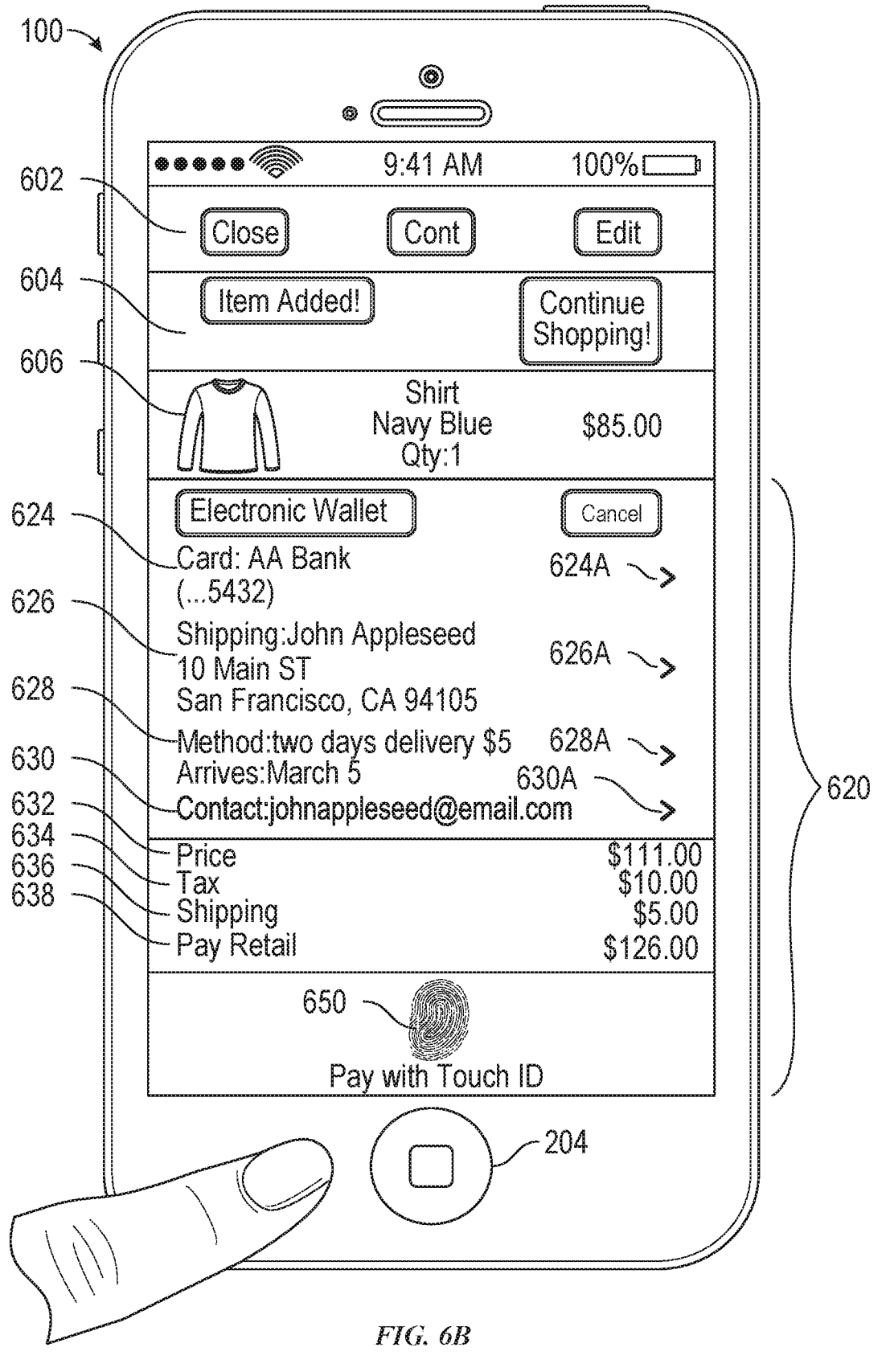

At FIG. 6B, the payment user interface 620 optionally includes an indication of a default/selected payment account 624, a name (e.g., cardholder's name) associated with the payment account, billing address, ship-to address 626, shipping method 628, contact information 630, a subtotal 630, a tax amount 634, a shipping amount 636, and a total 638.

Figure 6C:
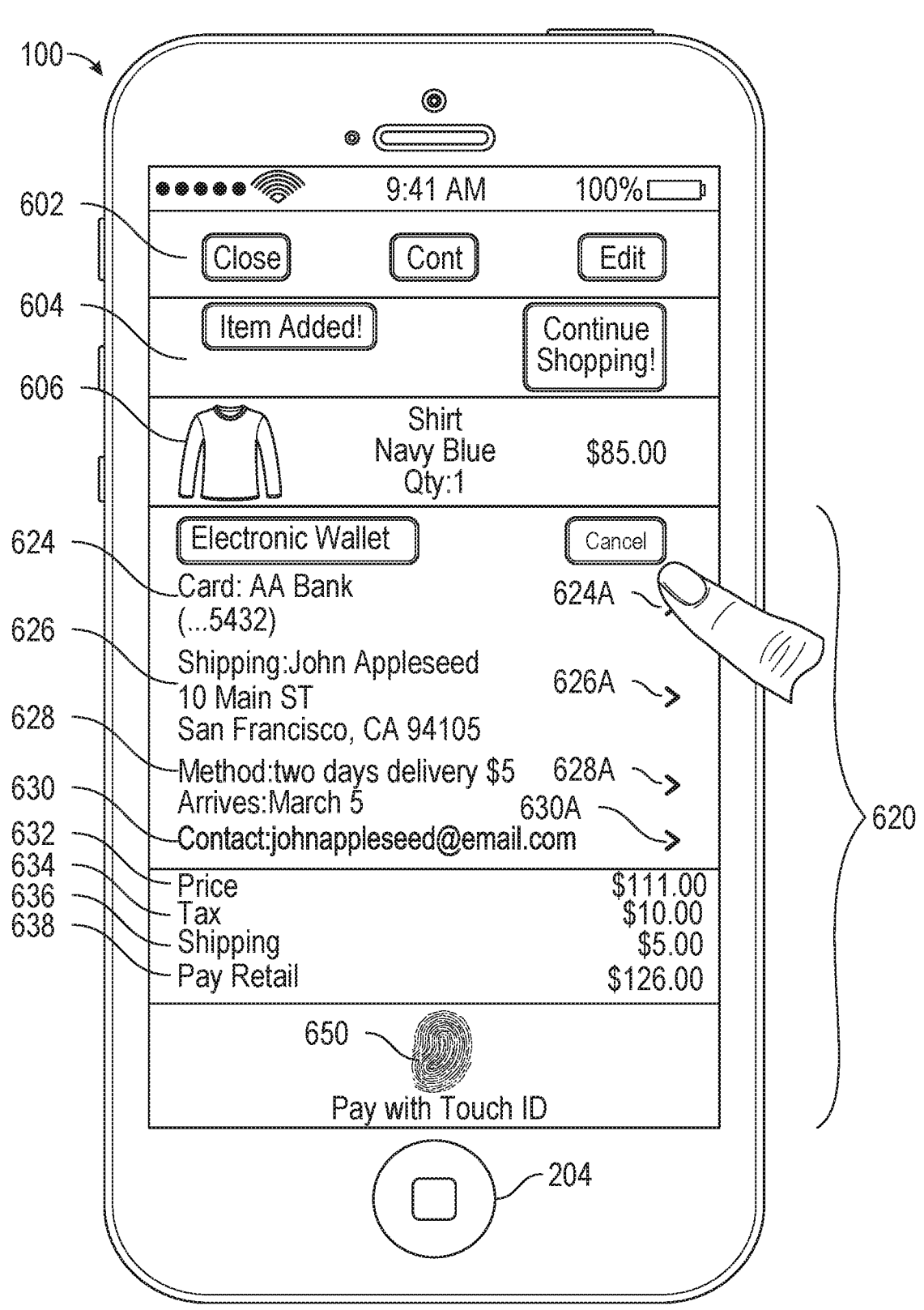
Figure 6D:
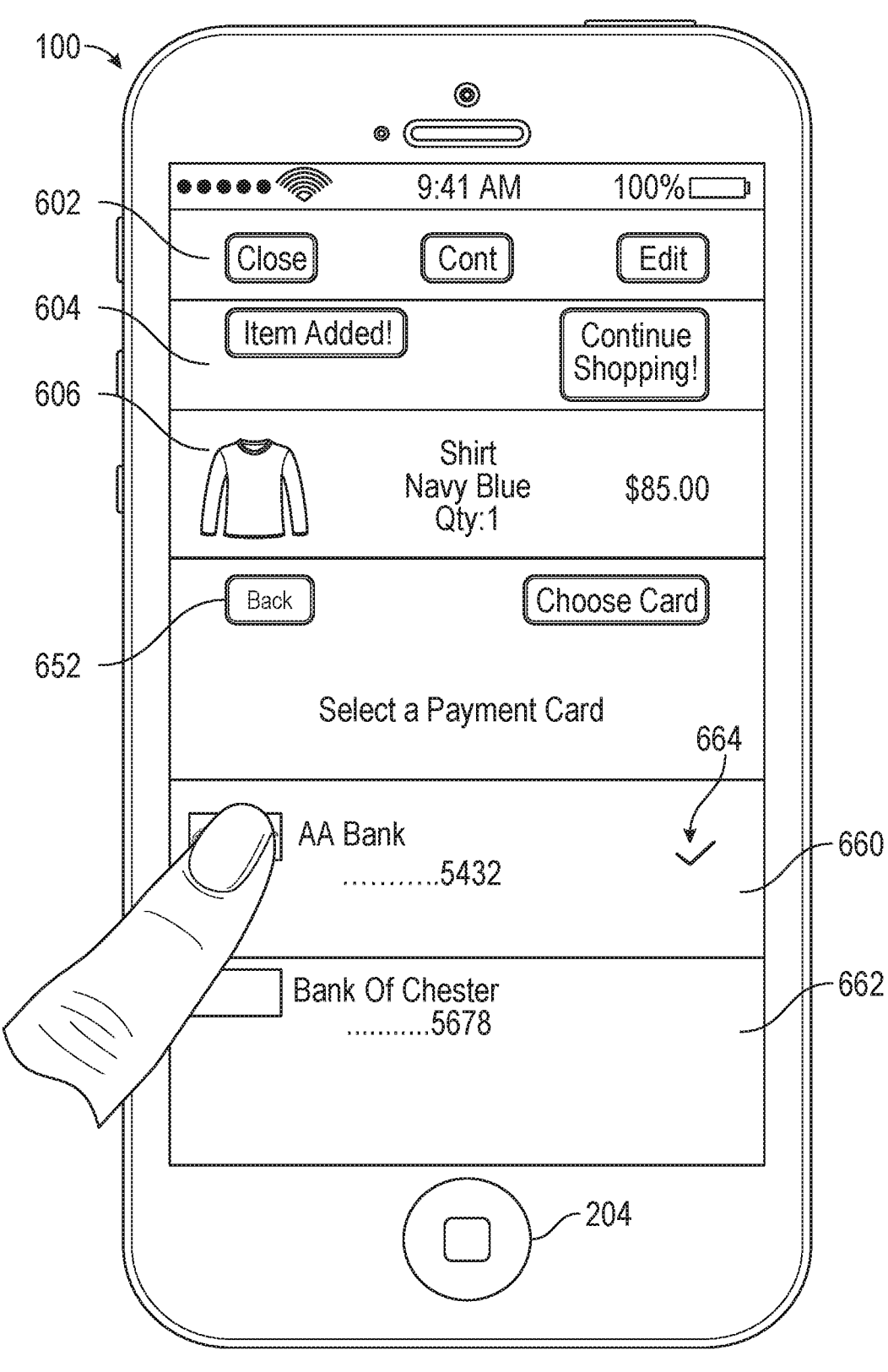

FIGS. 6C-6D illustrate exemplary user interfaces for changing an option of the payment transaction in accordance with some embodiments. In some embodiments, the electronic device receives a selection of (e.g., user taps on) a purchase detail affordance (e.g., caret associated with payment account 624A, shipping address 626A, shipping method 628A, contact information 630A) displayed on the payment user interface 620. The first purchase detail affordance 624A is associated with a first purchase detail (e.g., the selected payment account, shipping address, shipping method, contact information) of the payment transaction. In response to receiving selection of the first purchase detail affordance 624A, the device displays one or more affordances (e.g., displays different options for payment accounts) for selecting an alternate value for the first purchase detail of the payment transaction. For example, when a user selects caret 624A in FIG. 6C, which relates to a payment account for the first purchase detail, the device displays several payment account options 660 and 662 for the first purchase detail, as illustrated in FIG. 6D. The currently selected payment account option 660 is identified, such as by checkmark 664. Thus, the user can change the default payment account 624 that will be used for the payment transaction.

Figure 6E:
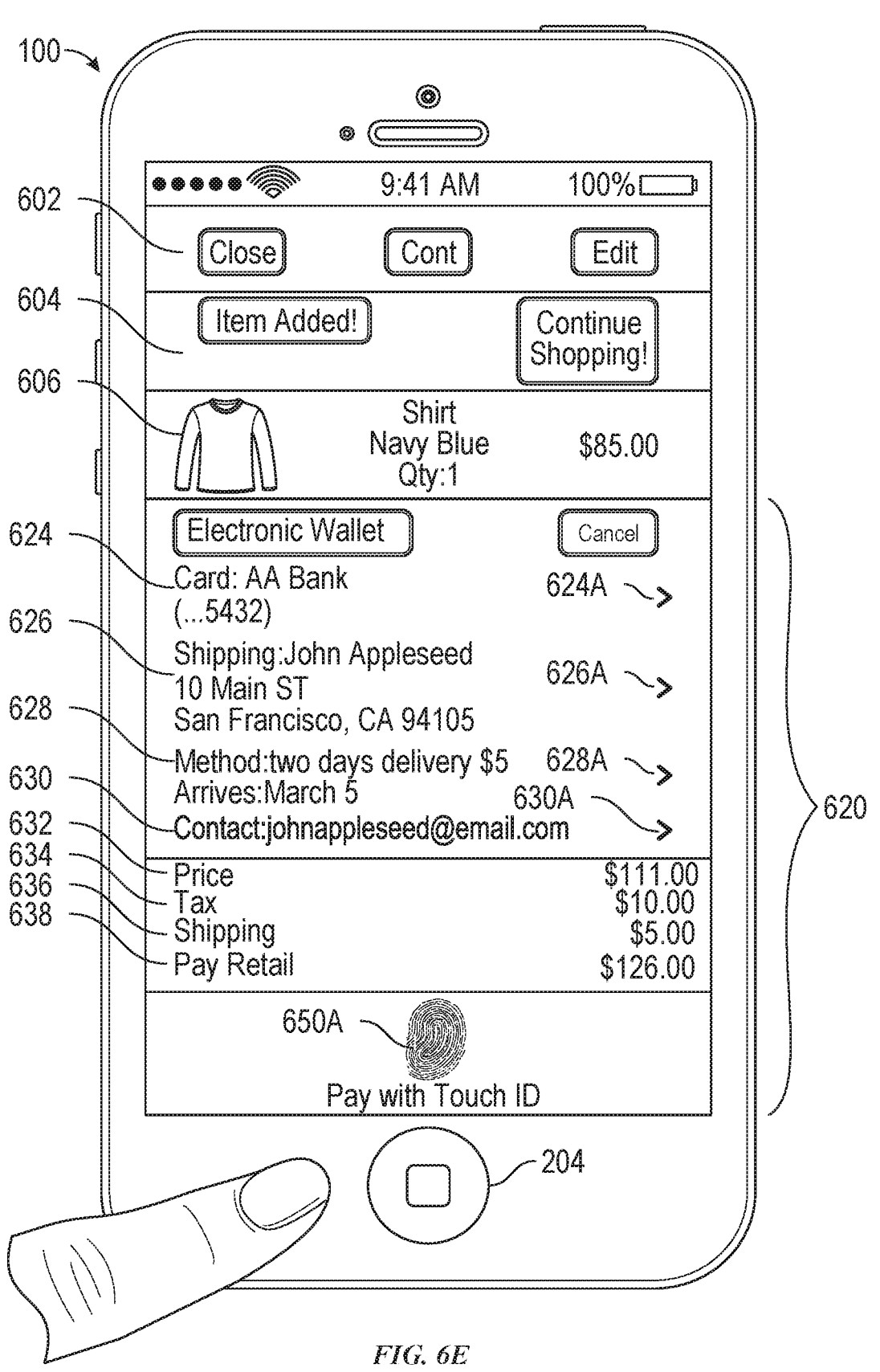
Figure 6F:
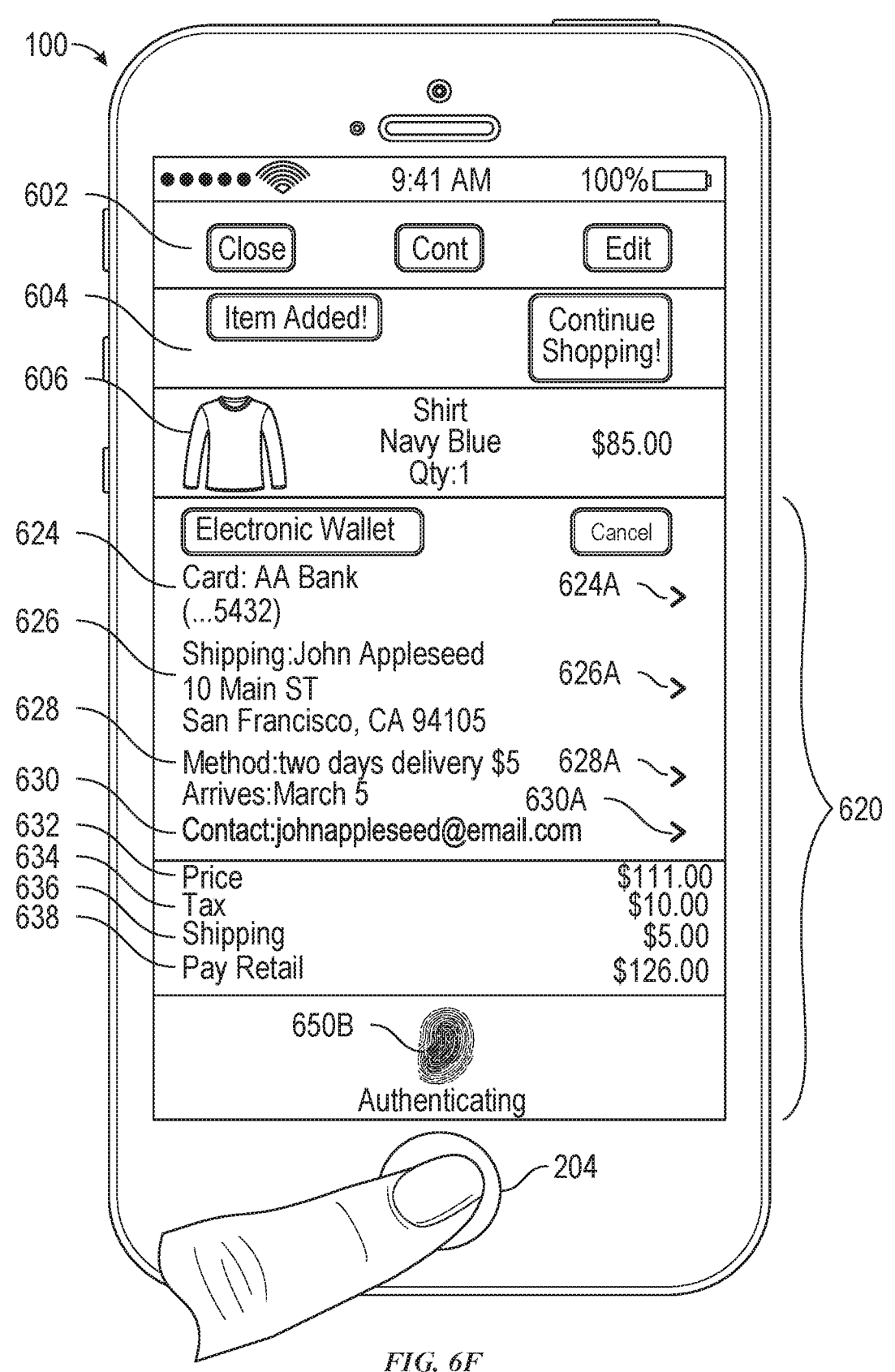
Figure 6G:
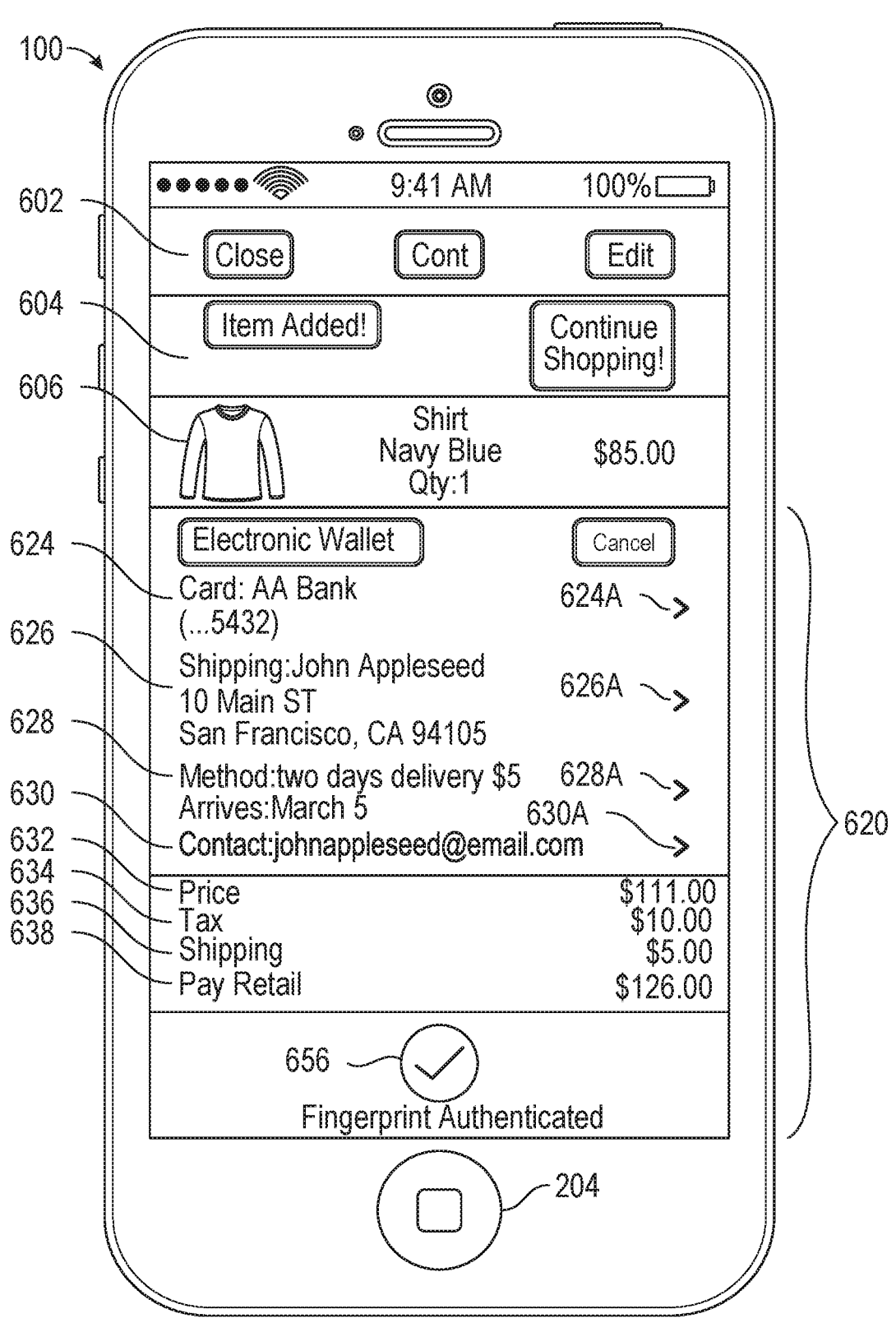

At FIGS. 6E-6F, while displaying the payment user interface 620, the electronic device receives first authorization data (e.g., fingerprint authentication information or a device passcode). In this example, a fingerprint authentication technique is illustrated, as indicated by visual indicator 650A of FIG. 6E instructing the user to provide authentication using fingerprint sensor 204 and visual indicator 650B of FIG. 6F indicating to the user that the user's fingerprint is being read using fingerprint sensor 204.

After receiving the first authorization data, the electronic device determines (e.g., at the electronic device) whether the first authorization data is valid (e.g., the electronic device confirms that the fingerprint or device passcode is authorized for payments). At FIG. 6G, the device has determined that the first authorization data is valid (e.g., that the fingerprint is authorized for payments), as indicated by visual indicator 656.

Figure 6H:
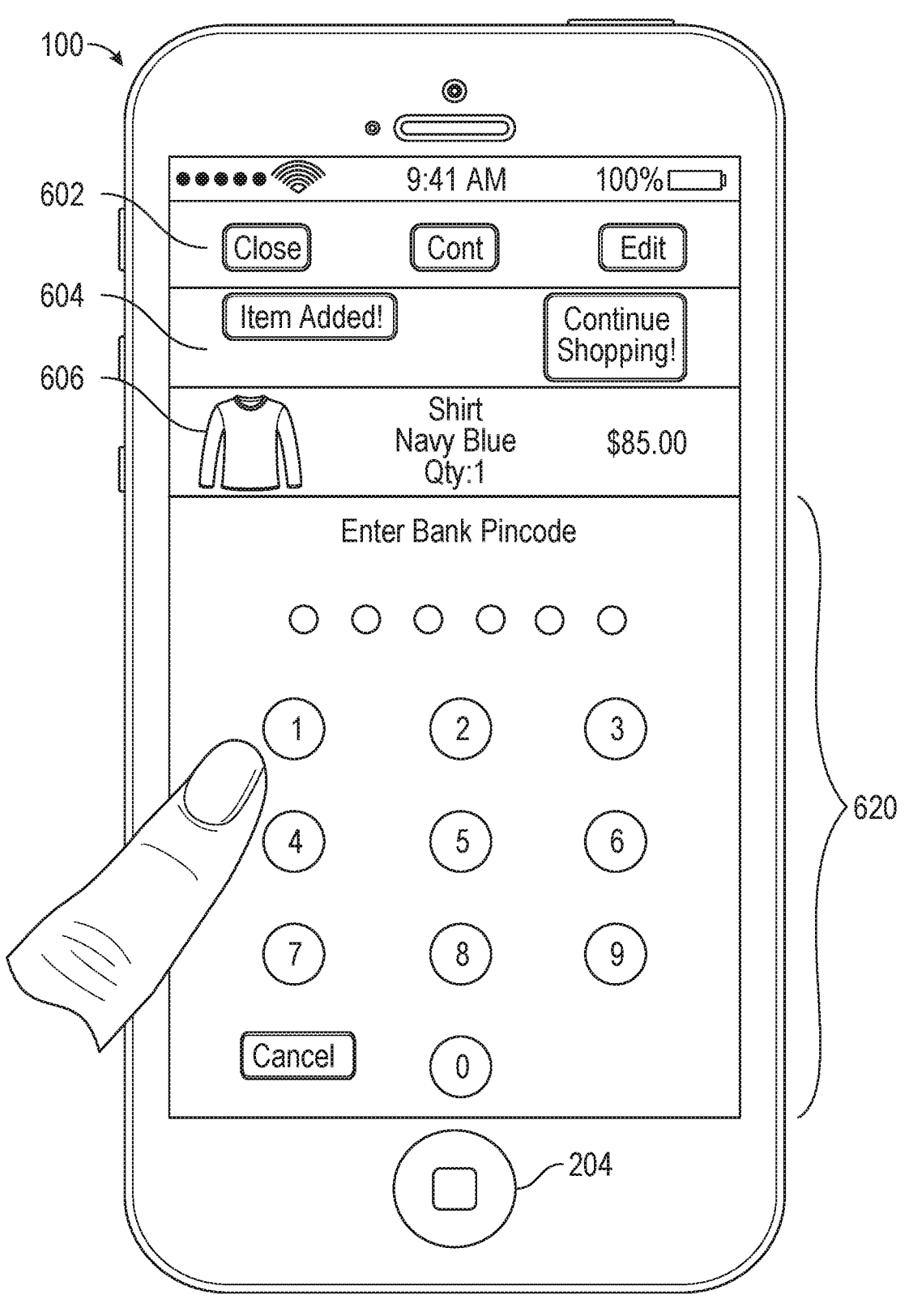
Figure 6I:
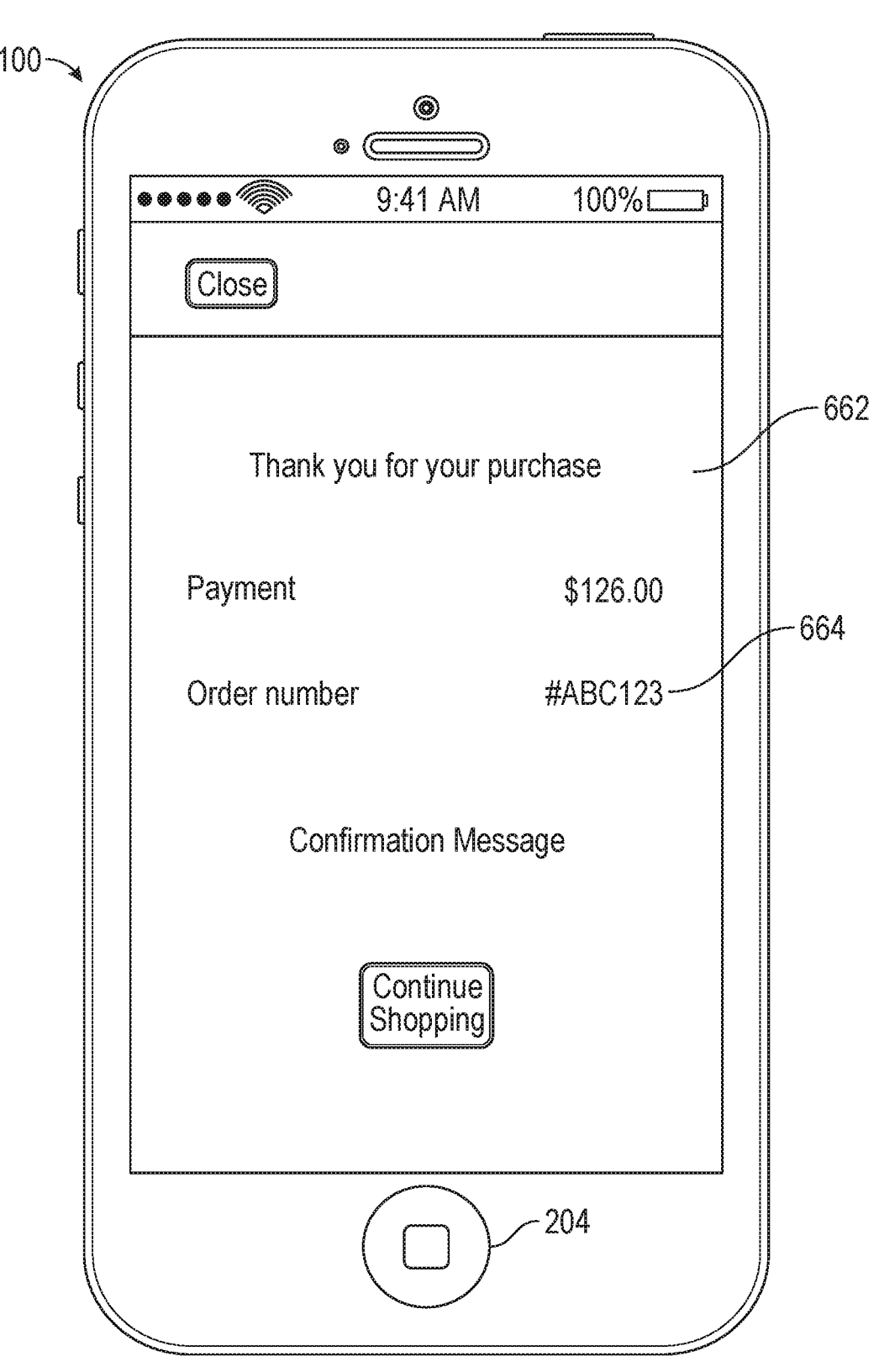

At FIG. 6H, the electronic device receives second authorization data (e.g., a bank personal identification number (pin) authorization code, such as a six-digit numerical value). In this example, the electronic device prompts the user for the second authorization data and receives the second authorization data after receiving the first authorization data. In the example of FIG. 6H, the user may enter the second authorization data using, for example, a keypad. The second authorization data is not limited to keypad entry. The user may provide the second authorization data using a fingerprint sensor, voice commands, or using other techniques. In some examples, the electronic device may receive the second authorization data before receiving the first authorization data.

After receiving the first authorization data and the second authorization data, the electronic device transmits a transaction request (e.g., the transaction request is based on the second authorization data) that corresponds to the payment transaction to one or more remote servers. The electronic device receives a reply to the transaction request. For example, the reply to the transaction request is received from the one or more remote servers or a separate server in communication with the one or more remote servers.

In response to receiving the reply to the transaction request, in accordance with a determination that the transaction request was successful (e.g., that the reply indicates that the transaction request contains valid or authorized second authorization data), the device dismisses the payment user interface (and, optionally, provides an indication of the success of the transaction). For example, at FIG. 6I, the electronic device has received the reply to the transaction request and determined that the transaction request was successful. In accordance with the determination, the device dismisses the payment user interface 620 (e.g., payment user interface 620 is no longer displayed) and displays a confirmation user interface 662 of the first application, including an order number 664.

Figure 6J:
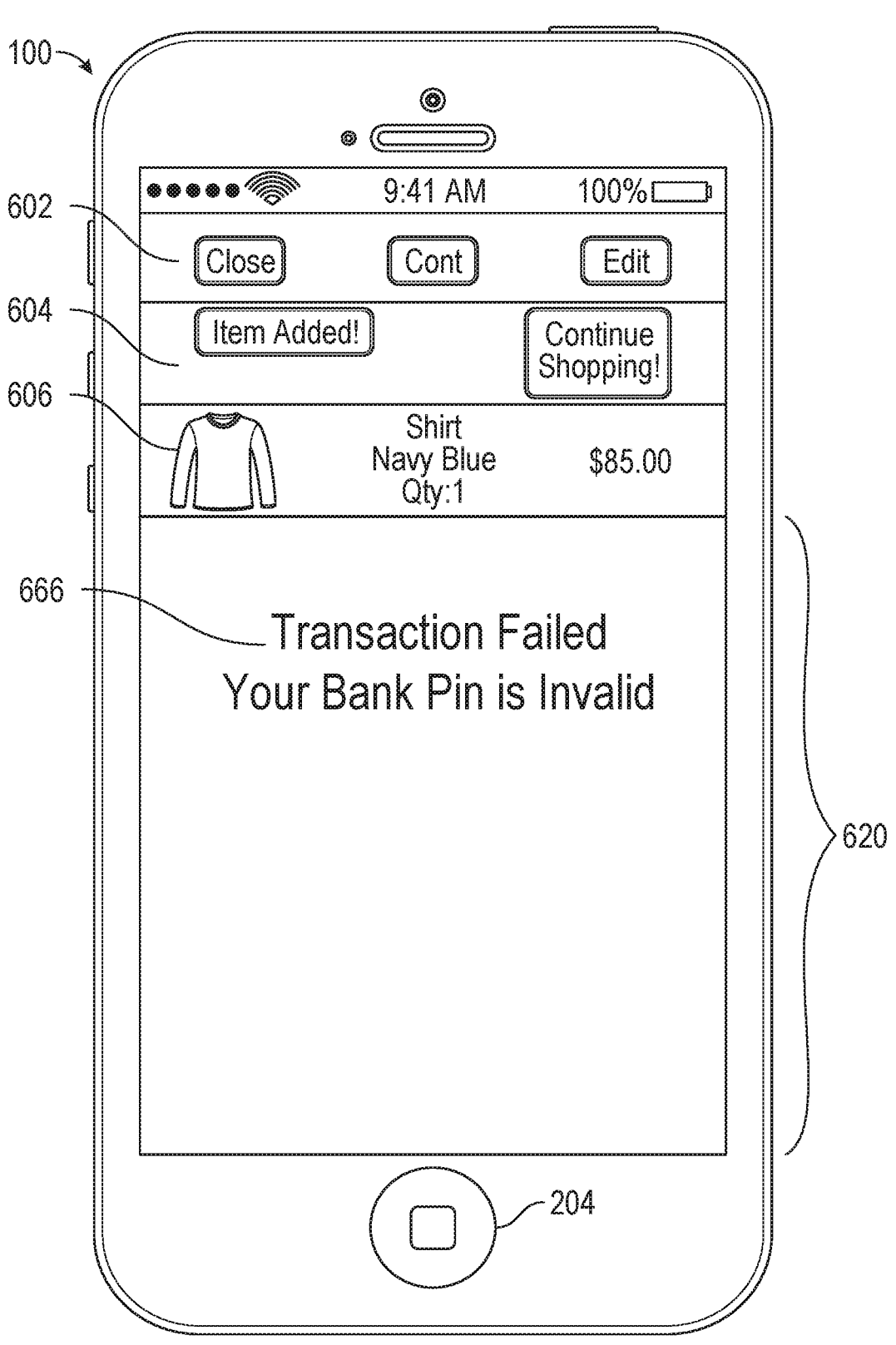

In response to receiving the reply to the transaction request, in accordance with a determination that the transaction request failed (e.g., that the reply indicates that the transaction request did not contain a valid or authorized second authorization data or because of insufficient funds in the payment account), the electronic device maintains display of the payment user interface 620 and updates the payment user interface 620 to display an indication of a reason for failure 666 of the transaction request, such as illustrated in FIG. 6J.

In some embodiments, the indication of the reason for failure of the transaction request comprises an indication that the transaction request failed due to a merchant associated with the payment transaction (e.g., the items from the shopping cart can't be shipped to the provided address or the items from the shopping cart are out of stock) or an indication (e.g., indication 666 of FIG. 6J) that the transaction request failed due to a financial institution (e.g., a bank or other authorizing agent) associated with the payment transaction (e.g., the financial institution determined that there are insufficient funds or that the second authorization data is invalid or not authorized).

In some embodiments, displaying the payment user interface 620 (e.g., a user interface of an operating system) comprises displaying the payment user interface 620 over only a portion of a first user interface (e.g., a user interface of a third-party merchant application or a web browser-accessed website). For example, payment user interface 620 is displayed such that the payment user interface 620 only covers a portion and not all of the first user interface (e.g., the user interface for first application 602, a third-party merchant application, or a web browser-accessed website), thus providing context of the payment transaction initiated using the first user interface. For example, in FIG. 6B, the payment user interface 620 (which, for example, includes displayed items 624, 626, 628, 630, 624A, 626A, 628A, 630A, 632, 634, 636, 638, and 650A) covers the bottom portion of the display of device 100, leaving the top portion of the user interface for the first application 602 visible, including part of the electronic shopping cart 604 and one of the clothing items 606 (e.g., the navy blue shirt for $85.00).

In some embodiments, transmitting the transaction request comprises transmitting the transaction request while displaying the payment user interface 620 and receiving the reply to the transaction request comprises receiving the reply to the transaction request while displaying the payment user interface 620. Thus, the transaction request is sent and a reply is received while the payment user interface 620 is displayed. This limits the need to display different user interfaces.

In some embodiments, in accordance with a determination that the transaction request was successful (and optionally a determination that the second authorization data (e.g., a bank pin authorization code) is not currently stored), the electronic device stores (e.g., in memory of the electronic device) the second authorization data (e.g., the bank pin authorization code) and/or stores (e.g., in memory of the electronic device) a representation of the second authorization data (e.g., an encrypted version of the bank pin authorization code). In accordance with a determination that the transaction request failed, the electronic device forgoes storing (e.g., not storing in memory of the electronic device) the second authorization data (e.g., a bank pin authorization code). Thus, when the user conducts a payment transaction, the device determines whether the payment transaction was successful. If the payment transaction was not successful (e.g., the financial institution indicated that the second authorization data was invalid or not authorized), the electronic device does not store the second authorization data for re-use in the future (because the second authorization data is invalid) and associating the stored second authorization data with the selected payment account.

Figure 6K:
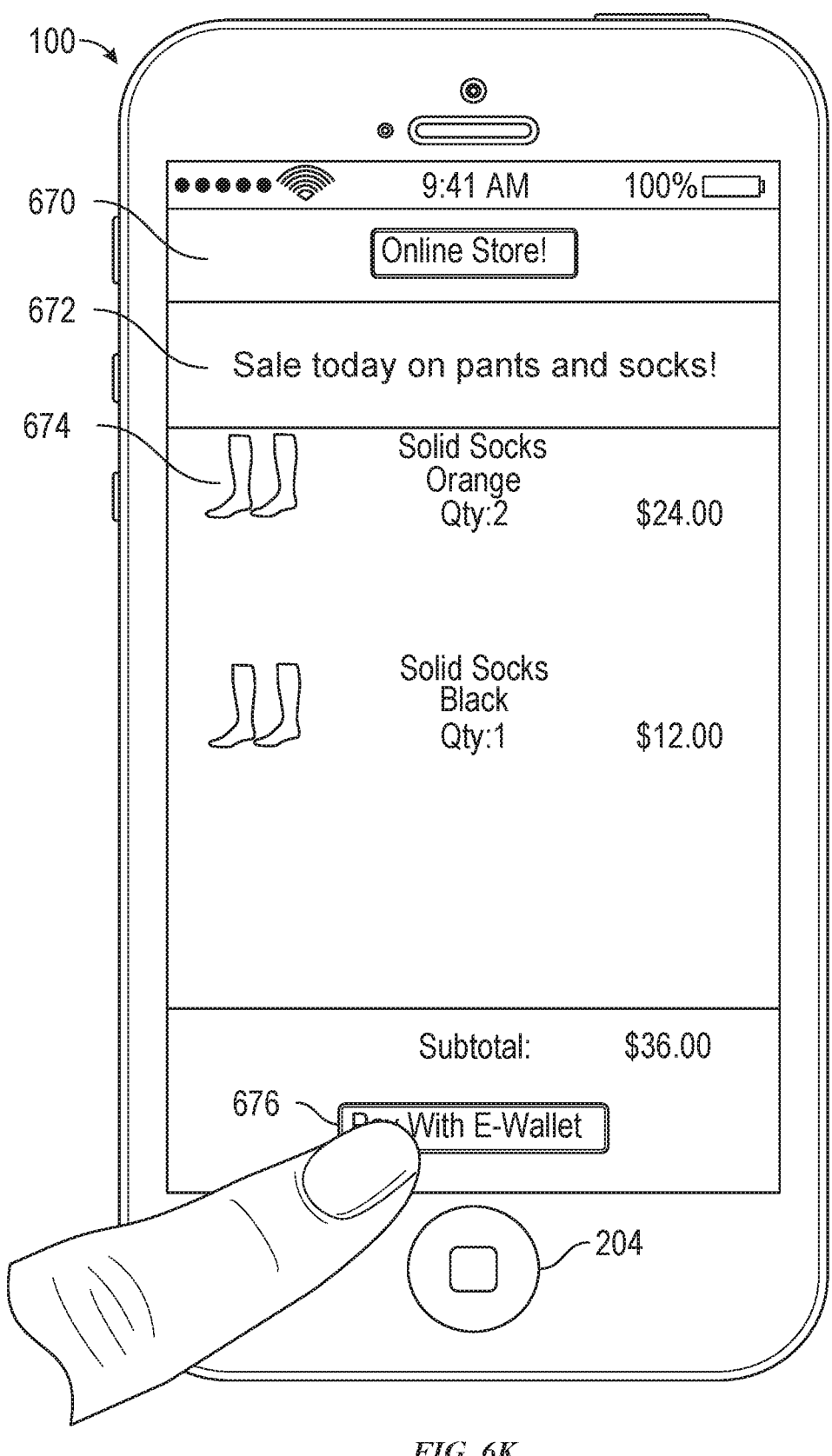

As illustrated in FIG. 6K, in some embodiments, the electronic device detects a second request (e.g., detecting selection of second payment affordance 676 associated with a second payment transaction; a user taps the second payment affordance 676 during a different shopping experience using an application different from the first application) to initiate a second payment transaction. For example, as illustrated in FIG. 6K, the second payment affordance 676 may be displayed as part of a user interface 670 of an application that is different from the first application. The user interface 670 may include an advertisement 672 and items 674 in an electronic shopping cart.

Figure 6L:
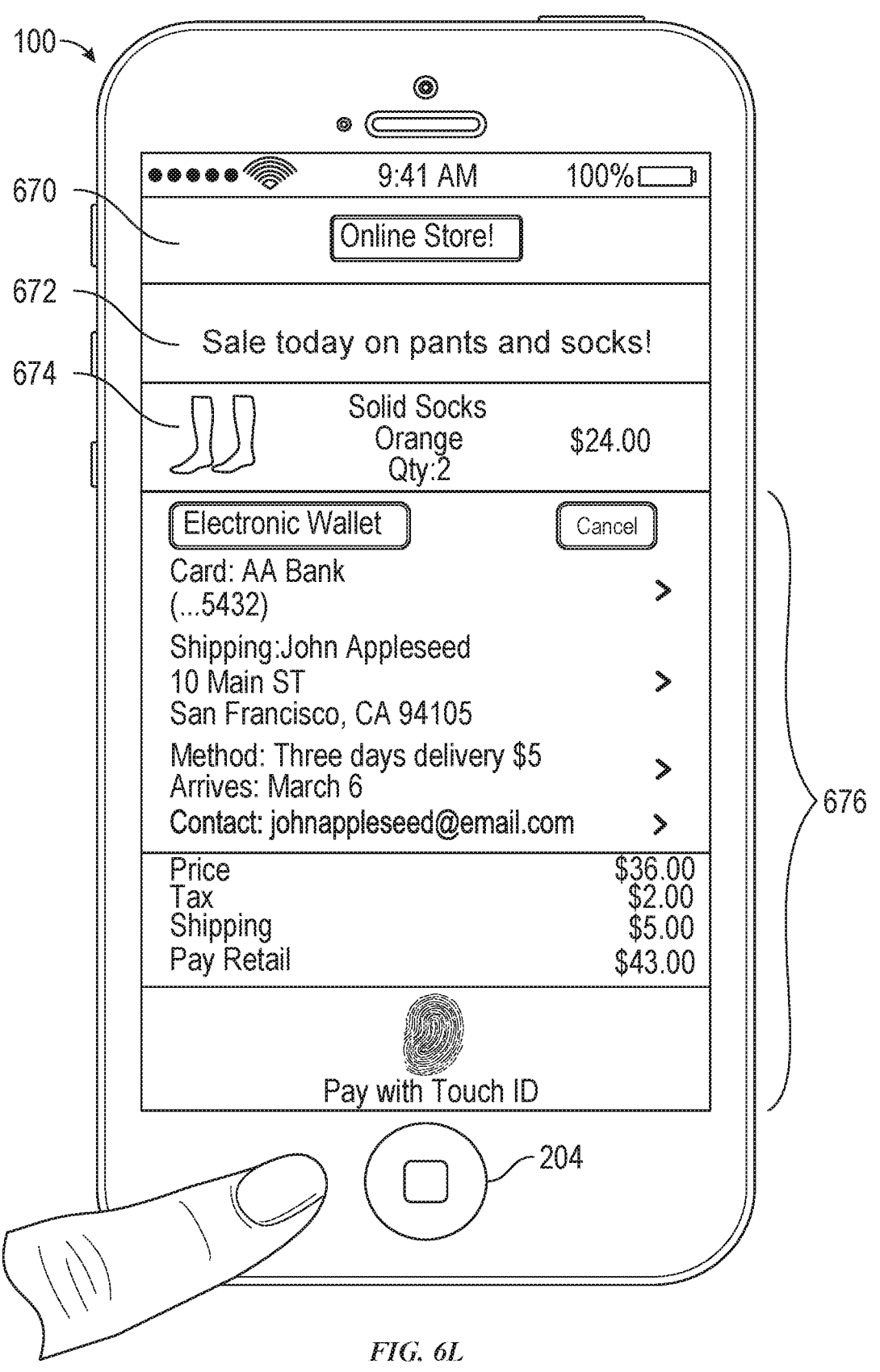
Figure 6M:
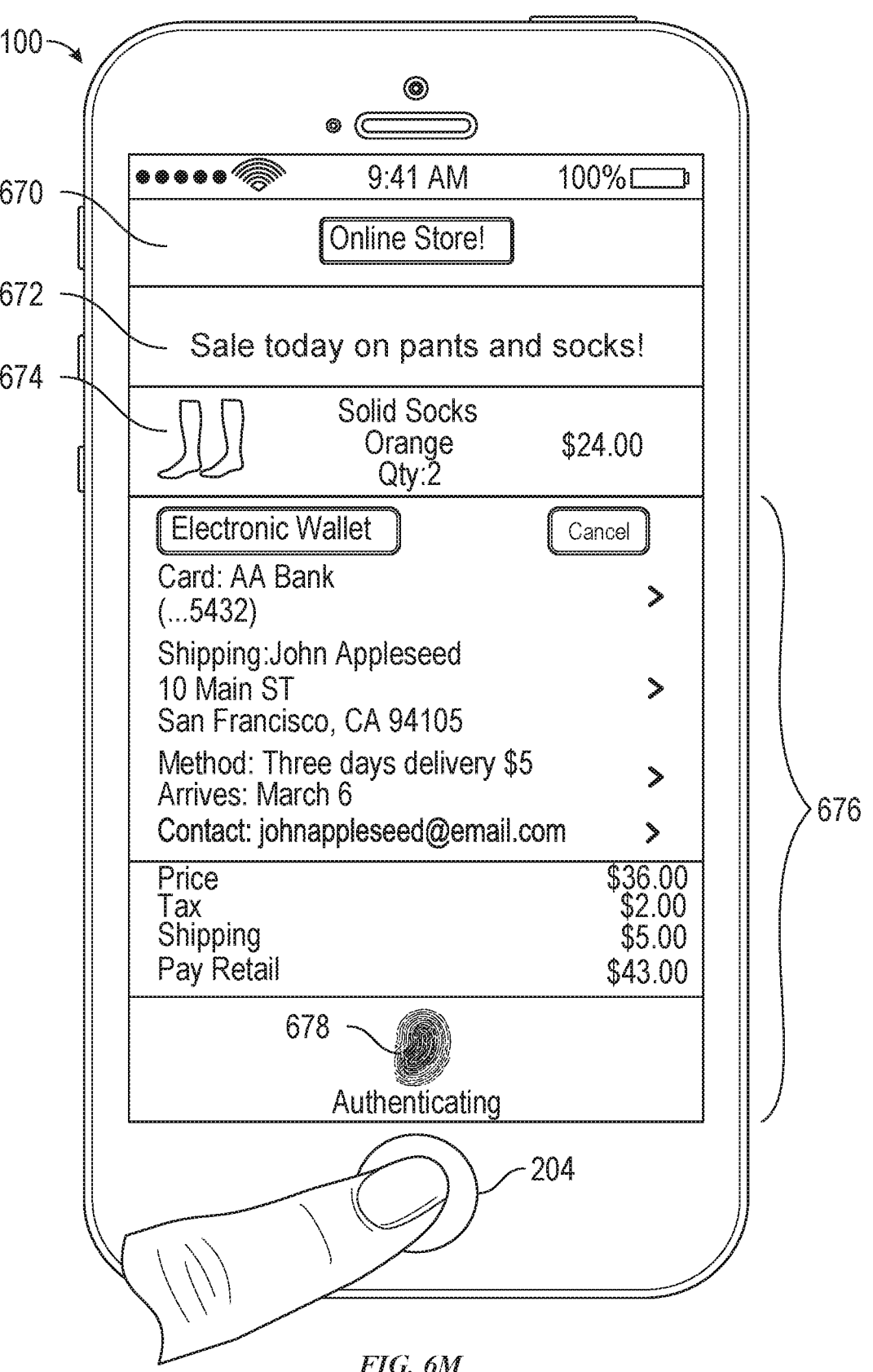
Figure 6N:

At FIG. 6L, in response to detecting the second request to initiate the second payment transaction, the electronic device displays a second payment user interface 676. At FIG. 6M, while displaying the second payment user interface 676, the electronic device receives third authorization data (e.g., fingerprint authentication information or device passcode). In some examples, the third authorization data has the same value (or represents the same fingerprint) as the first authorization data. After receiving the third authorization data, the electronic device determines (e.g., at the electronic device) whether the third authorization data is valid (e.g., the electronic device confirms that the fingerprint or device passcode is authorized for payments), as indicated by indicator 678 of FIG. 6M and indicator 680 of FIG. 6N.

After receiving the third authorization data (and without receiving the second authorization data from the user again (e.g., without requesting or receiving the bank pin authorization code again from the user)), the electronic device transmits a second transaction request (e.g., based on (or including) the stored second authorization data or a representation of the stored second authorization data) that corresponds to the second payment transaction to one or more remote servers. The second transaction request is based at least in part on a stored representation of the second authorization data. Optionally, the electronic device transmits the second transaction request only after determining that the third authorization data is valid, such as indicated by indicator 680 of FIG. 6N. The electronic device receives (e.g., from the one or more remote servers) a reply to the second transaction request.

Figure 6O:
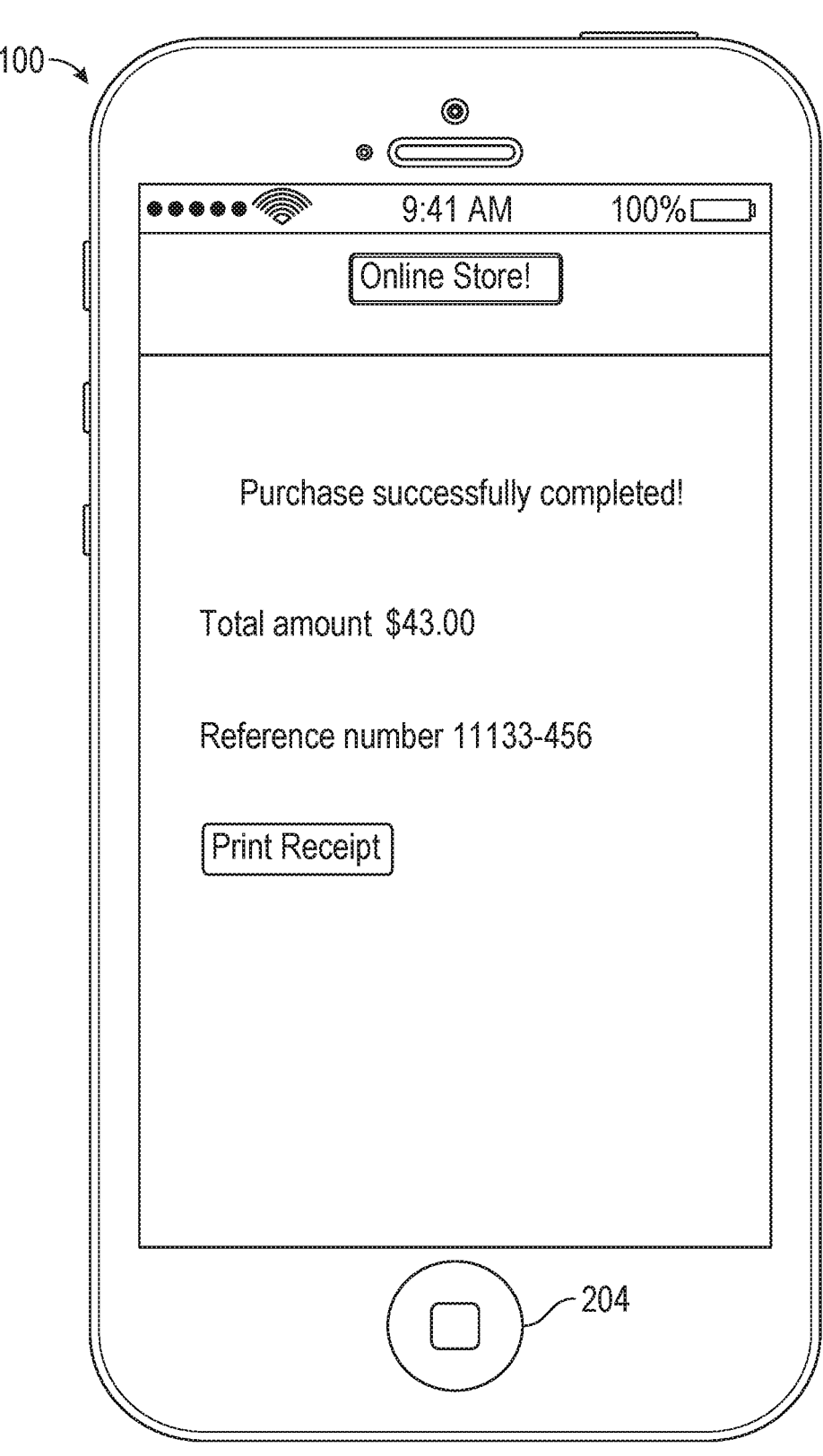

In response to receiving the reply to the second transaction request, in accordance with a determination that the second transaction request was successful, the electronic device dismisses the second payment user interface (and, optionally, providing an indication of the success of the transaction), as illustrated in FIG. 6O. In response to receiving the reply to the second transaction request, in accordance with a determination that the second transaction request failed, maintaining display of the second payment user interface and updating the second payment user interface to display a second indication of a second reason for failure of the second transaction request.

In some embodiments, transmitting the transaction request (e.g., based on the stored second authorization data) that corresponds to the payment transaction to the one or more remote servers comprises transmitting the second authorization data to a financial institution (e.g., a bank or other authorizing agent).

In some embodiments, in accordance with the determination that the transaction request failed (e.g., insufficient funds, wrong pin): while displaying the payment user interface, the electronic device receives third authorization data (e.g., fingerprint authentication information or a device passcode); after receiving the third authorization data, the electronic device determines (e.g., at the electronic device) whether the third authorization data is valid (e.g., confirms that the fingerprint or device passcode is authorized for payments). The electronic device receives fourth authorization data (e.g., a bank pin authorization code). After receiving the third authorization data and the fourth authorization data, the electronic device transmits a second transaction request (e.g., based on the stored second authorization data) that corresponds to the payment transaction to one or more remote servers; and the electronic device receives a second reply to the transaction request (e.g., from the one or more remote servers). Thus, for example, if the transaction request fails, as illustrated in FIG. 6J, and the user initiates a second attempt to complete the transaction, the user must again authenticate using two authentication methods, such as using fingerprint authorization that is authenticated locally, as illustrated in FIG. 6F, and using a bank pin authorization code that is authenticated at a remote server, as illustrated in FIG. 6H.

In some embodiments, receiving first authorization data (e.g., fingerprint authentication information or a device passcode) comprises detecting a respective fingerprint on a fingerprint sensor of the electronic device, and wherein determining (e.g., at the electronic device) whether the first authorization data is valid (e.g., confirm that the fingerprint authentication information or device passcode is authorized for payments) comprises determining whether the respective fingerprint is consistent with an enrolled fingerprint that is enabled to authorize payment transactions.

In some embodiments, receiving first authorization data (e.g., fingerprint authentication information or a device passcode) comprises receiving a payment passcode (e.g., using a physical or displayed keypad), and determining (e.g., at the electronic device) whether the first authorization data is valid (e.g., confirming that the fingerprint or device passcode is authorized for payments) comprises determining whether the payment passcode is consistent with an enrolled passcode that is enabled to authorize payment transactions.

In some embodiments, the first authorization data is different from the second authorization data (e.g., the device passcode is different than the bank pin authorization code). For example, the user may have previously selected a device passcode for making payments using the electronic device (and/or unlocking the electronic device) and the user may have previously selected (or have been assigned) a separate bank pin authorization code for making payments using a particular payment account.

In some embodiments, the second authorization data may not be needed when the electronic device is within a particular country or region, and the second authorization data may be needed when the electronic device is not within the particular country or region. This policy may be, for example, set by the bank that services the payment account. The electronic device determines a current location of the electronic device. The second authorization data is requested from the user (and subsequently received) in accordance with determining that the current location of the electronic device is within a first predefined geographical area (e.g., a first country or other geographical area in which a second form of authentication is required to authorize payment transactions). In contrast, in accordance with a determination that the electronic device is in a second predefined geographical area (e.g., outside of the first predefined geographical area or in a second country different from the first country), the electronic device authenticates the payment transaction with only a single form of authentication (e.g., the electronic device only requests and uses the first authorization data). For example, the bank processing the payment request may require that the payment request include the bank pin authorization code when the electronic device is within a particular country.

In some embodiments, the electronic device determines whether a payment amount of the payment transaction meets a predefined criteria (e.g., the payment amount is larger than a threshold payment amount). The second authorization data is (e.g., only) requested from the user (and subsequently received) in accordance with a determination that the payment amount of the payment transaction meets a predefined criteria (e.g., the payment amount is larger than a threshold payment amount). In contrast, in accordance with a determination that the payment amount of the payment transaction does not meet the predefined criteria (e.g., the payment amount is equal to or less than the threshold payment amount), the electronic device authenticates the payment transaction with only a single form of authentication (e.g., the electronic device only requests and uses the first authorization data). For example, the user may have previously requested that the bank pin authorization code only be transmitted to the one or more servers when the total amount (e.g., price) of the transaction exceeds a certain amount. For another example, the bank processing the payment request may require that the payment request include the bank pin authorization code when the total amount of the transaction exceeds a certain amount.

In some embodiments, a first entropy of the first authorization data is higher than a second entropy of the second authorization data (e.g., it is more difficult to guess the user's device passcode than to guess the bank pin authorization code). This is particularly helpful when the electronic device stores the bank pin authorization code (or a representation of the bank pin authorization code) and thus the electronic device must protect the bank pin authorization code.

FIG. 7 is a flow diagram illustrating a method for conducting a payment transaction using an electronic device in accordance with some embodiments. Method 700 is performed at a device (e.g., 100, 300, 500). Some operations in method 700 may be combined, the order of some operations may be changed, and some operations may be omitted.

As described below, method 700 provides an intuitive way for conducting a payment transaction. The method reduces the cognitive burden on a user for conducting the payment transaction, thereby creating a more efficient human-machine interface. For battery-operated computing devices, enabling a user to conduct payment transactions faster and more efficiently conserves power and increases the time between battery charges.

At block 702, the electronic device detects a request to initiate a payment transaction For example, the device detects selection of a payment affordance (e.g., 610 of FIG. 6A) associated with a payment transaction.

At block 704, in response to detecting the request to initiate the payment transaction, the electronic device displays a payment user interface (e.g., 620 of FIG. 6B).

At block 706, while displaying the payment user interface, the electronic device receives first authorization data (e.g., fingerprint authentication information or a device passcode).

At block 708, after receiving the first authorization data, the electronic device determines (e.g., at the electronic device) whether the first authorization data is valid (e.g., the electronic device confirms that the fingerprint or device passcode is authorized for payments).

At block 710, the electronic device receives second authorization data (e.g., a bank pin authorization code).

At block 712, after receiving the first authorization data (e.g., fingerprint authentication information or a device passcode) and the second authorization data (e.g., a bank pin authorization code), the electronic device transmits a transaction request (e.g., based on the second authorization data) that corresponds to the payment transaction to one or more remote servers.

At block 714, the electronic device receives a reply to the transaction request.

At block 716, in response to receiving the reply to the transaction request: in accordance with a determination that the transaction request was successful, the electronic device dismisses the payment user interface (and, optionally, providing an indication of the success of the transaction); and in accordance with a determination that the transaction request failed (e.g., because of insufficient funds, wrong bank pin authorization code), the electronic device maintains display of the payment user interface (e.g., 620) and updates the payment user interface (e.g., 620) to display an indication (e.g., 666 of FIG. 6J) of a reason for failure of the transaction request.

In some embodiments, the indication (e.g., 666 of FIG. 6J) of the reason for failure of the transaction request comprises: an indication that the transaction request failed due to a merchant associated with the payment transaction (e.g., items can't be shipped to provided address or items out of stock); or an indication (e.g., 666 of FIG. 6J) that the transaction request failed due to a financial institution (e.g., a bank or other authorizing agent) associated with the payment transaction (e.g., insufficient funds, wrong bank pin authorization code).

In some embodiments, displaying the payment user interface (e.g., 620) comprises displaying the payment user interface (e.g., 620) over only a portion of a first user interface (e.g., 602) (e.g., such that the payment user interface only covers a portion and not all of the first user interface, thus providing context of the transaction initiated using the first user interface).

In some embodiments, transmitting the transaction request comprises transmitting the transaction request while displaying the payment user interface (e.g., 620) and wherein receiving the reply to the transaction request comprises receiving the reply to the transaction request while displaying the payment user interface (e.g., 620).

In some embodiments, in accordance with a determination that the transaction request was successful (and optionally a determination that the bank pin authorization code is not currently stored), the electronic device stores (e.g., in memory of the electronic device) the second authorization data (e.g., the bank pin authorization code). In accordance with a determination that the transaction request failed, the electronic device forgoes storing (e.g., not storing in memory of the electronic device) the second authorization data (e.g., a bank pin authorization code).

In some embodiments, the electronic device detects a second request to initiate a second payment transaction (e.g., detecting selection of another payment affordance 676 associated with a second payment transaction). In response to detecting the second request to initiate the second payment transaction, the electronic device displays a second payment user interface (e.g., 676). While displaying the second payment user interface, the electronic device receives third authorization data (e.g., fingerprint authentication information or a device passcode). After receiving the third authorization data, the electronic device determines (e.g., at the electronic device) whether the third authorization data is valid (e.g., confirms that the fingerprint authentication information or device passcode is authorized for payments). After receiving the third authorization data (and without receiving the second authorization data from the user again (e.g., the bank pin authorization code)), the electronic device transmits a second transaction request (e.g., based on the stored second authorization data) that corresponds to the second payment transaction to one or more remote servers, wherein the second transaction request is based at least in part on a stored representation of the second authorization data. The electronic device receives a second reply to the second transaction request.

In some embodiments, in response to receiving the second reply to the second transaction request: in accordance with a determination that the second transaction request was successful, the electronic device dismisses the second payment user interface (and, optionally, provides an indication of the success of the transaction); and in accordance with a determination that the second transaction request failed, the electronic device maintains display of the second payment user interface and updates the second payment user interface to display a second indication of a second reason for failure of the second transaction request.

In some embodiments, transmitting the transaction request (e.g., based on the stored second authorization data) that corresponds to the payment transaction to the one or more remote servers comprises transmitting the second authorization data to a financial institution (e.g., a bank or other authorizing agent).

In some embodiments, in accordance with the determination that the transaction request failed (e.g., insufficient funds, wrong pin): while displaying the payment user interface, the electronic device receives third authorization data (e.g., fingerprint authentication information or a device passcode); after receiving the third authorization data, the electronic device determines (e.g., at the electronic device) whether the third authorization data is valid (e.g., confirms that the fingerprint or device passcode is authorized for payments); the electronic device receives fourth authorization data (e.g., a bank pin authorization code); after receiving the third authorization data and the fourth authorization data, the electronic device transmits a second transaction request (e.g., based on the stored second authorization data) that corresponds to the payment transaction to one or more remote servers; and the electronic device receives a second reply to the transaction request.

In some embodiments, receiving first authorization data (e.g., fingerprint authorization information or device passcode) comprises detecting a respective fingerprint on a fingerprint sensor of the electronic device, and wherein determining (e.g., at the electronic device) whether the first authorization data is valid (e.g., confirm that the fingerprint or device passcode is authorized for payments) comprises determining whether the respective fingerprint is consistent with an enrolled fingerprint that is enabled to authorize payment transactions.

In some embodiments, receiving first authorization data (e.g., fingerprint authorization information or device passcode) comprises receiving a payment passcode (e.g., using a keypad), and wherein determining (e.g., at the electronic device) whether the first authorization data is valid (e.g., confirm that the fingerprint or device pin is authorized for payments) comprises determining whether the payment passcode is consistent with an enrolled passcode that is enabled to authorize payment transactions.

In some embodiments, the first authorization data is different from the second authorization data (e.g., the payment passcode is different from the bank pin authorization code).

In some embodiments, the second authorization data is requested from the user (and subsequently received) in accordance with a determination that a current location of the electronic device is within a first predefined geographical area (e.g., a first country or other geographical area in which a second form of authentication is required to authorize payment transactions). In contrast, in accordance with a determination that the electronic device is in a second predefined geographical area (e.g., outside of the first predefined geographical area or in a second country different from the first country), the electronic device authenticates the payment transaction with only a single form of authentication (e.g., the first authorization data).

In some embodiments, the second authorization data is requested from the user (and subsequently received) in accordance with a determination that a payment amount of the payment transaction meets a predefined criteria (e.g., the payment amount is larger than a threshold payment amount). In contrast, in accordance with a determination that the payment amount of the payment transaction does not meet the predefined criteria (e.g., the payment amount is not larger than the threshold payment amount), the electronic device authenticates the payment transaction with only a single form of authentication (e.g., the first authorization data).

Note that details of the processes described above with respect to method 700 (e.g., FIG. 7) are also applicable in an analogous manner to the methods described below. For example, methods 900 and 1100 may include one or more of the characteristics of the various methods described above with reference to method 700. For brevity, these details are not repeated below.

FIGS. 8A-8K illustrate exemplary techniques and user interfaces for conducting a payment transaction using a short-range communication radio, such as a near field communication (NFC) radio, in accordance with some embodiments. The techniques and user interfaces in these figures are used to illustrate the processes described below, including the process in FIG. 9.

The NFC standards, which are related to radio-frequency identification (RFID) standards, describe communication protocols for transferring information between two devices, such as for making payments. It should be appreciated, however, that other communications standards and techniques may also be used.

Devices 100 (and devices 300 and 500) may include near field communications circuitry, such as a short range communication radio and physical input mechanism 204 (e.g., mechanical or capacitive button) that includes an integrated biometric sensor. Accordingly, device 100 can wirelessly communicate with external equipment, such as NFC-enabled contactless payment transaction terminal 850, using near field communications. For example, the near field communications circuitry in device 100 may include a near field transmitter and a near field receiver. Near field communications for device 100 may be supported using capacitive coupling near field communications structures and/or inductive coupling near field communications structures. In near field communications techniques, wireless signals are typically conveyed, for example, over distances of 1 m or less, 100 cm or less, 10 cm or less, or 1 cm or less, and are not conveyed over longer distances.

Figure 8A:
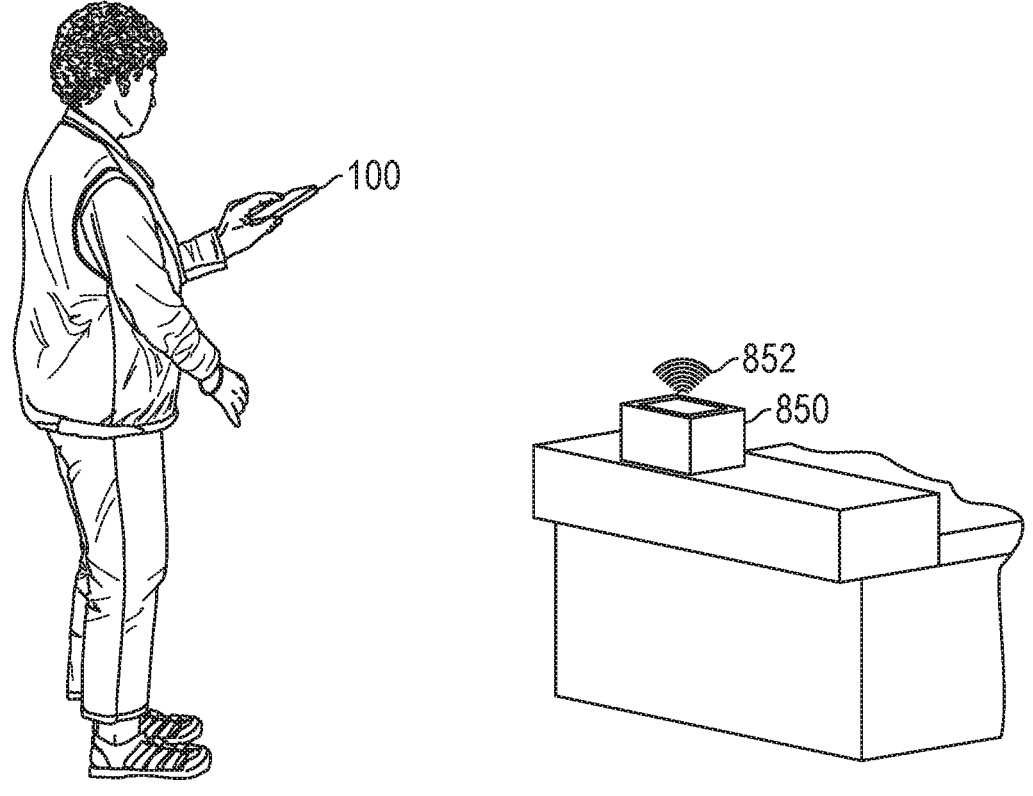
FIGS. 8A-8K illustrate exemplary techniques and user interfaces for conducting a payment transaction using a short-range communication radio in accordance with some embodiments.

In FIG. 8A, the NFC-enabled contactless payment transaction terminal 850 generates a field 852. For example, an NFC-enabled device that enters the field 852 can communicate with the contactless payment transaction terminal 850 using NFC. In FIG. 8A, the electronic device 100 has not been placed in the field 852. The contactless payment transaction terminal 850 may be part of a payment system (e.g., check register) installed in a retail store for processing payment transactions, such as purchases of products and services.

In some embodiments, electronic device 100 receives authorization (e.g., from the user, as described in detail below) to enable the electronic device to participate in payment transaction via short-range communication radio. Optionally, the authorization is only valid for a predetermined period of time (e.g., up to 30 seconds). If the user places the device into field 852 after receiving authorization and before the predetermined period of time has elapsed, the device will proceed with the payment transaction (e.g., a payment of funds being solicited by the contactless payment transaction terminal 850). After the predetermined period of time has elapsed, the device will no longer be enabled to participate in payment transaction via short-range communication radio (unless the user authorizes the device again), and accordingly the device will not proceed with the payment transaction, even if placed within range of the field 852. Thus, optionally, the electronic device does not stay enabled indefinitely after being enabled to participate in payment transaction via short-range communication radio.

By enabling the electronic device to participate in a payment transactions via short-range communication radio prior to the electronic device being placed within range of the field 852, the user is able to reduce the user interactions required with the electronic device once the electronic device is placed within range of the field 852, facilitating a simplified user experienced. Further, some NFC-enabled contactless payment transaction terminals use a reduced timeout duration. This reduced timeout duration requires that, for a successful payment transaction, the payment transaction be completed within a short duration of time, starting from the time the contactless payment transaction terminal detects that a device has entered the field of the contactless payment transaction terminal. By enabling the electronic device to participate in payment transaction via the short-range communication radio prior to the electronic device being within range of the field 852, the rate of timeouts is decreased and the rate of successful payment transactions is increase.

Electronic device 100 includes a short-range communication radio (e.g., NFC radio) and a physical input mechanism 204 (e.g., mechanical or capacitive button). The physical input mechanism 204 includes an integrated biometric sensor, such as a fingerprint sensor.

Figure 8B:
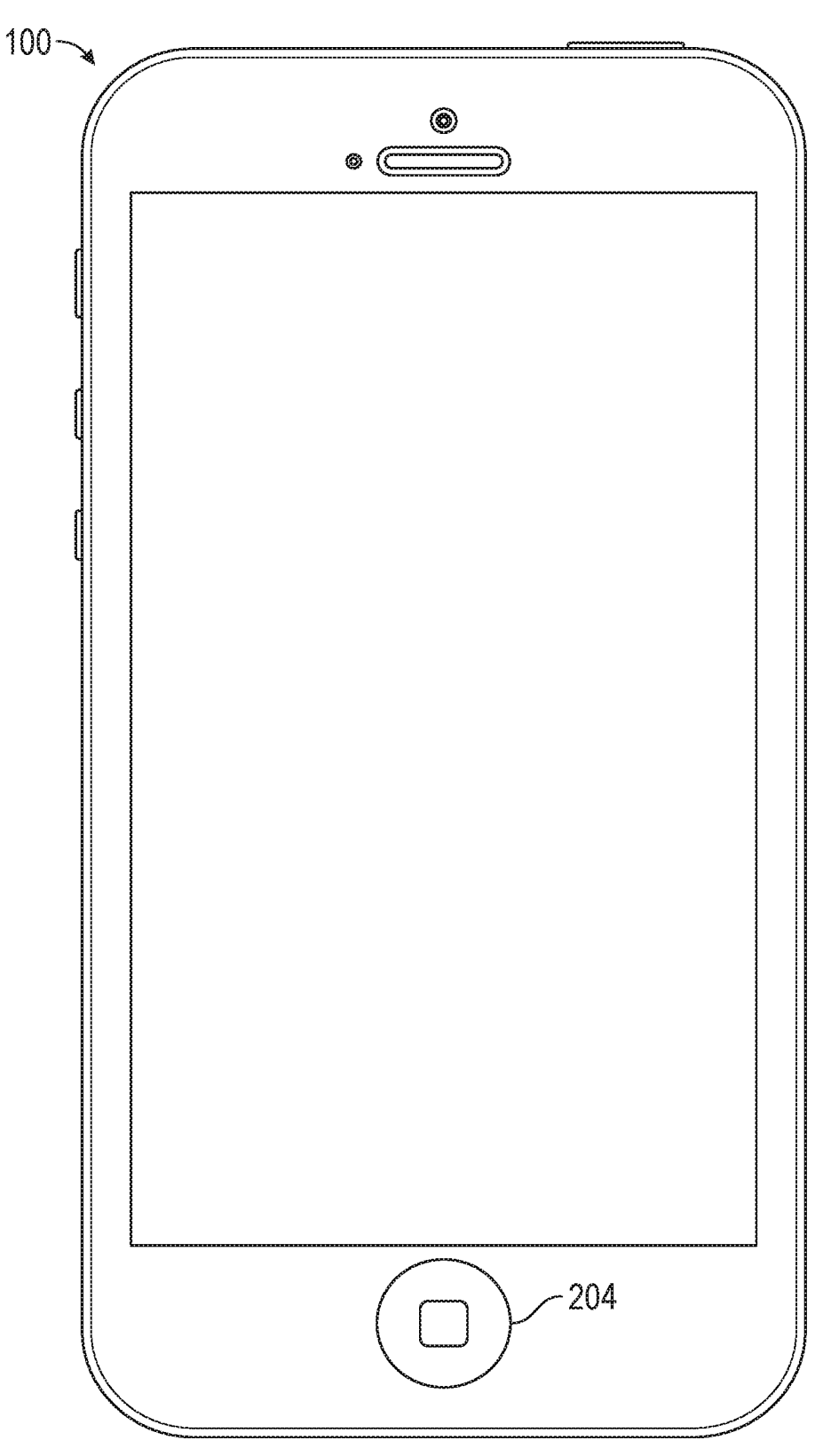
Figure 8C:
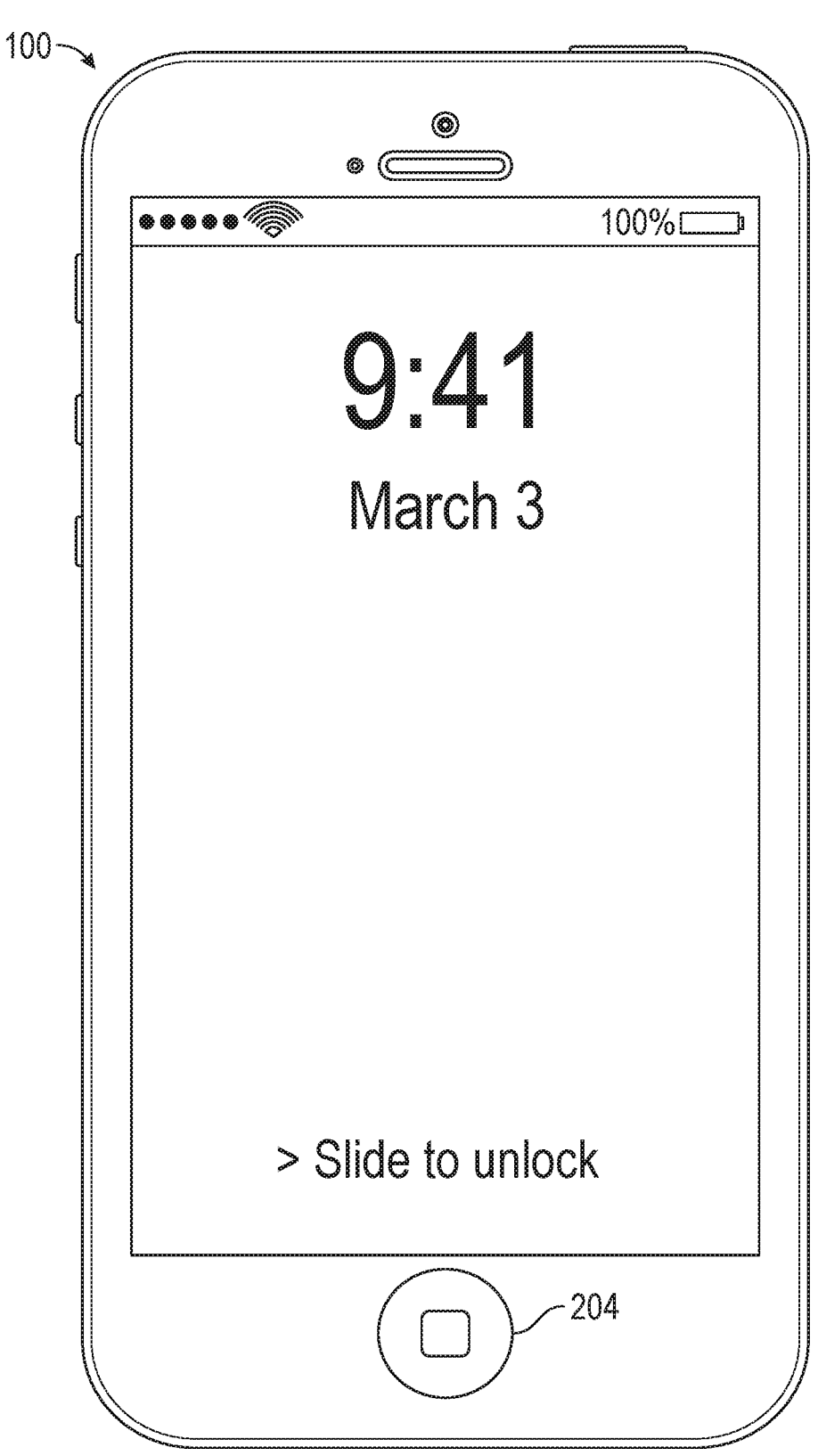

At both FIG. 8B and FIG. 8C, the electronic device 100 is not enabled to participant in payment transactions via the short-range communication radio. At FIG. 8B, the display of the device is turned off (e.g., disabled, not displaying anything). At FIG. 8B, the device may also be in a lock state or an unlock state.

In the lock state, the electronic device 100 is powered on and operational but is prevented from performing a predefined set of operations in response to the user input. The predefined set of operations may include navigation between user interfaces, activation or deactivation of a predefined set of functions, and activation or deactivation of certain applications. The lock state may be used to prevent unintentional or unauthorized use of some functionality of the electronic device 100 or activation or deactivation of some functions on the electronic device 100. In the unlock state, the electronic device 100 is power on and operational and is not prevented from performing at least a portion of the predefined set of operations that cannot be performed while in the lock state.

When the device 100 is in the lock state, the device 100 may be said to be locked. In some embodiments, the device 100 in the lock state may respond to a limited set of user inputs, including input that corresponds to an attempt to transition the device 100 to the user-interface unlock state or input that corresponds to powering the device 100 off.

At FIG. 8C, the display of the device 100 is turned on (e.g., displaying a current date or other information) and the device is in a lock state (e.g., locked).

While the electronic device is not enabled to participate in payment transactions via the short-range communication radio (whether the display is on or not, and whether or not the device is in a lock state or unlock state), the device detects activation of the physical input mechanism 204. For example, activating the physical input mechanism may require two presses (or clicks) of a mechanical or capacitive button within a predetermined period of time. Thus, the user can initiate the activation of the physical input mechanism 204 at either FIG. 8B or FIG. 8C.

Figure 8D:
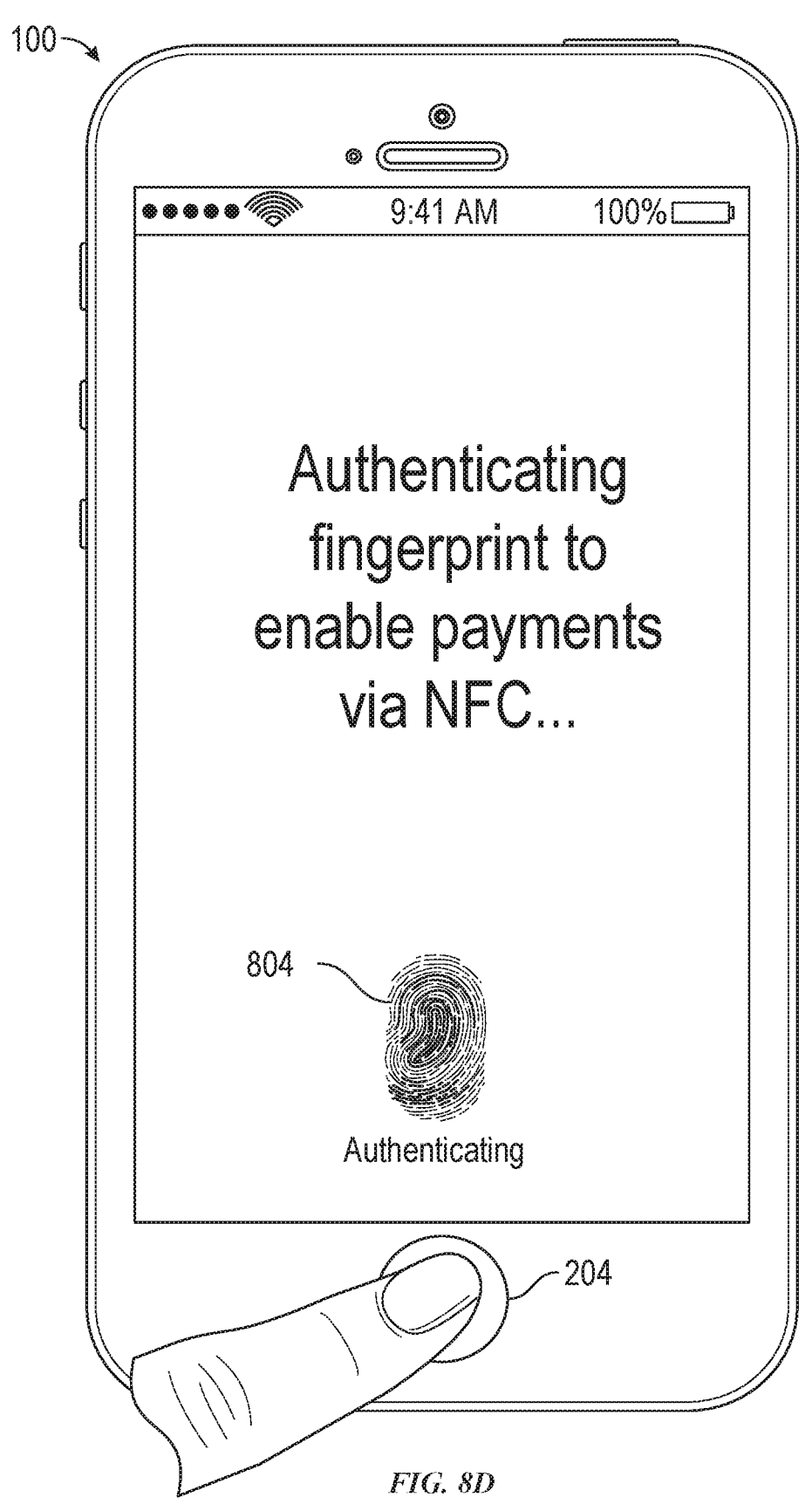

In response to detecting at least a portion of the activation of the physical input mechanism (e.g., the first click or the button down portion of the first click), the electronic device detects a fingerprint using the integrated biometric sensor, as illustrated in FIG. 8D and as indicated by indicator 804. The electronic device also determines (e.g., at the electronic device) whether the fingerprint is consistent with an enrolled fingerprint that is enabled to authorize payment transactions.

Figure 8E:
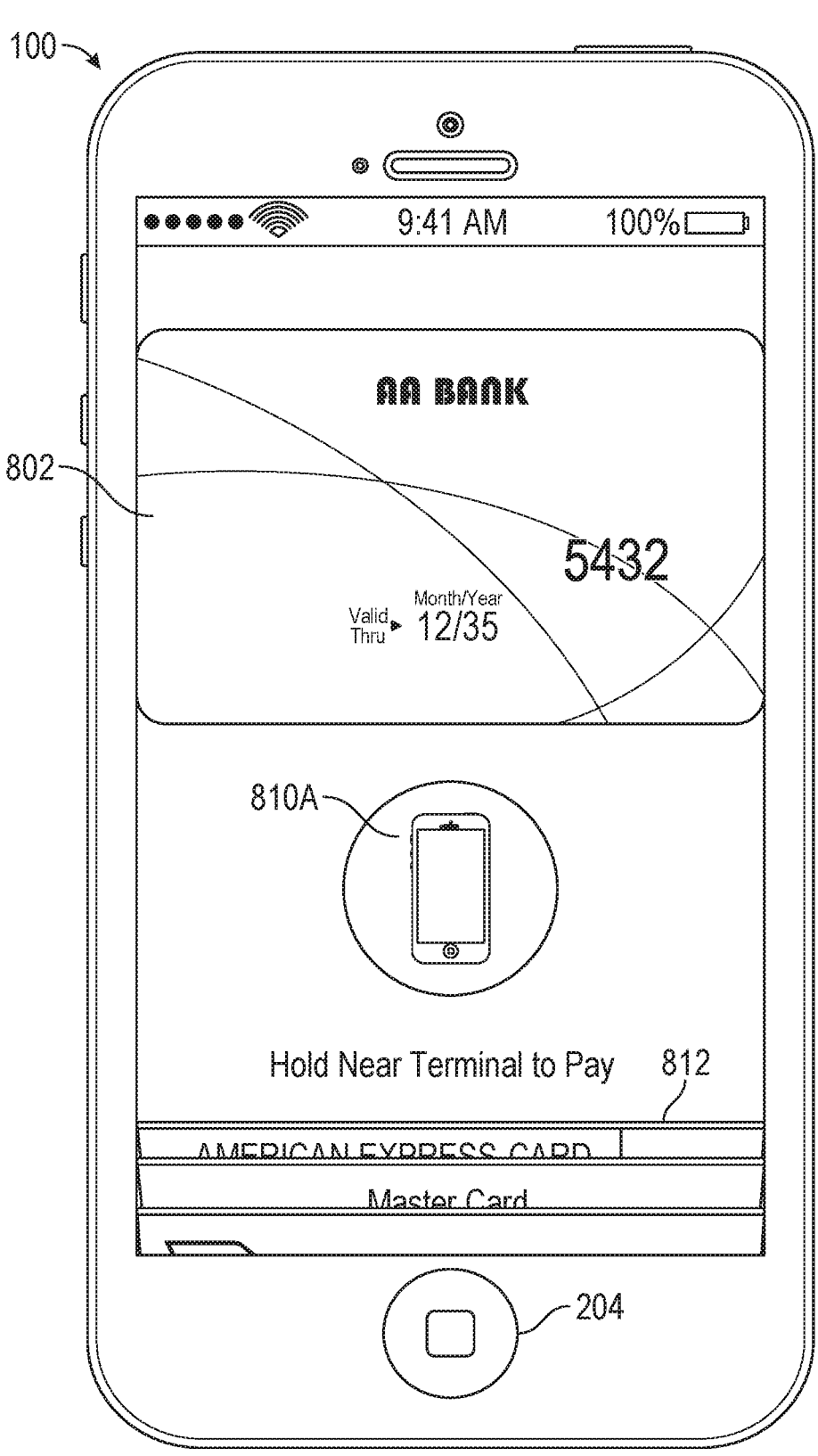
Figure 8F:
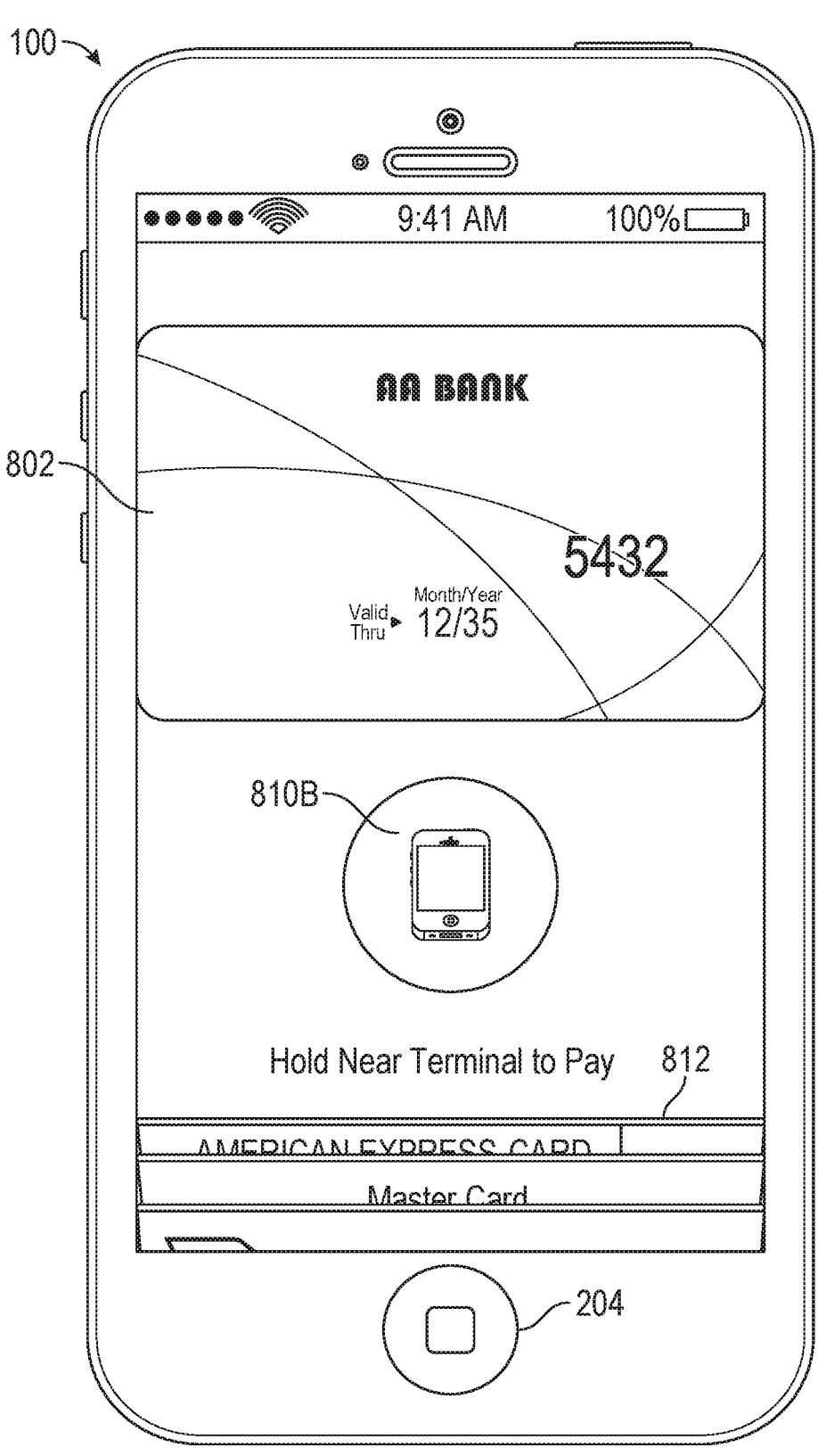
Figure 8G:
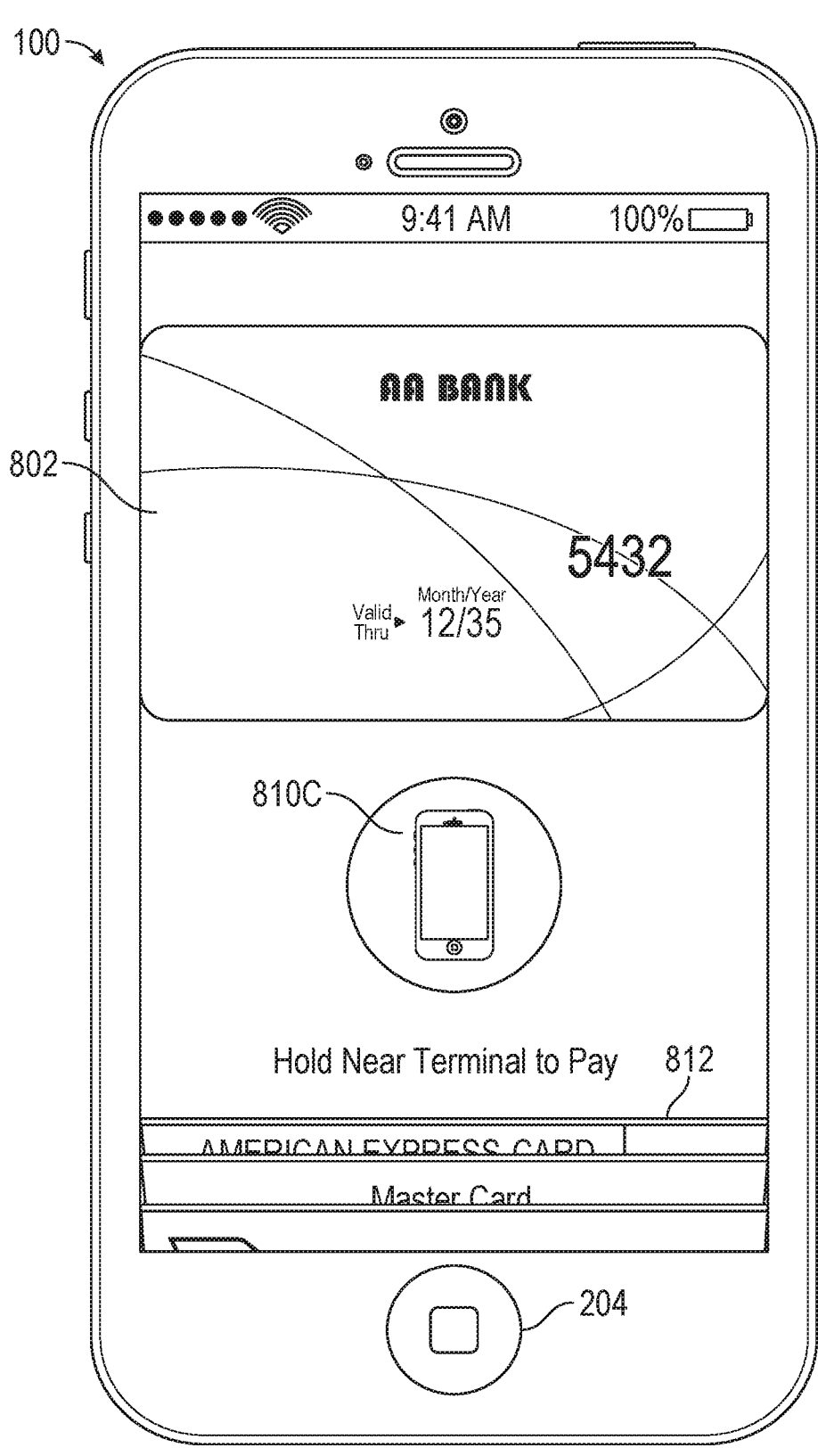

As illustrated in FIGS. 8E-8G, in accordance with a determination that the fingerprint is consistent with an enrolled fingerprint that is enabled to authorize payment transactions, the electronic device enables the device to participate in payment transactions via the short-range communication radio, as indicated by indicators 810A-810C. For example, the electronic device transitions to an armed state (e.g., the electronic device advertises using the short-range communication radio that the device can make an NFC payment) in preparation for a payment transaction.

Although FIGS. 8C-8H illustrate displaying user interfaces, the same technique described above can be performed while not turning on the display.

In some embodiments, in accordance with a determination that the fingerprint is consistent with an enrolled fingerprint that is enabled to authorize payment transactions, the electronic device displays an electronic wallet, as illustrated in FIGS. 8E-8G. The electronic wallet may optionally include a plurality of payment card affordances (such as payment card affordances 802 and 812). For example, the user interface of FIG. 8E allows the user to easily determine which payment account will be used if the electronic device is used for the payment transaction. In this example, the payment card affordance 802 is displayed at the top of the display, indicating that the payment account associated with the payment card affordance 802 will be used for payment. The user can select a different payment account for use in the payment transaction by, for example, activating one of the payment card affordances 812 associated with other payment accounts.

Figure 8H:

At FIG. 8H, in some embodiments, in accordance with a determination that the fingerprint is not consistent with an enrolled fingerprint that is enabled to authorize payment transactions, the electronic device forgoes enabling (e.g., does not enable) the electronic device to participate in payment transactions via the short-range communication radio, as indicated by indicator 806. Additionally, in some embodiments, in accordance with a determination that the fingerprint is not consistent with an enrolled fingerprint that is enabled to authorize payment transactions, the electronic device displays an affordance 808, which when activated, displays a user interface, such as illustrated in FIG. 8K, for receiving a device passcode (rather than use a fingerprint) to enable the device to authorize payment transactions.

Figure 8I:
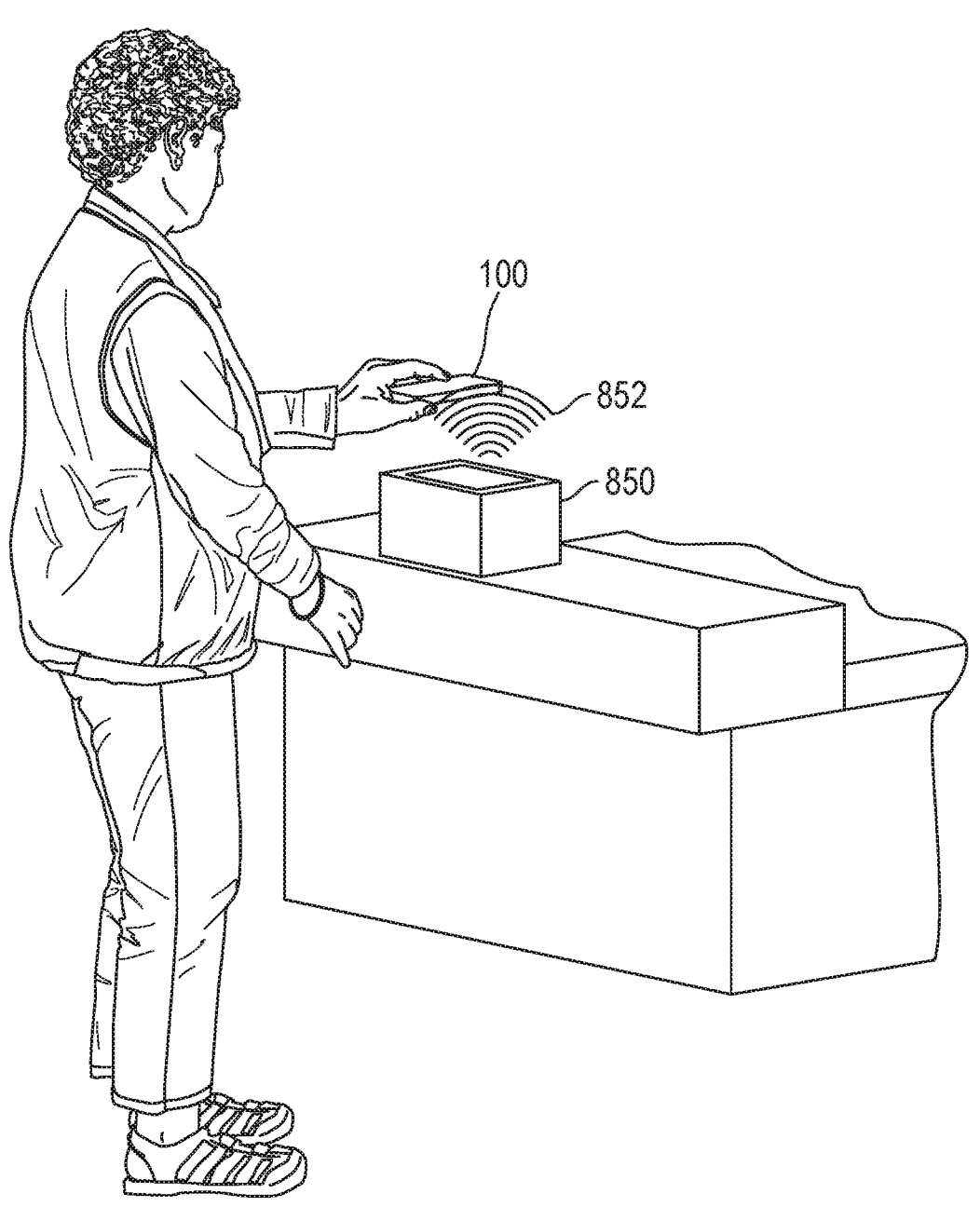
Figure 8J:
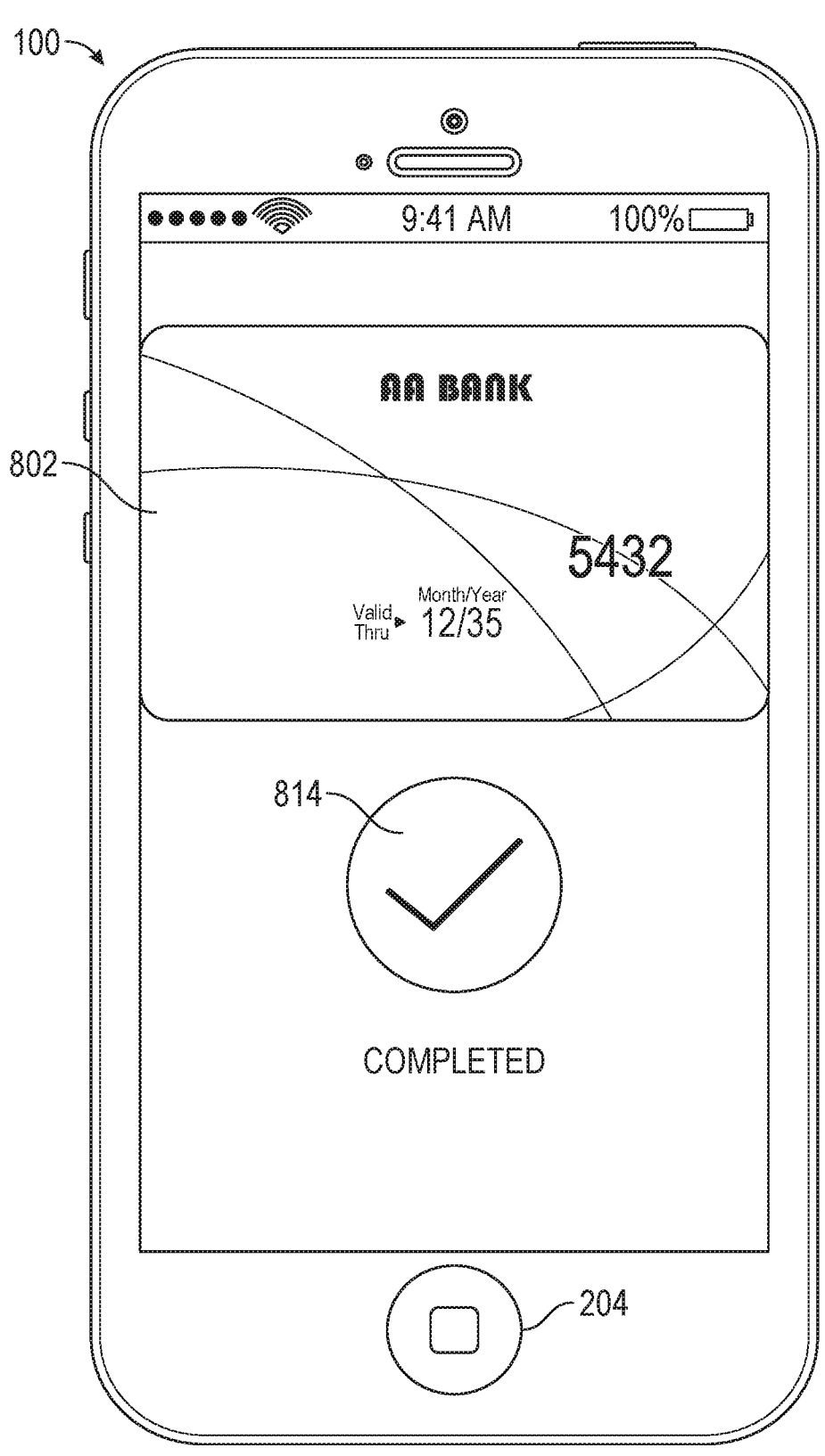
Figure 8K:
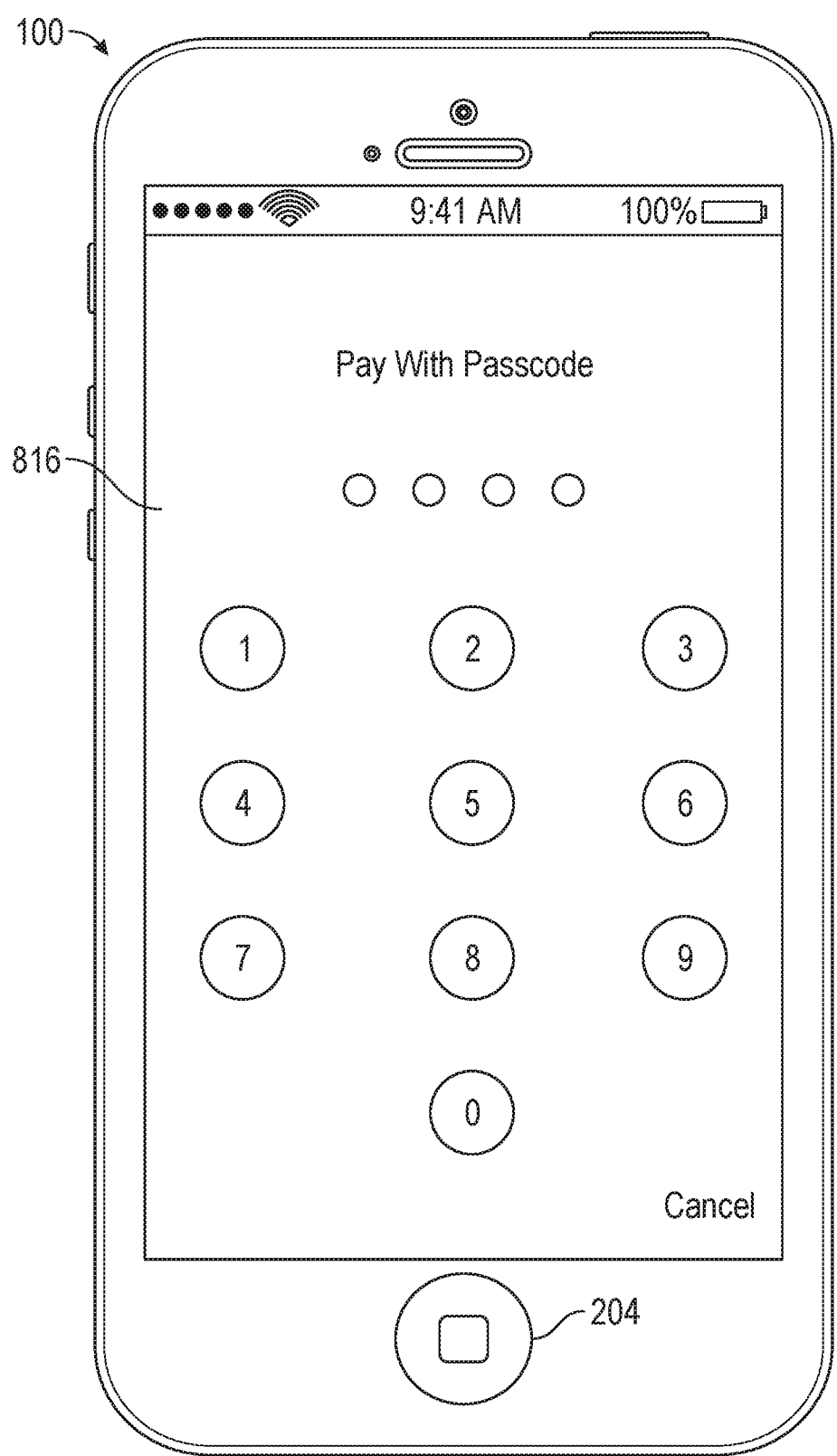

FIG. 8I illustrates the user placing the electronic device within range of field 852 generated by contactless payment transaction terminal 850. While the device is enabled to participate in payment transactions via the short-range communication radio, the device detects, by the short-range communication radio, presence of a field 852 generated by a contactless payment transaction terminal 850; performs, using the short-range communication radio, a handshake with the contactless payment transaction terminal 850; and authorizes the payment transaction, as illustrated in FIG. 8J and as indicated by indicator 814. As a result, the user does not need to authenticate (e.g., using fingerprint authentication) while the device is within range of field 852, as the user has already enabled the device in anticipation of the payment.

In contrast, if the user places the electronic device within range of field 852 generated by contactless payment transaction terminal 850 while the device is not enabled to participate in payment transactions via the short-range communication radio, the device will detect the field 852, determine that the electronic device has not been preauthorized by the user for proceeding with payment transactions, and attempt to receive authorization from the user to enable the electronic device to participate in payment transactions via the short-range communication radio.

In some embodiments, activation of the physical input mechanism is detected while the device is in a lock state (e.g., the electronic device detects the activation of the physical input mechanism while the device is in a lock state), as illustrated in FIG. 8C.

In some embodiments, enabling the device to participate in payment transactions via the short-range communication radio comprises enabling the device to participate in payment transactions via the short-range communication radio while the device is (e.g., remains) in a lock state.

In some embodiments, enabling the device to participate in payment transactions via the short-range communication radio comprises enabling the electronic device to participate in payment transactions via the short-range communication radio without turning on a display (or any displays) of the device, as illustrated in FIG. 8B.

In some embodiments, while the electronic device is not enabled to participate in payment transactions via the short-range communication radio, the electronic device displays a first user interface (e.g., the lock screen user interface of FIG. 8C) and maintains (e.g., does not update) the first user interface subsequent to enabling the device to participate in payment transactions via the short-range communication radio.

In some embodiments, enabling the electronic device to participate in payment transactions via the short-range communication radio comprises configuring the electronic device to respond to a payment transaction request (e.g., a handshake and subsequent payment request) via the short-range communication radio with at least partial credit card information (e.g., account number, expiration date, and or cardholder's name) of a payment account (e.g., a bank card, credit card, or other account that was previously linked to the device, such as described with respect to method 11 (FIGS. 10A-10I and 11), of a plurality of payment accounts linked to the device (e.g., a default payment account is used, but the device can be configured to use one of the other payment accounts of the plurality of payment accounts), and wherein the payment transaction request is received from a contactless payment transaction terminal 850 (e.g., an NFC equipped payment terminal located at a physical retail store).

In some embodiments, subsequent to enabling the electronic device to participate in payment transactions via the short-range communication radio and while the electronic device is enabled to participate in payment transactions via the short-range communication radio and while the device is in a lock state, the electronic device receives user input to place the device in an unlock state (e.g., the user unlocks the device by performing an unlock action, using fingerprint authentication, or entering a passcode). The electronic device receives user input selecting a second payment account of a plurality of payment accounts linked to the device for use in the payment transaction (e.g., the user selects a different credit card (not the default credit card) for this particular payment).

In some embodiments, enabling the device to participate in payment transactions via the short-range communication radio does not require detecting a field generated by a contactless payment transaction terminal (e.g., the user can arm the device for making NFC payments without being detecting (or being near) an NFC-enabled contactless payment transaction terminal).

In some embodiments, enabling the device to participate in payment transactions via the short-range communication radio comprises using the short-range communication radio to transmit a signal, the signal indicating that the device is configured for making payments using near field communication. In contrast, when the electronic device is not enabled to participate in payment transactions via the short-range communication radio, the electronic device does not immediately respond to a contactless payment transaction terminal using the short-range communication radio to transmit when the electronic device detects a field generated by a contactless payment transaction terminal. Rather, the electronic device requests (and receives) authorization from the user before responding to the contactless payment transaction terminal.

In some embodiments, subsequent to enabling the electronic device to participate in payment transactions via the short-range communication radio, in response to determining that a payment transaction has not been authorized using the short-range communication radio within a predetermined duration of time, the electronic device becomes disabled from participating in payment transactions via the short-range communication radio.

FIG. 9 is a flow diagram illustrating a method for conducting a payment transaction using a short-range communication radio in accordance with some embodiments. Method 900 is performed at a device (e.g., 100, 300, 500). Some operations in method 900 may be combined, the order of some operations may be changed, and some operations may be omitted.

As described below, method 900 provides an intuitive way for conducting a payment transaction using a short-range communication radio. The method reduces the cognitive burden on a user when conducting the payment transaction, thereby creating a more efficient human-machine interface. For battery-operated computing devices, enabling a user to conduct a payment transaction using a short-range communication radio faster and more efficiently conserves power and increases the time between battery charges.

At block 902, while the electronic device is not enabled to participate in payment transactions via the short-range communication radio: the electronic device detects, at block

904, activation of the physical input mechanism (e.g., two presses of the mechanical or capacitive button within a predetermined period of time); at block 906, in response to detecting at least a portion of the activation of the physical input mechanism (e.g., the first click, or the button down portion of the first click), the electronic device detects a fingerprint using the integrated biometric sensor; and at block 908, the electronic device determines (e.g., at the electronic device) whether the fingerprint is consistent with an enrolled fingerprint that is enabled to authorize payment transactions.

At block 910, in accordance with a determination that the fingerprint is consistent with an enrolled fingerprint that is enabled to authorize payment transactions, the electronic device enables the device to participate in payment trans- actions via the short-range communication radio (e.g., tran- sitioning the electronic device to an armed state in prepa- ration for a payment transaction).

In some embodiments, at block 912, in accordance with a determination that the fingerprint is not consistent with an enrolled fingerprint that is enabled to authorize payment transactions, the electronic device forgoes enabling the device to participate in payment transactions via the short- range communication radio.

In some embodiments, while the device is enabled to participate in payment transactions via the short-range com- munication radio: the electronic device detects, by the short-range communication radio, presence of a field gen- erated by a contactless payment transaction terminal; the electronic device performs, using the short-range commu- nication radio, a handshake with the contactless payment transaction terminal; and the electronic device authorizes the payment transaction.

In some embodiments, activation of the physical input mechanism is detected while the device is in a lock state.

In some embodiments, enabling the device to participate in payment transactions via the short-range communication radio comprises enabling the device to participate in pay- ment transactions via the short-range communication radio while the device is in a lock state.

In some embodiments, enabling the device to participate in payment transactions via the short-range communication radio comprises enabling the device to participate in pay- ment transactions via the short-range communication radio without turning on a display (or any displays) of the device.

In some embodiments, while the electronic device is not enabled to participate in payment transactions via the short- range communication radio, the electronic device displays a first user interface; and maintains (e.g., does not update) the first user interface subsequent to enabling the device to participate in payment transactions via the short-range com- munication radio.

In some embodiments, enabling the device to participate in payment transactions via the short-range communication radio comprises configuring the device to respond to a payment transaction request (e.g., a handshake and subse- quent payment request) via the short-range communication radio with at least partial credit card information (e.g., account number, expiration date, and or cardholder's name) of a payment account (e.g., a bank card, credit card, or other account that was previously linked to the device) of a plurality of payment accounts linked to the device (e.g., a default payment account is used, but the device can be configured to use one of the other payment accounts of the plurality of payment accounts), and wherein the payment transaction request is received from a contactless payment transaction terminal (e.g., 850 of FIG. 8A).

In some embodiments, subsequent to enabling the device to participate in payment transactions via the short-range communication radio and while the device is enabled to participate in payment transactions via the short-range com- munication radio and while the device is in a lock state, the electronic device receives user input to place the device in an unlock state (e.g., the user unlocks the device by per- forming an unlock action, using fingerprint authentication, or entering a passcode); and the electronic device receives user input selecting a second payment account of a plurality of payment accounts linked to the device for use in the payment transaction (e.g., the user selects a different credit card (not the default credit card) for this particular payment).

In some embodiments, enabling the electronic device to participate in payment transactions via the short-range com- munication radio does not require the electronic device to detect a field generated by a contactless payment transaction terminal (e.g., the user can arm the device for NFC payment without being near an NFC-enabled contactless payment transaction terminal).

In some embodiments, enabling the device to participate in payment transactions via the short-range communication radio comprises using the short-range communication radio to transmit a signal, the signal indicating that the device is configured for making payments using near field commu- nication.

In some embodiments, subsequent to enabling the device to participate in payment transactions via the short-range communication radio: in response to determining that a payment transaction has not been authorized using the short-range communication radio within a predetermined duration of time, the electronic device disables the device from participating in payment transactions via the short- range communication radio.

Note that details of the processes described above with respect to method 900 (e.g., FIG. 9) are also applicable in an analogous manner to the methods described below and above. For example, methods 700 and 1100 may include one or more of the characteristics of the various methods described above with reference to method 900. For brevity, these details are not repeated below.

FIGS. 10A-10I illustrate exemplary user interfaces for linking a payment account to a respective device, in accor- dance with some embodiments. The user interfaces in these figures are used to illustrate the processes described below, including the process in FIG. 11.

FIGS. 10A-10I illustrate exemplary user interfaces for linking a payment account, such as a bank account or revolving credit account, associated with a credit card (e.g., a physical credit card or debit card issued to a user) to a respective device (e.g., a cell phone, a laptop, a wearable electronic device) in accordance with some embodiments.

Figure 10A:
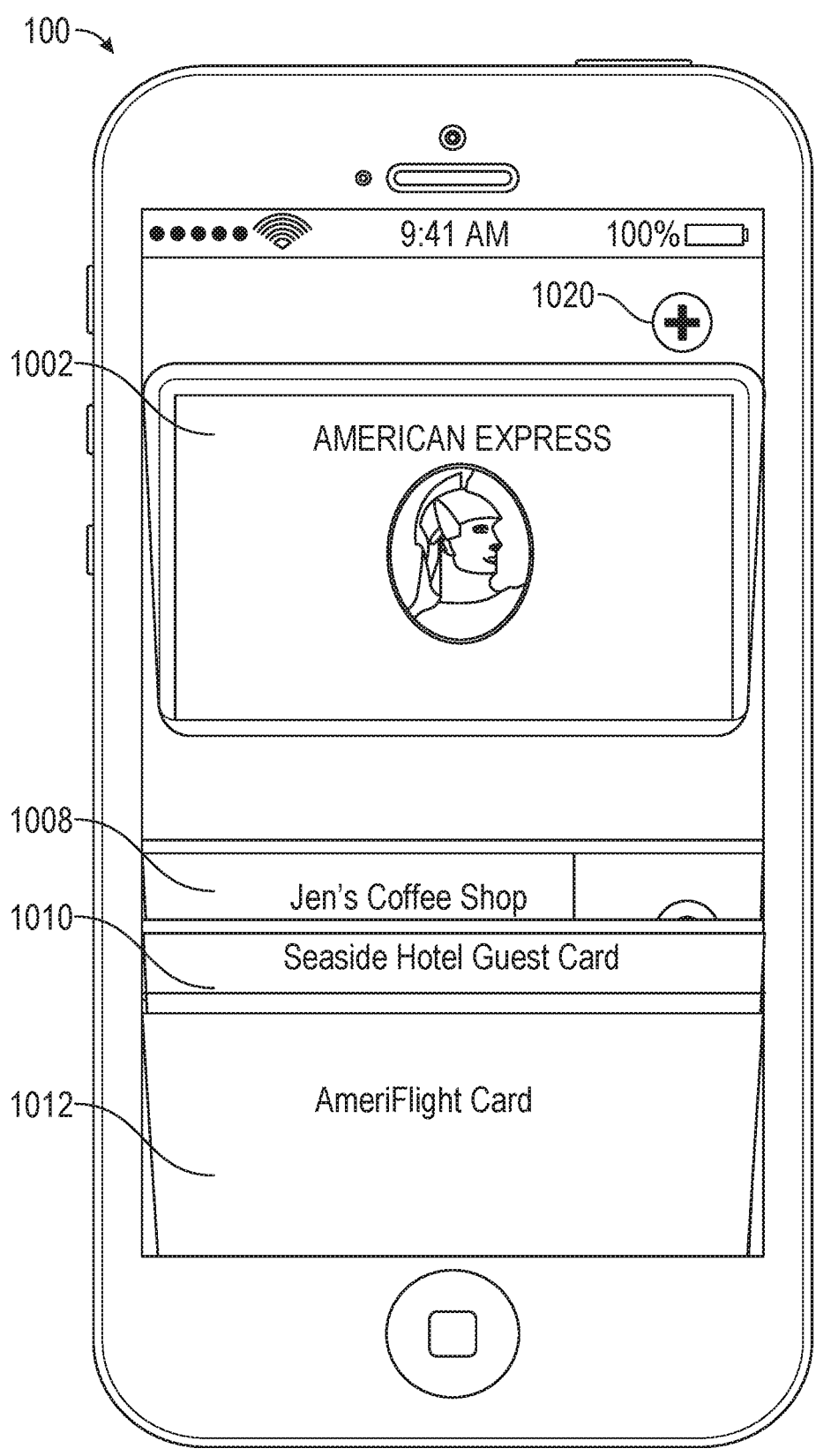
FIGS. 10A-10I illustrate exemplary user interfaces for linking a payment account to an electronic device in accordance with some embodiments.

For example, in FIG. 10A, an electronic wallet is dis- played on the display of an electronic device with a display and a camera sensor. The electronic wallet comprises a first stack of card objects 1002 and a second stack of card objects 1008, 1010, and 1012. The first stack of card objects 1002 is visually separated from the second stack of card objects 1008, 1010, and 1012. In this example, one credit card (e.g., an American Express credit card) is already linked to the electronic device and is displayed as part of the first stack of card objects 1002. The electronic device displays affordance 1020. In response to the electronic device receiving activa- tion of affordance 1020, the electronic device displays the user interface illustrated in FIG. 10B.

Figure 10B:
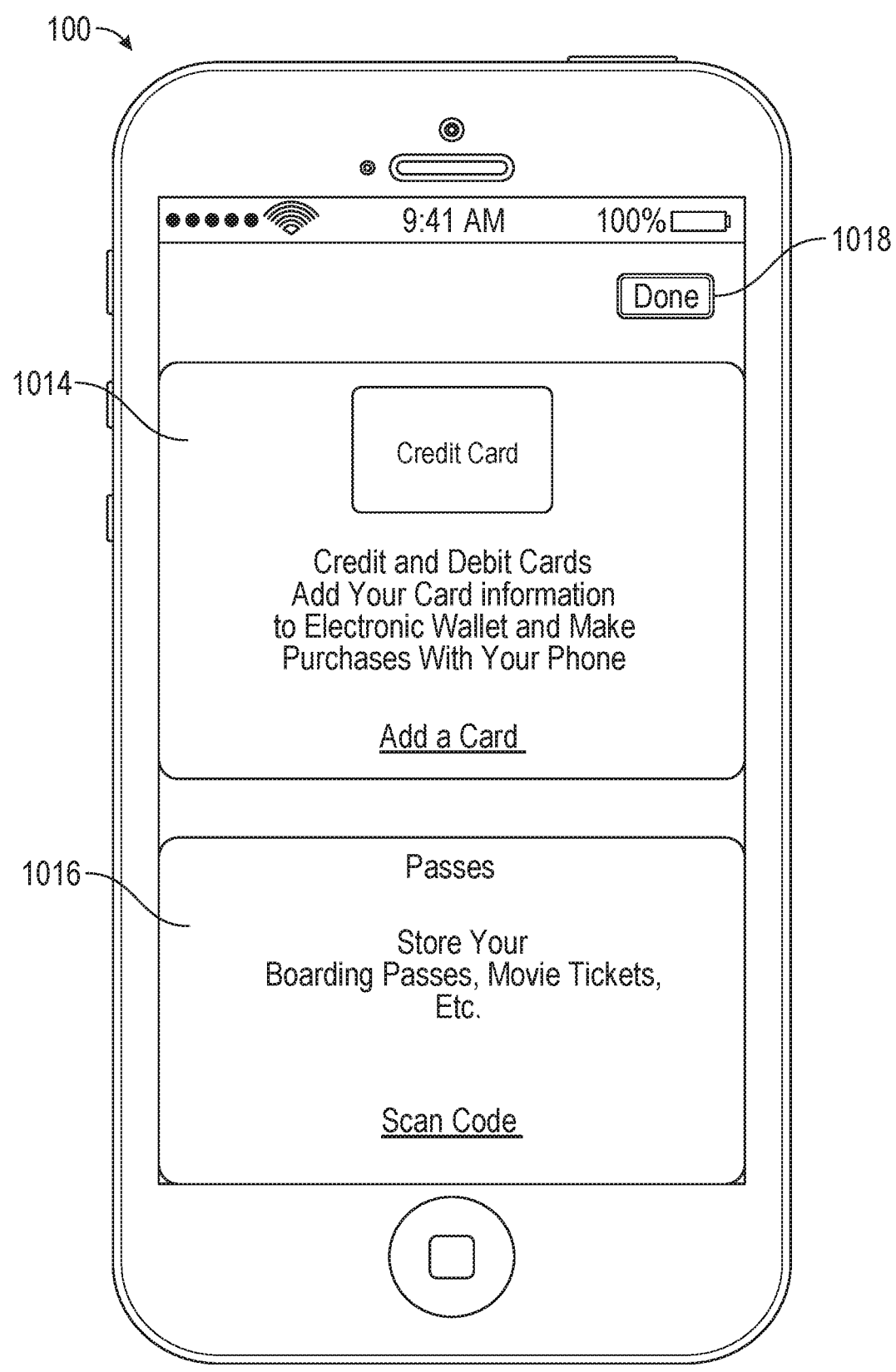

FIG. 10B illustrates a user interface for selecting from among an add payment card affordance 1014 to link a payment account to the device (e.g., to make the payment account available in the electronic wallet) and a scan code affordance 1016 to link a pass. If the device determines that selection of done affordance 1018 is received, the device returns to displaying the user interface of FIG. 10A. If the device receives selection of add payment card affordance 1014, the device transitions to the user interface illustrated in FIG. 10C.

Figure 10C:
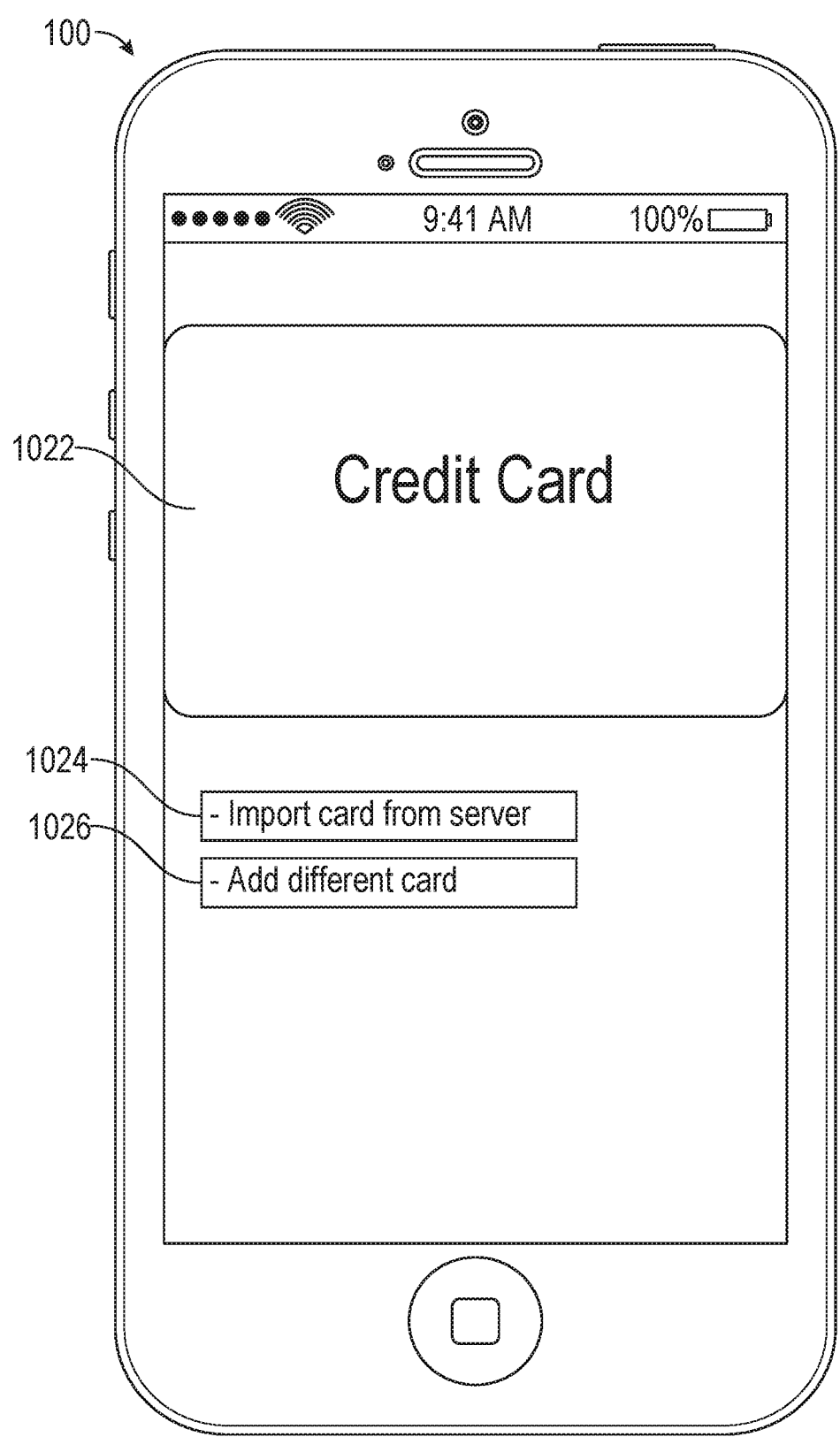

At FIG. 10C, the electronic device displays, on the display, a user interface comprising: a credit card import affordance 1024 for importing, from a remote server, at least partial credit card information (e.g., import credit/debit card from iTunes server) and a credit card input affordance 1026 for receiving, at the electronic device, at least partial credit card information (e.g., receive credit/debit card details using a camera or manual numerical entry). The electronic device receives selection of the credit card input affordance 1026.

In response to receiving the selection of the credit card input affordance 1026, the electronic device displays, on the display, a live preview 1004 of images obtained via the camera sensor. For example, the camera preview turns on to show a live preview 1004 of images to indicate that the user should place a credit card 1028 in the camera's field of view for linking the payment account associated with the credit card 1028 to the electronic device.

Figure 10D:
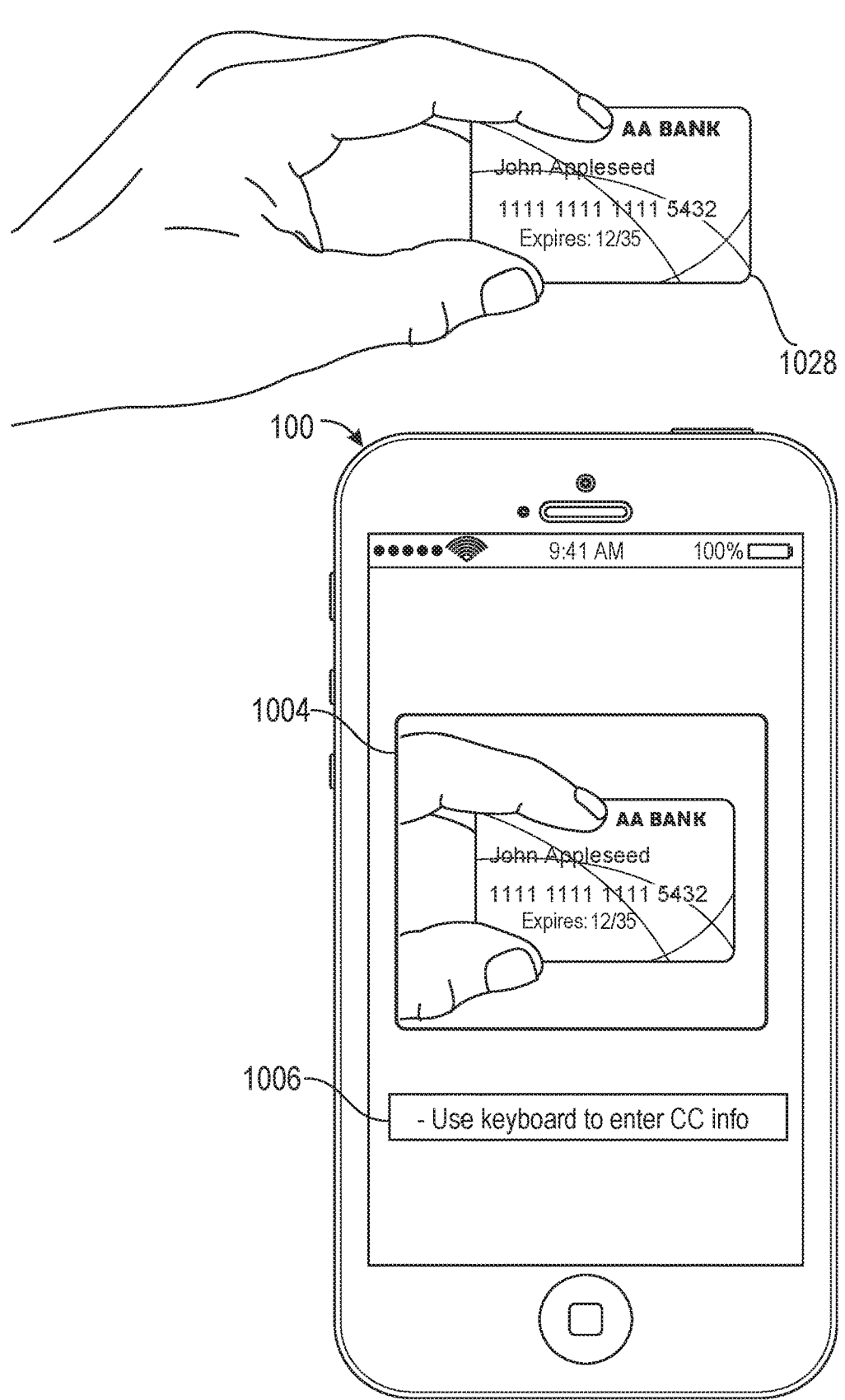

While the electronic device displays the live preview 1004 of images obtained via the camera sensor, the electronic device detects (e.g., using the camera sensor on the back of the electronic device) at least partial credit card information of the credit card 1028 in a field of view of the camera sensor. For example, as illustrated in FIG. 10D, the user places a credit card in the field of view of the camera sensor and the electronic device performs optical character recognition of one or more of (1) an account number displayed on the credit card, (2) an expiration date displayed on the credit card, (3) an account holder's name displayed on the credit card.

In some embodiments, the live preview 1004 is displayed on the display of the electronic device immediately in response to receiving the selection of the credit card input affordance 1026, and without displaying an intervening user interface on the display (e.g., no intervening user interface is displayed on the display for receiving manual user typed credit card information). Thus, in response to detecting selection of credit card input affordance 1026, the electronic device transitions directly from the user interface of FIG. 10C to the user interface of FIG. 10D.

In some embodiments, the electronic device displays, on the display, concurrently with the live preview of images obtained via the camera sensor, a manual credit card entry affordance 1006. For example, the manual credit card entry affordance 1006, when activated, causes the electronic device to display a user interface for manually typing in credit card information. The electronic device receives selection of the manual credit card entry affordance 1006. In response to receiving the selection of the manual credit card entry affordance 1006, the electronic device displays a user interface for receiving at least partial credit card information via a displayed keyboard 1050, as illustrated in FIG. 10F.

Figure 10E:
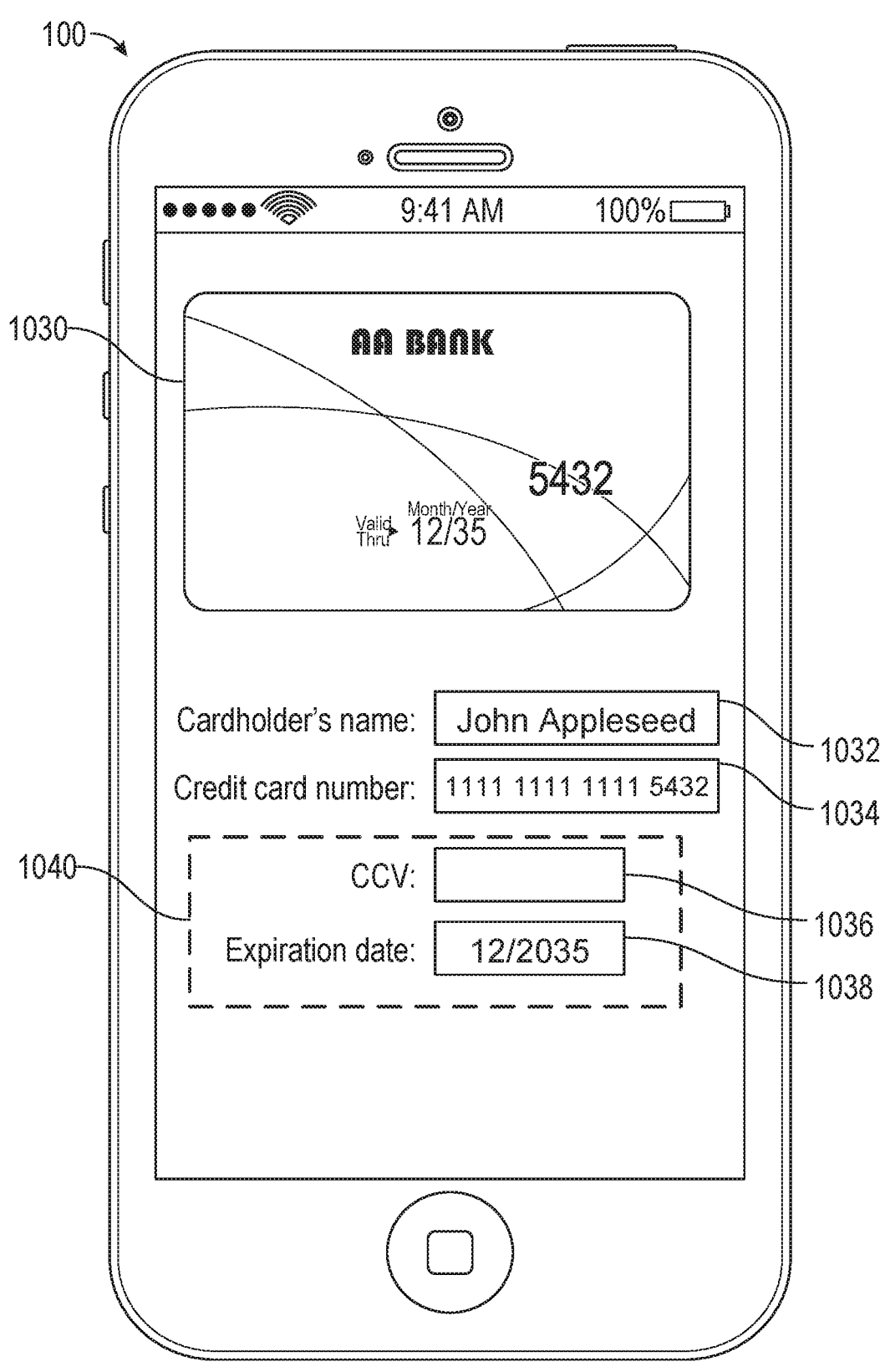
Figure 10F:
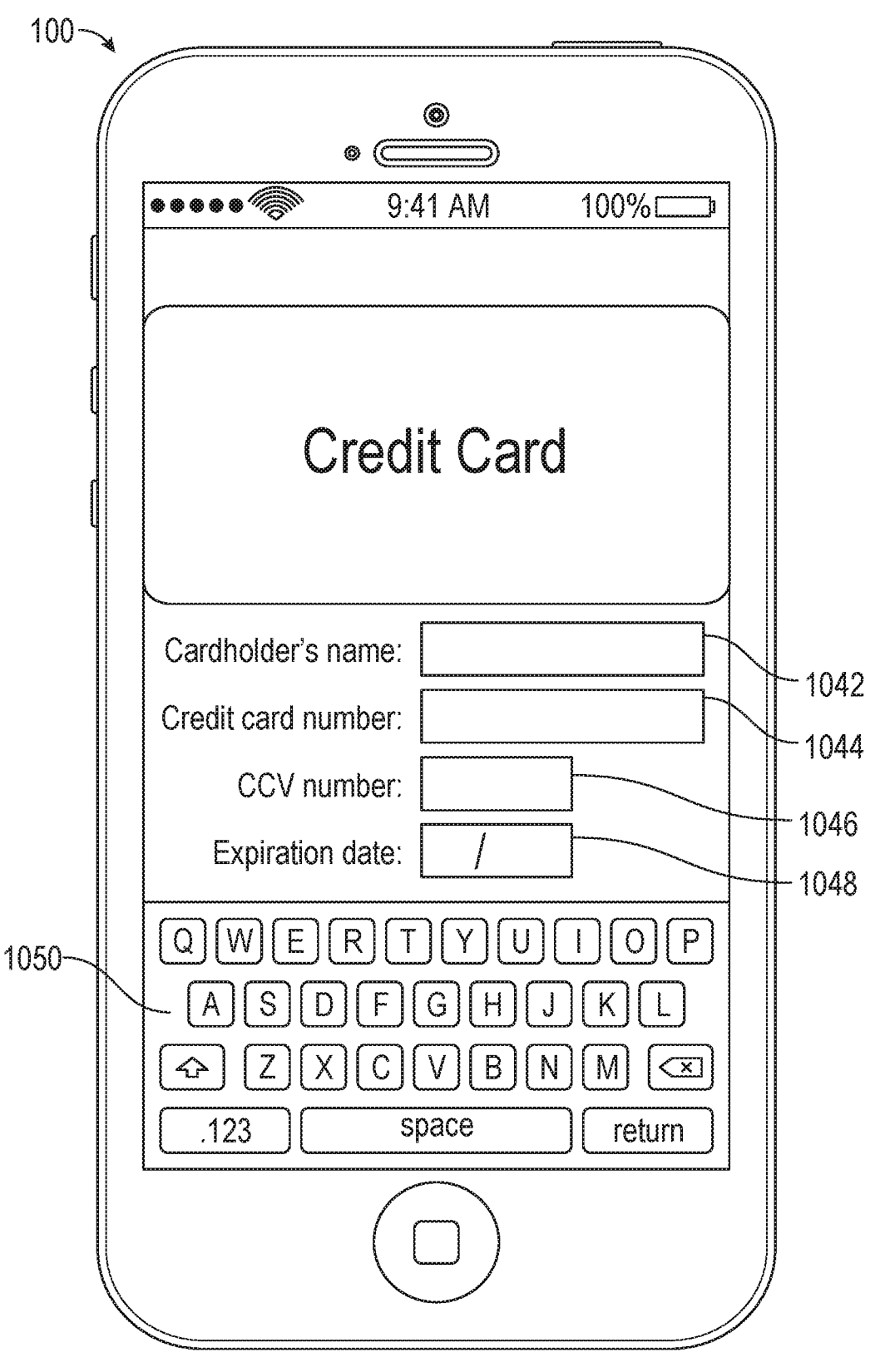
Figure 10G:
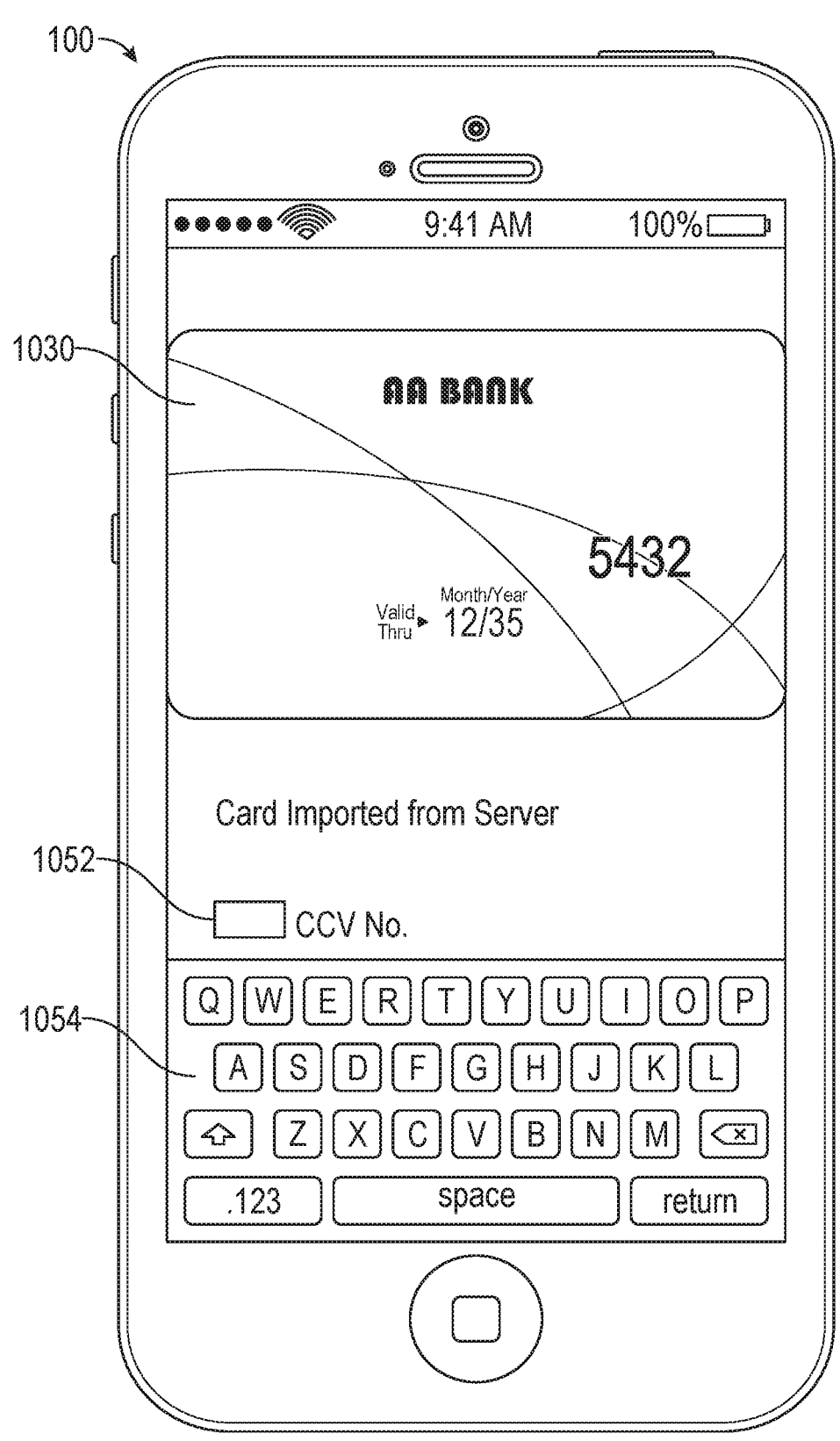
Figure 10H:
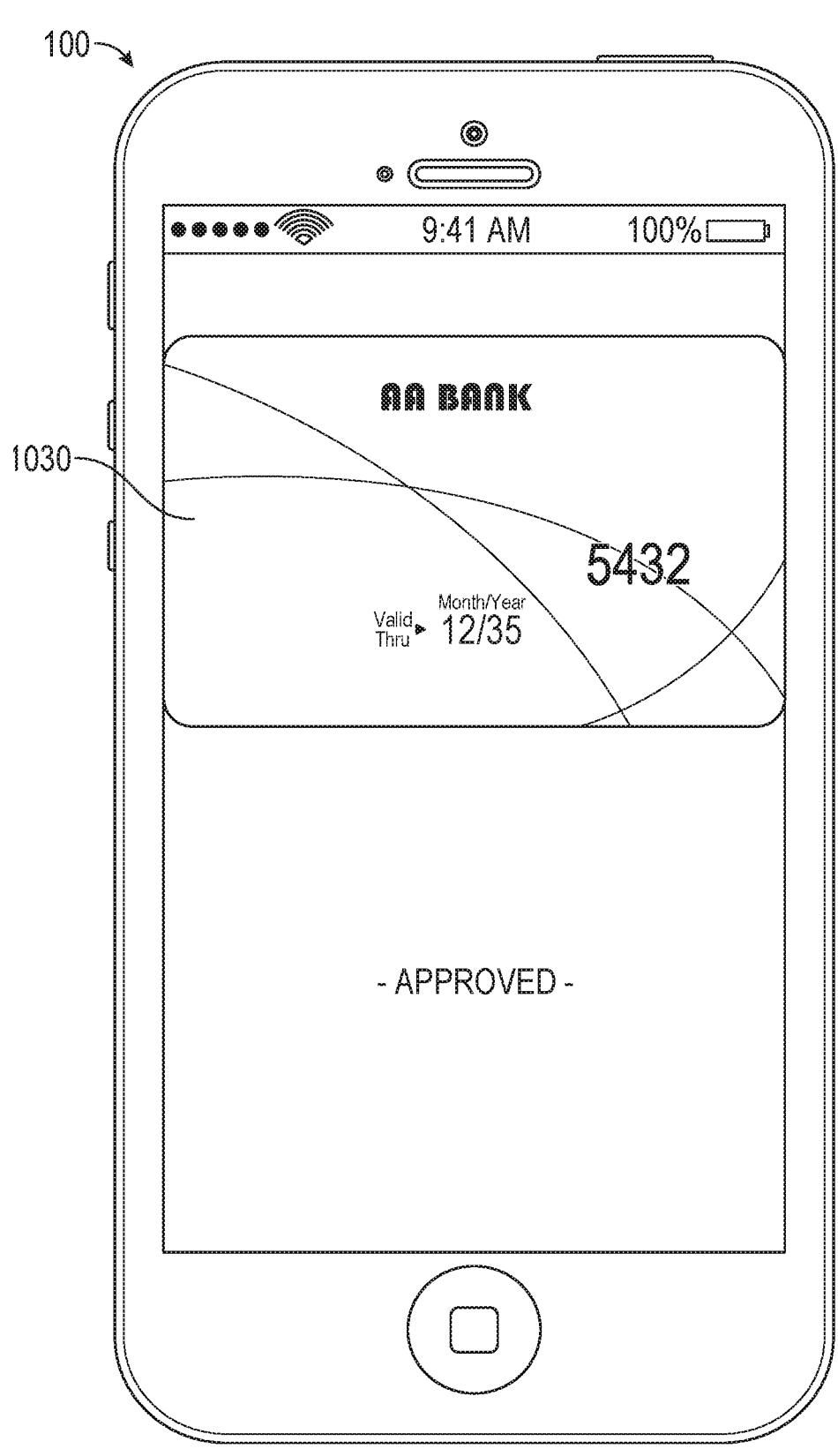
Figure 10I:
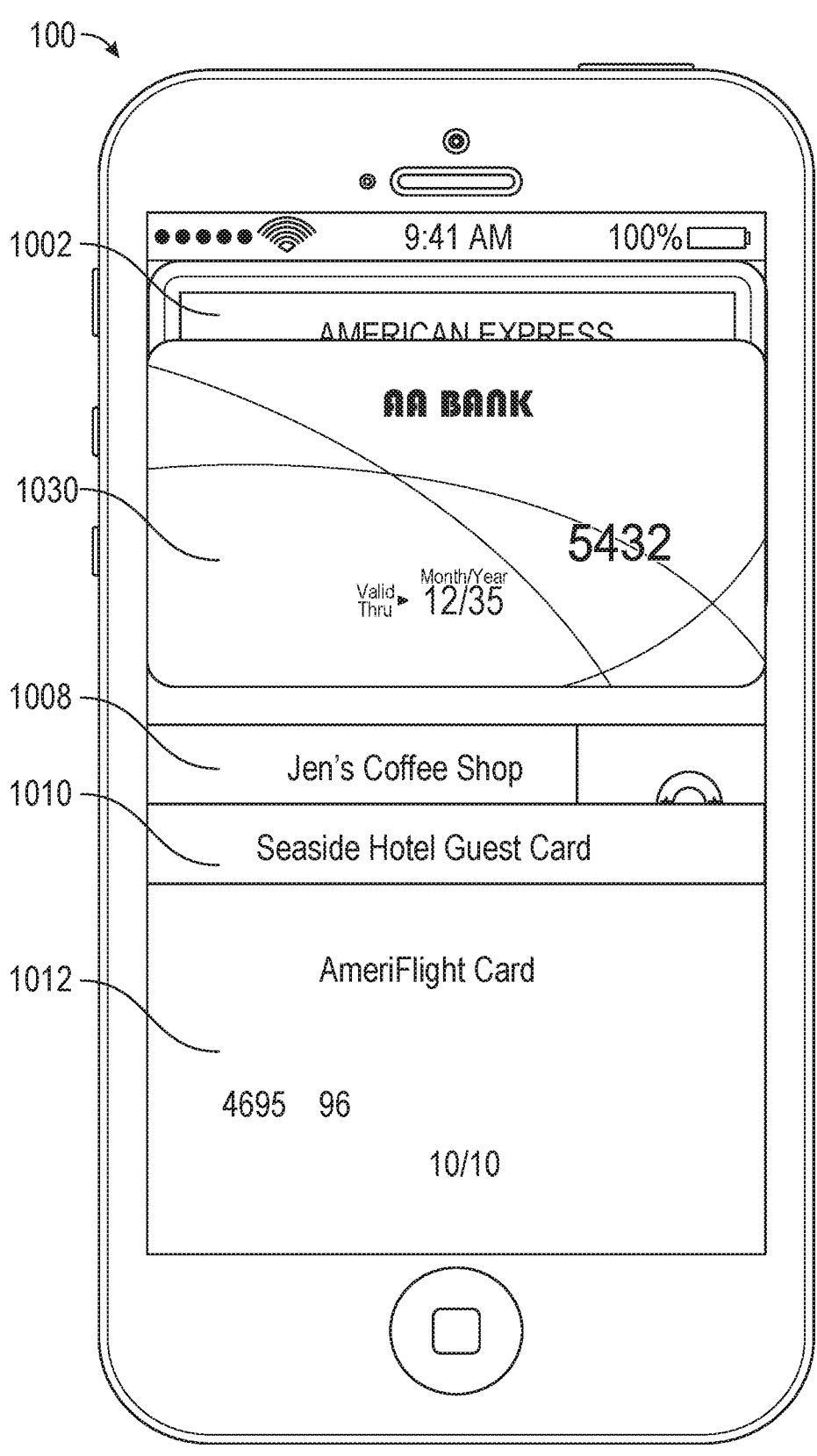

In some embodiments, in response to receiving the selection of the credit card input affordance 1026, the electronic device displays a manual credit card entry affordance 1006 for activating a manual credit card entry user interface (such as illustrated in FIG. 10F) for receiving at least partial credit card information via a keyboard 1050.

In some embodiments, the electronic device receives selection of the manual credit card entry affordance, and in response to receiving the selection of the manual credit card entry affordance, the electronic device displays the manual credit card entry user interface, such as illustrated in FIG. 10F. The manual credit card entry user interface comprises one or more input fields 1042, 1044, 1046, and 1048 for receiving user-entered credit card information.

At FIG. 10F, the electronic device receives user input, such as a portion of the credit card number at field 1042. In accordance with a determination that the credit card is of a first type (e.g., based on the portion of the credit card number received), the electronic device forgoes displaying input field 1046 (the security code input field) and 1048 (the expiration date input field). In accordance with a determination that the credit card is not of the first type (e.g., based on the portion of the credit card number received), the electronic device displays input field 1046 (the security code input field) and 1048 (the expiration date input field). If a field is displayed, such as first entry field 1046 or second entry field 1048, and then the electronic device subsequently determines that the displayed field 1046 or 1048 is not needed (e.g., the user goes back and changes the inputted credit card number), the electronic device marks the displayed, but not needed field as "Not Applicable", grays out the field, or otherwise indicates the data for that field is not needed, rather than removing the field.

In some embodiments, the manual credit card entry user interface comprises two or more input fields (e.g., 1042 and 1044) for receiving user-entered account information of a payment account, the two or more input fields selected from the group consisting of a name of a cardholder associated with the payment account (e.g., pre-populated using a name from the device, but editable), an account number associated with the payment account (e.g., a credit card number), an expiration date associated with the payment account, and a security code associated with the payment account (e.g., a CCV).

Optionally, the credit card information that is detected while displaying the live preview 1004 of images may be used to determine how many (and which) fields are displayed. In some embodiments, the at least partial credit card information of the credit card includes a portion of an account number of the credit card. The electronic device determines, based on the portion of the account number of the credit card, whether the credit card is of a first type (e.g., the credit card number falls within a certain predetermined range of numbers). In accordance with a determination that the credit card is not of the first type (e.g., the credit card number does not fall within a certain predetermined range of numbers), the electronic device displays an expiration date of the credit card in a first entry field 1038 and a security code (and/or space for a security code, such as a CCV) of the credit card in a second entry field 1036, as illustrated in FIG. 10E. In accordance with a determination that the credit card is of the first type, the electronic device forgoes displaying the expiration date of the credit card in the first entry field 1038 and forgoes displaying the security code (or space for a security code of the credit card in the second entry field 1036 (e.g., the electronic device does not display the expiration and security code or their corresponding fields, as identified inside dotted line 1040 of FIG. 10E. If a field is displayed, such as first entry field 1038 or second entry field 1036, and then the electronic device subsequently determines that the displayed field is not needed, the electronic device marks the field as "Not Applicable", grays out the field, or otherwise indicates the data for that field is not needed, rather than removing the field.

In some embodiments, the portion of the account number of the credit card includes a bin identification number of the credit card (e.g., the issuer identification number portion of the credit card number, the first six digits of the credit card), and determining, based on the portion of the account number of the credit card, whether the credit card is of the first type comprises determining, based on the bin identification number of the credit card (e.g., issuer identification number, the first six digits of the credit card), whether the card is of the first type (e.g., the first type of card is cards where the issuer of the credit card requires the expiration date and security code for processing a payment).

In some embodiments, the electronic device displays two or more input fields (e.g., fields 1032, 1034, 1036, and 1038) associated with the credit card. The quantity of the two or more input fields is based on an image obtained via the camera sensor (e.g., the image includes the credit card number, which is used to determine if expiration date field 1038 and security code field 1036 are required).

In some embodiments however, the credit card number in the credit card field 1034 may be changed/updated by the user. The electronic device displays two or more input fields (e.g., account holder's name field 1032 and credit card number 1034) associated with the credit card (and not the fields within dotted line 1040). The electronic device receives a user input selecting a first field of the two or more input fields. In response to receiving the user input selecting the first field, displaying (e.g., without regard to the credit card number/bin) a supplementary user input field (e.g., an expiration date field or a security code field that was not previously displayed, such as those in dotted line 1040) in addition to the two or more input fields 1032 and 1034. Thus, in some cases the device determines (based on the credit card number) that the security code and expiration dates of the credit card are not needed for payment transactions and does not display those respective fields. If the electronic device later detects selection of one of the displayed fields 1032 or 1034, additional fields (such as those within dotted line 1040) are displayed, regardless of whether the credit card number indicates the card is or is not of the first type.

In some embodiments, once the supplementary user input fields are displayed (e.g., the fields in dotted line 1040), they are not removed, even if the device determines that the supplementary user input fields are not needed. Instead, the device identifies the fields as being inactive. The electronic device receives a user input on a keyboard at the first field of the two or more input fields (e.g., the user has selected the credit card number field 1034 and has used the keyboard to change the value of the field). The electronic device determines, based on the user input, whether the credit card is of the first type. In accordance with a determination that the credit card is not of the first type, the device forgoes marking the supplementary user input field as inactive (e.g., so the user can select/edit the contents of the expiration date field and/or security code field) In accordance with a determination that the credit card is of the first type, the device marks the supplementary user input field as inactive (e.g., if the bin number of the credit card entered by the user indicates it is of the first type, gray out the field or mark it as "Not Applicable").

FIG. 11 is a flow diagram illustrating a method for linking a payment account to an electronic device in accordance with some embodiments. Method 1100 is performed at a device (e.g., 100, 300, 500). Some operations in method 1100 may be combined, the order of some operations may be changed, and some operations may be omitted.

As described below, method 1100 provides an intuitive way for linking a payment account to an electronic device. The method reduces the cognitive burden on a user for linking a payment account to an electronic device, thereby creating a more efficient human-machine interface. For battery-operated computing devices, enabling a user to link a payment account to an electronic device faster and more efficiently conserves power and increases the time between battery charges.

At block 1102, the electronic device displays, on the display, a user interface (e.g., the user interface of FIG. 10C) comprising: a credit card import affordance (e.g., 1024 of FIG. 10C) for importing, from a remote server, at least partial credit card information; and a credit card input affordance (e.g., 1026 of FIG. 10C) for receiving, at the electronic device, at least partial credit card information.

At block 1104, the electronic device receives selection of the credit card input affordance (e.g., 1026 of FIG. 10C).

At block 1106, in response to receiving the selection of the credit card input affordance (e.g., 1026 of FIG. 10C), the electronic device displays, on the display, a live preview (e.g., 1004 of FIG. 10D) of images obtained via the camera sensor.

At block 1108, while displaying the live preview (e.g., 1004 of FIG. 10D) of images obtained via the camera sensor, the electronic device detects (e.g., using the camera sensor) at least partial credit card information of a credit card (e.g., 1028 of FIG. 10D) in a field of view of the camera sensor.

In some embodiments, the live preview (e.g., 1004 of FIG. 10D) is displayed on the display immediately in response to receiving the selection of the credit card input affordance, and without displaying an intervening user interface on the display (e.g., no intervening user interface is displayed on the display for receiving manual user typed credit card information).

In some embodiments, at block 1110, the electronic device displays, on the display, concurrently with the live preview (e.g., 1004 of FIG. 10D) of images obtained via the camera sensor, a manual credit card entry affordance (e.g., 1006 of FIG. 10D).

In some embodiments, at block 1112, the electronic device receives selection of the manual credit card entry affordance (e.g., 1006 of FIG. 10D).

In some embodiments, at block 1114, in response to receiving the selection of the manual credit card entry affordance, the electronic device displays a user interface (e.g., the user interface of FIG. 10F) for receiving at least partial credit card information via a displayed keyboard (e.g., 1050 of FIG. 10F).

In some embodiments, in response to receiving the selection of the credit card input affordance (e.g., 1026 of FIG. 10C), the electronic device displays a manual credit card entry affordance (e.g., 1006 of FIG. 10D) for activating a manual credit card entry user interface (e.g., the user interface of FIG. 10F) for receiving at least partial credit card information via a keyboard (e.g., 1050 of FIG. 10F).

In some embodiments, the electronic device receives selection of the manual credit card entry affordance (e.g., 1006 of FIG. 10D). In response to receiving the selection of the manual credit card input affordance (e.g., 1006 of FIG. 10D), the electronic device displays the manual credit card entry user interface (e.g., the user interface of FIG. 10F). The manual credit card entry user interface (e.g., the user interface of FIG. 10F) comprises one or more input fields (e.g., 1042, 1044, 1046, 1048) for receiving user-entered credit card information.

In some embodiments, the manual credit card entry user interface (e.g., the user interface of FIG. 10F) comprises two or more input fields (e.g., 1042, 1044, 1046, 1048) for receiving user-entered account information of a payment account, the two or more input fields selected from the group consisting of: a name of a cardholder associated with the payment account (e.g., pre-populated using a name from the device, but editable), an account number associated with the payment account (e.g., a credit card number), an expiration date associated with the payment account, and a security code associated with the payment account (e.g., a CCV).

In some embodiments, the at least partial credit card information of the credit card includes a portion of an account number of the credit card. The electronic device determines, based on the portion of the account number of the credit card, whether the credit card is of a first type. In accordance with a determination that the credit card is not of the first type, the electronic device displays an expiration date of the credit card in a first entry field (e.g., 1038 of FIG. 10E) and a security code of the credit card in a second entry field (e.g., 1036 of FIG. 10E). In accordance with a determination that the credit card is of the first type, the electronic device forgoes displaying the expiration date of the credit card in the first entry field (e.g., 1038 of FIG. 10E) and forgoes displaying the security code of the credit card in the second entry field (e.g., 1036 of FIG. 10E) (e.g., don't display the expiration and security code or the fields).

In some embodiments, the portion of the account number of the credit card includes a bin identification number of the credit card (e.g., an issuer identification number, the first six digits of the credit card), and wherein determining, based on the portion of the account number of the credit card, whether the credit card is of the first type comprises determining, based on the bin identification number of the credit card (e.g., issuer identification number, the first six digits of the credit card), whether the card is of the first type (e.g., the first type of card is cards where the issuer of the credit card requires the expiration date and security code for processing a payment).

In some embodiments, the electronic device displays two or more input fields (e.g., 1032, 1034, 1036, 1038 of FIG. 10E) associated with the credit card. The quantity of the two or more input fields is based on an image obtained via the camera sensor (e.g., the image includes the credit card number, which is used to determine if expiration date and security code fields are required).

In some embodiments, the electronic device displays two or more input fields (e.g., 1032, 1034 of FIG. 10E) associated with the credit card. The electronic device receives a user input selecting a first field (e.g., 1032 of FIG. 10E) of the two or more input fields (e.g., 1032, 1034 of FIG. 10E). In response to receiving the user input selecting the first field (e.g., 1032 of FIG. 10E), displaying (e.g., without regard to the credit card number/bin) a supplementary user input field (e.g., 1036 or 1038 of FIG. 10E; an expiration date field or a security code field that was not previously displayed) in addition to the two or more input fields.

In some embodiments, the electronic device receives a user input (e.g., using a keyboard) at the first field of the two or more input fields. The electronic device determines, based on the user input, whether the credit card is of the first type. In accordance with a determination that the credit card is not of the first type, the electronic device forgoes marking the supplementary user input field as inactive (e.g., so the user can select/edit the contents of the expiration date field and/or security code field). In accordance with a determination that the credit card is of the first type, the electronic device marks the supplementary user input field as inactive (e.g., if the bin number of the credit card entered by the user indicates it is of the first type, gray out the field or mark it as "Not Applicable").

Note that details of the processes described above with respect to method 1100 (e.g., FIG. 11) are also applicable in an analogous manner to the methods described above. For example, methods 700 and 900 may include one or more of the characteristics of the various methods described above with reference to method 1100. For brevity, these details are not repeated below.

Figure 12:
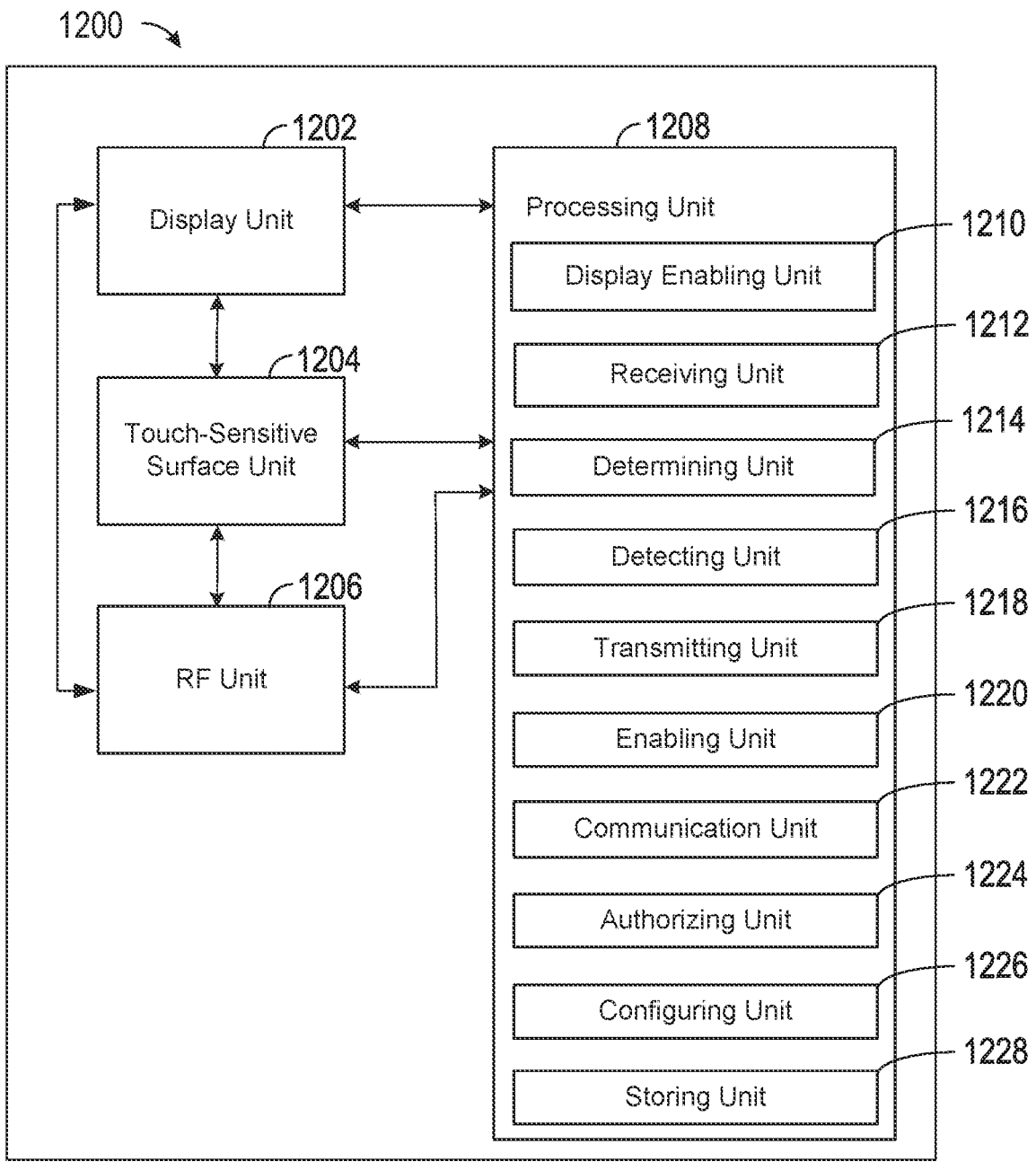
FIG. 12 illustrates a functional block diagram in accordance with some embodiments.

FIG. 12 shows exemplary functional blocks of an electronic device 1200 that, in some embodiments, perform the features described above. As shown in FIG. 12, an electronic device 1200 includes a display unit 1202 configured to display graphical objects; a touch-sensitive surface unit 1204 configured to receive user gestures (e.g., touches); one or more RF units 1206 configured to detect and communicate with external electronic devices; and a processing unit 1208 coupled to display unit 1202, touch-sensitive surface unit 1204, and RF units 1206. In some embodiments, the processing unit 1208 includes a display enabling unit 1210, a receiving unit 1212, a determining unit 1214, a detecting unit 1216, a transmitting unit 1218, an enabling unit 1220, a communication unit 1222, an authorizing unit 1224, a configuring unit 1226, and a storing unit 1228. The units of FIG. 12 may be used to implement the various techniques and methods described above with respect to FIGS. 6-11.

For example, the display enabling unit 1210 can be used for: displaying a payment user interface; displaying a live preview of images obtained via the camera sensor; displaying, on the display, a user interface comprising a credit card import affordance for importing, from a remote server, at least partial credit card information, and a credit card input affordance for receiving, at the electronic device, at least partial credit card information; dismissing the payment user interface; maintaining display of the payment user interface; updating the payment user interface to display an indication of a reason for failure of the transaction request; displaying the payment user interface over only a portion of a first user interface; displaying a second payment user interface; dismissing the second payment user interface; maintaining display of the second payment user interface; updating the second payment user interface to display a second indication of a second reason for failure of the second transaction request; displaying a first user interface; maintaining the first user interface; displaying concurrently with the live preview of images obtained via the camera sensor, a manual credit card entry affordance; displaying a user interface for receiving at least partial credit card information via a displayed keyboard; displaying a manual credit card entry affordance for activating a manual credit card entry user interface for receiving at least partial credit card information via a keyboard; displaying the manual credit card entry user interface; displaying an expiration date of the credit card in a first entry field and a security code of the credit card in a second entry field; and forgoing displaying the expiration date of the credit card in the first entry field and forgoing displaying the security code of the credit card in the second entry field.

For example, the receiving unit 1212 can be used for: receiving first authorization data; receiving second authorization data; receiving a reply to the transaction request; receiving selection of the credit card input affordance; receiving the reply to the transaction request while displaying the payment user interface; receiving third authorization data; receiving a second reply to the second transaction request; receiving third authorization data; receiving fourth authorization data; receiving a second reply to the transaction request; receiving a payment passcode; receiving user input to place the device in an unlock state; receiving user input selecting a second payment account of a plurality of payment accounts linked to the device for use in the payment transaction; receiving selection of the manual credit card entry affordance; and receiving selection of the manual credit card entry affordance.

For example, the determining unit 1214 can be used for: determining whether the first authorization data is valid; determining whether the fingerprint is consistent with an enrolled fingerprint that is enabled to authorize payment transactions; determining whether the third authorization data is valid; determining whether the third authorization data is valid; determining whether the respective fingerprint is consistent with an enrolled fingerprint that is enabled to authorize payment transactions; determining whether the payment passcode is consistent with an enrolled passcode that is enabled to authorize payment transactions; determining, based on the portion of the account number of the credit card, whether the credit card is of a first type; and determining, based on the bin identification number of the credit card, whether the card is of the first type.

For example, the detecting unit 1216 can be used for: detecting a request to initiate a payment transaction; detecting activation of the physical input mechanism; detecting a fingerprint using the integrated biometric sensor; detecting at least partial credit card information of a credit card in a field of view of the camera sensor; detecting a second request to initiate a second payment transaction; detecting a respective fingerprint on a fingerprint sensor of the electronic device; and detecting, by the short-range communication radio, presence of a field generated by a contactless payment transaction terminal.

For example, the transmitting unit 1218 can be used for: transmitting a transaction request that corresponds to the payment transaction to one or more remote servers; transmitting the transaction request while displaying the payment user interface; transmitting a second transaction request that corresponds to the second payment transaction to one or more remote servers; transmitting the second authorization data to a financial institution; and transmitting a second transaction request that corresponds to the payment transaction to one or more remote servers.

For example, the enabling unit 1220 can be used for: enabling the device to participate in payment transactions via the short-range communication radio; forgoing enabling the device to participate in payment transactions via the short-range communication radio; and enabling the device to participate in payment transactions via the short-range communication radio while the device is in a lock state.

For example, the communication unit 1222 can be used for: performing, using the short-range communication radio, a handshake with the contactless payment transaction terminal.

For example, the authorizing unit 1224 can be used for: authorizing the payment transaction.

For example, the configuring unit 1226 can be used for: configuring the device to respond to a payment transaction request via the short-range communication radio with at least partial credit card information of a payment account of a plurality of payment accounts linked to the device; and disabling the device from participating in payment transactions via the short-range communication radio.

For example, the storing unit 1228 can be used for: storing the second authorization data; and forgoing storing the second authorization data.

The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

The operations described above with reference to the figures may be implemented by components depicted in FIGS. 1A-1B, 2, 3, and 5A-B. For example, detection operations, display operations, and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 2, 3, and 5A-B.

FIGS. 13A-13E illustrate exemplary techniques and user interfaces for enabling an electronic device to participate in a payment transaction using a short-range communication radio in accordance with some embodiments. The user interfaces in these figures are used to illustrate the processes described below, including the processes in FIG. 14.

Figure 13A:
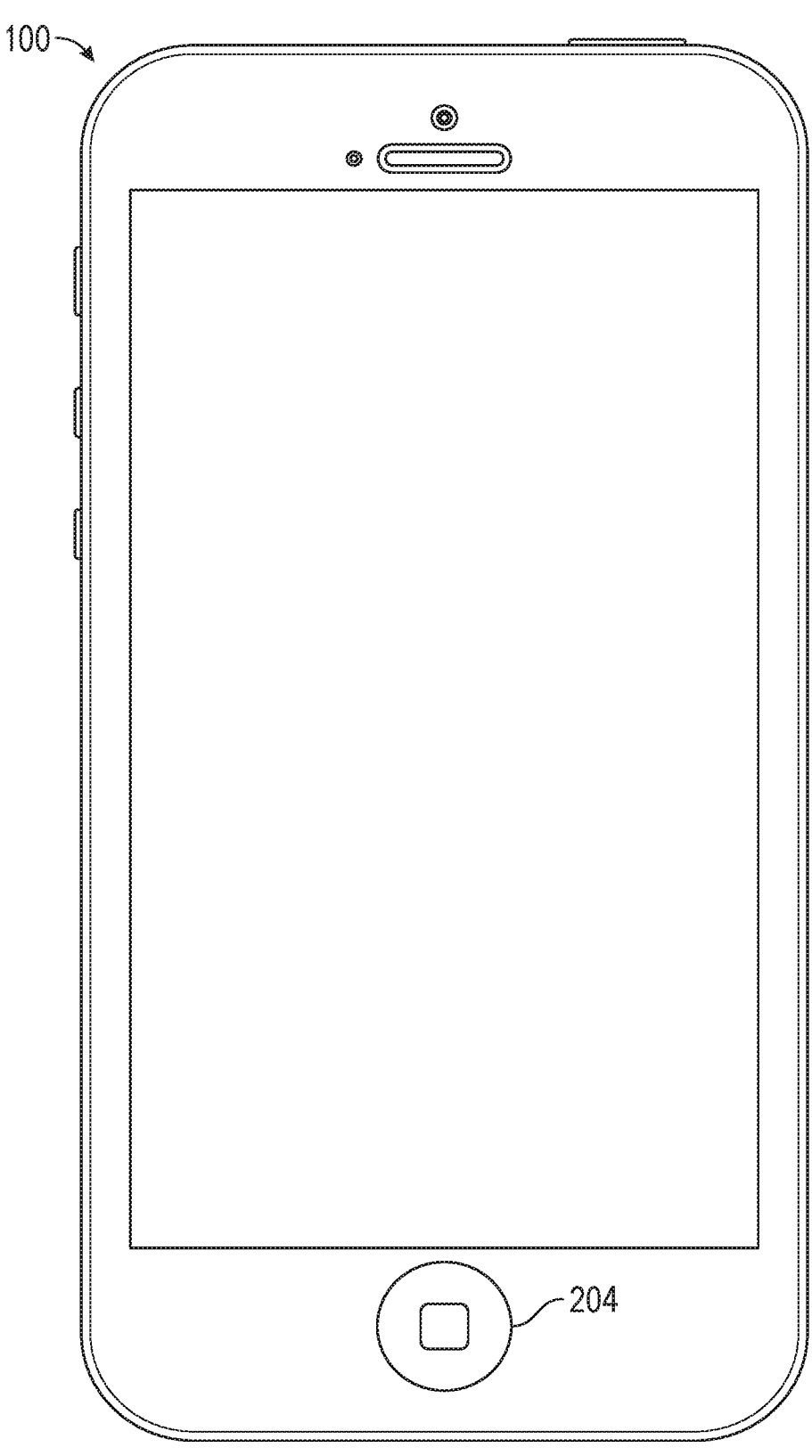

FIG. 13A illustrates electronic device 100 wherein the display is turned off, an integrated biometric sensor of physical input mechanism (menu button) 204 is not enabled to detect fingerprints, the device is locked, and a short-range communication radio (e.g., NFC radio) of the device is not enabled to participate in payment transactions (a first short-range communication radio payment mode). Generally, device 100 may be in this state when it has not recently been used by the user. Although the short-range communication radio may be monitoring for an NFC field, it is not enabled to participate in payment transactions.

The device may need to disambiguate between a user's request to unlock the device and a user's request to enable the device to participate in payment transactions. In some examples, (1) detecting a single press of the physical input mechanism 204 along with fingerprint authentication unlocks the device and alternatively (2) detecting a double press of the physical input mechanism 204 along with fingerprint authentication enables the device to participate in payment transactions. Additional details of this technique are described below.

Figure 13B:
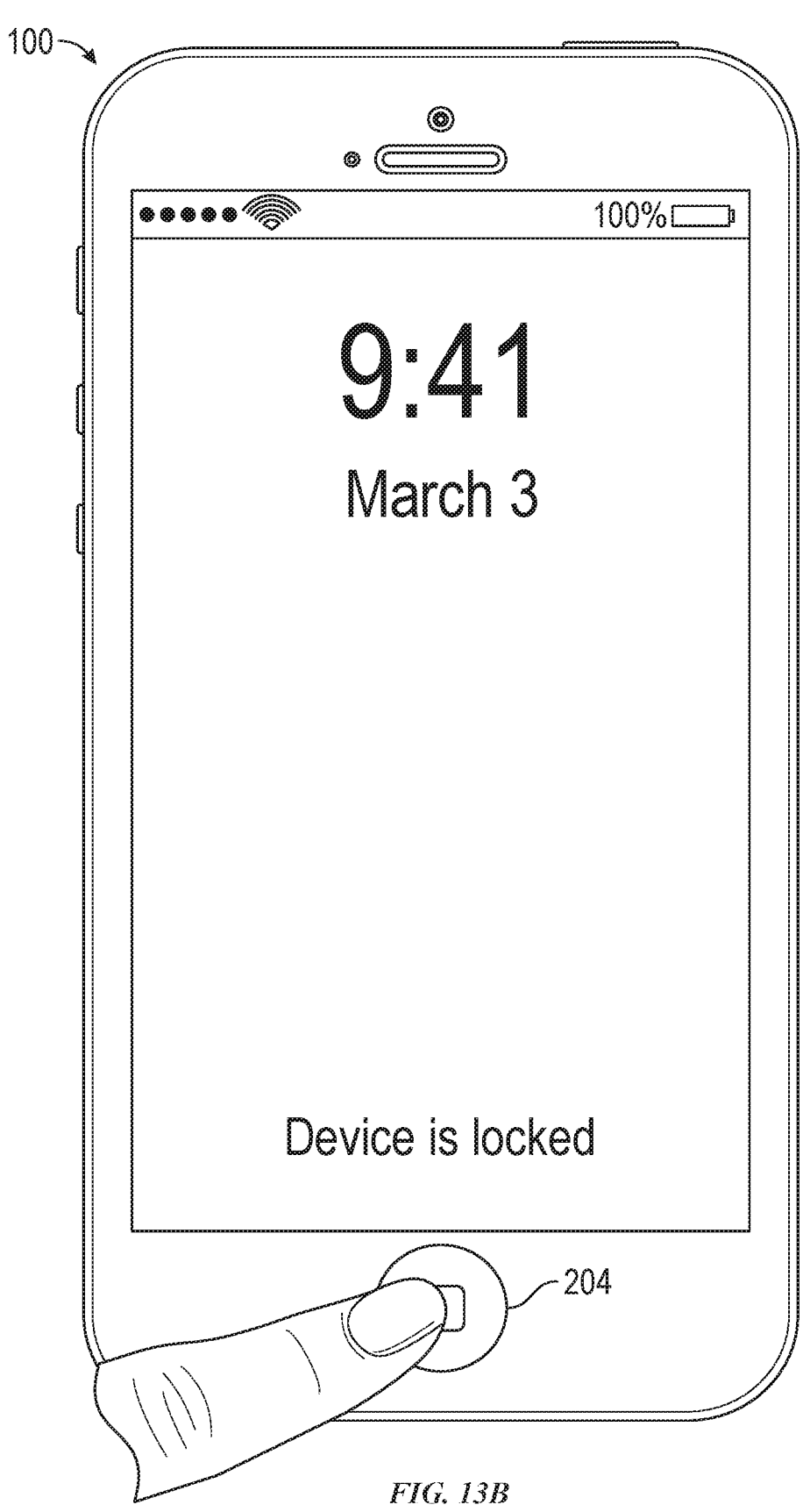

At FIG. 13B, while the electronic device is locked and in the first short-range communication radio payment mode (e.g., not enabled to participate in payment transactions via the short-range communication radio), the device detects activation of the physical input mechanism 204 (e.g., a first press of the mechanical or capacitive button). The device detects a fingerprint (e.g., at least a portion of a finger, without having to identify or match a complete fingerprint) using the integrated biometric sensor. The device determines whether the fingerprint is consistent with an enrolled fingerprint. In some examples, the determination of whether the fingerprint is consistent with the enrolled fingerprint happens before or after detecting the activation of the physical input mechanism. The device determines (e.g., at the electronic device) whether a set of one or more criteria is met. The set of one or more criteria includes a criterion that is met when the physical input mechanism 204 is reactivated within a predetermined period of time (e.g., 300 ms) after the activation of the physical input mechanism (e.g., a second press of the mechanical or capacitive button, resulting in a double-press).

Figure 13C:
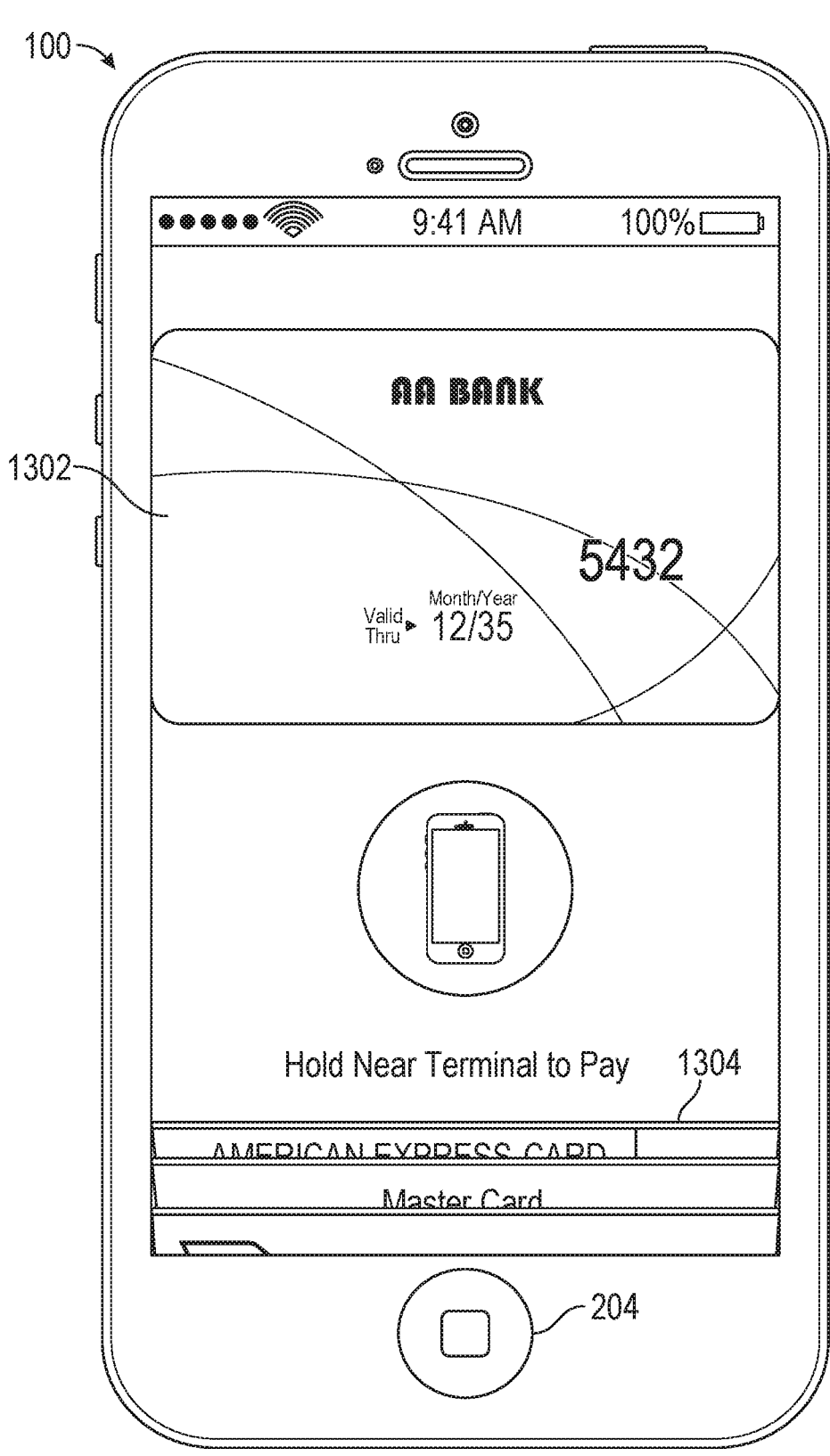

At FIG. 13C, in accordance with a determination that the fingerprint is consistent with the enrolled fingerprint and a determination that the set of one or more criteria is met (e.g., a double-press of the physical input mechanism 204 was detected), the device transitions to a second short-range communication radio payment mode different from the first short-range communication radio payment mode. For example, enabling the device to participate in payment transactions via the short-range communication radio or transitioning the electronic device to an armed state (e.g., advertising device can make a payment) in preparation for a payment transaction).

As illustrated in FIG. 13C, the user interface of the device while in the second short-range communication radio payment mode may include an indication 1302 of a payment account to be used for a payment transaction. The user interface may also include one or more affordance 1304, which when activated, change the payment account to be used for a payment transaction. While in the second short-range communication radio payment mode, the device will enabled a contactless payment terminal to engage in a payment transaction by transmitting payment account information to the contactless payment terminal. Thus, to make a payment using their electronic device while it is in a locked state, a user can merely double-press the physical input mechanism 204 and place the device into a field of a contactless payment terminal.

Figure 13D:
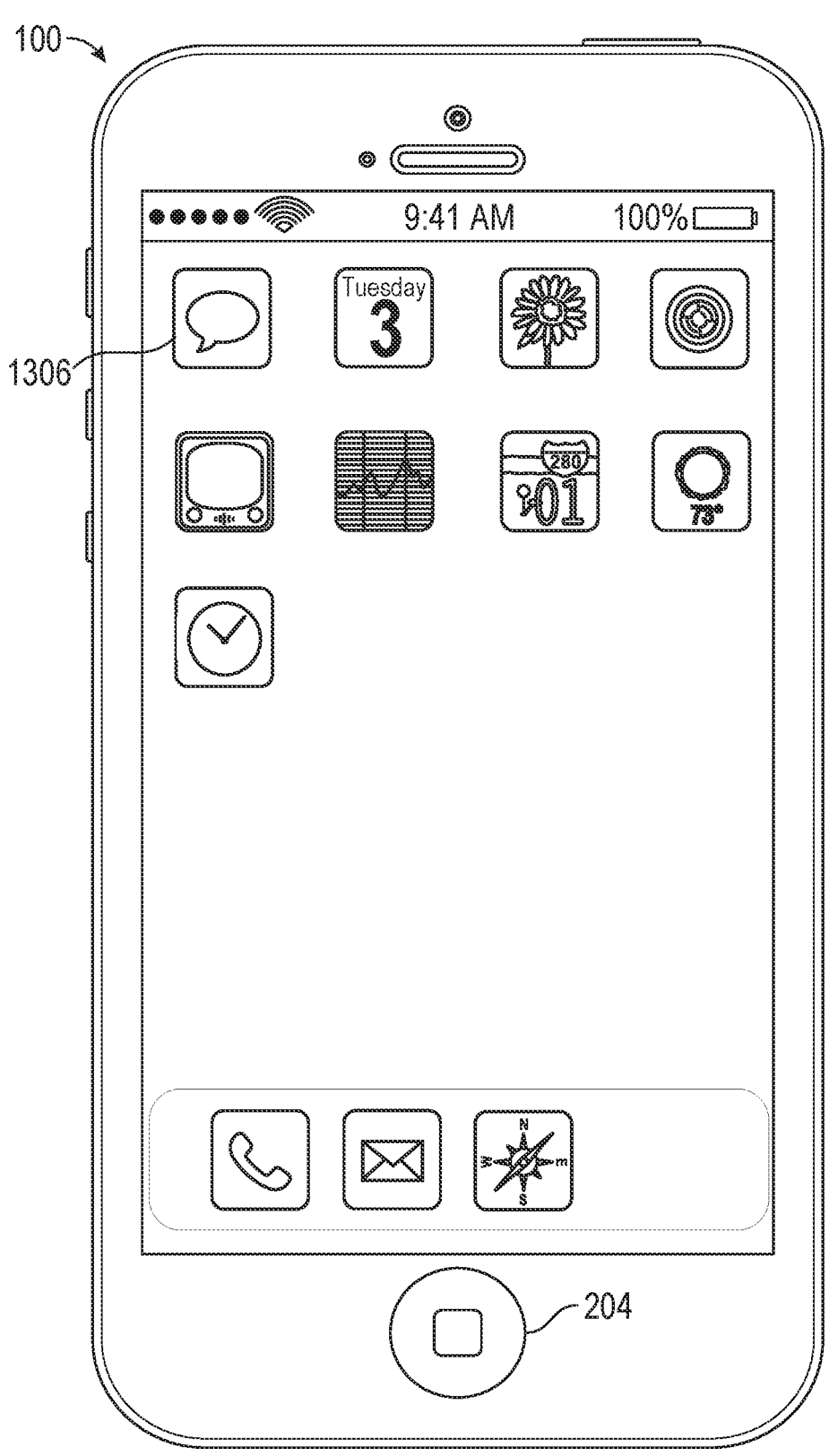

At FIG. 13D, in accordance with a determination that the fingerprint is consistent with the enrolled fingerprint and a determination that the set of one or more criteria is not met, the device unlocks (e.g., transitioning the electronic device from a lock state to an unlock state). For example, in the unlock state one or more affordances 1306 may be displayed, which when activates, start and/or display a corresponding application.

In the lock state, the electronic device 100 is powered on and operational but is prevented from performing a predefined set of operations in response to the user input. The predefined set of operations may include navigation between user interfaces, activation or deactivation of a predefined set of functions, and activation or deactivation of certain applications. The lock state may be used to prevent unintentional or unauthorized use of some functionality of the electronic device 100 or activation or deactivation of some functions on the electronic device 100. In the unlock state, the electronic device 100 is power on and operational and is not prevented from performing at least a portion of the predefined set of operations that cannot be performed while in the lock state.

In some embodiments, in accordance with the determination that the fingerprint is consistent with the enrolled fingerprint and the determination that the set of one or more criteria is met (e.g., double-press), the device forgoes unlocking. As a result, the device is in the second short-range communication radio payment mode, but remains locked.

In some embodiments, in accordance with a determination that the fingerprint is consistent with the enrolled fingerprint and a determination that the set of one or more criteria (e.g., double-press) is not met, the device forgoes transitioning to the second short-range communication radio payment mode. For example, the device unlocks, but the device remains in the first short-range communication radio payment mode.

In some embodiments, as discussed above, the first short-range communication radio payment mode is a mode in which the device is not enabled to participate in payment transactions via the short-range communication radio and the second short-range communication radio payment mode is a mode in which the device is enabled to participate in payment transactions via the short-range communication radio.

In some embodiments, the set of one or more criteria includes a criterion that is met when at least one payment account is linked to the device for use in payment transactions using the short-range communication radio (e.g., a credit card was previously provisioned on the device for NFC payments). Thus, the device must be provisioned for at least one payment account for the criteria is met. If the device is not provisioned for at least one payment account, the device does not meet the set of one or more criteria.

Thus, in one example the set of one or more criteria is satisfied when: (1) the physical input mechanism is reactivated within the predetermined period of time (e.g., 300 ms) after the activation of the physical input mechanism and (2) at least one payment account is linked to the device for use in payment transactions using the short-range communication radio.

In some embodiments, in response to detecting activation of the physical input mechanism, the device enables the integrated biometric sensor to detect fingerprints. Accordingly, power savings can be achieved by keeping the integrated biometric sensor disabled (e.g., turned off) and enabling it after detecting the activation of the physical input mechanism.

In some embodiments, in response to detecting activation of the physical input mechanism, the device turns on the display of the device. As a result, the user is notified that the activation of the physical input mechanism was detected.

In some embodiments, unlocking the device does not enable the device to participate in payment transactions via the short-range communication radio. In some embodiments, enabling the device to participate in payment transactions via the short-range communication radio does not unlock the electronic device.

In some embodiments, the device determines whether the fingerprint is consistent with an enrolled fingerprint subsequent to determining whether the set of one or more criteria is met.

In some embodiments, in accordance with a determination that the fingerprint is not consistent with the enrolled fingerprint, the device forgoes transitioning to the second short-range communication radio payment mode and forgoes unlocking the device. Thus, if the user's fingerprint is not registered with the device, the device does not unlock and does not transition to the second short-range communication radio mode.

In some embodiments, to unlock the device, the device provides fingerprint sensor information (e.g., a confirmation of a fingerprint match) of the integrated biometric sensor to a first application of the electronic device. The first application is configured to unlock the device based on the fingerprint sensor information. For example, the integrated biometric sensor sends a single-use confirmation to the operating system that allows the operating system to unlock the device.

In some embodiments, in accordance with the determination that the fingerprint is consistent with the enrolled fingerprint and the determination that the set of one or more criteria is not met, the device transitions the integrated biometric sensor from a first sensor mode to a second sensor mode. For example, while in the second sensor mode, the integrated biometric sensor sends a single-use confirmation to the operating system that allows the operating system to unlock the device. In accordance with the determination that the fingerprint is consistent with the enrolled fingerprint and the determination that the set of one or more criteria is met, the device transitions the integrated biometric sensor from the first sensor mode to a third sensor mode. For example, while in the third sensor mode, the integrated biometric sensor sends a single-use confirmation to an electronic wallet application that allows the electronic wallet application to enable the device to participate in payment transactions via the short-range communication radio. However, while in the first sensor mode, the integrated biometric sensor does not send a confirmation to the operating system or to the electronic wallet application because it does not yet know whether the single-use confirmation should be sent to the operating system or to the electronic wallet application.

FIG. 13E illustrates exemplary timelines for detected activations of a physical input mechanism. In the first exemplary timeline 1320, prior to event 1322, the electronic device is locked and in the first short-range communication radio payment mode (e.g., not enabled to participate in payment transactions via the short-range communication radio). At event 1322, the electronic device detects activation of the physical input mechanism (e.g., a first press of the mechanical or capacitive button). At event 1324, the device detects reactivation of the physical input mechanism within the 300 ms predetermined period of time. As a result, the device transitions to a second short-range communication radio payment mode (e.g., enabled to participate in payment transactions via the short-range communication radio) different from the first short-range communication radio payment mode (if a fingerprint of the user is authenticated).

In the second exemplary timeline 1330, prior to event 1332, the electronic device is locked and in the first short-range communication radio payment mode (e.g., not enabled to participate in payment transactions via the short-range communication radio). At event 1332, the electronic device detects activation of the physical input mechanism (e.g., a first press of the mechanical or capacitive button). At event 1334, the device unlocks because a second activation of the physical input mechanism was not detected within the 300 ms predetermined period of time (if a fingerprint of the user is authenticated).

FIG. 14 is a flow diagram illustrating a method for enabling an electronic device to participate in a payment transaction using a short-range communication radio, in accordance with some embodiments. Method 1400 is performed at a device (e.g., 100, 300, 500) with a short-range communication radio (e.g., NFC radio) and a physical input mechanism (e.g., mechanical or capacitive button) that includes an integrated biometric sensor (e.g., fingerprint sensor). Some operations in method 1400 may be combined, the order of some operations may be changed, and some operations may be omitted.

As described below, method 1400 provides an intuitive way for enabling an electronic device to participate in a payment transaction using a short-range communication radio. The method reduces the cognitive burden on a user for enabling an electronic device to participate in a payment transaction, thereby creating a more efficient human-machine interface. For battery-operated computing devices, enabling a user to enabling an electronic device to participate in a payment transaction using a short-range communication radio faster and more efficiently conserves power and increases the time between battery charges.

At block 1402, the electronic device is locked and in a first short-range communication radio payment mode.

At block 1404, the electronic device detects activation of the physical input mechanism 204 (e.g., a first press of the mechanical or capacitive button).

At block 1406, the electronic device detects a fingerprint (e.g., at least a portion of a finger, without having to identify or match a complete fingerprint) using the integrated biometric sensor.

At block 1408, the electronic device determines whether the fingerprint is consistent with an enrolled fingerprint. In some examples, the determination of whether the fingerprint is consistent with the enrolled fingerprint happens before or after detecting the activation of the physical input mechanism.

At block 1410, the electronic device determines (e.g., at the electronic device) whether a set of one or more criteria is met, wherein the set of one or more criteria includes a criterion that is met when the physical input mechanism is reactivated within a predetermined period of time (e.g., 300 ms) after the activation of the physical input mechanism (e.g., a second press of the mechanical or capacitive button, resulting in a double-press).

At block 1412, in accordance with a determination that the fingerprint is consistent with the enrolled fingerprint and a determination that the set of one or more criteria is met (e.g., double-press), transitioning to a second short-range communication radio payment mode different from the first short-range communication radio payment mode (e.g., enabling the device to participate in payment transactions via the short-range communication radio; transitioning the electronic device to an armed state (e.g., advertising device can make a payment) in preparation for a payment transaction).

At block 1414, in accordance with a determination that the fingerprint is consistent with the enrolled fingerprint and a determination that the set of one or more criteria is not met, unlocking the device.

In some embodiments, in accordance with the determination that the fingerprint is consistent with the enrolled fingerprint and the determination that the set of one or more criteria is met (e.g., double-press), the electronic device forgoes unlocking the device.

In some embodiments, in accordance with a determination that the fingerprint is consistent with the enrolled fingerprint and a determination that the set of one or more criteria (e.g., double-press) is not met, the electronic device forgoes transitioning to the second short-range communication radio payment mode (e.g., forgoing enabling the device to participate in payment transactions via the short-range communication radio).

In some embodiments, the first short-range communication radio payment mode is a mode in which the device is not enabled to participate in payment transactions via the short-range communication radio and the second short-range communication radio payment mode is a mode in which the device is enabled to participate in payment transactions via the short-range communication radio.

In some embodiments, the set of one or more criteria includes a criterion that is met when at least one payment account is linked to the device for use in payment transactions using the short-range communication radio (e.g., a credit card was previously provisioned on the device for NFC payments).

In some embodiments, in response to detecting activation of the physical input mechanism, the electronic device enables the integrated biometric sensor to detect fingerprints.

In some embodiments, the electronic device includes a display, and in response to detecting activation of the physical input mechanism, the electronic device turns on the display of the electronic device.

In some embodiments, unlocking the electronic device does not enable the electronic device to participate in payment transactions via the short-range communication radio. In some embodiments, enabling the electronic device to participate in payment transactions via the short-range communication radio does not unlock the electronic device.

In some embodiments, determining whether the fingerprint is consistent with an enrolled fingerprint occurs subsequent to determining whether the set of one or more criteria is met.

In some embodiments, in accordance with a determination that the fingerprint is not consistent with the enrolled fingerprint, the electronic device forgoes transitioning to the second short-range communication radio payment mode and forgoing unlocking the device.

In some embodiments, unlocking the device further comprises providing fingerprint sensor information (e.g., a confirmation of a fingerprint match) of the integrated biometric sensor to a first application of the electronic device, the first application configured to unlock the device. For example, the integrated biometric sensor sends a single-use confirmation to the OS that allows the operating system to unlock the device.

In some embodiments, in accordance with the determination that the fingerprint is consistent with the enrolled fingerprint and the determination that the set of one or more criteria is not met, the electronic device transitions the integrated biometric sensor from a first sensor mode to a second sensor mode. For example, while in the second sensor mode, the integrated biometric sensor sends a single-use confirmation to the operating system that allows the operating system to unlock the device.

In some embodiments, in accordance with the determination that the fingerprint is consistent with the enrolled fingerprint and the determination that the set of one or more criteria is met, the electronic device transitions the integrated biometric sensor from the first sensor mode to a third sensor mode. For example, while in the third sensor mode, the integrated biometric sensor sends a single-use confirmation to an electronic wallet application that allows the electronic wallet application to enable the device to participate in payment transactions via the short-range communication radio. However, while in the first sensor mode, the integrated biometric sensor does not send a confirmation to the operating system or the wallet application.

Note that details of the processes described above with respect to method 1400 (e.g., FIG. 14) are also applicable in an analogous manner to the methods described below and above. For example, method 1400 may include one or more of the characteristics of the various methods described above and below with reference to method 700, method 900, method 1100, and method 1600. For brevity, these details are not repeated below.

FIGS. 15A-15E illustrate exemplary techniques and user interfaces for enabling an electronic device to participate in a payment transaction using a short-range communication radio in accordance with some embodiments. The user interfaces in these figures are used to illustrate the processes described below, including the processes in FIG. 16.

Figure 15A:
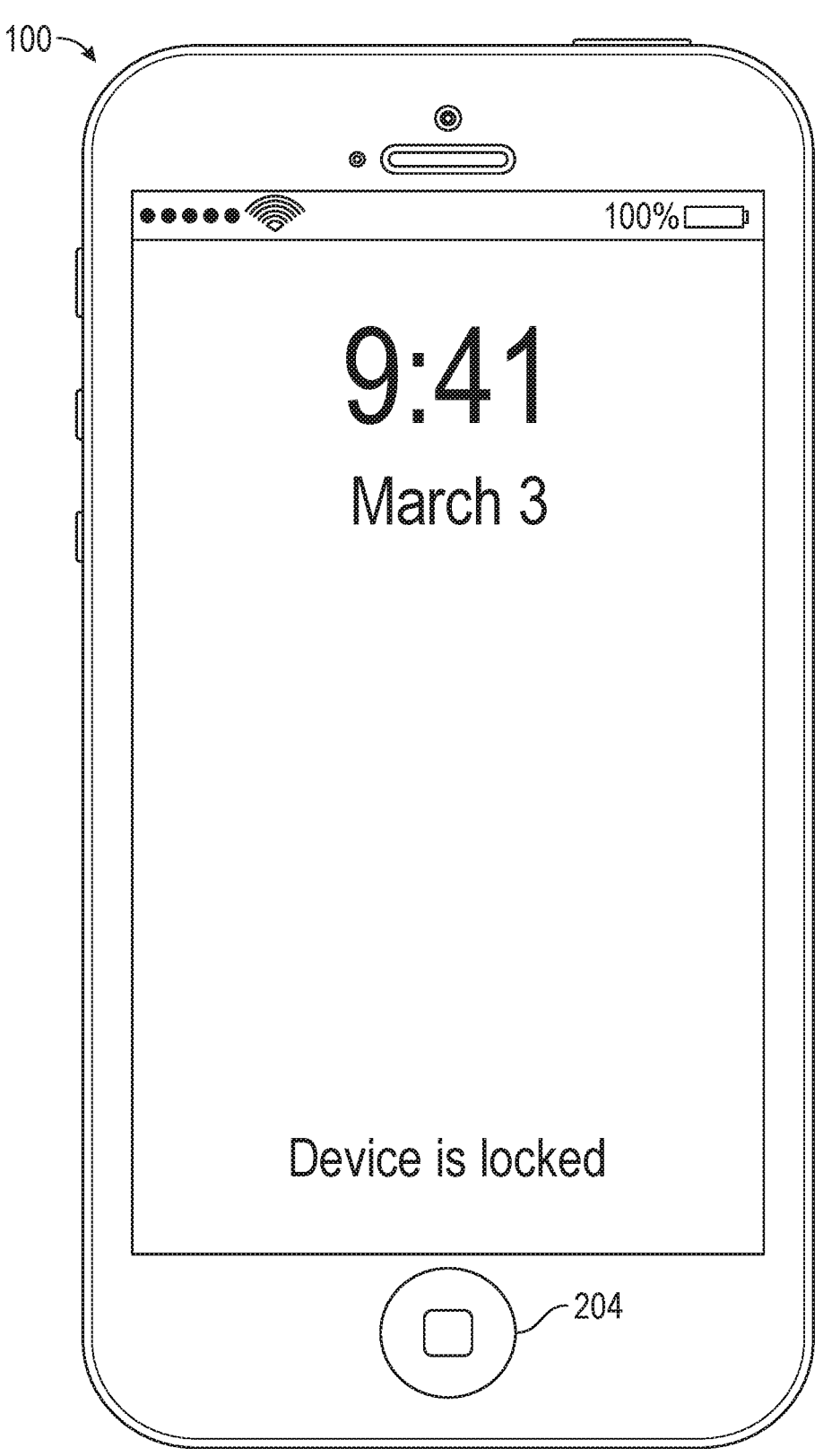

FIG. 15A illustrates electronic device 100 wherein the display is turned on, an integrated biometric sensor of physical input mechanism (menu button) 204 is enabled to detect fingerprints, the device is locked, and a short-range communication radio (e.g., NFC radio) of the device is not enabled to participate in payment transactions (a first short-range communication radio payment mode). Generally, device 100 may be in this state when the electronic device has been woken up by the user (such as by activating the physical input mechanism 204 or a button other than the physical input mechanism 204). Although the short-range communication radio may be monitoring for an NFC field, it is not enabled to participate in payment transactions.

The device may need to disambiguate between a user's request to unlock the device and a user's request to enable the device to participate in payment transactions. In some examples, (1) detecting a fingerprint without a press of the physical input mechanism 204 along with fingerprint authentication unlocks the device, (2) detecting a single press of the physical input mechanism 204 along with fingerprint authentication unlocks the device, and (3) detecting a double press of the physical input mechanism 204 along with fingerprint authentication enables the device to participate in payment transactions. Additional details of this technique are described below.

Figure 15B:
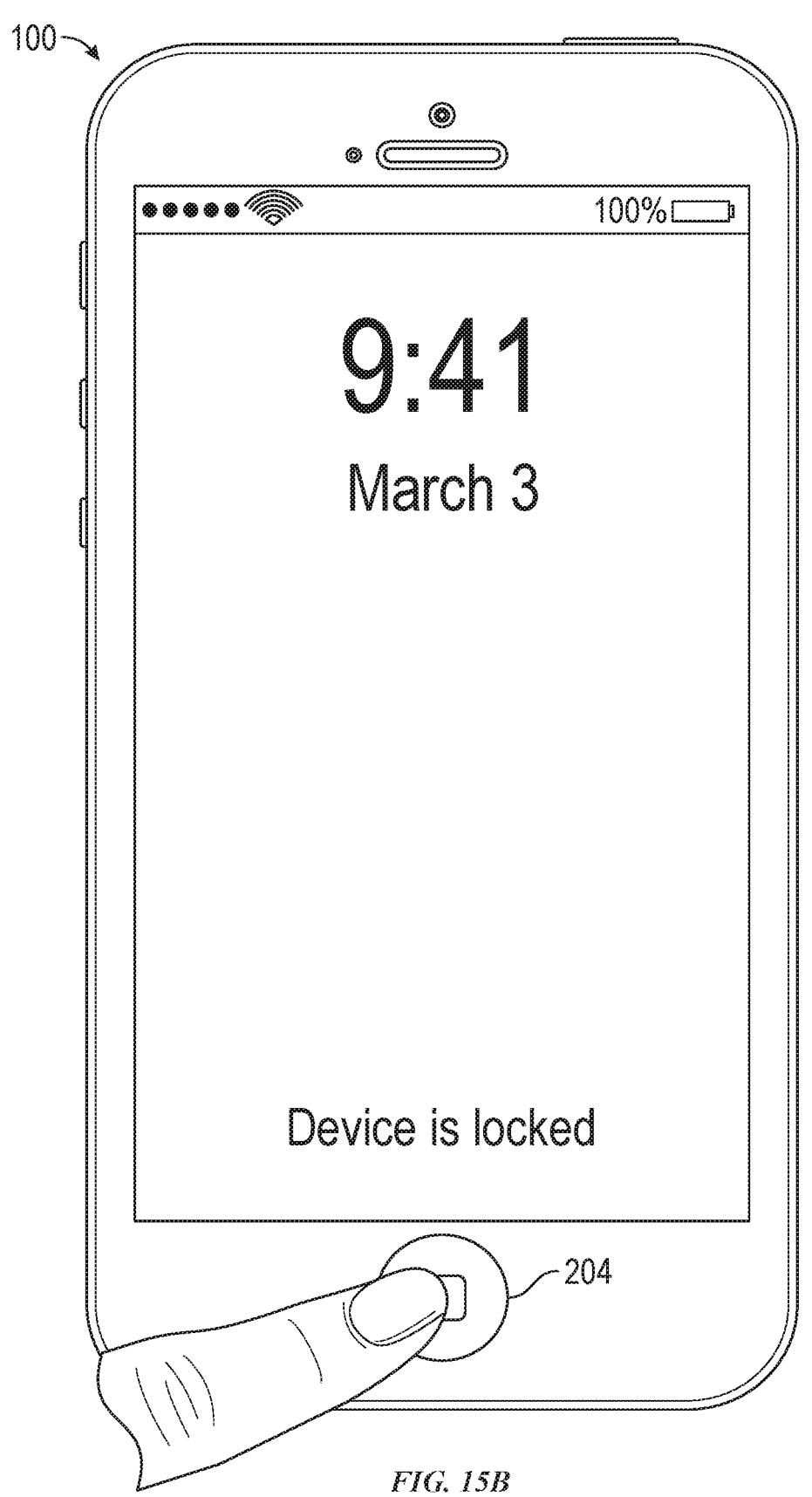

At FIG. 15B, while the electronic device is locked and in the first short-range communication radio payment mode (e.g., not enabled to participate in payment transactions via the short-range communication radio), the electronic device detects a fingerprint (e.g., at least a portion of a finger) using the integrated biometric sensor. The electronic device determines whether the fingerprint is consistent with an enrolled fingerprint. In some examples, the determination of whether the fingerprint is consistent with the enrolled fingerprint happens before or after detecting the activation of the physical input mechanism. The electronic device determines (e.g., at the electronic device) whether a set of one or more criteria is met, wherein the set of one or more criteria includes a criterion that is met when the physical input mechanism 204 is activated within a first predetermined period of time (e.g., 300 ms) after detecting the fingerprint using the biometric sensor (e.g., a first touch of the physical input mechanism).

Figure 15C:
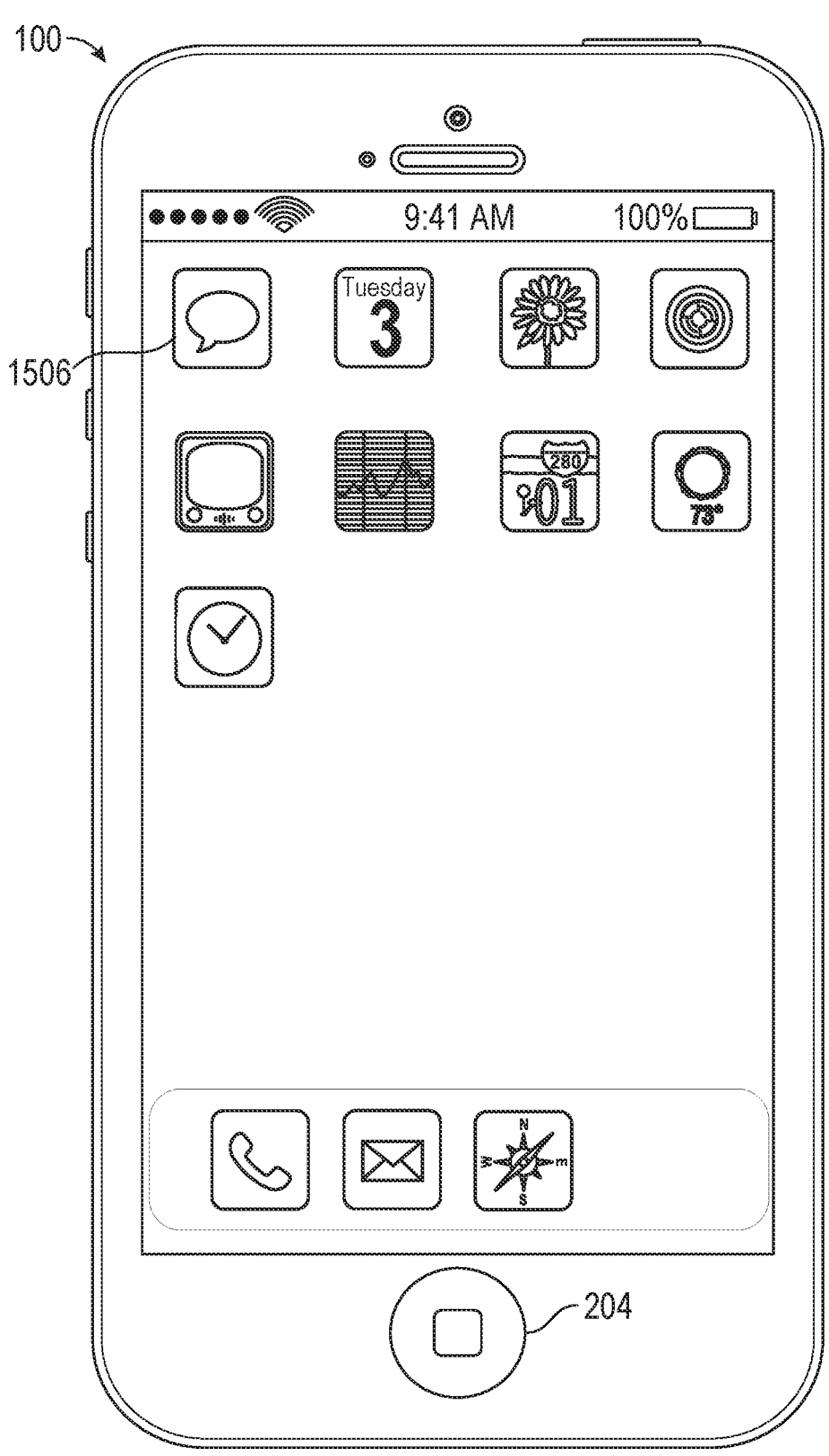

In accordance with a determination that the fingerprint is consistent with an enrolled fingerprint and a determination that the set of one or more criteria is not met (e.g., no press within 300 ms), the electronic device unlocks (e.g., transitioning the electronic device from a lock state to an unlock state), as illustrated in FIG. 15C. For example, in the unlock state one or more affordances 1506 may be displayed, which when activates, start and/or display a corresponding application.

In accordance with a determination that the set of one or more criteria is met (e.g., a press of the physical input mechanism within 300 ms), the electronic device determines (e.g., at the electronic device) whether the physical input mechanism is reactivated within a second predetermined period of time (e.g., 300 ms) after the activation of the physical input mechanism (e.g., a second press of the mechanical or capacitive button, resulting in a double-press).

In accordance with a determination that the physical input mechanism is not reactivated within the second predetermined period of time (e.g., no second press within 300 ms of the first press) and a determination that the fingerprint is consistent with an enrolled fingerprint, the electronic device locks (e.g., transitioning the electronic device from a lock state to an unlock state.), as illustrated in FIG. 15C. Thus, to unlock the electronic device, a user can place a finger on the physical input mechanism with the integrated biometric sensor and either (1) not press the physical input mechanism or (2) press the physical input mechanism once.

Figure 15D:
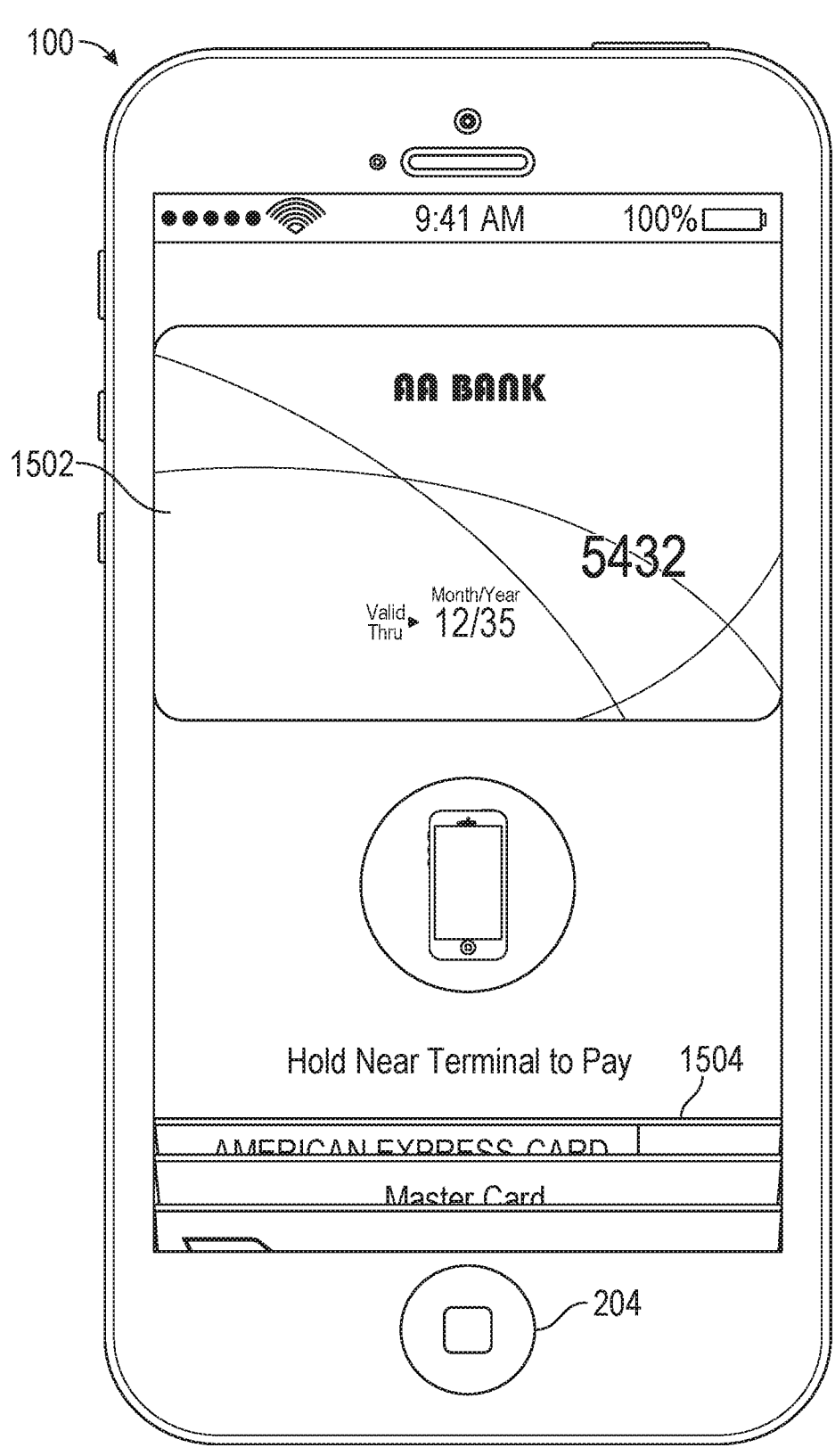

In accordance with a determination that the physical input mechanism is reactivated within the second predetermined period of time (e.g., a double-press) and in accordance with a determination that the fingerprint is consistent with an enrolled fingerprint, the electronic device transitions to a second short-range communication radio payment mode different from the first short-range communication radio payment mode (e.g., enabling the device to participate in payment transactions via the short-range communication radio; transitioning the electronic device to an armed state (e.g., advertising device can make a payment) in preparation for a payment transaction), as illustrated in FIG. 15D.

As illustrated in FIG. 15D, the user interface of the device while in the second short-range communication radio payment mode may include an indication 1502 of a payment account to be used for a payment transaction. The user interface may also include one or more affordance 1504, which when activated, change the payment account to be used for a payment transaction. While in the second short-range communication radio payment mode, the device will enabled a contactless payment terminal to engage in a payment transaction by transmitting payment account information to the contactless payment terminal. Thus, to make a payment using their electronic device while it is in a locked state, a user can merely double-press the physical input mechanism 204 and place the device into a field of a contactless payment terminal.

In the lock state, the electronic device 100 is powered on and operational but is prevented from performing a predefined set of operations in response to user input. The predefined set of operations may include navigation between user interfaces, activation or deactivation of a predefined set of functions, and activation or deactivation of certain applications. The lock state may be used to prevent unintentional or unauthorized use of some functionality of the electronic device 100 or activation or deactivation of some functions on the electronic device 100. In the unlock state, the electronic device 100 is power on and operational and is not prevented from performing at least a portion of the predefined set of operations that cannot be performed while in the lock state.

In some embodiments, in accordance with the determination that the fingerprint is consistent with the enrolled fingerprint and the determination that the set of one or more criteria is met (e.g., double-press), the electronic device forgoes unlocking.

In some embodiments, in accordance with a determination that the fingerprint is consistent with the enrolled fingerprint and a determination that the set of one or more criteria (e.g., double-press) is not met, the electronic device forgoes transitioning to the second short-range communication radio payment mode. (e.g., forgoing enabling the device to participate in payment transactions via the short-range communication radio.)

In some embodiments, the first short-range communication radio payment mode is a mode in which the device is not enabled to participate in payment transactions via the short-range communication radio and the second short-range communication radio payment mode is a mode in which the device is enabled to participate in payment transactions via the short-range communication radio.

In some embodiments, the set of one or more criteria includes a criterion that is met when at least one payment account is linked to the device for use in payment transactions using the short-range communication radio (e.g., a credit card was previously provisioned on the device for NFC payments).

Thus, in this example the set of one or more criteria is satisfied when: (1) the physical input mechanism is activated within the predetermined period of time after detection of a fingerprint and (2) at least one payment account is linked to the device for use in payment transactions using the short-range communication radio.

In some embodiments, unlocking the device does not enable the device to participate in payment transactions via the short-range communication radio. In some embodiments, enabling the device to participate in payment transactions via the short-range communication radio does not unlock the device.

In some embodiments, determining whether the fingerprint is consistent with an enrolled fingerprint occurs subsequent to determining whether the set of one or more criteria is met.

In some embodiments, in accordance with a determination that the fingerprint is not consistent with the enrolled fingerprint, the electronic device forgoes transitioning to the second short-range communication radio payment mode and forgoes unlocking the device.

In some embodiments, the electronic device includes a display and the display is on while detecting the fingerprint using the integrated biometric sensor.

In some embodiments, unlocking the device further comprises providing fingerprint sensor information (e.g., a confirmation of a fingerprint match) of the integrated biometric sensor to a first application of the electronic device, the first application configured to unlock the device. For example, the integrated biometric sensor sends a single-use confirmation to the OS that allows the operating system to unlock the device.

In some embodiments, in accordance with the determination that: (1) the fingerprint is consistent with an enrolled fingerprint and (2) the set of one or more criteria is not met (e.g., no press within 300 ms), the electronic device transitions the integrated biometric sensor from a first sensor mode to a second sensor mode. For example, while in the second sensor mode, the integrated biometric sensor sends a single-use confirmation to the operating system that allows the operating system to unlock the device.

In some embodiments, in accordance with the determination that: (1) the set of one or more criteria is met (e.g., a press within 300 ms), (2) the physical input mechanism is not reactivated within the second predetermined period of time (e.g., no second press within 300 ms of the first press), and (3) the fingerprint is consistent with an enrolled fingerprint, the electronic device transitions the integrated biometric sensor from the first sensor mode to a second sensor mode. For example, while in the second sensor mode, the integrated biometric sensor sends a single-use confirmation to the operating system that allows the operating system to unlock the device.

In some embodiments, in accordance with the determination that: (1) the set of one or more criteria is met (e.g., a press within 300 ms), (2) the physical input mechanism is reactivated within the second predetermined period of time (e.g., within another 300 ms, resulting in a double-press), and (3) the fingerprint is consistent with an enrolled fingerprint, the electronic device transitions the integrated biometric sensor from the first sensor mode to a third sensor mode. For example, while in the third sensor mode, the integrated biometric sensor sends a single-use confirmation to a wallet application that allows the wallet application to enable the device to participate in payment transactions via the short-range communication radio. However, while in the first sensor mode, the integrated biometric sensor does not send a confirmation to the operating system or the wallet application.

Thus, (1) detecting a fingerprint without a press of the physical input mechanism 204 along with fingerprint authentication transitions the integrated biometric sensor from the first sensor mode to a second sensor mode, (2) detecting a single press of the physical input mechanism 204 along with fingerprint authentication transitions the integrated biometric sensor from the first sensor mode to the second sensor mode, and (3) detecting a double press of the physical input mechanism 204 along with fingerprint authentication transitions the integrated biometric sensor from the first sensor mode to a third sensor mode.

FIG. 15E illustrates exemplary timelines for detected activations of a physical input mechanism. In the first exemplary timeline 1520, prior to event 1522, the electronic device is locked and in the first short-range communication radio payment mode (e.g., not enabled to participate in payment transactions via the short-range communication radio). At event 1522, the electronic device detects a finger on the fingerprint sensor. At event 1524, the device unlocks because an activation of the physical input mechanism was not detected within the 275 ms predetermined period of time (if a fingerprint of the user is authenticated).

In the second exemplary timeline 1530, prior to event 1532, the electronic device is locked and in the first short-range communication radio payment mode (e.g., not enabled to participate in payment transactions via the short-range communication radio). At event 1532, the electronic device detects a finger on the fingerprint sensor. At event 1534, the device detects activation of the physical input mechanism within the 275 ms predetermined period of time. At event 1536, the device unlocks because an reactivation of the physical input mechanism was not detected within the 300 ms second predetermined period of time (if a fingerprint of the user is authenticated).

In the third exemplary timeline 1540, prior to event 1542, the electronic device is locked and in the first short-range communication radio payment mode (e.g., not enabled to participate in payment transactions via the short-range communication radio). At event 1542, the electronic device detects a finger on the fingerprint sensor. At event 1544, the device detects activation of the physical input mechanism within the 275 ms predetermined period of time. At event 1546, the device detects reactivation of the physical input mechanism within the 300 ms second predetermined period of time from the first activation and, as a result, the device transitions to a second short-range communication radio payment mode (e.g., enabled to participate in payment transactions via the short-range communication radio) different from the first short-range communication radio payment mode (if a fingerprint of the user is authenticated).

FIG. 16 is a flow diagram illustrating a method for enabling an electronic device to participate in a payment transaction using a short-range communication radio, in accordance with some embodiments. Method 1600 is performed at a device (e.g., 100, 300, 500) with a short-range communication radio (e.g., NFC radio) and a physical input mechanism (e.g., mechanical or capacitive button) that includes an integrated biometric sensor (e.g., fingerprint sensor). Some operations in method 1600 may be combined, the order of some operations may be changed, and some operations may be omitted.

As described below, method 1600 provides an intuitive way for enabling an electronic device to participate in a payment transaction using a short-range communication radio. The method reduces the cognitive burden on a user for enabling an electronic device to participate in a payment transaction, thereby creating a more efficient human-machine interface. For battery-operated computing devices, enabling a user to enabling an electronic device to participate in a payment transaction using a short-range communication radio faster and more efficiently conserves power and increases the time between battery charges.

At block 1602, the electronic device is locked and in a first short-range communication radio payment mode.

At block 1604, the electronic device detects a fingerprint (e.g., at least a portion of a finger) using the integrated biometric sensor.

At block 1606, the electronic device determines whether the fingerprint is consistent with an enrolled fingerprint. In some examples, the determination of whether the fingerprint is consistent with the enrolled fingerprint happens before or after detecting the activation of the physical input mechanism.

At block 1608, the electronic device determines (e.g., at the electronic device) whether a set of one or more criteria is met, wherein the set of one or more criteria includes a criterion that is met when the physical input mechanism is activated within a first predetermined period of time after detecting the fingerprint using the biometric sensor (e.g., a first touch of the mechanical or capacitive button).

At block 1610, in accordance with a determination that the fingerprint is consistent with an enrolled fingerprint and a determination that the set of one or more criteria is not met (e.g., no press), the electronic device unlocks (e.g., transitioning the electronic device from a lock state to an unlock state).

At block 1612, in accordance with a determination that the set of one or more criteria is met (e.g., a press), blocks 1614-1618 are assessed.

At block 1614, the device determines (e.g., at the electronic device) whether the physical input mechanism is reactivated within a second predetermined period of time after the activation of the physical input mechanism (e.g., a second press of the mechanical or capacitive button, resulting in a double-press).

At block 1616, in accordance with a determination that the physical input mechanism is not reactivated within the second predetermined period of time (e.g., a second press resulting in a double-press) and a determination that the fingerprint is consistent with an enrolled fingerprint, the electronic device unlocks (e.g., transitioning the electronic device from a lock state to an unlock state).

At block 1618, in accordance with a determination that the physical input mechanism is reactivated within the second predetermined period of time (e.g., a double-press)

and in accordance with a determination that the fingerprint is consistent with an enrolled fingerprint, the electronic device transitions to a second short-range communication radio payment mode different from the first short-range communication radio payment mode (e.g., enabling the device to participate in payment transactions via the short-range communication radio; transitioning the electronic device to an armed state (e.g., advertising device can make a payment) in preparation for a payment transaction).

In some embodiments, in accordance with the determination that the fingerprint is consistent with the enrolled fingerprint and the determination that the set of one or more criteria is met (e.g., double-press), the electronic device forgoes unlocking.

In some embodiments, in accordance with a determination that the fingerprint is consistent with the enrolled fingerprint and a determination that the set of one or more criteria (e.g., double-press) is not met, the electronic device forgoes transitioning to the second short-range communication radio payment mode (e.g., forgoing enabling the device to participate in payment transactions via the short-range communication radio).

In some embodiments, the first short-range communication radio payment mode is a mode in which the device is not enabled to participate in payment transactions via the short-range communication radio and the second short-range communication radio payment mode is a mode in which the device is enabled to participate in payment transactions via the short-range communication radio.

In some embodiments, the set of one or more criteria includes a criterion that is met when at least one payment account is linked to the device for use in payment transactions using the short-range communication radio (e.g., a credit card was previously provisioned on the device for NFC payments).

Thus, in this example the set of one or more criteria is satisfied when: (1) the physical input mechanism is activated within the predetermined period of time after detection of a fingerprint and (2) at least one payment account is linked to the device for use in payment transactions using the short-range communication radio.

In some embodiments, unlocking the device does not enable the device to participate in payment transactions via the short-range communication radio. In some embodiments, enabling the device to participate in payment transactions via the short-range communication radio does not unlock the device.

In some embodiments, determining whether the fingerprint is consistent with an enrolled fingerprint occurs subsequent to determining whether the set of one or more criteria is met.

In some embodiments, in accordance with a determination that the fingerprint is not consistent with the enrolled fingerprint, the electronic device forgoes transitioning to the second short-range communication radio payment mode and forgoes unlocking the device.

In some embodiments, the electronic device includes a display and the display is on while detecting the fingerprint using the integrated biometric sensor.

In some embodiments, unlocking the device further comprises providing fingerprint sensor information (e.g., a confirmation of a fingerprint match) of the integrated biometric sensor to a first application of the electronic device, the first application configured to unlock the device. For example, the integrated biometric sensor sends a single-use confirmation to the OS that allows the operating system to unlock the device.

In some embodiments, in accordance with the determination that: (1) the fingerprint is consistent with an enrolled fingerprint and (2) the set of one or more criteria is not met (e.g., no press within 300 ms), the electronic device transitions the integrated biometric sensor from a first sensor mode to a second sensor mode. For example, while in the second sensor mode, the integrated biometric sensor sends a single-use confirmation to the operating system that allows the operating system to unlock the device. In accordance with the determination that: (1) the set of one or more criteria is met (e.g., a press within 300 ms), (2) the physical input mechanism is not reactivated within the second predetermined period of time (e.g., no second press within 300 ms of the first press), and (3) the fingerprint is consistent with an enrolled fingerprint, the electronic device transitions the integrated biometric sensor from the first sensor mode to a second sensor mode. For example, while in the second sensor mode, the integrated biometric sensor sends a single-use confirmation to the operating system that allows the operating system to unlock the device. In accordance with the determination that: (1) the set of one or more criteria is met (e.g., a press within 300 ms), (2) the physical input mechanism is reactivated within the second predetermined period of time (e.g., within another 300 ms, resulting in a double-press), and (3) the fingerprint is consistent with an enrolled fingerprint, the electronic device transitions the integrated biometric sensor from the first sensor mode to a third sensor mode. For example, while in the third sensor mode, the integrated biometric sensor sends a single-use confirmation to a wallet application that allows the wallet application to enable the device to participate in payment transactions via the short-range communication radio. However, while in the first sensor mode, the integrated biometric sensor does not send a confirmation to the operating system or the wallet application.

Thus, (1) detecting a fingerprint without a press of the physical input mechanism 204 along with fingerprint authentication transitions the integrated biometric sensor from the first sensor mode to a second sensor mode, (2) detecting a single press of the physical input mechanism 204 along with fingerprint authentication transitions the integrated biometric sensor from the first sensor mode to the second sensor mode, and (3) detecting a double press of the physical input mechanism 204 along with fingerprint authentication transitions the integrated biometric sensor from the first sensor mode to a third sensor mode.

Note that details of the processes described above with respect to method 1600 (e.g., FIG. 16) are also applicable in an analogous manner to the methods described below and above. For example, method 1600 may include one or more of the characteristics of the various methods described above with reference to method 700, method 900, method 1100, and method 1400. For brevity, these details are not repeated below.

Figure 17:
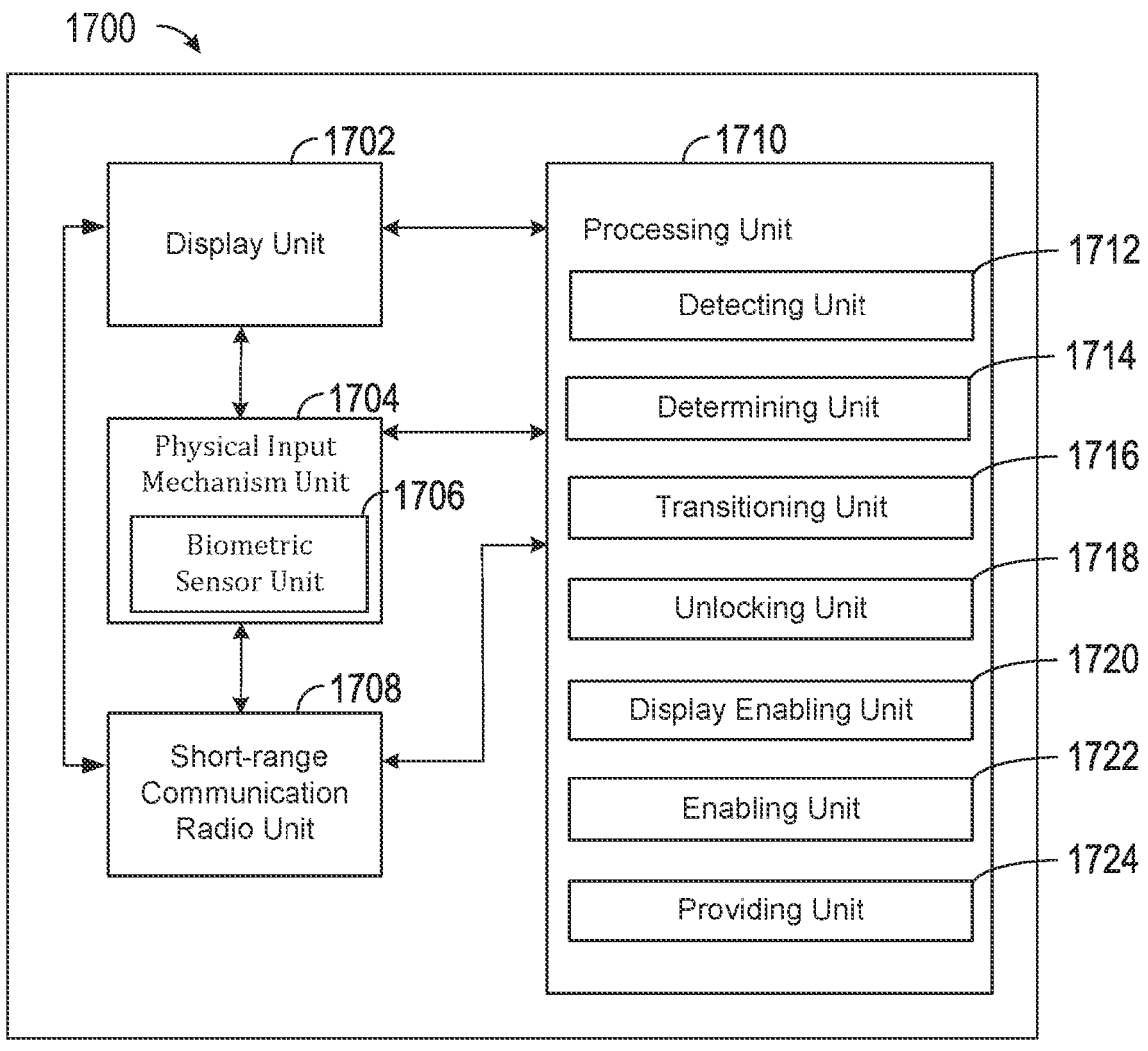
FIGS. 17-18 illustrate functional block diagrams in accordance with some embodiments.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples.

Therefore, the description herein optionally supports any possible combination or separation or further definition of the functional blocks described herein.

As shown in FIG. 17, an electronic device 1700 includes an (optional) display unit 1702 configured to display a graphic user interface, a physical input mechanism unit 1704 that includes an integrated biometric sensor unit 1706 configured to detect fingerprints, a short-range communication radio unit 1708, and a processing unit 1710 coupled to the (optional) display unit 1702, the physical input mechanism unit 1704 that includes the integrated biometric sensor unit 1706 configured to detect fingerprints, and the short-range communication radio unit 1708. In some embodiments, the processing unit 1710 includes a detecting unit 1712, a determining unit 1714, a transitioning unit 1716, an unlocking unit 1718, a display enabling unit 1720, an enabling unit 1722, and a providing unit 1724.

The processing unit 1710 is configured to: detect (e.g., using detecting unit 1712) activation of the physical input mechanism unit 1704; detect (e.g., using detecting unit 1712) a fingerprint using the integrated biometric sensor unit 1706; determine (e.g., using determining unit 1714) whether the fingerprint is consistent with an enrolled fingerprint; determine (e.g., using determining unit 1714) whether a set of one or more criteria is met, wherein the set of one or more criteria includes a criterion that is met when the physical input mechanism unit 1704 is reactivated within a predetermined period of time after the activation of the physical input mechanism unit 1704; in accordance with a determination that the fingerprint is consistent with the enrolled fingerprint and a determination that the set of one or more criteria is met, transition (e.g., using transitioning unit 1716) to a second short-range communication radio payment mode different from the first short-range communication radio payment mode (e.g., using short-range communication radio unit 1708); and in accordance with a determination that the fingerprint is consistent with the enrolled fingerprint and a determination that the set of one or more criteria is not met, unlock (e.g., using unlocking unit 1719) the electronic device.

In accordance with some embodiments, the processing unit 1710 is further configured to: in accordance with the determination that the fingerprint is consistent with the enrolled fingerprint and the determination that the set of one or more criteria is met, forgo unlocking (e.g., using the unlocking unit 1718) the device.

In accordance with some embodiments, the processing unit 1710 is further configured to: in accordance with a determination that the fingerprint is consistent with the enrolled fingerprint and a determination that the set of one or more criteria is not met, forgo transitioning (e.g., using transitioning unit 1716) to the second short-range communication radio payment mode.

In accordance with some embodiments, the first short-range communication radio payment mode is a mode in which the device is not enabled to participate in payment transactions via the short-range communication radio unit 1708 and the second short-range communication radio payment mode is a mode in which the device is enabled to participate in payment transactions via the short-range communication radio unit 1708.

In accordance with some embodiments, wherein the set of one or more criteria includes a criterion that is met when at least one payment account is linked to the electronic device for use in payment transactions using the short-range communication radio unit 1708.

In accordance with some embodiments, the processing unit 1710 is further configured to: in response to detecting (e.g., using detecting unit 1712) activation of the physical input mechanism unit 1704, enable (e.g. using enabling unit 1722) the integrated biometric sensor unit 1706 to detect fingerprints.

In accordance with some embodiments, the processing unit 1710 is further configured to: in response to detecting (e.g., using detecting unit 1712) activation of the physical input mechanism unit 1704, turning on (e.g., using display enabling unit 1720) the display unit 1702 of the electronic device.

In accordance with some embodiments, unlocking (e.g., using unlocking unit 1718) the electronic device does not enable (e.g., using enabling unit 1722) the device to participate in payment transactions via the short-range communication radio unit 1708.

In accordance with some embodiments, enabling (e.g., using enabling unit 1722) the device to participate in payment transactions via the short-range communication radio unit 1708 does not unlock (e.g., using unlocking unit 1718) the device.

In accordance with some embodiments, determining (e.g., using determining unit 1714) whether the fingerprint is consistent with an enrolled fingerprint occurs subsequent to determining (e.g., using determining unit 1714) whether the set of one or more criteria is met.

In accordance with some embodiments, the processing unit 1710 is further configured to: in accordance with a determination that the fingerprint is not consistent with the enrolled fingerprint, forgo transitioning (e.g., using transitioning unit 1716) to the second short-range communication radio payment mode and forgoing unlocking (e.g., using unlocking unit 1718) the electronic device.

In accordance with some embodiments, to unlock the device, the processing unit 1710 is further configured to: provide (e.g., using providing unit 1724) fingerprint sensor information of the integrated biometric sensor unit 1706 to a first application of the electronic device, wherein the first application configured to unlock (e.g., using unlocking unit 1718) the device.

In accordance with some embodiments, the processing unit 1710 is further configured to: in accordance with the determination that the fingerprint is consistent with the enrolled fingerprint and the determination that the set of one or more criteria is not met, transition (e.g., using transitioning unit 1716) the integrated biometric sensor unit 1706 from a first sensor mode to a second sensor mode; and in accordance with the determination that the fingerprint is consistent with the enrolled fingerprint and the determination that the set of one or more criteria is not met, transitioning (e.g., using transitioning unit 1716) the integrated biometric sensor unit 1706 from the first sensor mode to a third sensor mode.

The operations described above with reference to FIG. 14 are, optionally, implemented by components depicted in FIGS. 1A-1B or FIG. 17. For example, detecting operation 1404, determining operation 1406, and transitioning operation 1412 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
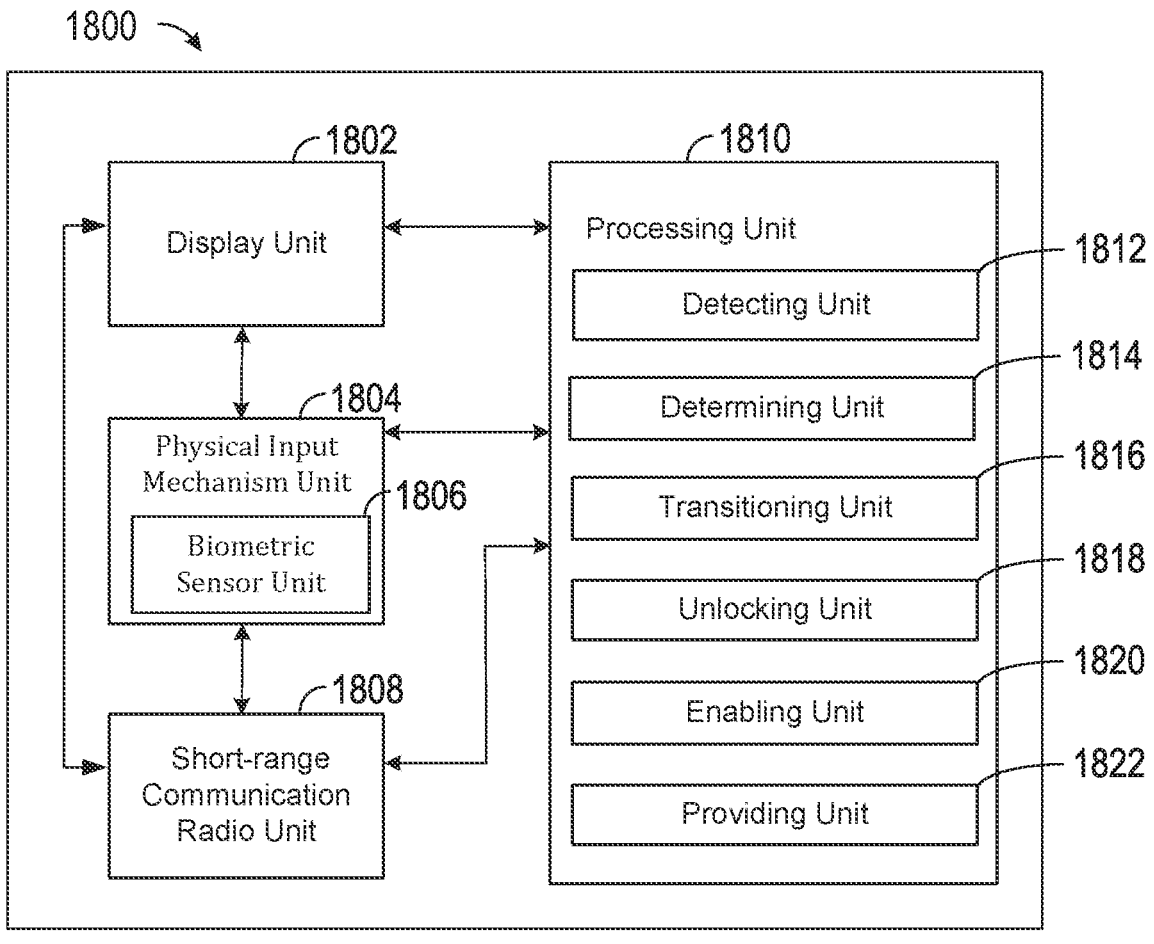

In accordance with some embodiments, FIG. 18 shows an exemplary functional block diagram of an electronic device 1800 configured in accordance with the principles of the various described embodiments. In accordance with some embodiments, the functional blocks of electronic device 1800 are configured to perform the techniques described above. The functional blocks of the device 1800 are, optionally, implemented by hardware, software, or a combination of hardware and software to carry out the principles of the various described examples. It is understood by persons of skill in the art that the functional blocks described in FIG. 18 are, optionally, combined or separated into sub-blocks to implement the principles of the various described examples. Therefore, the description herein optionally supports any possible combination or separation or further definition of the functional blocks described herein.

As shown in FIG. 18, an electronic device 1800 includes an (optional) display unit 1802 configured to display a graphic user interface, a physical input mechanism unit 1804 that includes an integrated biometric sensor unit 1806 configured to detect fingerprints, a short-range communication radio unit 1808, and a processing unit 1810 coupled to the (optional) display unit 1802, the physical input mechanism unit 1804 that includes the integrated biometric sensor unit 1806 configured to detect fingerprints, and the short-range communication radio unit 1808. In some embodiments, the processing unit 1810 includes a detecting unit 1812, a determining unit 1814, a transitioning unit 1816, an unlocking unit 1818, an enabling unit 1820, and a providing unit 1822.

The processing unit 1810 is configured to: detect (e.g., using detecting unit 1812) a fingerprint using the integrated biometric sensor unit 1806; determine (e.g., using determining unit 1814) whether the fingerprint is consistent with an enrolled fingerprint; determine (e.g., using determining unit 1814) whether a set of one or more criteria is met, wherein the set of one or more criteria includes a criterion that is met when the physical input mechanism unit 1804 is activated within a first predetermined period of time after detecting the fingerprint using the biometric sensor unit 1806; in accordance with a determination that the fingerprint is consistent with an enrolled fingerprint and a determination that the set of one or more criteria is not met, unlock (e.g., using unlocking unit 1818) the electronic device; and in accordance with a determination that the set of one or more criteria is met: determine (e.g., using determining unit 1814) whether the physical input mechanism unit 1804 is reactivated within a second predetermined period of time after the activation of the physical input mechanism unit 1804; in accordance with a determination that the physical input mechanism unit 1804 is not reactivated within the second predetermined period of time and a determination that the fingerprint is consistent with an enrolled fingerprint, unlock (e.g., using unlocking unit 1818) the electronic device; and in accordance with a determination that the physical input mechanism is reactivated within the second predetermined period of time and in accordance with a determination that the fingerprint is consistent with an enrolled fingerprint, transition (e.g., using transitioning unit 1816) to a second short-range communication radio payment mode different from the first short-range communication radio payment mode (e.g., using short-range communication radio unit 1808).

In accordance with some embodiments, the processing unit 1810 is further configured to: in accordance with the determination that the fingerprint is consistent with the enrolled fingerprint and the determination that the set of one or more criteria is met, forgo unlocking (e.g., using unlocking unit 1818) the device.

In accordance with some embodiments, the processing unit 1810 is further configured to: in accordance with a determination that the fingerprint is consistent with the enrolled fingerprint and a determination that the set of one or more criteria is not met, forgo transitioning (e.g., using transitioning unit 1816) to the second short-range communication radio payment mode.

In accordance with some embodiments, the first short-range communication radio payment mode is a mode in which the device is not enabled to participate in payment transactions via the short-range communication radio unit 1808 and the second short-range communication radio payment mode is a mode in which the device is enabled to participate in payment transactions via the short-range communication radio unit 1808.

In accordance with some embodiments, the set of one or more criteria includes a criterion that is met when at least one payment account is linked to the device for use in payment transactions using the short-range communication radio unit 1808.

In accordance with some embodiments, unlocking (e.g., using unlocking unit 1818) the device does not enable (e.g., using enabling unit 1820) the device to participate in payment transactions via the short-range communication radio unit 1808.

In accordance with some embodiments, enabling (e.g., using the enabling unit 1820) the device to participate in payment transactions via the short-range communication radio unit 1808 does not unlock (e.g., using unlocking unit 1818) the device.

In accordance with some embodiments, determining (e.g., using determining unit 1814) whether the fingerprint is consistent with an enrolled fingerprint occurs subsequent to determining (e.g., using determining unit 1814) whether the set of one or more criteria is met.

In accordance with some embodiments, the processing unit 1810 is further configured to: in accordance with a determination that the fingerprint is not consistent with the enrolled fingerprint, forgo transitioning (e.g., using transitioning unit 1816) to the second short-range communication radio payment mode and forgo unlocking (e.g., using unlocking unit 1818) the device.

In accordance with some embodiments, the display unit 1802 is on while detecting (e.g., using detecting unit 1812) the fingerprint using the integrated biometric sensor unit 1806.

In accordance with some embodiments, to unlock the device, the processing unit 1810 is further configured to: provide (e.g., using providing unit 1822) fingerprint sensor information of the integrated biometric sensor unit 1806 to a first application of the electronic device, the first application configured to unlock (e.g., using unlocking unit 1818) the electronic device.

In accordance with some embodiments, the processing unit 1810 is further configured to: in accordance with the determination that the fingerprint is consistent with an enrolled fingerprint and the determination that the set of one or more criteria is not met, transition (e.g., using transitioning unit 1816) the integrated biometric sensor unit 1806 from a first sensor mode to a second sensor mode; and in accordance with the determination that the set of one or more criteria is met: in accordance with the determination that the physical input mechanism is not reactivated within the second predetermined period of time and the determination that the fingerprint is consistent with an enrolled fingerprint, transition (e.g., using transitioning unit 1816) the integrated biometric sensor unit 1806 from the first sensor mode to a second sensor mode; and in accordance with the determination that the physical input mechanism is reactivated within the second predetermined period of time and the determination that the fingerprint is consistent with an enrolled fingerprint, transition (e.g., using transitioning unit 1816) the integrated biometric sensor unit 1806 from the first sensor mode to a third sensor mode.

The operations described above with reference to FIG. 16 are, optionally, implemented by components depicted in FIGS. 1A-1B or FIG. 18. For example, detecting operation 1604, determining operation 1606, and unlocking operation 1610 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them.

The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device comprising:

a short-range communication radio;

a physical input mechanism that includes an integrated biometric sensor;

one or more processors; and memory storing one or more programs configured to be executed by the one or more processors, the one or more processors including instructions for:

while the electronic device is locked and in a first short-range communication radio mode:

detecting activation of the physical input mechanism;

detecting a fingerprint using the integrated biometric sensor;

determining whether the fingerprint is consistent with an enrolled fingerprint; and determining whether a set of one or more criteria is met, wherein the set of one or more criteria includes a criterion that is met when the physical input mechanism is reactivated within a predetermined period of time after the activation of the physical input mechanism;

in accordance with a determination that the fingerprint is consistent with the enrolled fingerprint and a determination that the set of one or more criteria is met, transitioning to a second short-range communication radio mode different from the first short-range communication radio mode; and in accordance with a determination that the fingerprint is consistent with the enrolled fingerprint and a determination that the criterion is not met, forgoing transitioning to the second short-range communication radio mode and unlocking the electronic device.

2. The electronic device of claim 1, wherein the one or more processors further include instructions for:

in accordance with the determination that the fingerprint is consistent with the enrolled fingerprint and the determination that the set of one or more criteria is met, forgoing unlocking the electronic device.

3. The electronic device of claim 1, wherein the first short-range communication radio mode is a mode in which the electronic device is not enabled to participate in payment transactions via the short-range communication radio and the second short-range communication radio mode is a mode in which the electronic device is enabled to participate in payment transactions via the short-range communication radio.

4. The electronic device of claim 1, wherein the set of one or more criteria includes a second criterion that is met when at least one payment account is linked to the electronic device for use in payment transactions using the short-range communication radio.

5. The electronic device of claim 1, wherein the one or more processors further include instructions for:

in response to detecting activation of the physical input mechanism, enabling the integrated biometric sensor to detect fingerprints.

6. The electronic device of claim 1, wherein the electronic device includes a display, and wherein the one or more processors further include instructions for:

in response to detecting activation of the physical input mechanism, turning on the display of the electronic device.

7. The electronic device of claim 1, wherein unlocking the electronic device does not enable the electronic device to participate in payment transactions via the short-range communication radio.

8. The electronic device of claim 1, wherein enabling the electronic device to participate in payment transactions via the short-range communication radio does not unlock the electronic device.

9. The electronic device of claim 1, wherein determining whether the fingerprint is consistent with an enrolled fingerprint occurs subsequent to determining whether the set of one or more criteria is met.

10. The electronic device of claim 1, wherein the one or more processors further include instructions for:

in accordance with a determination that the fingerprint is not consistent with the enrolled fingerprint, forgoing transitioning to the second short-range communication radio mode and forgoing unlocking the electronic device.

11. The electronic device of claim 1, wherein unlocking the electronic device further comprises:

providing fingerprint sensor information of the integrated biometric sensor to a first application of the electronic device, the first application configured to unlock the electronic device.

12. The electronic device of claim 1, wherein the one or more processors further include instructions for:

in accordance with the determination that the fingerprint is consistent with the enrolled fingerprint and the determination that the criterion set is not met, transitioning the integrated biometric sensor from a first sensor mode to a second sensor mode; and in accordance with the determination that the fingerprint is consistent with the enrolled fingerprint and the determination that the set of one or more criteria is met, transitioning the integrated biometric sensor from the first sensor mode to a third sensor mode.

13. A method, comprising:

at an electronic device with a short-range communication radio and a physical input mechanism that includes an integrated biometric sensor:

while the electronic device is locked and in a first short-range communication radio mode:

detecting activation of the physical input mechanism;

detecting a fingerprint using the integrated biometric sensor;

determining whether the fingerprint is consistent with an enrolled fingerprint; and determining whether a set of one or more criteria is met, wherein the set of one or more criteria includes a criterion that is met when the physical input mechanism is reactivated within a predetermined period of time after the activation of the physical input mechanism;

in accordance with a determination that the fingerprint is consistent with the enrolled fingerprint and a determination that the set of one or more criteria is met, transitioning to a second short-range communication radio mode different from the first short-range communication radio mode; and in accordance with a determination that the fingerprint is consistent with the enrolled fingerprint and a determination that the criterion is not met, forgoing transitioning to the second short-range communication radio mode and unlocking the electronic device.

14. The method of claim 13, further comprising:

in accordance with the determination that the fingerprint is consistent with the enrolled fingerprint and the determination that the set of one or more criteria is met, forgoing unlocking the electronic device.

15. The method of claim 13, wherein the first short-range communication radio mode is a mode in which the electronic device is not enabled to participate in payment transactions via the short-range communication radio and the second short-range communication radio mode is a mode in which the electronic device is enabled to participate in payment transactions via the short-range communication radio.

16. The method of claim 13, wherein the set of one or more criteria includes a second criterion that is met when at least one payment account is linked to the electronic device for use in payment transactions using the short-range communication radio.

17. The method of claim 13, further comprising:

in response to detecting activation of the physical input mechanism, enabling the integrated biometric sensor to detect fingerprints.

18. The method of claim 13, wherein the electronic device includes a display, the method further comprising:

in response to detecting activation of the physical input mechanism, turning on the display of the electronic device.

19. The method of claim 13, wherein unlocking the electronic device does not enable the electronic device to participate in payment transactions via the short-range communication radio.

20. The method of claim 13, wherein enabling the electronic device to participate in payment transactions via the short-range communication radio does not unlock the electronic device.

21. The method of claim 13, wherein determining whether the fingerprint is consistent with an enrolled fingerprint occurs subsequent to determining whether the set of one or more criteria is met.

22. The method of claim 13, further comprising:

in accordance with a determination that the fingerprint is not consistent with the enrolled fingerprint, forgoing transitioning to the second short-range communication radio mode and forgoing unlocking the electronic device.

23. The method of claim 13, wherein unlocking the electronic device further comprises:

providing fingerprint sensor information of the integrated biometric sensor to a first application of the electronic device, the first application configured to unlock the electronic device.

24. The method of claim 13, further comprising:

in accordance with the determination that the fingerprint is consistent with the enrolled fingerprint and the determination that the criterion is not met, transitioning the integrated biometric sensor from a first sensor mode to a second sensor mode; and in accordance with the determination that the fingerprint is consistent with the enrolled fingerprint and the determination that the set of one or more criteria is met, transitioning the integrated biometric sensor from the first sensor mode to a third sensor mode.

25. A non-transitory computer-readable storage medium comprising one or more programs for execution by one or more processors of an electronic device with a short-range communication radio and a physical input mechanism that includes an integrated biometric sensor, the one or more programs including instructions for:

while the electronic device is locked and in a first short-range communication radio mode:

detecting activation of the physical input mechanism;

detecting a fingerprint using the integrated biometric sensor;

determining whether the fingerprint is consistent with an enrolled fingerprint; and determining whether a set of one or more criteria is met, wherein the set of one or more criteria includes a criterion that is met when the physical input mechanism is reactivated within a predetermined period of time after the activation of the physical input mechanism;

in accordance with a determination that the fingerprint is consistent with the enrolled fingerprint and a determination that the set of one or more criteria is met, transitioning to a second short-range communication radio mode different from the first short-range communication radio mode; and in accordance with a determination that the fingerprint is consistent with the enrolled fingerprint and a determination that the criterion is not met, forgoing transitioning to the second short-range communication radio mode and unlocking the electronic device.

26. The non-transitory computer-readable storage medium of claim 25, wherein the one or more processors further include instructions for:

in accordance with the determination that the fingerprint is consistent with the enrolled fingerprint and the determination that the set of one or more criteria is met, forgoing unlocking the electronic device.

27. The non-transitory computer-readable storage medium of claim 25, wherein the first short-range communication radio mode is a mode in which the electronic device is not enabled to participate in payment transactions via the short-range communication radio and the second short-range communication radio mode is a mode in which the electronic device is enabled to participate in payment transactions via the short-range communication radio.

28. The non-transitory computer-readable storage medium of claim 25, wherein the set of one or more criteria includes a second criterion that is met when at least one payment account is linked to the electronic device for use in payment transactions using the short-range communication radio.

29. The non-transitory computer-readable storage medium of claim 25, wherein the one or more processors further include instructions for:

in response to detecting activation of the physical input mechanism, enabling the integrated biometric sensor to detect fingerprints.

30. The non-transitory computer-readable storage medium of claim 25, wherein the electronic device includes a display, and wherein the one or more processors further include instructions for:

in response to detecting activation of the physical input mechanism, turning on the display of the electronic device.

31. The non-transitory computer-readable storage medium of claim 25, wherein unlocking the electronic device does not enable the electronic device to participate in payment transactions via the short-range communication radio.

32. The non-transitory computer-readable storage medium of claim 25, wherein enabling the electronic device to participate in payment transactions via the short-range communication radio does not unlock the electronic device.

33. The non-transitory computer-readable storage medium of claim 25, wherein determining whether the fingerprint is consistent with an enrolled fingerprint occurs subsequent to determining whether the set of one or more criteria is met.

34. The non-transitory computer-readable storage medium of claim 25, wherein the one or more processors further include instructions for:

in accordance with a determination that the fingerprint is not consistent with the enrolled fingerprint, forgoing transitioning to the second short-range communication radio mode and forgoing unlocking the electronic device.

35. The non-transitory computer-readable storage medium of claim 25, wherein unlocking the electronic device further comprises:

providing fingerprint sensor information of the integrated biometric sensor to a first application of the electronic device, the first application configured to unlock the electronic device.

36. The non-transitory computer-readable storage medium of claim 25, wherein the one or more processors further include instructions for:

in accordance with the determination that the fingerprint is consistent with the enrolled fingerprint and the determination that the criterion is not met, transitioning the integrated biometric sensor from a first sensor mode to a second sensor mode; and in accordance with the determination that the fingerprint is consistent with the enrolled fingerprint and the determination that the set of one or more criteria is met, transitioning the integrated biometric sensor from the first sensor mode to a third sensor mode.

\* \* \* \* \*